United States Patent
Robert et al.

(10) Patent No.: US 10,175,762 B2
(45) Date of Patent: Jan. 8, 2019

(54) DEVICES, METHODS, AND GRAPHICAL USER INTERFACES FOR GENERATING TACTILE OUTPUTS

(71) Applicant: Apple Inc., Cupertino, CA (US)

(72) Inventors: Julien Y. Robert, Paris (FR); Tyler M. Fox, Santa Clara, CA (US); Camille Moussette, Los Gatos, CA (US); Viktor Miladinov, Palo Alto, CA (US); Jean-Pierre M. Mouilleseaux, San Francisco, CA (US); Madeleine S. Cordier, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/688,754

(22) Filed: Aug. 28, 2017

(65) Prior Publication Data

US 2018/0067557 A1    Mar. 8, 2018

Related U.S. Application Data

(63) Continuation of application No. 15/271,073, filed on Sep. 20, 2016, now Pat. No. 9,753,541.
(Continued)

(51) Int. Cl.
*G06F 3/01* (2006.01)
*G06F 3/0488* (2013.01)
(Continued)

(52) U.S. Cl.
CPC ............ *G06F 3/016* (2013.01); *G06F 1/1684* (2013.01); *G06F 1/325* (2013.01); *G06F 3/0485* (2013.01);
(Continued)

(58) Field of Classification Search
CPC ....... G06F 3/016; G06F 3/04883; G06F 1/325
See application file for complete search history.

(56) References Cited

U.S. PATENT DOCUMENTS

| 5,959,624 A | 9/1999 | Johnston, Jr. et al. |
| 5,990,869 A | 11/1999 | Kubica et al. |

(Continued)

FOREIGN PATENT DOCUMENTS

| AU | 2016100246 A4 | 4/2016 |
| CN | 101631162 A | 1/2010 |

(Continued)

OTHER PUBLICATIONS

Notice of Allowance, dated Jan. 31, 2018, received in U.S. Appl. No. 15/619,359, 8 pages.

(Continued)

*Primary Examiner* — Abbas I Abdulselam
(74) *Attorney, Agent, or Firm* — Morgan, Lewis & Bockius LLP

(57) ABSTRACT

An electronic device displays a user interface and detects an occurrence of a first condition that triggers a first user interface event, including display of one or more changes to the user interface, associated with a tactile output. The device is not able to generate the tactile output associated with the first user interface event for a respective amount of time. In response to detecting the occurrence of the first condition, in accordance with a determination that the first user interface event corresponds to a first user interface event category, the device delays generation of the first user interface event for at least the respective amount of time, and, thereafter, displays the one or more changes to the user interface in synchronization with generation of the tactile output associated with the first user interface event.

36 Claims, 117 Drawing Sheets

Related U.S. Application Data

(60) Provisional application No. 62/384,159, filed on Sep. 6, 2016.

(51) Int. Cl.

| | | |
|---|---|---|
| *G06F 1/32* | (2006.01) | |
| *G06F 1/16* | (2006.01) | |
| *G06F 3/0485* | (2013.01) | |
| G06F 3/0482 | (2013.01) | |
| G06F 3/0484 | (2013.01) | |
| G06F 17/24 | (2006.01) | |

(52) U.S. Cl.
CPC ........ *G06F 3/0488* (2013.01); *G06F 3/04883* (2013.01); *G06F 3/0482* (2013.01); *G06F 3/04845* (2013.01); *G06F 3/04847* (2013.01); *G06F 17/245* (2013.01); *G06F 2203/04806* (2013.01)

(56) References Cited

U.S. PATENT DOCUMENTS

| | | |
|---|---|---|
| 6,424,251 B1 | 7/2002 | Byre |
| 6,433,771 B1 | 8/2002 | Yocum et al. |
| 6,560,165 B1 | 5/2003 | Barker |
| 7,130,664 B1 | 10/2006 | Williams |
| 7,305,257 B2 | 12/2007 | Ladouceur et al. |
| 7,308,253 B2 | 12/2007 | Moody et al. |
| 7,469,381 B2 | 12/2008 | Ording |
| 7,479,949 B2 | 1/2009 | Jobs et al. |
| 7,720,213 B2 | 5/2010 | Desai et al. |
| 7,768,838 B2 | 8/2010 | Kaushik et al. |
| 7,809,406 B2 | 10/2010 | Weinans |
| 7,978,183 B2 | 7/2011 | Rosenberg et al. |
| 8,026,814 B1 | 9/2011 | Heinze et al. |
| 8,131,848 B1 | 3/2012 | Denise |
| 8,165,640 B2 | 4/2012 | Mullen |
| 8,204,548 B1 | 6/2012 | Blinn et al. |
| 8,207,832 B2 | 6/2012 | Yun et al. |
| 8,209,606 B2 | 6/2012 | Ording |
| 8,266,550 B1 | 9/2012 | Cleron et al. |
| 8,331,268 B2 | 12/2012 | Hicks, III |
| 8,509,856 B1 | 8/2013 | Blinn et al. |
| 8,548,418 B1 | 10/2013 | Jintaseranee et al. |
| 8,619,051 B2 | 12/2013 | Lacroix et al. |
| 8,624,864 B2 | 1/2014 | Birnbaum et al. |
| 8,659,571 B2 | 2/2014 | Birnbaum et al. |
| 8,676,274 B2 | 3/2014 | Li |
| 8,698,766 B2 | 4/2014 | Ali et al. |
| 8,717,151 B2 | 5/2014 | Forutanpour et al. |
| 8,750,296 B2 | 6/2014 | Bosschaert et al. |
| 8,754,757 B1 | 6/2014 | Ullrich et al. |
| 8,773,356 B2 | 7/2014 | Martin et al. |
| 8,886,252 B2 | 11/2014 | Luke et al. |
| 8,886,576 B1 | 11/2014 | Sanketi et al. |
| 9,088,668 B1 | 7/2015 | Salvador |
| 9,092,953 B1 | 7/2015 | Mortimer et al. |
| 9,100,805 B2 | 8/2015 | Oshita |
| 9,110,529 B2 | 8/2015 | Kido |
| 9,166,823 B2 | 10/2015 | Karmarkar |
| 9,189,932 B2 | 11/2015 | Kerdemelidis |
| 9,247,525 B2 | 1/2016 | Jacobs et al. |
| 9,357,052 B2 | 5/2016 | Ullrich |
| 9,411,422 B1 | 8/2016 | McClendon et al. |
| 9,430,796 B1 | 8/2016 | So |
| 9,509,829 B2 | 11/2016 | Culbert et al. |
| 9,542,820 B2 | 1/2017 | Moussette et al. |
| 9,548,050 B2 | 1/2017 | Gruber et al. |
| 9,690,382 B1 | 6/2017 | Moussette et al. |
| 9,830,784 B2 | 11/2017 | Moussette et al. |
| 9,928,699 B2 | 3/2018 | Moussette et al. |
| 9,984,539 B2 | 5/2018 | Moussette et al. |
| 2001/0002126 A1 | 5/2001 | Rosenberg et al. |
| 2002/0080112 A1 | 6/2002 | Braun et al. |
| 2002/0115478 A1 | 8/2002 | Fujisawa et al. |
| 2004/0088353 A1 | 5/2004 | Mendelsohn et al. |
| 2004/0213401 A1 | 10/2004 | Aupperle et al. |
| 2004/0233161 A1 | 11/2004 | Shahoian et al. |
| 2005/0231489 A1 | 10/2005 | Ladouceur et al. |
| 2005/0275638 A1 | 12/2005 | Kolmykov-Zotov et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0045252 A1 | 3/2006 | Gorti et al. |
| 2006/0248183 A1 | 11/2006 | Barton |
| 2007/0046627 A1 | 3/2007 | Soh et al. |
| 2007/0055770 A1 | 3/2007 | Karmakar et al. |
| 2007/0088560 A1 | 4/2007 | Mock et al. |
| 2007/0106457 A1 | 5/2007 | Rosenberg |
| 2007/0146316 A1 | 6/2007 | Poupyrev et al. |
| 2007/0193436 A1 | 8/2007 | Chu |
| 2007/0226646 A1 | 9/2007 | Nagiyama et al. |
| 2007/0274503 A1 | 11/2007 | Klemm et al. |
| 2007/0283239 A1 | 12/2007 | Morris |
| 2008/0024459 A1 | 1/2008 | Poupyrev et al. |
| 2008/0122796 A1 | 5/2008 | Jobs et al. |
| 2008/0270931 A1 | 10/2008 | Bamford |
| 2009/0085878 A1 | 4/2009 | Heubel et al. |
| 2009/0128581 A1 | 5/2009 | Brid et al. |
| 2009/0135142 A1 | 5/2009 | Fu et al. |
| 2009/0167509 A1 | 7/2009 | Fadell et al. |
| 2009/0167704 A1 | 7/2009 | Terlizzi et al. |
| 2009/0178008 A1 | 7/2009 | Herz et al. |
| 2009/0215432 A1 | 8/2009 | Matsuoka |
| 2009/0215479 A1 | 8/2009 | Karmarkar |
| 2009/0222902 A1 | 9/2009 | Bender et al. |
| 2009/0231271 A1 | 9/2009 | Heubel et al. |
| 2009/0284463 A1 | 11/2009 | Morimoto et al. |
| 2009/0292990 A1 | 11/2009 | Park et al. |
| 2009/0303031 A1 | 12/2009 | Strohallen et al. |
| 2009/0322497 A1 | 12/2009 | Ku et al. |
| 2009/0325645 A1 | 12/2009 | Bang et al. |
| 2009/0325647 A1 | 12/2009 | Cho et al. |
| 2010/0017489 A1 | 1/2010 | Birnbaum et al. |
| 2010/0099445 A1 | 4/2010 | Song et al. |
| 2010/0114974 A1 | 5/2010 | Jung et al. |
| 2010/0141411 A1 | 6/2010 | Ahn et al. |
| 2010/0144395 A1 | 6/2010 | Komiya |
| 2010/0156818 A1 | 6/2010 | Burrough et al. |
| 2010/0231367 A1 | 9/2010 | Cruz-Hernandez et al. |
| 2010/0231534 A1 | 9/2010 | Chaudhri et al. |
| 2010/0231537 A1 | 9/2010 | Pisula et al. |
| 2010/0267424 A1 | 10/2010 | Kim et al. |
| 2010/0299638 A1 | 11/2010 | Choi |
| 2010/0302003 A1 | 12/2010 | Zellner |
| 2010/0302042 A1 | 12/2010 | Barnett et al. |
| 2011/0001707 A1 | 1/2011 | Faubert et al. |
| 2011/0017828 A1 | 1/2011 | Pine |
| 2011/0018695 A1 | 1/2011 | Bells et al. |
| 2011/0053577 A1 | 3/2011 | Lee et al. |
| 2011/0074695 A1 | 3/2011 | Rapp et al. |
| 2011/0266375 A1 | 3/2011 | Ono et al. |
| 2011/0081889 A1 | 4/2011 | Gao et al. |
| 2011/0102349 A1 | 5/2011 | Harris |
| 2011/0126148 A1 | 5/2011 | Krishnaraj et al. |
| 2011/0141142 A1 | 6/2011 | Leffert et al. |
| 2011/0148608 A1 | 6/2011 | Grant et al. |
| 2011/0179388 A1 | 7/2011 | Fleizach et al. |
| 2011/0190595 A1 | 8/2011 | Bennett et al. |
| 2011/0202843 A1 | 8/2011 | Morris |
| 2011/0210926 A1 | 9/2011 | Pasquero et al. |
| 2011/0252346 A1 | 10/2011 | Chaudhri et al. |
| 2011/0264491 A1 | 10/2011 | Birnbaum et al. |
| 2011/0267181 A1 | 11/2011 | Kildal |
| 2011/0267294 A1 | 11/2011 | Kildal |
| 2011/0270358 A1 | 11/2011 | Davis et al. |
| 2011/0271181 A1 | 11/2011 | Tsai et al. |
| 2011/0279380 A1 | 11/2011 | Weber et al. |
| 2011/0279381 A1 | 11/2011 | Tong et al. |
| 2011/0316698 A1 | 12/2011 | Palin et al. |
| 2012/0019365 A1 | 1/2012 | Tuikka et al. |
| 2012/0026110 A1 | 2/2012 | Yamano |
| 2012/0050324 A1 | 3/2012 | Jeong et al. |
| 2012/0056806 A1 | 3/2012 | Rosenberg et al. |

(56) References Cited

U.S. PATENT DOCUMENTS

| | | |
|---|---|---|
| 2012/0062491 A1 | 3/2012 | Coni et al. |
| 2012/0105367 A1 | 3/2012 | Son et al. |
| 2012/0174033 A1 | 7/2012 | Joo |
| 2012/0191704 A1 | 7/2012 | Jones |
| 2012/0216139 A1 | 8/2012 | Ording et al. |
| 2012/0229276 A1 | 9/2012 | Ronkainen |
| 2012/0249461 A1 | 10/2012 | Flanagan et al. |
| 2012/0286943 A1 | 11/2012 | Rothkopf et al. |
| 2012/0286944 A1 | 11/2012 | Forutanpour et al. |
| 2012/0299857 A1 | 11/2012 | Grant et al. |
| 2012/0299859 A1 | 11/2012 | Kinoshita |
| 2012/0306631 A1 | 12/2012 | Hughes |
| 2012/0306632 A1 | 12/2012 | Fleizach et al. |
| 2012/0306790 A1 | 12/2012 | Kyung et al. |
| 2012/0311477 A1 | 12/2012 | Mattos et al. |
| 2012/0327006 A1 | 12/2012 | Israr et al. |
| 2013/0091462 A1 | 4/2013 | Gray et al. |
| 2013/0167058 A1 | 6/2013 | Levee et al. |
| 2013/0174137 A1 | 7/2013 | Kim |
| 2013/0201115 A1 | 8/2013 | Heubel |
| 2013/0222224 A1 | 8/2013 | Eriksson et al. |
| 2013/0225300 A1 | 8/2013 | Brinlee |
| 2013/0234929 A1 | 9/2013 | Libin |
| 2013/0244633 A1 | 9/2013 | Jacobs et al. |
| 2013/0262298 A1 | 10/2013 | Morley |
| 2013/0265268 A1 | 10/2013 | Okumura et al. |
| 2013/0282325 A1 | 10/2013 | Takahashi et al. |
| 2013/0290442 A1 | 10/2013 | Dgani |
| 2013/0300684 A1 | 11/2013 | Kim et al. |
| 2013/0307786 A1 | 11/2013 | Heubel |
| 2013/0316744 A1 | 11/2013 | Newham et al. |
| 2013/0318437 A1 | 11/2013 | Jung et al. |
| 2013/0321317 A1 | 12/2013 | Hirukawa |
| 2013/0326367 A1 | 12/2013 | Nakamura et al. |
| 2013/0332721 A1 | 12/2013 | Chaudhri et al. |
| 2014/0007005 A1 | 1/2014 | Libin et al. |
| 2014/0024414 A1 | 1/2014 | Fuji |
| 2014/0039900 A1 | 2/2014 | Heubel et al. |
| 2014/0059427 A1 | 2/2014 | Dombrowski et al. |
| 2014/0074716 A1 | 3/2014 | Ni |
| 2014/0075375 A1 | 3/2014 | Hwang et al. |
| 2014/0082501 A1 | 3/2014 | Bae et al. |
| 2014/0091857 A1 | 4/2014 | Bernstein |
| 2014/0092037 A1 | 4/2014 | Kim |
| 2014/0132568 A1 | 5/2014 | Hirose et al. |
| 2014/0168110 A1 | 6/2014 | Araki et al. |
| 2014/0176415 A1 | 6/2014 | Buuck et al. |
| 2014/0176452 A1 | 6/2014 | Aleksov et al. |
| 2014/0176455 A1 | 6/2014 | Araki et al. |
| 2014/0181222 A1 | 6/2014 | Geris et al. |
| 2014/0181756 A1 | 6/2014 | Kuo |
| 2014/0197946 A1 | 7/2014 | Park et al. |
| 2014/0207880 A1 | 7/2014 | Malkin et al. |
| 2014/0210740 A1 | 7/2014 | Lee |
| 2014/0215494 A1 | 7/2014 | Kim |
| 2014/0218317 A1 | 8/2014 | Aberg et al. |
| 2014/0232657 A1 | 8/2014 | Aviles et al. |
| 2014/0253319 A1 | 9/2014 | Chang |
| 2014/0258857 A1 | 9/2014 | Dykstra-Erickson et al. |
| 2014/0267076 A1 | 9/2014 | Birnbaum et al. |
| 2014/0273858 A1 | 9/2014 | Panther et al. |
| 2014/0281924 A1 | 9/2014 | Chipman et al. |
| 2014/0292501 A1 | 10/2014 | Lim et al. |
| 2014/0292668 A1 | 10/2014 | Fricklas et al. |
| 2014/0300454 A1 | 10/2014 | Lacroix et al. |
| 2014/0320402 A1 | 10/2014 | Stahlberg |
| 2014/0320431 A1 | 10/2014 | Cruz-Hernandez et al. |
| 2014/0329567 A1 | 11/2014 | Chan et al. |
| 2014/0333564 A1 | 11/2014 | Hong et al. |
| 2014/0340316 A1 | 11/2014 | Gu et al. |
| 2014/0351698 A1 | 11/2014 | Nakagawa |
| 2014/0358709 A1 | 12/2014 | Wu |
| 2014/0368440 A1 | 12/2014 | Polyakov et al. |
| 2015/0002477 A1 | 1/2015 | Cheatham, III et al. |
| 2015/0020015 A1 | 1/2015 | Zhou |
| 2015/0050966 A1 | 2/2015 | West |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067563 A1 | 3/2015 | Bernstein et al. |
| 2015/0067596 A1 | 3/2015 | Brown et al. |
| 2015/0070260 A1 | 3/2015 | Saboune et al. |
| 2015/0077335 A1 | 3/2015 | Taguchi et al. |
| 2015/0078586 A1 | 3/2015 | Ang et al. |
| 2015/0089613 A1 | 3/2015 | Tippett et al. |
| 2015/0097657 A1 | 4/2015 | Gandhi et al. |
| 2015/0103028 A1 | 4/2015 | Ruemelin et al. |
| 2015/0116239 A1 | 4/2015 | Kaplan et al. |
| 2015/0123775 A1 | 5/2015 | Kerdemelidis |
| 2015/0134531 A1 | 5/2015 | Xia |
| 2015/0135109 A1 | 5/2015 | Zambetti et al. |
| 2015/0138046 A1 | 5/2015 | Moon |
| 2015/0145656 A1 | 5/2015 | Levesque et al. |
| 2015/0145657 A1 | 5/2015 | Levesque et al. |
| 2015/0149899 A1 | 5/2015 | Moussette et al. |
| 2015/0153828 A1 | 6/2015 | Monkhouse et al. |
| 2015/0153830 A1 | 6/2015 | Hirose et al. |
| 2015/0156196 A1 | 6/2015 | Kim et al. |
| 2015/0169059 A1 | 6/2015 | Behles et al. |
| 2015/0199172 A1 | 7/2015 | Ringuette et al. |
| 2015/0201065 A1 | 7/2015 | Shim et al. |
| 2015/0227204 A1 | 8/2015 | Gipson et al. |
| 2015/0227280 A1 | 8/2015 | Westerman et al. |
| 2015/0227589 A1 | 8/2015 | Chakrabarti et al. |
| 2015/0234464 A1 | 8/2015 | Yliaho |
| 2015/0244848 A1 | 8/2015 | Park et al. |
| 2015/0253835 A1 | 9/2015 | Yu |
| 2015/0254570 A1 | 9/2015 | Florence et al. |
| 2015/0254947 A1 | 9/2015 | Komori et al. |
| 2015/0261296 A1 | 9/2015 | Yoshikawa |
| 2015/0261387 A1 | 9/2015 | Petersen |
| 2015/0268725 A1 | 9/2015 | Levesque et al. |
| 2015/0286288 A1 | 10/2015 | Lee et al. |
| 2015/0293592 A1* | 10/2015 | Cheong .............. G06F 3/016 345/173 |
| 2015/0301838 A1 | 10/2015 | Steeves |
| 2015/0323996 A1 | 11/2015 | Obana et al. |
| 2015/0332226 A1 | 11/2015 | Wu et al. |
| 2015/0332565 A1 | 11/2015 | Cho et al. |
| 2015/0346916 A1 | 12/2015 | Jisrawi et al. |
| 2015/0350146 A1 | 12/2015 | Cary et al. |
| 2015/0365306 A1 | 12/2015 | Chaudhri et al. |
| 2016/0007290 A1 | 1/2016 | Lindemann et al. |
| 2016/0034253 A1 | 2/2016 | Bang et al. |
| 2016/0041750 A1 | 2/2016 | Cieplinski et al. |
| 2016/0062464 A1 | 3/2016 | Moussette et al. |
| 2016/0062465 A1 | 3/2016 | Moussette et al. |
| 2016/0062466 A1 | 3/2016 | Moussette et al. |
| 2016/0062590 A1 | 3/2016 | Karunamuni et al. |
| 2016/0063496 A1 | 3/2016 | Royyuru et al. |
| 2016/0063825 A1 | 3/2016 | Moussette et al. |
| 2016/0063826 A1 | 3/2016 | Morrell et al. |
| 2016/0063827 A1 | 3/2016 | Moussette et al. |
| 2016/0063828 A1 | 3/2016 | Moussette et al. |
| 2016/0063850 A1 | 3/2016 | Yang et al. |
| 2016/0065525 A1 | 3/2016 | Dye et al. |
| 2016/0123745 A1 | 5/2016 | Cotier et al. |
| 2016/0161922 A1 | 6/2016 | Shin |
| 2016/0165038 A1 | 6/2016 | Lim et al. |
| 2016/0179203 A1 | 6/2016 | Modarres et al. |
| 2016/0205244 A1 | 7/2016 | Dvortsov et al. |
| 2016/0246376 A1 | 8/2016 | Birnbaum et al. |
| 2016/0259499 A1 | 9/2016 | Kocienda et al. |
| 2016/0259519 A1 | 9/2016 | Foss et al. |
| 2016/0259528 A1 | 9/2016 | Foss et al. |
| 2016/0259542 A1 | 9/2016 | Chaudhri et al. |
| 2016/0295010 A1 | 10/2016 | Miller |
| 2016/0313875 A1 | 10/2016 | Williams et al. |
| 2016/0342973 A1 | 11/2016 | Jueng et al. |
| 2016/0349936 A1 | 12/2016 | Cho et al. |
| 2016/0357354 A1 | 12/2016 | Chen et al. |
| 2016/0357362 A1 | 12/2016 | Gauci et al. |
| 2016/0357363 A1 | 12/2016 | Decker et al. |

(56) References Cited

U.S. PATENT DOCUMENTS

| | | | |
|---|---|---|---|
| 2017/0011210 A1 | 1/2017 | Cheong et al. |
| 2017/0031495 A1 | 2/2017 | Smith |
| 2017/0068511 A1 | 3/2017 | Brown et al. |
| 2017/0075520 A1 | 3/2017 | Bauer et al. |
| 2017/0075534 A1 | 3/2017 | Leschenko |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0358181 A1 | 12/2017 | Moussette et al. |
| 2018/0082552 A1 | 3/2018 | Moussette et al. |
| 2018/0129292 A1 | 5/2018 | Moussette et al. |
| 2018/0204425 A1 | 7/2018 | Moussette et al. |

FOREIGN PATENT DOCUMENTS

| | | |
|---|---|---|
| CN | 101901048 A | 12/2010 |
| CN | 102484664 A | 5/2012 |
| CN | 102651920 A | 8/2012 |
| CN | 103503428 A | 1/2014 |
| CN | 1038438424 A | 6/2014 |
| DE | 102010048745 A1 | 4/2012 |
| EP | 2 141 569 A2 | 1/2010 |
| EP | 2 194 697 A1 | 6/2010 |
| EP | 2 328 063 A1 | 1/2011 |
| EP | 2 386 935 A1 | 11/2011 |
| EP | 2 434 387 A2 | 3/2012 |
| EP | 2 733 575 A1 | 5/2014 |
| EP | 2 821 912 A1 | 1/2015 |
| EP | 2 827 225 A2 | 1/2015 |
| EP | 2 846 549 A1 | 3/2015 |
| EP | 2 847 658 A1 | 3/2015 |
| EP | 2 857 933 A1 | 4/2015 |
| EP | 2 977 859 A1 | 1/2016 |
| GB | 2532766 A | 6/2016 |
| GB | 2533572 A | 6/2016 |
| JP | 2000209311 A | 7/2000 |
| JP | 2004064117 A | 2/2004 |
| JP | 2004363999 A | 12/2004 |
| JP | 2010114702 A | 5/2010 |
| JP | 2010136151 A | 6/2010 |
| JP | 2011159110 A | 8/2011 |
| JP | 2013503578 A | 1/2013 |
| JP | 2013162167 A | 8/2013 |
| KR | 20130075412 A | 7/2013 |
| KR | 20140002563 A | 1/2014 |
| TW | I388995 B | 3/2013 |
| WO | WO 01/24158 A1 | 4/2001 |
| WO | WO 2004/053830 A1 | 6/2004 |
| WO | WO 2008/075082 A1 | 6/2008 |
| WO | WO 2012/081182 A1 | 6/2012 |
| WO | WO 2013/156815 A1 | 10/2013 |
| WO | WO/ 2013/169300 A1 | 11/2013 |
| WO | WO 2013/169852 A1 | 11/2013 |
| WO | WO 2013/169854 A2 | 11/2013 |
| WO | WO 2013/169865 A2 | 11/2013 |
| WO | WO 2013/169875 A2 | 11/2013 |
| WO | WO 2014/095756 A1 | 6/2014 |
| WO | WO 2014-105275 A1 | 7/2014 |
| WO | WO 2015/116056 A1 | 8/2015 |
| WO | WO 2016/171848 A1 | 10/2016 |
| WO | WO 2017/027526 A1 | 2/2017 |

OTHER PUBLICATIONS

Office Action, dated Jan. 24, 2018, received in Danish Patent Application No. 201770369, which corresponds with U.S. Appl. No. 15/619,359, 6 pages.
Office Action, dated Dec. 26, 2017, received in Korean Patent Application No. 2017-7005874, which corresponds with U.S. Appl. No. 14/835,708, 11 pages.
Notice of Allowance, dated Nov. 22, 2017, received in U.S. Appl. No. 15/270,885, 5 pages.
Grant, dated Dec. 21, 2017, received in Australian Application No. 2017216447, which corresponds with U.S. Appl. No. 15/270,885, 1 page.
Grant, dated Dec. 21, 2017, received in Australian Application No. 2017216475, which corresponds with U.S. Appl. No. 15/270,885, 1 page.
Patent, dated Oct. 16, 2017, received in Danish Patent Application No. 201670726, which corresponds with U.S. Appl. No. 15/270,885, 2 pages.
Office Action, dated Jan. 24, 2018, received in European Patent Application No. 17177160.3, which corresponds with U.S. Appl. No. 15/270,885, 4 pages.
Grant, dated Dec. 21, 2017, received in Australian Application No. 2017213578, which corresponds with U.S. Appl. No. 15/271,073, 1 page.
Grant, dated Dec. 21, 2017, received in Australian Application No. 2017216471, which corresponds with U.S. Appl. No. 15/271,073, 1 page.
Grant, dated Dec. 21, 2017, received in Australian Application No. 2017216453, which corresponds with U.S. Appl. No. 15/271,073, 1 page.
Notice of Allowance, dated Dec. 6, 2017, received in U.S. Appl. No. 15/272,380, 11 pages.
Office Action, dated Dec. 7, 2017, received in Danish Patent Application No. 201670735, which corresponds with U.S. Appl. No. 15/272,380, 3 pages.
Office Action, dated Nov. 22, 2017, received in Chinese Patent Application No. 201710736331.5, which corresponds with U.S. Appl. No. 15/271,108, 3 pages.
Office Action, dated Nov. 30, 2017, received in U.S. Appl. No. 14/869,835, 8 pages.
International Search Report and Written Opinion, dated Nov. 29, 2017, received in International Patent Application No. PCT/US2017/037004, which corresponds with U.S. Appl. No. 15/619,359, 21 pages.
Invitation to Pay Additional Fees, dated Nov. 8, 2017, received in International Patent Application No. PCT/US2017/045152, which corresponds with U.S. Appl. No. 15/270,885, 17 pages.
International Search Report and Written Opinion, dated Jan. 18, 2018, received in International Patent Application No. PCT/US2017/045152, which corresponds with U.S. Appl. No. 15/270,885, 20 pages.
Extended European Search Report, dated Jan. 10, 2018, received in European Patent Application No. 17186196.6, which corresponds with U.S. Appl. No. 15/271,073, 8 pages.
Extended European Search Report, dated Jan. 9, 2018, received in European Patent Application No. 17186312.9, which corresponds with U.S. Appl. No. 15/271,073, 6 pages.
Extended European Search Report, dated Jan. 5, 2018, received in European Patent Application No. 17186313.7, which corresponds with U.S. Appl. No. 15/271,073, 9 pages.
International Search Report and Written Opinion, dated Jan. 16, 2018, received in International Patent Application No. PCT/US2017/045740, which corresponds with U.S. Appl. No. 15/271,073, 19 pages.
International Search Report and Written Opinion, dated Jan. 18, 2018, received in International Patent Application No. PCT/US2017/044851, which corresponds with U.S. Appl. No. 15/272,380, 17 pages.
Dosher et al., "Human Interaction with Small Haptic Effects", University of Washington, Seattle, WA, Jun. 2005, 16 pages.
Immersion, "The Value of Haptics", San Jose, California, 2010, 12 pages.
Sulaiman et al., "User Haptic Experience and the Design of Drawing Interfaces", *Interacting with Computers*, http://doi.org/10.1016/j.intcom.2009.11.009, Dec. 5, 2009, 20 pages.
VladMaxSoft, "Make Your iPhone Ring Louder When Inside a Pocket or Bag with Ringing Pocket Tweak", https://www.reddit.com/r/jailbreak/comments/1zj6zx/release_make_your_iphone_ring_louder_when_inside/, Mar. 4, 2014, 8 pages.
Notice of Allowance, dated Oct. 2, 2017, received in U.S. Appl. No. 15/619,359, 9 pages.

(56) References Cited

OTHER PUBLICATIONS

Innovation Patent, dated May 18, 2017, received in Australian Patent Application No. 2017100482, which corresponds with U.S. Appl. No. 15/619,359, 1 page.
Office Action, dated Jun. 27, 2017, received in Australian Patent Application No. 2017100482, which corresponds with U.S. Appl. No. 15/619,359, 7 page.
Notice of Allowance, dated Dec. 14, 2016, received in U.S. Appl. No. 15/270,885, 13 pages.
Notice of Allowance, dated Apr. 10, 2017, received in U.S. Appl. No. 15/270,885, 5 pages.
Notice of Allowance, dated Jul. 21, 2017, received in U.S. Appl. No. 15/270,885, 10 pages.
Notice of Acceptance, dated Aug. 18, 2017, received in Australian Patent Application No. 2017216447, which corresponds with U.S. Appl. No. 15/270,885, 3 pages.
Notice of Acceptance, dated Aug. 21, 2017, received in Australian Patent Application No. 2017216475, which corresponds with U.S. Appl. No. 15/270,885, 3 pages.
Office Action, dated Jan. 5, 2017, received in Danish Patent Application No. 201670721, which corresponds with U.S. Appl. No. 15/270,885, 7 pages.
Office Action, dated Jul. 20, 2017, received in Danish Patent Application No. 201670721, which corresponds with U.S. Appl. No. 15/270,885, 2 pages.
Office action, dated Jan. 18, 2017, received in Danish Patent Application No. 201670726, which corresponds with U.S. Appl. No. 15/270,885, 7 pages.
Office Action, dated Apr. 5, 2017, received in Danish Patent Application No. 201670726, which corresponds with U.S. Appl. No. 15/270,885, 2 pages.
Notice of Allowance, dated Jul. 18, 2017, received in Danish Patent Application No. 201670726, which corresponds with U.S. Appl. No. 15/270,885, 2 pages.
Office Action, dated Aug. 25, 2017, received in European patent Application No. 17177160.3, which corresponds with U.S. Appl. No. 15/270,885, 3 pages.
Office Action, dated Jan. 17, 2017, received in U.S. Appl. No. 15/271,073, 8 pages.
Notice of Allowance, dated May 2, 2017, received in U.S. Appl. No. 15/271,073, 5 pages.
Notice of Allowance, dated Aug. 21, 2017, received in Australian Application No. 2017213578, which corresponds with U.S. Appl. No. 15/271,073, 3 pages.
Notice of Allowance, dated Sep. 7, 2017, received in Australian Application No. 2017216471, which corresponds with U.S. Appl. No. 15/271,073, 3 pages.
Notice of Allowance, dated Aug. 24, 2017, received in Australian Application No. 2017216453, which corresponds with U.S. Appl. No. 15/271,073, 3 pages.
Office Action, dated Sep. 8, 2017, received in Chinese Application No. 201710735308.4, which corresponds with U.S. Appl. No. 15/271,073, 4 pages.
Office Action, dated Jan. 20, 2017, received in Danish Patent Application No. 201670720, which corresponds with U.S. Appl. No. 15/271,073, 9 pages.
Office Action, dated Sep. 4, 2017, received in Danish Patent Application No. 201670720, which corresponds with U.S. Appl. No. 15/271,073, 4 pages.
Office Action, dated Apr. 5, 2017, received in Danish Patent Application No. 201670724, which corresponds with U.S. Appl. No. 15/271,073, 5 pages.
Office Action, dated Aug. 1, 2017, received in Danish Patent Application No. 2016-70724, which corresponds with U.S. Appl. No. 15/271,073, 5 pages.
Office Action, dated Jan. 25, 2017, received in Danish Patent Application No. 201670725, which corresponds with U.S. Appl. No. 15/271,073, 6 pages.
Office Action, dated Apr. 5, 2017, received in Danish Patent Application No. 201670725, which corresponds with U.S. Appl. No. 15/271,073, 3 pages.
Office Action, dated Feb. 10, 2017, received in U.S. Appl. No. 15/272,380, 18 pages.
Certificate of Grant, dated Aug. 23, 2017, received in Australian Patent Application No. 20171010920, which corresponds with U.S. Appl. No. 15/272,380, 1 page.
Office Action, dated Feb. 23, 2017, received in Danish Patent Application No. 201670729, which corresponds with U.S. Appl. No. 15/272,380, 9 pages.
Office Action, dated Aug. 28, 2017, received in Danish Patent Application No. 201670729, which corresponds with U.S. Appl. No. 15/272,380, 3 pages.
Office Action, dated Jan. 24, 2017, received in Danish Patent Application No. 201670735, which corresponds with U.S. Appl. No. 15/272,380, 8 pages.
Office Action, dated Jul. 27, 2017, received in Danish Patent Application No. 201670735, which corresponds with U.S. Appl. No. 15/272,380, 3 pages.
Office Action, dated Jan. 11, 2017, received in Danish Patent Application No. 201670736, which corresponds with U.S. Appl. No. 15/272,380, 11 pages.
Office Action, dated Aug. 30, 2017, received in Danish Patent Application No. 201670736, which corresponds with U.S. Appl. No. 15/272,380, 4 pages.
Office Action, dated Jan. 30, 2017, received in Danish Patent Application No. 201670737, which corresponds with U.S. Appl. No. 15/272,380, 9 pages.
Office Action, dated Aug. 31, 2017, received in Danish Patent Application No. 201670737, which corresponds with U.S. Appl. No. 15/272,380, 4 pages.
Notice of Allowance, dated Feb. 22, 2017, received in U.S. Appl. No. 15/271,534, 13 pages.
Office Action, dated Jan. 10, 2017, received in U.S. Appl. No. 15/271,653, 9 pages.
Office Action, dated Jan. 27, 2017, received in U.S. Appl. No. 15/271,708, 8 pages.
Notice of Allowance, dated Apr. 5, 2017, received in U.S. Appl. No. 15/271,708, 5 pages.
Office Action, dated Nov. 30, 2015, received in U.S. Appl. No. 14/835,708, 28 pages.
Final Office Action, dated May 20, 2016, received in U.S. Appl. No. 14/835,708, 7 pages.
Notice of Allowance, dated Aug. 29, 2016, received in U.S. Appl. No. 14/835,708, 9 pages.
Office Action, dated Aug. 1, 2016, received in Taiwanese Patent Application No. 104126890, which corresponds with U.S. Appl. No. 14/835,708, 17 pages.
Office Action, dated Dec. 20, 2016, received in Taiwanese Patent Application No. 104126890, which corresponds with U.S. Appl. No. 14/835,708, 5 pages.
Office Action, dated Dec. 28, 2016, received in Taiwanese Patent Application No. 104126890, which corresponds with U.S. Appl. No. 14/835,708, 3 pages.
Office action, dated Apr. 5, 2017, received in Taiwanese Patent Application No. 105139726, which corresponds with U.S. Appl. No. 14/835,708, 2 pages.
Notice of Allowance, dated Jul. 21, 2017, received in Taiwanese Patent Application No. 105139726, which corresponds with U.S. Appl. No. 14/835,708, 6 pages.
Office Action, dated Feb. 12, 2016, received in U.S. Appl. No. 14/869,825, 15 pages.
Final Office Action, dated Jul. 8, 2016, received in U.S. Appl. No. 14/869,825, 20 pages.
Office Action, dated Dec. 27, 2016, received in U.S. Appl. No. 14/869,825, 27 pages.
Office Action, dated Feb. 12, 2016, received in U.S. Appl. No. 14/869,829, 20 pages.
Final Office Action, dated Aug. 8, 2016, received in U.S. Appl. No. 14/869,829, 28 pages.
Office Action, dated Mar. 7, 2017, received in U.S. Appl. No. 14/869,829, 24 pages.

(56) References Cited

OTHER PUBLICATIONS

Final Office Action, dated Jul. 24, 2017, received in U.S. Appl. No. 14/869,829, 30 pages.
Office Action, dated Feb. 18, 2016, received in U.S. Appl. No. 14/869,834, 17 pages.
Final Office Action, dated Aug. 8, 2016, received in U.S. Appl. No. 14/869,834, 22 pages.
Office Action, dated Mar. 7, 2017, received in U.S. Appl. No. 14/869,834, 20 pages.
Final Office Action, dated Jul. 25, 2017, received in U.S. Appl. No. 14/869,834, 18 pages.
Office Action, dated Feb. 17, 2016, received in U.S. Appl. No. 14/869,835, 15 pages.
Final Office Action, dated Aug. 4, 2016, received in U.S. Appl. No. 14/869,835, 21 pages.
Office Action, dated Jan. 6, 2017, received in U.S. Appl. No. 14/869,835, 17 pages.
Final Office Action, dated Jun. 28, 2017, received in U.S. Appl. No. 14/869,835, 24 pages.
Office Action, dated Dec. 30, 2015, received in U.S. Appl. No. 14/869,837, 35 pages.
Final Office Action, dated Jun. 30, 2016, received in U.S. Appl. No. 14/869,837, 37 pages.
Office Action, dated Jan. 17, 2017, received in U.S. Appl. No. 14/869,837, 27 pages.
Notice of Allowance, dated Jul. 31, 2017, received in U.S. Appl. No. 14/869,837, 27 pages.
Office Action, dated Aug. 31, 2017, received in Danish Patent Application No. 201770372, 10 pages.
International Search Report and Written Opinion, dated Mar. 15, 2016, received in International Patent Application No. PCT/US2015/041858, which corresponds with U.S. Appl. No. 14/835,708, 31 pages.
Certificate of Examination, dated Oct. 27, 2017, received in Australian Patent Application No. 2017100482, which corresponds with U.S. Appl. No. 15/619,359, 1 page.
Decision to Grant, dated Oct. 25, 2017, received in Danish Patent Application No. 201670721, which corresponds with U.S. Appl. No. 15/270,885, 2 pages.
Office Action, dated Oct. 12, 2017, received in Danish Patent Application No. 201670725, which corresponds with U.S. Appl. No. 15/271,073, 3 pages.
Office Action, dated Oct. 4, 2017, received in Australian Patent Application No. 2017101091, which correspond with U.S. Appl. No. 15/272,380, 8 pages.
Office Action, dated Sep. 13, 2017, received in Chinese Patent Application No. 201710728497.2, which corresponds with U.S. Appl. No. 15/271,653, 3 pages.
Office Action, dated Oct. 30, 2017, received in Australian Patent Application No. 2015312344, which corresponds with U.S. Appl. No. 14/835,708, 2 pages.
Patent, dated Nov. 1, 2017, received in Taiwanese Patent Application No. 105139726, which corresponds with U.S. Appl. No. 14/835,708, 5 pages.
Notice of Allowance, dated Nov. 7, 2017, received in U.S. Appl. No. 14/869,834, 9 pages.
Extended European Search Report, dated Oct. 20, 2017, received in European Patent Application No. 17177493.8, 6 pages.
Office Action, dated Feb. 14, 2018, received in Danish Patent Application No. 2016-70724, which corresponds with U.S. Appl. No. 15/271,073, 2 pages.
Office Action, dated May 16, 2018, received in Danish Patent Application No. 201670725, which corresponds with U.S. Appl. No. 15/271,073, 2 pages.
Notice of Allowance, dated Mar. 8, 2018, received in U.S. Appl. No. 15/272,380, 11 pages.
Certificate of Grant, dated Apr. 26, 2018, received in Australian Patent Application No. 2018100429, which corresponds with U.S. Appl. No. 15/272,380, 1 page.
Office Action, dated May 31, 2018, received in Australian Patent Application No. 2018100429, which corresponds with U.S. Appl. No. 15/272,380, 5 pages.
Office Action, dated Mar. 9, 2018, received in Danish Patent Application No. 01670729, which corresponds with U.S. Appl. No. 15/272,380, 2 pages.
Office Action, dated May 17, 2018, received in Danish Patent Application No. 01670729, which corresponds with U.S. Appl. No. 15/272,380, 2 pages.
Office Action, dated Mar. 16, 2018, received in Danish Patent Application No. 201670736, which corresponds with U.S. Appl. No. 15/272,380, 4 pages.
Notice of Acceptance, dated Apr. 5, 2018, received in Australian Patent Application No. 2015312344, which corresponds with U.S. Appl. No. 14/835,708, 5 pages.
Office Action, dated May 11, 2018, received in Japanese Patent Application No. 2017509011, which corresponds with U.S. Appl. No. 14/835,708, 8 pages.
Patent, dated Apr. 11, 2018, received in Taiwanese Patent Application No. 104126890, which corresponds with U.S. Appl. No. 14/835,708, 5 pages.
Examiner's Answer, dated Mar. 21, 2018, received in U.S. Appl. No. 14/869,829, 8 pages.
Notice of Allowance, dated May 29, 2018, received in U.S. Appl. No. 14/869,835, 12 pages.
Office Action, dated Apr. 17, 2018, received in Danish Patent Application No. 201770372, 5 pages.
Office Action, dated Jun. 15, 2018, received in Danish Patent Application No. 201670735, which corresponds with U.S. Appl. No. 15/272,380, 2 pages.
Notice of Allowance, dated Jul. 12, 2018, received in U.S. Appl. No. 15/275,083, 22 pages.
Office Action, dated Jul. 20, 2018, received in U.S. Appl. No. 15/905,671, 7 pages.
Office Action, dated Aug. 6, 2018, received in Danish Patent Application No. 201770369, which corresponds with U.S. Appl. No. 15/619,359, 5 pages.
Office Action, dated Aug. 14, 2018, received in Danish Patent Application No. 201670720, which corresponds with U.S. Appl. No. 15/271,073, 2 pages.
Certificate of Examination, dated Aug. 7, 2018, received in Australian Patent Application No. 2018100429, which corresponds with U.S. Appl. No. 15/272,380, 1 page.
Office Action, dated Jul. 25, 2018, received in Danish Patent Application No. 201670737, which corresponds with U.S. Appl. No. 15/272,380, 5 pages.
Final Office Action, dated Jul. 17, 2018, received in Korean Patent Application No. 2017-7005874, which corresponds with U.S. Appl. No. 14/835,708, 3 pages.
Notice of Allowance, dated Aug. 27, 2018, received in U.S. Appl. No. 15/273,688, 27 pages.
Certificate of Grant, dated Aug. 2, 2018, received in Australian Patent Application No. 2015312344, which corresponds with U.S. Appl. No. 14/835,708, 1 page.
International Search Report and Written Opinion, dated Aug. 22, 2018, received in International Patent Application No. PCT/US2018032936, which corresponds with U.S. Appl. No. 15/972,040, 14 pages.

* cited by examiner

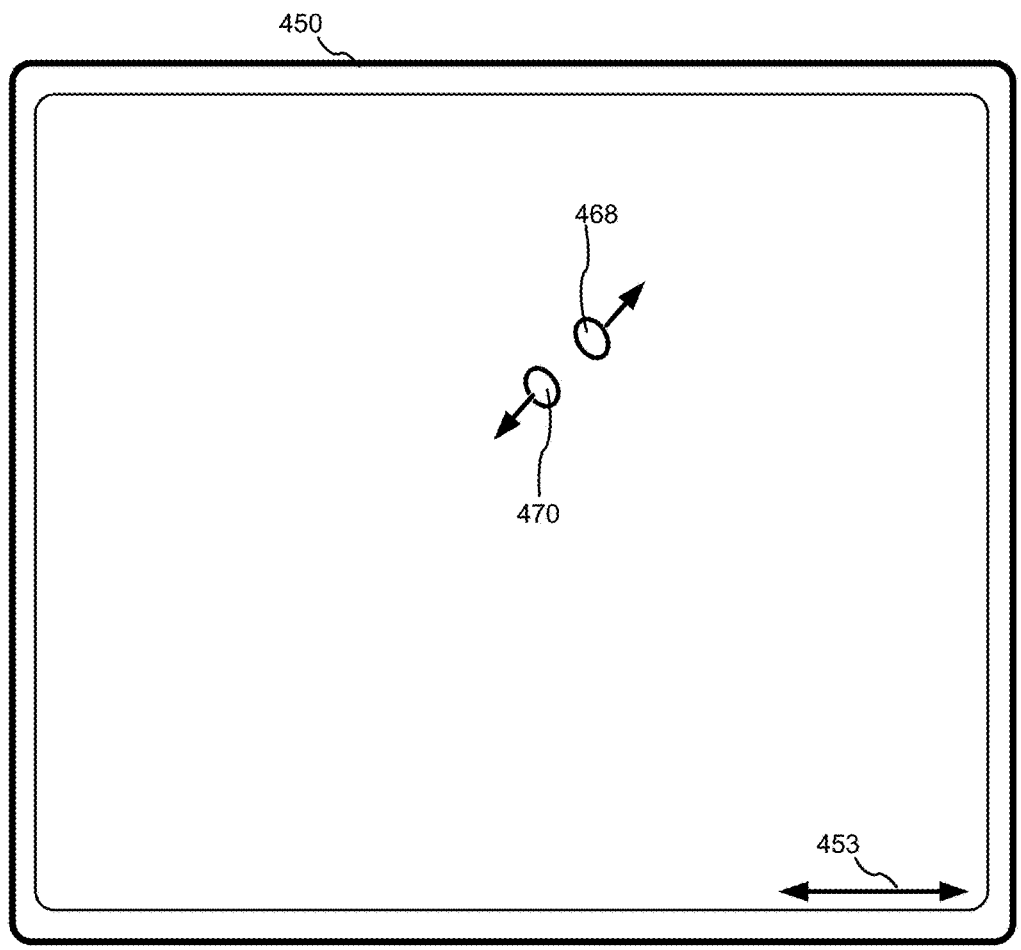
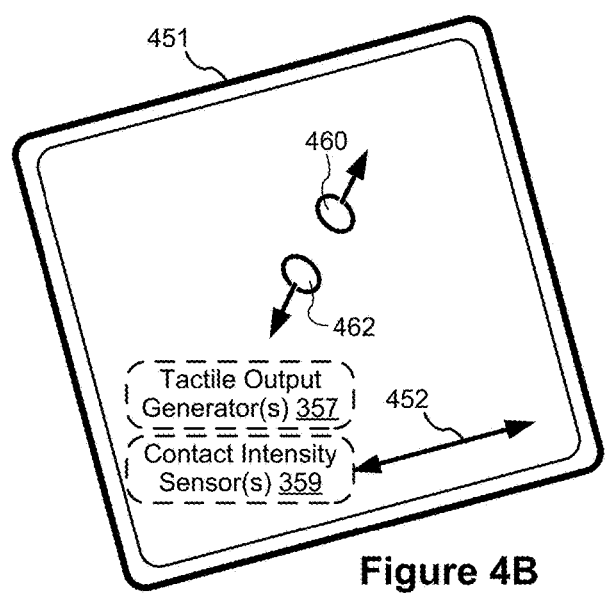
Figure 4B

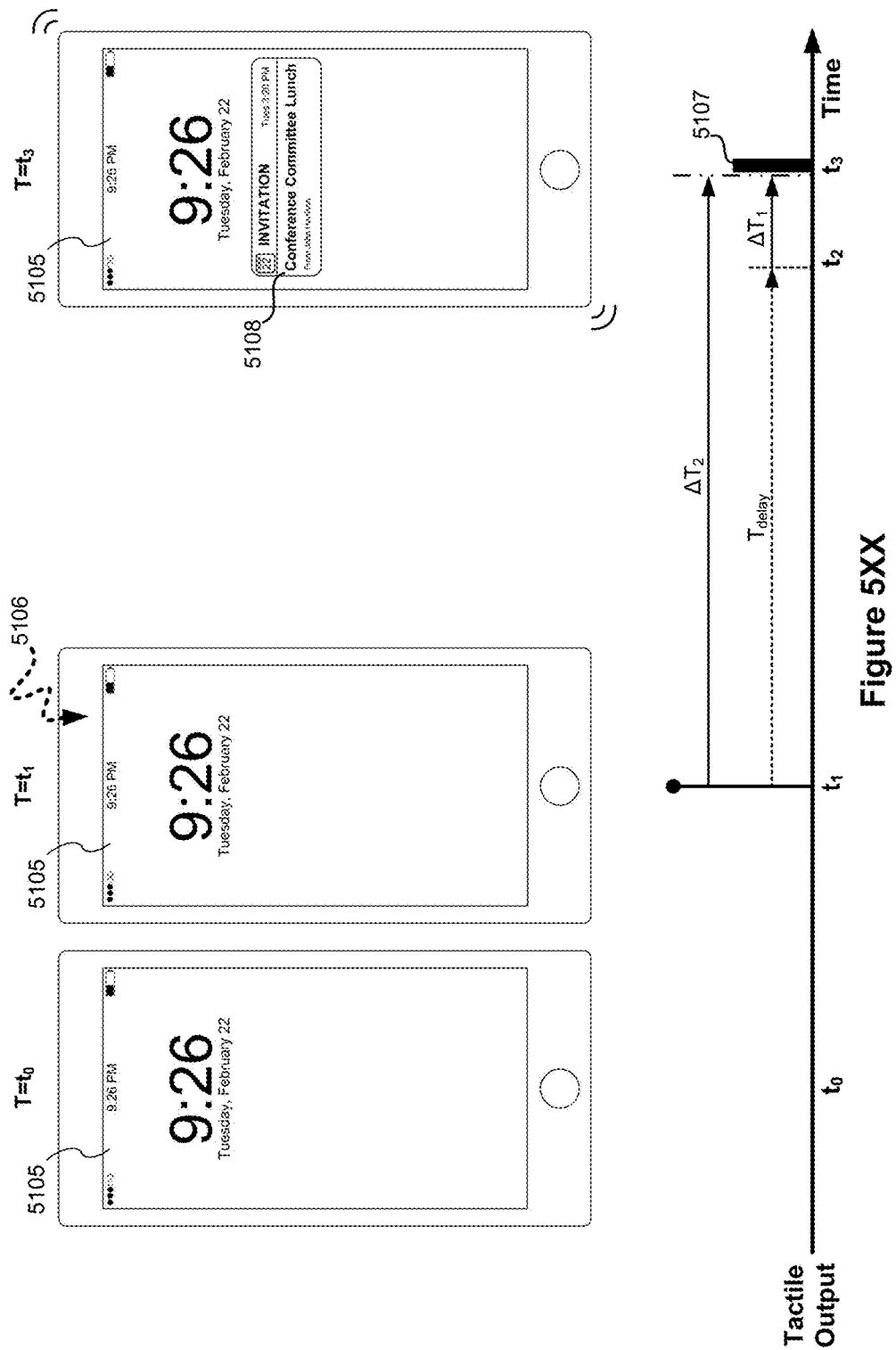

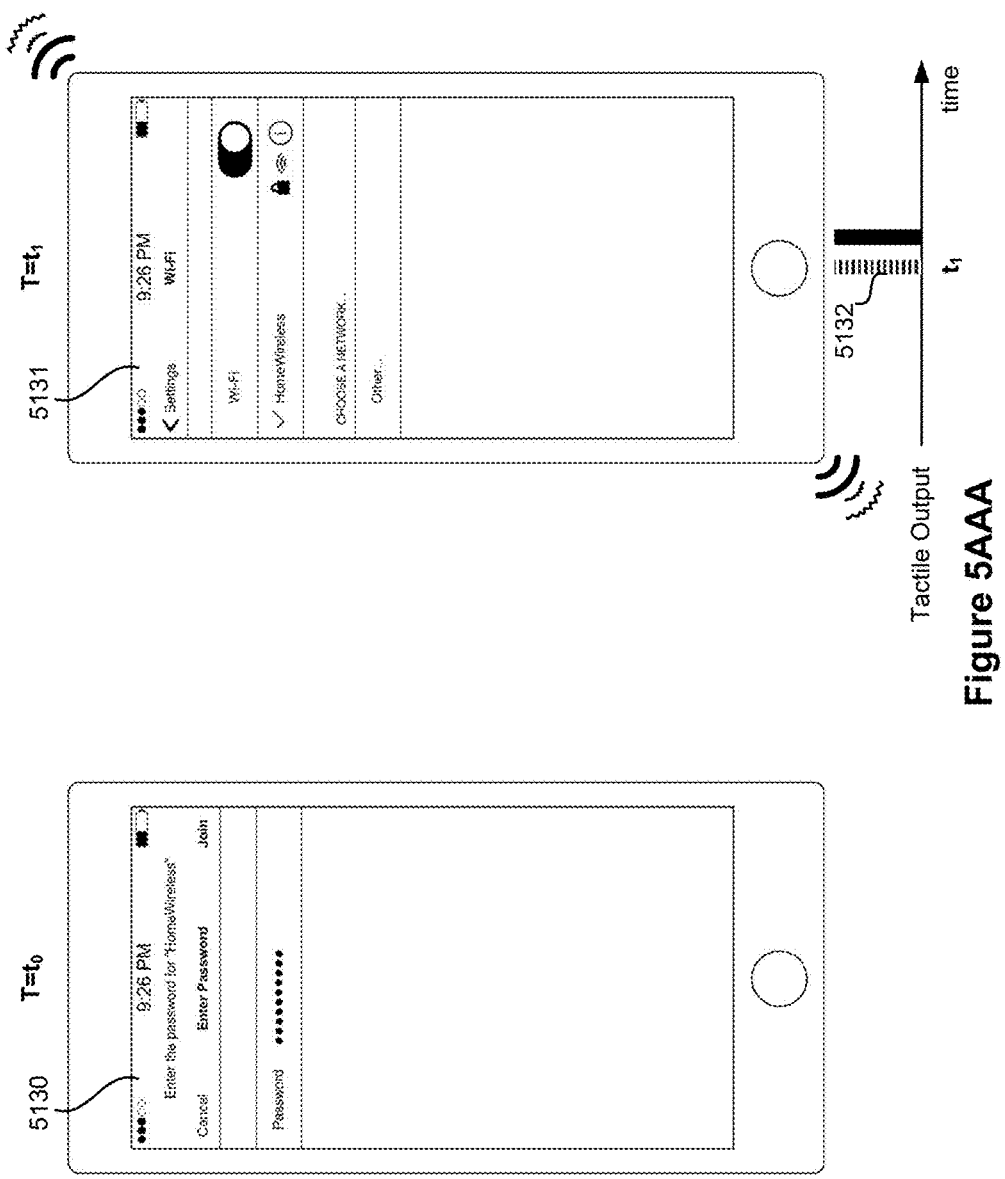
Figure 5AAA

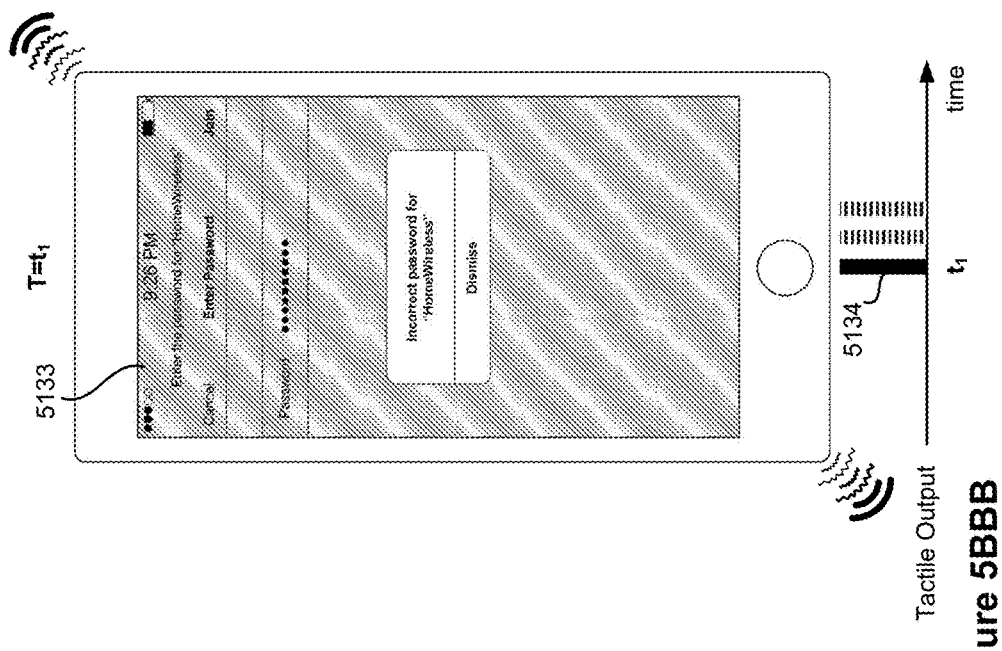
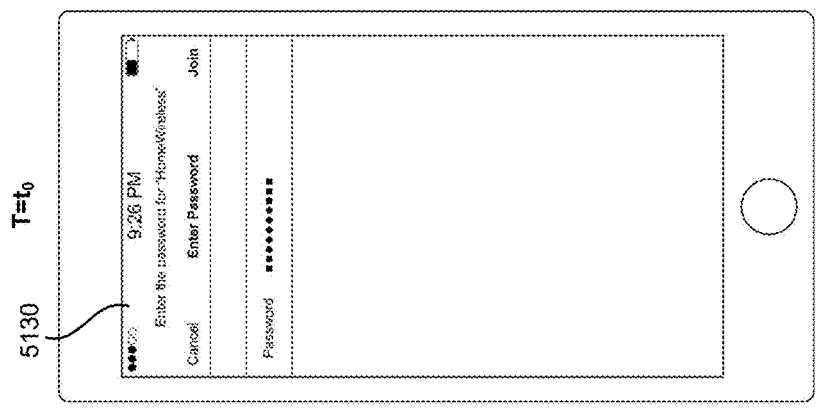
Figure 5BBB

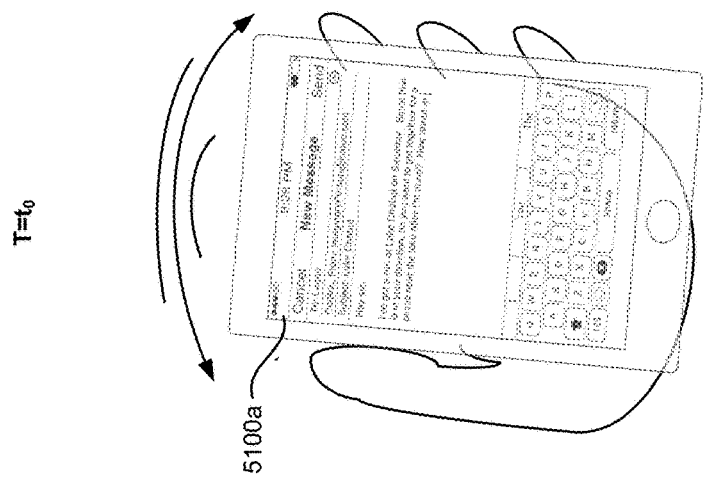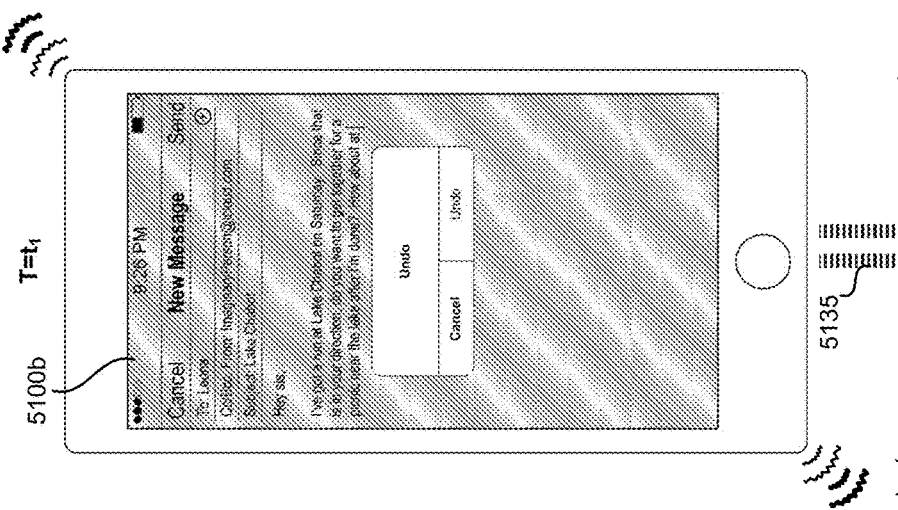
Figure 5CCC

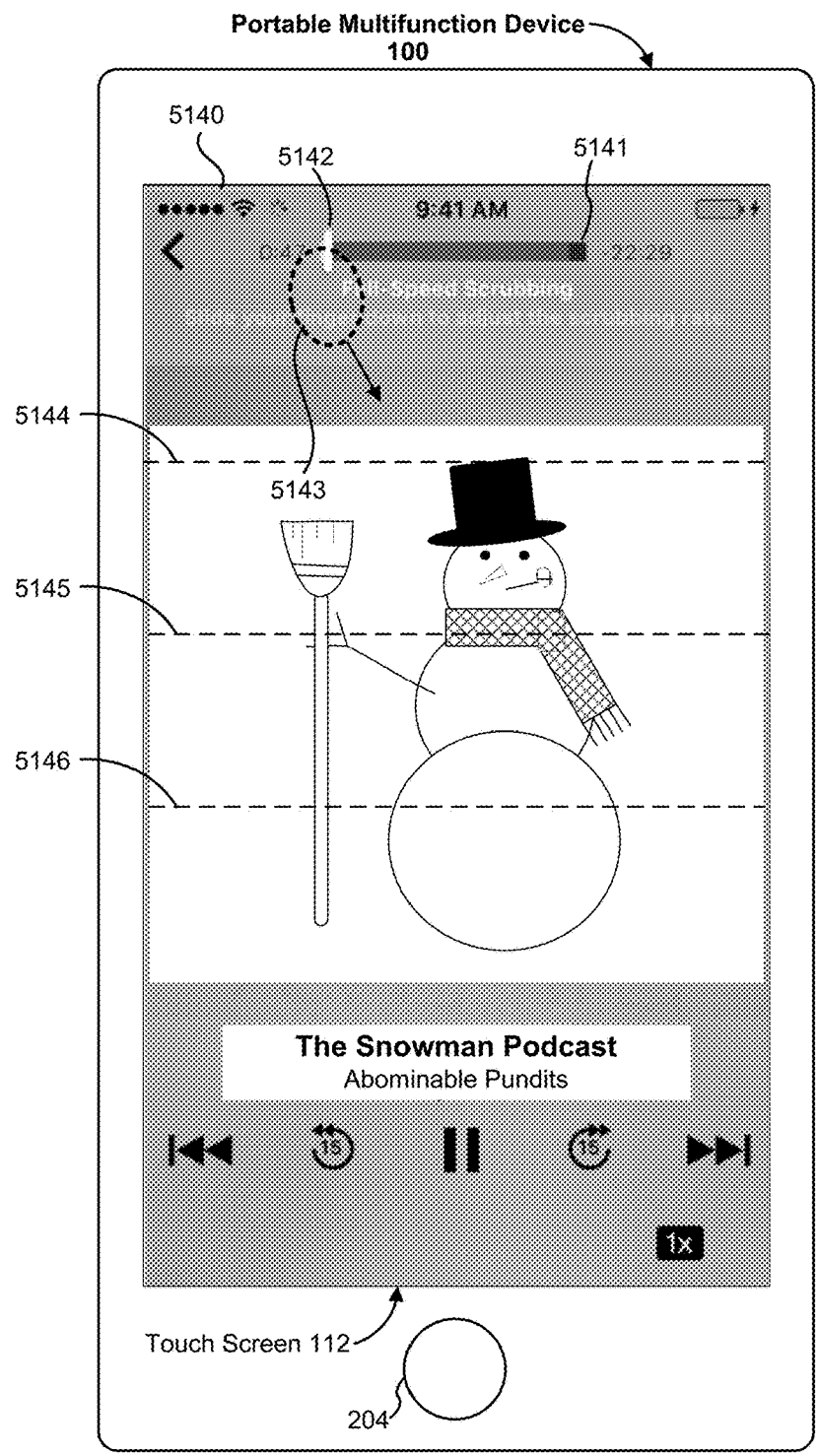
Figure 5DDD

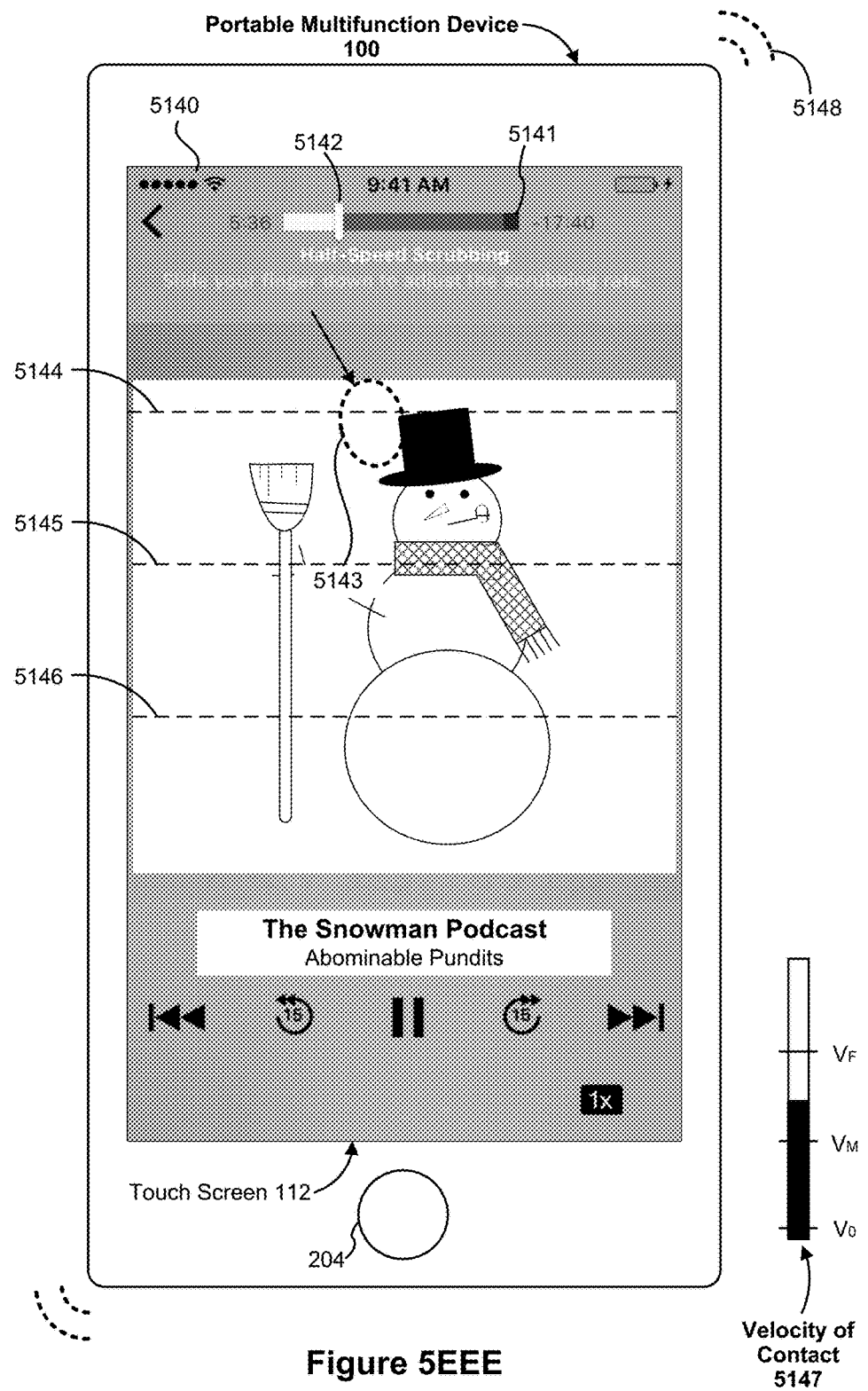
Figure 5EEE

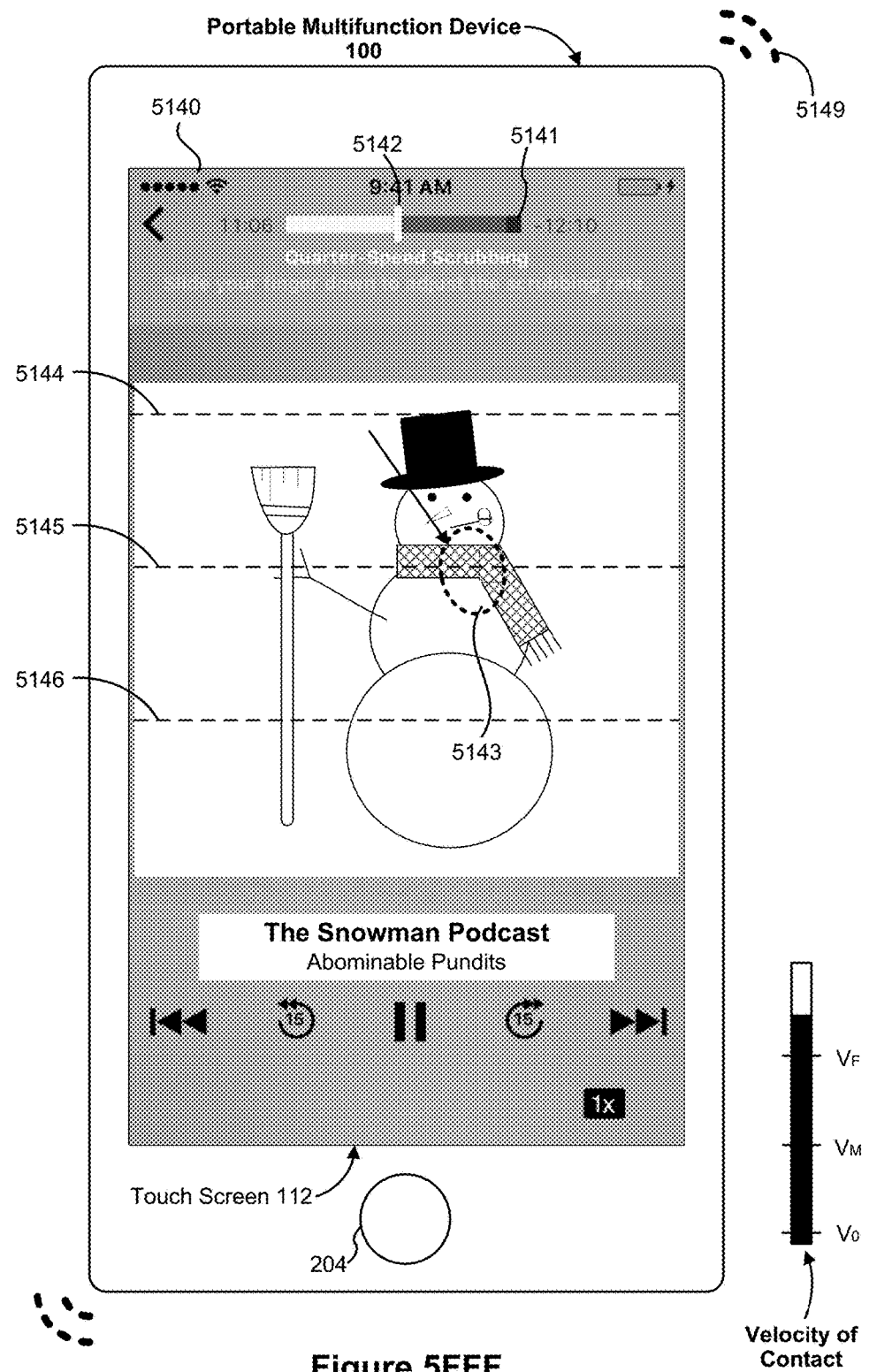
Figure 5FFF

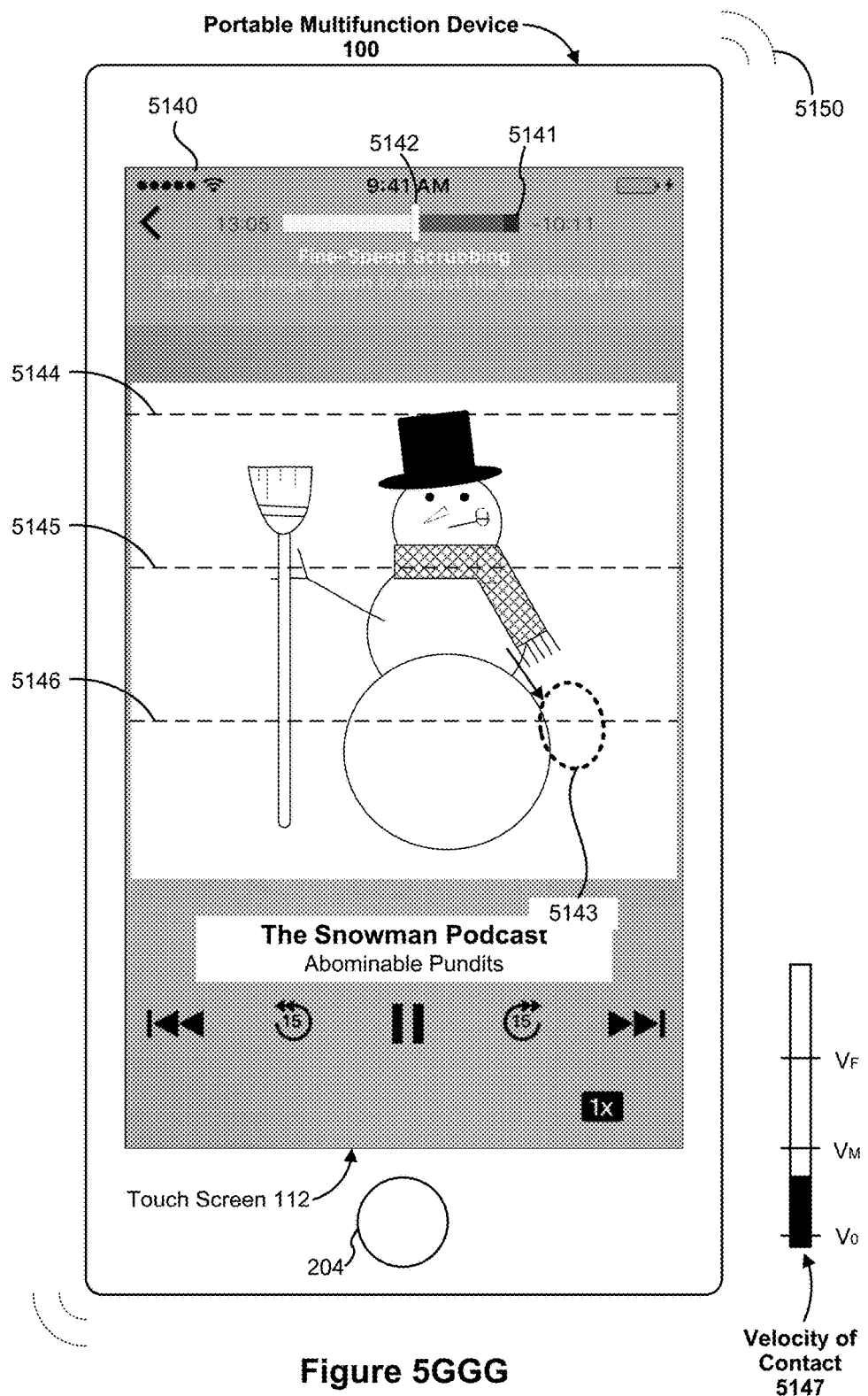
Figure 5GGG

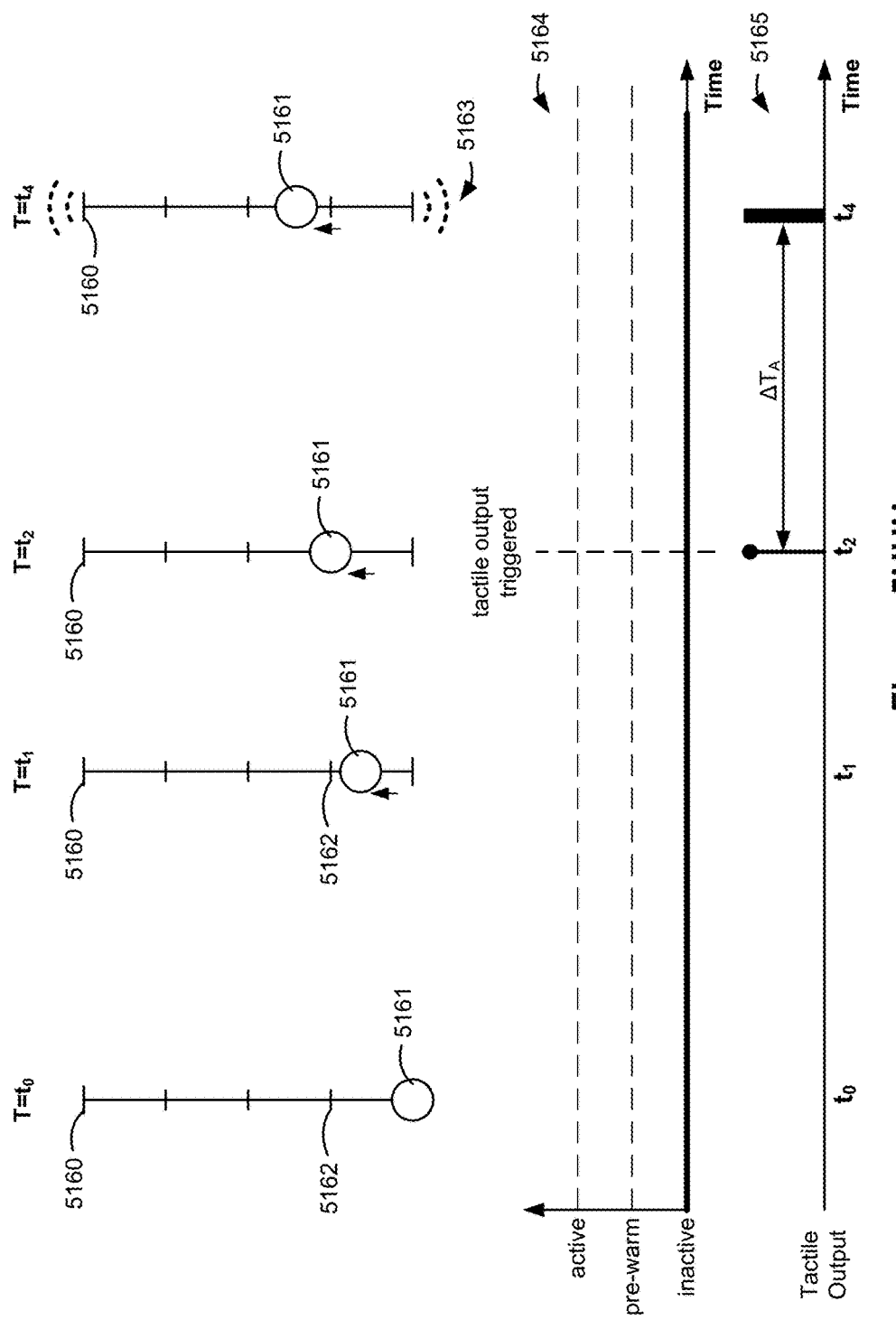
Figure 5HHH

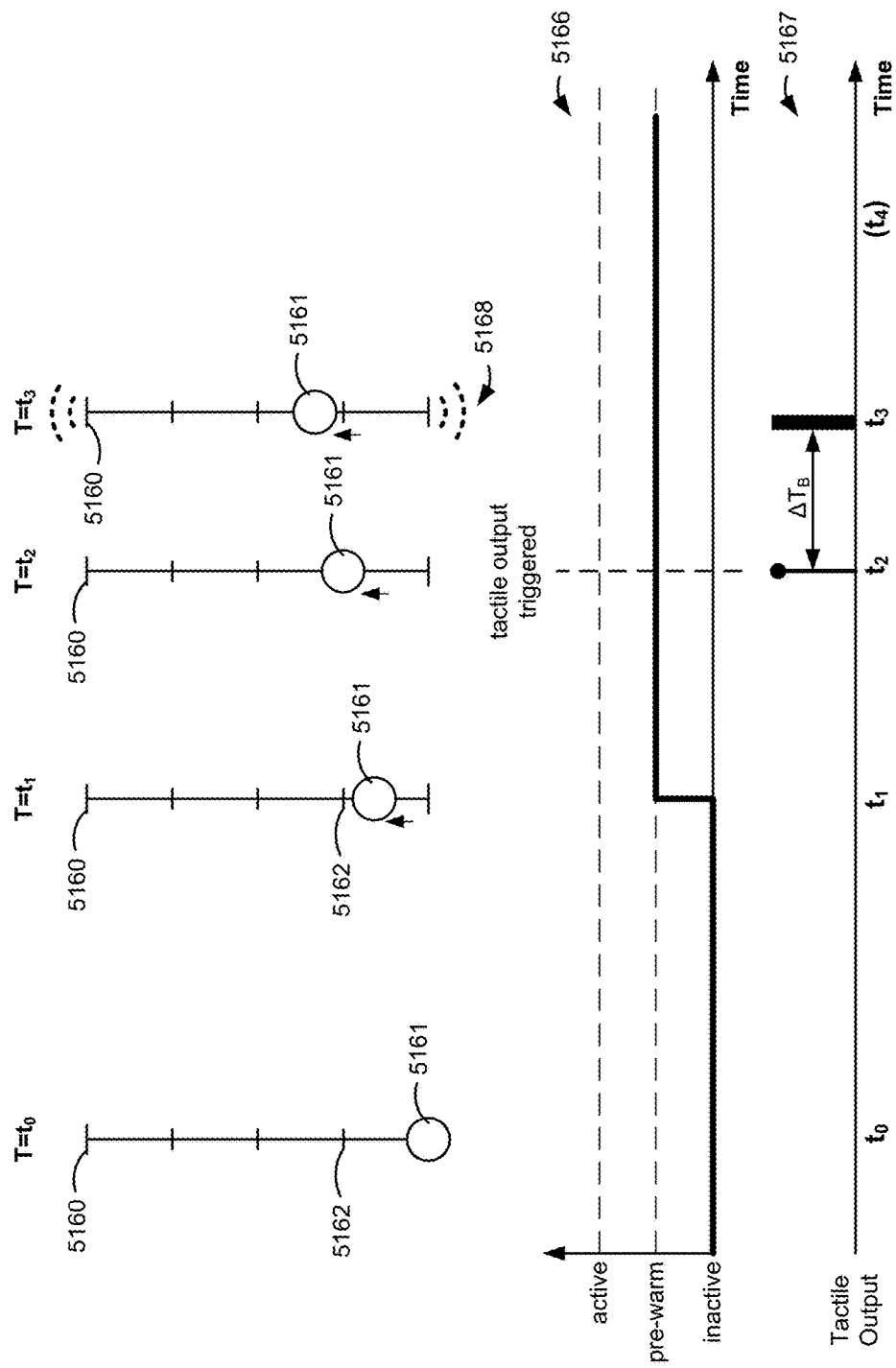
Figure 5III

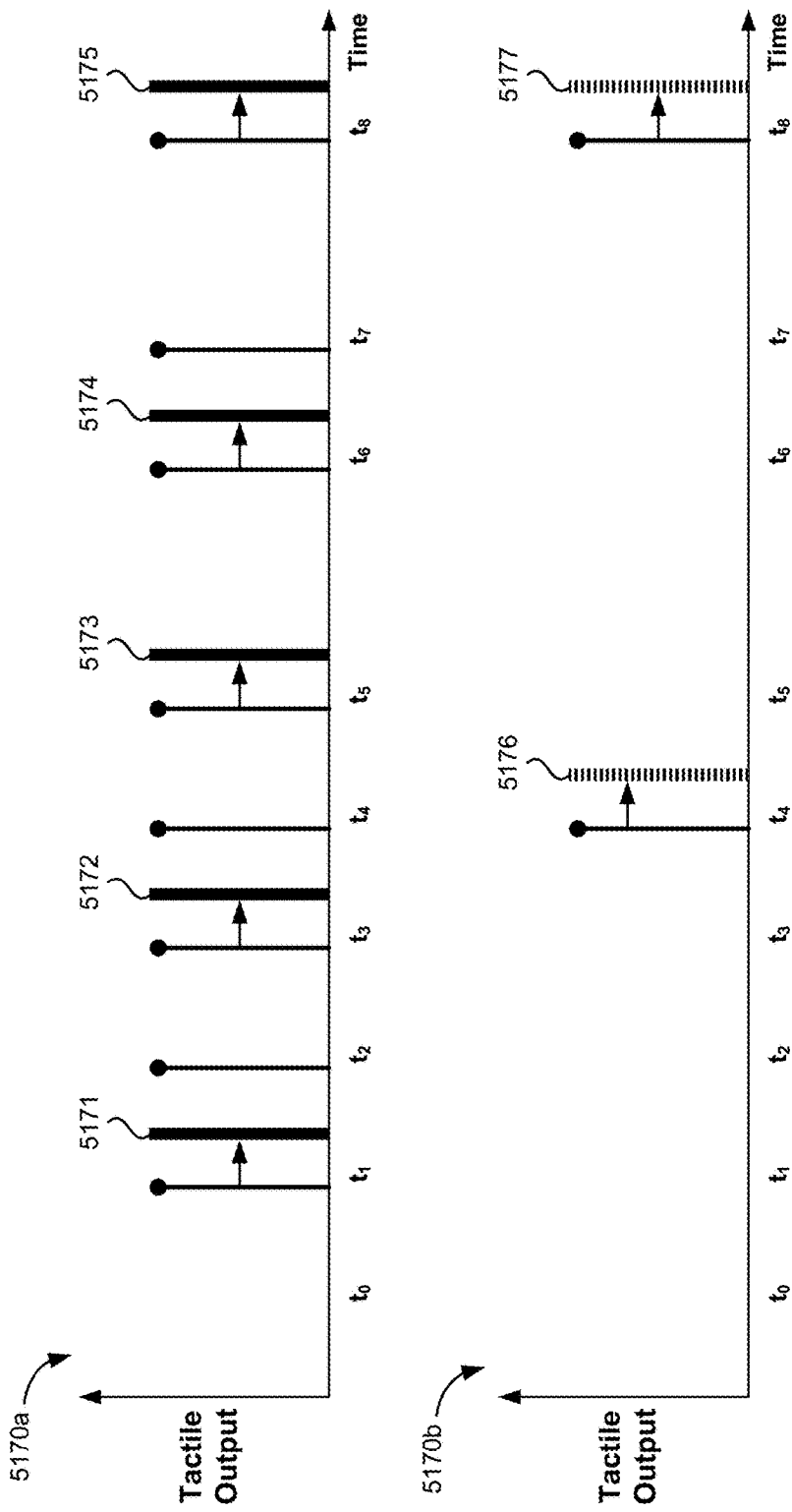
Figure 5JJJ

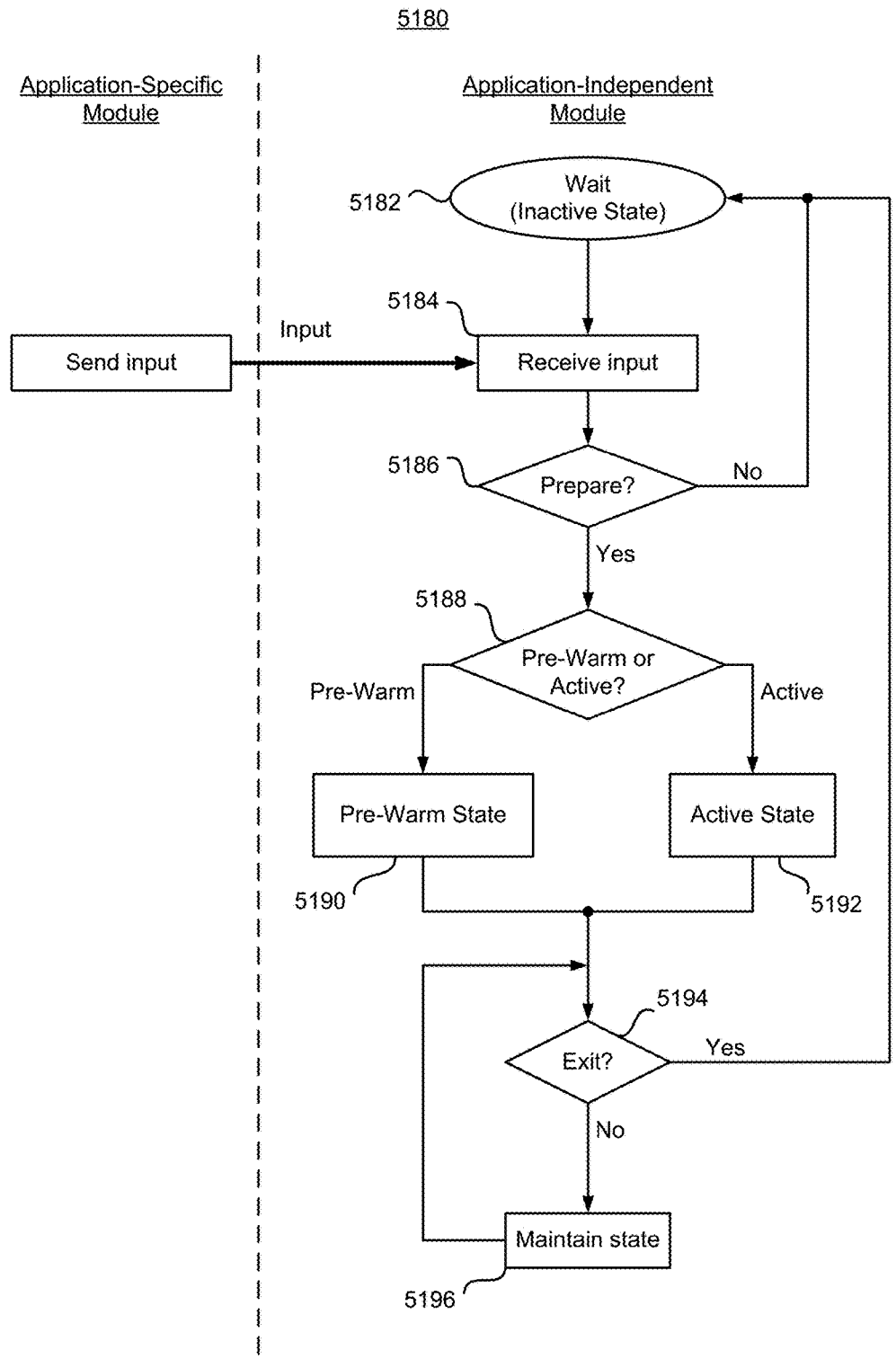
Figure 5KKK

600

602 At an electronic device with a display, one or more input devices, and one or more tactile output generators, display, on the display, a user interface for a first software application 604 The user interface includes a plurality of elements to which user interaction models from a plurality of user interaction models provided by an application-independent module have been assigned, the plurality of elements including a first element to which a first user interaction model has been assigned, the plurality of elements having content provided by an application-specific module for the first software application 606 Assign the first user interaction model to the first element using a predefined application programming interface (API)

608 The first user interaction model defines how the user interface responds to inputs directed to the first element of the user interface 610 While displaying the user interface, detect, via the one or more input devices, an input directed to the first element of the user interface 612 In response to detecting the input:

614 Update the user interface on the display based on characteristics of the detected input 616 Update the user interface on the display based on characteristics of the detected input and the first user interaction model 618 In accordance with a determination that the input meets tactile output criteria specified by the first user interaction model, generate a first tactile output corresponding to the input (A)

618 In accordance with a determination that the input meets tactile output criteria specified by the first user interaction model, generate a first tactile output corresponding to the input (A)

620 The first element includes a slider object generated at least in part based on information provided by the application-specific module for the first software application, and the first user interaction model specifies generating tactile outputs in accordance with user manipulation of the slider object with touch inputs 622 Generate a predefined modulation selection tactile output in response to a touch input that selects a modulation type for the slider object 624 The first user interaction model specifies generating the first tactile output in accordance with a modulation type of the slider object and a parameter of the first software application modulated in accordance with user manipulation of the slider object with touch inputs 626 The first user interaction model specifies generating a distinct tactile output in accordance with a moveable portion of the slider object reaching an end position 628 The first element includes a switch object generated at least in part based on information provided by the application-specific module for the first software application, and the first user interaction model specifies generating the first tactile output when the input corresponds to an action that changes a state of the switch object 630 The first element includes a value selection object generated at least in part based on information provided by the application-specific module for the first software application, and the first user interaction model specifies generating the first tactile output when the input corresponds to an action that changes a value selected using the value selection object (B)

618 In accordance with a determination that the input meets tactile output criteria specified by the first user interaction model, generate a first tactile output corresponding to the input (B)

632 The first element includes content that is refreshed in response to a pull down gesture reaching a refresh threshold, and the first user interaction model specifies generating a predefined impact tactile output in accordance with a determination that the input corresponds to a pull down gesture reaching the refresh threshold

634 The first element includes a region or object, the size of which changes in response to the input comprising a zoom gesture, and the first user interaction model specifies generating a predefined size limit tactile output in accordance with a determination that the size of the region or object has reached a predefined limit

636 The first element includes a table, having cells organized in rows and columns, generated at least in part based on information provided by the application-specific module for the first software application, and the first user interaction model specifies generating the first tactile output when the input moves from any cell in the table to any other cell in the table, or moves from outside the table to a cell inside the table

638 The first element includes a table, having cells organized in rows and columns, generated at least in part based on information provided by the application-specific module for the first software application, and the first user interaction model specifies generating the first tactile output when two or more rows of the cells are reordered in response to the input

640 The input causes the first software application to select an item, in a collection of distinct items, to be moved to a predefined position within the first element, and the first user interaction model specifies generating the first tactile output in conjunction with the selected item being moved to the predefined position within the first element (C)

612 In response to detecting the input:

618 In accordance with a determination that the input meets tactile output criteria specified by the first user interaction model, generate a first tactile output corresponding to the input

642 The first user interaction model specifies generating the first tactile output when the input or an object manipulated in accordance with the input approaches a next predefined state, and generating a second tactile output, distinct from the first tactile output, when the input or an object manipulated in accordance with the input reaches the next predefined state

644 In accordance with a determination that the input does not meet the tactile output criteria specified by the first user interaction model, forgo generation of the first tactile output

646 The plurality of elements includes a second element to which a second user interaction model from the plurality of user interaction models provided by the application-independent module has been assigned. While displaying the user interface, detect, via the one or more input devices, a second input directed to the second element of the user interface. In response to detecting the second input directed to the second element of the user interface: update the user interface on the display based on characteristics of the detected second input; in accordance with a determination that the second input meets tactile output criteria specified by the second user interaction model, generate a second tactile output corresponding to the second input; and, in accordance with a determination that the second input does not meet the tactile output criteria specified by the second user interaction model, forgo generation of the second tactile output

802 At an electronic device with a display, a touch-sensitive surface, and one or more tactile output generators, display, on the display, a user interface 804 Detect the occurrence of a first condition that triggers a first user interface event that is associated with a tactile output 806 Generating the first user interface event includes displaying one or more changes to the user interface 808 The occurrence of the first condition includes detected movement of the electronic device that meets predefined input pattern criteria and the one or more changes to the user interface include undoing a previously performed operation 810 The device will not be able to generate the tactile output associated with the first user interface event for a respective amount of time 812 In response to detecting the occurrence of the first condition, in accordance with a determination that the first user interface event corresponds to a first user interface event category:

(A)

814 Delay generating the first user interface event for at least the respective amount of time 816 When the respective amount of time is a first amount of time, delay displaying the one or more changes to the user interface for the first amount of time, and when the respective amount of time is a second amount of time, delay displaying the one or more changes to the user interface for the second amount of time (B)

812 In response to detecting the occurrence of the first condition, in accordance with a determination that the first user interface event corresponds to a first user interface event category:

(A)

818 The determination that the first user interface event corresponds to the first user interface event category includes a determination that the first user interface event is a notification event that does not correspond to a user input currently detected on the touch-sensitive surface 820 The determination that the first user interface event corresponds to the first user interface event category includes a determination that the first user interface event is a notification event initiated in accordance with receiving electronically delivered information from an information source external to the electronic device 822 The determination that the first user interface event corresponds to the first user interface event category includes a determination that the first user interface event is a notification event initiated in accordance with receiving electronically delivered information from an application executed by the electronic device and independent of any user input on the touch-sensitive surface that is detected at the same time as, or immediately preceding, the notification event 824 The determination that the first user interface event corresponds to the first user interface event category includes a determination that the first user interface event is a notification event initiated in accordance with completion of a transaction initiated by a user of the electronic device 826 The determination that the first user interface event corresponds to the first user interface event category includes a determination that the first user interface event is provided to an application programming interface (API) with a value indicating that the one or more changes to the user interface can be delayed until the device is ready to generate the tactile output

812 In response to detecting the occurrence of the first condition, in accordance with a determination that the first user interface event corresponds to a first user interface event category:

828 After delaying generating the first user interface event for at least the respective amount of time, display the one or more changes to the user interface and generate the tactile output that is associated with the first user interface event

830 The display of the one or more changes to the user interface is synchronized with the generation of the tactile output that is associated with the first user interface event

---

832 In response to detecting the occurrence of the first condition, in accordance with a determination that the first user interface event corresponds to a second user interface event category, display the one or more changes to the user interface before the respective amount of time has elapsed and generate the tactile output that is associated with the one or more changes in the user interface after the respective amount of time has elapsed

834 The first user interface event category includes events where the timing of the one or more changes to the user interface is flexible; and the second user interface event category includes events where the timing of the one or more changes to the user interface is inflexible

836 The first user interface event category includes events where the one or more changes to the user interface do not simulate direct manipulation of the user interface by user inputs; and the second user interface event category includes events where the one or more changes to the user interface simulate direct manipulation of the user interface by user inputs

838 Detect a user input on the touch-sensitive surface that triggers a second user interface event that is associated with a tactile output, wherein generating the second user interface event includes displaying one or more changes to the user interface; and, in response to detecting the user input on the touch-sensitive surface, display the one or more changes to the user interface for the second user interface event and generate the tactile output that is associated with the second user interface event, wherein a first time interval between the display of the one or more changes to the user interface for the first user interface event and the generation of the tactile output that is associated with the first user interface event is less than a second time interval between the display of the one or more changes to the user interface for the second user interface event and the generation of the tactile output that is associated with the second user interface event

1002 At an electronic device with a display, a touch-sensitive surface, and one or more tactile output generators, while the one or more tactile output generators are in a low-power state, receive an indication that a user interaction has started

1004 A respective portion of the user interaction is associated with a tactile output

1006 The low-power state is a state in which tactile outputs are generated with a first amount of latency

1008 The low-power state is a predefined inactive state of the one or more tactile output generators

1010 The user interaction that is associated with the tactile output includes location information corresponding to a touch input having a location on the touch-sensitive surface or a user interface object having a location on the touch-sensitive surface

1012 Determining a location of the tactile output in accordance with the location information for the user interaction

1014 The one or more tactile output generators include two or more tactile output generators, each having a corresponding location, or location and size, and determining the location of the tactile output includes determining the location of the tactile output in accordance with the location information for the user interaction and the locations, or locations and sizes, of the two of more tactile output generators (A)

1016 In response to receiving the indication that the user interaction that is associated with the tactile output has started, in accordance with a determination that the indication meets tactile output generator preparation criteria, set one or more tactile output generators to a low-latency state at a first time 1018 The low-latency state is a state in which the tactile outputs are generated with a second amount of latency that is lower than the first amount of latency 1020 The low-power state of the one or more tactile output generators has a lower power consumption than the low-latency state; and the low-latency state has a lower latency for generating tactile outputs than the low-power state 1022 The low-latency state is selected from a first low-latency state and a second low-latency state, wherein the first low-latency state consumes less power than the second low-latency state and has a higher latency than the second low-latency state 1024 The low-latency state is selected from the first low-latency state and the second low-latency state by an operating system of the device based on energy conservation protocols used by the device 1026 A first software application issues a command to set the one or more tactile output generators to the low-latency state, wherein setting the one or more tactile output generators to the low-latency state is performed in response to the command issued by the first software application to set the one or more tactile output generators to the low-latency state 1028 A first software application issues a command to set the one or more tactile output generators to the low-latency state, and an operating system of the electronic device receives the issued command and makes a determination of whether to set the one or more tactile output generators to the low-latency state

1016 In response to receiving the indication that the user interaction that is associated with the tactile output has started, in accordance with a determination that the indication meets tactile output generator preparation criteria, set one or more tactile output generators to a low-latency state at a first time (B)

1030 An operating system of the electronic device determines when to set the one or more tactile output generators to the low-latency state

1032 The operating system of the electronic device determines whether to set the one or more tactile output generators to the low-latency state in accordance with a state of the electronic device

1034 The operating system of the electronic device determines, in response to a first software application issuing a command to set the one or more tactile output generators to the low-latency state, whether to set the one or more tactile output generators to the low-latency state in accordance with historical information concerning prior commands by the first software application to set the one or more tactile output generators to the low-latency state (C)

1202 At an electronic device with a display, a touch-sensitive surface, and one or more tactile output generators, while a first type of event is associated with a first tactile output and a second type of event that is distinct from the first type is associated with a second tactile output that is different from the first tactile output by an application-independent module:

1204 Receive first information from a first application

1206 In response to receiving the first information from the first application, generate a response to the first information

1208 In accordance with a determination that the first information corresponds to an application event of the first type, generate the first tactile output using the one or more tactile output generators

1210 In accordance with a determination that the first information corresponds to an application event of the second type that is distinct from the first type, generate, using the one or more tactile output generators, the second tactile output that is different from the first tactile output

1212 After generating the response to the first information, receive second information from a second application that is distinct from the first application

1214 In response to receiving the second information from the second application, generate a response to the second information

1216 In accordance with a determination that the second information corresponds to an application event of the first type, generate the first tactile output using the one or more tactile output generators

1218 In accordance with a determination that the second information corresponds to an application event of the second type, generate the second tactile output using the one or more tactile output generators (A)

1202 At an electronic device with a display, a touch-sensitive surface, and one or more tactile output generators, while a first type of event is associated with a first tactile output and a second type of event that is distinct from the first type is associated with a second tactile output that is different from the first tactile output by an application-independent module:

(A)

1220 The first type of event is a success event and the second type of event is a failure event

1222 The first information is received from an application-specific module for the first application, the second information is received from an application-specific module for the second application, and determining whether to generate the first tactile output or the second tactile output is performed by the application-independent module

1224 Generating the response to the first information includes, in accordance with a determination that the first information corresponds to an application event of a third type that is associated with a fifth tactile output that is different from the first tactile output and the second tactile output and that is distinct from the first type and second type, generating, using the one or more tactile output generators, the fifth tactile output that is different from the first tactile output and the second tactile output; and
    generating the response to the second information includes, in accordance with a determination that the second information corresponds to an application event of the third type, generating the fifth tactile output using the one or more tactile output generators

1402 At an electronic device with a display, a touch-sensitive surface, and one or more tactile output generators, receive, at an application-independent module, from an application-specific module that is associated with a first application, information about an input directed to the user interface of the first application 1404 An operation performed in the user interface of the first application in response to detecting the input is associated with a tactile output pattern specified by the application-specific module 1406 The information about the input includes information indicating a magnitude of the operation performed in the user interface in response to detecting the input 1408 The magnitude is provided by the application 1410 The magnitude is provided by an operating system of the electronic device

1412 In response to receiving the information about the input directed to the user interface of the first application, generate, via the one or more tactile output generators, a tactile output that corresponds to the operation performed in the user interface of the first application 1414 The tactile output has the tactile output pattern specified by the application-specific module 1416 The tactile output has an amplitude determined in accordance with the magnitude of the operation performed in the user interface of the first application in response to detecting the input 1418 The amplitude of the tactile output is further determined in accordance with at least one of a velocity or mass of an object in a simulated collision or impact 1420 The amplitude of the tactile output is further determined by applying a predefined physics model to one or more parameters of one or more displayed user interface elements or one or more parameters of a touch input 1422 The tactile output is further characterized by a vibration frequency, wherein the frequency is selected based on the tactile output pattern 1424 The vibration frequency is less than 100 hertz

1602 At an electronic device with a display, a touch-sensitive surface, and one or more tactile output generators, display a user interface on the display

1604 While displaying the user interface on the display and while the one or more tactile output generators are in a low-power state, detect a first user interaction via the touch-sensitive surface > 1606 The first user interaction is touchdown of a contact on the touch-sensitive surface > 1608 The first user interaction is a change in a contact after detecting touchdown of the contact on the touch-sensitive surface

1610 In response to detecting the first user interaction, set the one or more tactile output generators to a low-latency state

1612 After setting the one or more tactile output generators to the low-latency state, detect a second user interaction that is part of a same sequence of user interactions as the first user interaction
(A)

1614 In response to detecting the second user interaction, generate a tactile output that corresponds to the second user interaction
(B)

1612 After setting the one or more tactile output generators to the low-latency state, detect a second user interaction that is part of a same sequence of user interactions as the first user interaction (A)

1616 The first user interaction and the second user interaction are detected as part of a continuous touch input on the touch-sensitive surface that traverses a sequence of components of the user interface displayed on the display 1618 Scroll a set of menu items in response to user input on the touch-sensitive surface, wherein the sequence of user interactions comprises a sequence of respective menu items in the set of menu items scrolling to or through a selection position in the user interface 1620 Scroll a set of date component or time component items in response to user input on the touch-sensitive surface, wherein the sequence of user interaction events comprises a sequence of date component or time component items scrolling to or through a selection position in the user interface 1614 In response to detecting the second user interaction, generate a tactile output that corresponds to the second user interaction (B)

1622 A monitoring function tracks a progress of the sequence of user interactions; the one or more tactile output generators are changed to the low-latency state based on a determination that the monitoring function has entered a start state in which the monitoring function has started monitoring the sequence of user interactions; and the tactile output is generated based on a determination that the monitoring function has entered a changed state (C)

1614 In response to detecting the second user interaction, generate a tactile output that corresponds to the second user interaction (C)

1624 A monitoring function tracks a progress of the sequence of user interactions; the one or more tactile output generators are changed to the low-latency state based on a determination that the monitoring function has entered a changed state that precedes a changed state that corresponds to a tactile output; and the tactile output is generated based on a determination that the monitoring function has entered the changed state that corresponds to a tactile output

1626 The sequence of user interactions corresponds to a continuous touch input on the touch-sensitive surface that traverses a sequence of components of a user interface displayed on the display, and the method further includes generating a sequence of two or more tactile outputs using identical waveforms

1628 The sequence of user interactions corresponds to a touch input on the touch-sensitive surface that traverses a sequence of soft keys displayed on the display, and the method further includes generating one or more tactile outputs that correspond to the touch input reaching predefined positions with respect to the sequence of soft keys

1630 The sequence of user interactions includes a sequence of events corresponding to distinct phases of dragging an object, in the user interface displayed on the display, from an initial location to another location

1632 The distinct phases of dragging the object include an object lifting phase and an object dropping phase

1634 The distinct phases of dragging the object include an object snapping phase, corresponding to the object snapping into place with respect to a user interface feature, and the tactile output corresponds to the object snapping into place with respect to the user interface feature (D) (E)

1636 After generating the tactile output in response to detecting the second user interaction, forgo generation of a subsequent tactile output in response to detecting a third user interaction that is part of the same sequence of user interactions as the first user interaction and the second user interaction, in accordance with a determination that the third user interaction occurred less than a predefined time duration from the second user interaction

1638 Detect an end of the sequence of user interactions; and, in response to detecting the end of the sequence of user interactions, set the one or more tactile output generators to the low-power state 1640 A monitoring function tracks a progress of the sequence of user interactions, and the one or more tactile output generators are set to the low-power state based on a determination that the monitoring function has entered an end state

1802 At an electronic device with a display, a touch-sensitive surface, and one or more tactile output generators, receive a first request for a first user interface operation 1804 The first user interface operation is a first type of change in a respective user interface element that is associated with a first tactile output 1806 In response to receiving the first request:

1808 Perform the first user interface operation

1810 Generate the first tactile output

1812 After performing the first user interface operation, receive a second request for a second user interface operation that is associated with a second tactile output 1814 In response to receiving the second request:

1816 In accordance with a determination that the second request for the second user interface operation comprises a request for an instance of the first type of change in the user interface that is associated with a second tactile output:

1818 Determine a time interval from a point in time corresponding to a most recent prior instance of the first type of change in the respective user interface element for which a tactile output was generated to a point in time corresponding to the first type of change in the respective user interface element requested by the second request (A)

1814 In response to receiving the second request:

1816 In accordance with a determination that the second request for the second user interface operation comprises a request for an instance of the first type of change in the user interface that is associated with a second tactile output:

1820 In accordance with a determination that the time interval is less than a predefined time period, perform the second user interface operation without generating the second tactile output 1822 The time interval is determined from a beginning of the tactile output generated for the most recent prior instance of the first type of change in the respective user interface element to a beginning of the second tactile output, and the predefined time period is longer than a duration of the tactile output generated for the most recent prior instance of the first type of change in the respective user interface element 1824 In accordance with a determination that the time interval is greater than the predefined time period, perform the second user interface operation and generate the second tactile output 1826 In accordance with a determination that the second request for the second user interface operation does not comprise a request for an instance of the first type of change in the respective user interface element, mix the second tactile output with other tactile outputs generated by the one or more tactile output generators without regard to whether the time interval is less than the predefined time period

2002 At an electronic device with a display, a touch-sensitive surface, and one or more tactile output generators, at an application-independent module, receive user interface information from an application

2004 The application-independent module comprises, or is included in, an operating system of the electronic device

2006 The user interface information corresponds to one or more displayed user interface elements with one or more dimensions defined by an application-specific module of the application

2008 The dimensions of the user interface elements include an extent of a user interface element and an extent that the user interface element can be temporarily scrolled beyond an edge of a display region

2010 The dimensions of the user interface elements include a maximum zoom size of a user interface element and an amount by which the user interface element can be temporarily zoomed beyond the maximum zoom size

2012 The dimensions of the user interface elements include a minimum zoom size of a user interface element and an amount by which the user interface element can be temporarily zoomed beyond the minimum zoom size

2014 Receive an input directed toward one or more of the displayed user interface elements

2016 At the application-independent module, determine one or more tactile outputs to be generated based on a magnitude of the input and the one or more dimensions defined by the applications-specific module (A)

2018 Using the one or more tactile output generators, generate the determined one or more tactile outputs

2016 At the application-independent module, determine one or more tactile outputs to be generated based on a magnitude of the input and the one or more dimensions defined by the applications-specific module (A)

2020 The application-independent module determines a magnitude of the one or more tactile outputs by applying a predefined physics model to one or more parameters of the received input

2022 The application-independent module determines whether to generate a respective tactile output based on whether an edge of a respective element, of the displayed user interface elements, has passed a predefined boundary

2024 The application-independent module determines whether to generate a respective tactile output based on whether a parameter of a respective element, of the displayed user interface elements, has passed a predefined limit

2026 The application-independent module determines whether to generate a respective tactile output based on whether an edge of a respective element, of the displayed user interface elements, has passed a predefined boundary, and whether a respective user touch input is detected

DEVICES, METHODS, AND GRAPHICAL USER INTERFACES FOR GENERATING TACTILE OUTPUTS

RELATED APPLICATIONS

This application is a continuation application of U.S. application Ser. No. 15/271,073 filed Sep. 20, 2016, which claims priority to U.S. Provisional Application Ser. No. 62/384,159, filed Sep. 6, 2016, both of which are incorporated by reference herein in their entireties.

TECHNICAL FIELD

This relates generally to electronic devices with touch-sensitive surfaces, including but not limited to electronic devices with touch-sensitive surfaces that generate tactile outputs to provide haptic feedback to a user.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Haptic feedback, typically in combination with visual and/or audio feedback, is often used in an attempt to make manipulation of user interfaces and user interface objects more efficient and intuitive for a user, thereby improving the operability of electronic devices.

However, applications that provide different haptic feedback in response to a same gesture present challenges to users, which may lead to unintended operations. When devices perform unintended operations, the user needs to cancel such operations and provide inputs again. These manipulations are cumbersome and tedious. In addition, having to undo unintended operations and providing inputs again take longer than necessary, thereby wasting energy. This latter consideration is particularly important in battery-operated devices. Thus, it would be desirable to have a framework for providing haptic feedback.

SUMMARY

Accordingly, there is a need for electronic devices with faster, more efficient, and more consistent methods and interfaces for providing haptic feedback (typically in conjunction with visual and/or audio feedback), which in turn make manipulation of user interfaces more efficient and intuitive for a user. Such methods and interfaces optionally complement or replace conventional methods for providing haptic feedback. Such methods and interfaces reduce the number, extent, and/or nature of the inputs from a user by helping the user to understand the connection between provided inputs and device responses to the inputs, thereby creating a more efficient human-machine interface. In addition, such methods and interfaces provide a more consistent human-machine interface for a plurality of software applications. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, one or more input devices, and one or more tactile output generators. The method includes displaying, on the display, a user interface for a first software application. The user interface includes a plurality of elements to which user interaction models from a plurality of user interaction models provided by an application-independent module have been assigned, the plurality of elements including a first element to which a first user interaction model has been assigned, the plurality of elements having content provided by an application-specific module for the first software application. The first user interaction model defines how the user interface responds to inputs directed to the first element of the user interface. The method also includes, while displaying the user interface, detecting, via the one or more input devices, an input directed to the first element of the user interface. The method further includes, in response to detecting the input: updating the user interface on the display based on characteristics of the input; in accordance with a determination that the input meets tactile output criteria specified by the first user interaction model, generating a first tactile output corresponding to the input; and, in accordance with a determination that the input does not meet the tactile output criteria specified by the first user interaction model, forgoing generation of the first tactile output.

In accordance with some embodiments, a method is performed at an electronic device with a display, a touch-sensitive surface, and one or more tactile output generators. The method includes displaying, on the display, a user interface; and detecting an occurrence of a first condition that triggers a first user interface event that is associated with a tactile output. Generating the first user interface event includes displaying one or more changes to the user interface. The device will not be able to generate the tactile output associated with the first user interface event for a respective amount of time. The method also includes, in response to detecting the occurrence of the first condition, in accordance with a determination that the first user interface event corresponds to a first user interface event category: delaying generating the first user interface event for at least the respective amount of time; and, after delaying generating the first user interface event for at least the respective amount of time, displaying the one or more changes to the user interface and generating the tactile output that is associated with the first user interface event. The display of the one or more changes to the user interface is synchronized with the generation of the tactile output that is associated with the first user interface event.

In accordance with some embodiments, a method is performed at an electronic device with a display, a touch-sensitive surface, and one or more tactile output generators. The method includes, while the one or more tactile output generators are in a low-power state, receiving an indication that a user interaction has started. A respective portion of the user interaction is associated with a tactile output. The low-power state is a state in which tactile outputs are generated with a first amount of latency. The method also includes, in response to receiving the indication that the user interaction that is associated with the tactile output has started, in accordance with a determination that the indication meets tactile output generator preparation criteria, setting the one or more tactile output generators to a low-latency state at a first time. The low-latency state is a state in which the tactile outputs are generated with a second amount of latency that is lower than the first amount of latency. The method further includes, after setting the one or more tactile output generators to the low-latency state: in accordance with a determination that the user interaction has reached the respective portion of the user interaction that is associated with the tactile output before a predefined amount of time since the first time has elapsed and that the one or more tactile output generators are still in the low-latency state, generating the tactile output using the one or more tactile output generators with the second amount of latency; and, in accordance with a determination that a tactile output has not been generated for at least the predefined amount of time since the first time, transitioning the one or more tactile output generators from the low-latency state to the low-power state.

In accordance with some embodiments, a method is performed at an electronic device with a display, a touch-sensitive surface, and one or more tactile output generators. The method includes, while a first type of event is associated with a first tactile output and a second type of event that is distinct from the first type of event is associated with a second tactile output that is different from the first tactile output by an application-independent module, receiving first information from a first application; and, in response to receiving the first information from the first application, generating a response to the first information, including: in accordance with a determination that the first information corresponds to an application event of the first type, generating the first tactile output using the one or more tactile output generators; and, in accordance with a determination that the first information corresponds to an application event of the second type that is distinct from the first type, generating, using the one or more tactile output generators, the second tactile output that is different from the first tactile output. The method also includes, after generating the response to the first information, receiving second information from a second application that is distinct from the first application; and, in response to receiving the second information from the second application, generating a response to the second information, including: in accordance with a determination that the second information corresponds to an application event of the first type, generating the first tactile output using the one or more tactile output generators; and, in accordance with a determination that the second information corresponds to an application event of the second type, generating the second tactile output using the one or more tactile output generators.

In accordance with some embodiments, a method is performed at an electronic device with a display, a touch-sensitive surface, and one or more tactile output generators. The method includes receiving, at an application-independent module, from an application-specific module that is associated with a first application, information about an input directed to a user interface of the first application. An operation performed in the user interface of the first application in response to detecting the input is associated with a tactile output pattern specified by the application-specific module. The information about the input includes information indicating a magnitude of the operation performed in the user interface in response to detecting the input. The method also includes, in response to receiving the information about the input directed to the user interface of the first application, generating, via the one or more tactile output generators, a tactile output that corresponds to the operation performed in the user interface of the first application. The tactile output has the tactile output pattern specified by the application-specific module. The tactile output has an amplitude determined in accordance with the magnitude of the operation performed in the user interface of the first application in response to detecting the input.

In accordance with some embodiments, a method is performed at an electronic device with a display, a touch-sensitive surface, and one or more tactile output generators. The method includes displaying a user interface on the display; and, while displaying the user interface on the display and while the one or more tactile output generators are in a low-power state, detecting a first user interaction via the touch-sensitive surface. The method also includes, in response to detecting the first user interaction, setting the one or more tactile output generators to a low-latency state; and, after setting the one or more tactile output generators to the low-latency state, detecting a second user interaction that is part of a same sequence of user interactions as the first user interaction. The method further includes, in response to detecting the second user interaction, generating a tactile output that corresponds to the second user interaction.

In accordance with some embodiments, a method is performed at an electronic device with a display, a touch-sensitive surface, and one or more tactile output generators. The method includes receiving a first request for a first user interface operation. The first user interface operation is a first type of change in a respective user interface element that is associated with a first tactile output. The method also includes, in response to receiving the first request: performing the first user interface operation and generating the first tactile output. The method further includes, after performing the first user interface operation, receiving a second request for a second user interface operation that is associated with a second tactile output; and, in response to receiving the second request, in accordance with a determination that the second request for the second user interface operation comprises a request for an instance of the first type of change in the user interface that is associated with the second tactile output: determining a time interval from a point in time corresponding to a most recent prior instance of the first type of change in the respective user interface element for which a tactile output was generated to a point in time corresponding to the first type of change in the respective user interface element requested by the second request; in accordance with a determination that the time interval is less than a predefined time period, performing the second user interface operation without generating the second tactile output; and, in accordance with a determination that the time interval is greater than the predefined time period, performing the second user interface operation and generating the second tactile output.

In accordance with some embodiments, a method is performed at an electronic device with a display, a touch-sensitive surface, and one or more tactile output generators. The method includes, at an application-independent module, receiving user interface information from an application. The user interface information corresponds to one or more displayed user interface elements with one or more dimensions defined by an application-specific module of the application. The method also includes receiving an input directed toward one or more of the displayed user interface elements; and, at the application-independent module, determining one or more tactile outputs to be generated based on a magnitude of the input and the one or more dimensions defined by the applications-specific module; and, using the one or more tactile output generators, generating the determined one or more tactile outputs.

In accordance with some embodiments, an electronic device includes a display unit configured to display one or more user interfaces; one or more input device units configured to receive inputs; one or more tactile output generator units configured to generate one or more tactile outputs; and a processing unit coupled with the display unit, the one or more input device units, and the one or more tactile output generator units. The processing unit is configured to enable display, on the display unit, of a user interface for a first software application. The user interface includes a plurality of elements to which user interaction models from a plurality of user interaction models provided by an application-independent module have been assigned, the plurality of elements including a first element to which a first user interaction model has been assigned, the plurality of elements having content provided by an application-specific module for the first software application. The first user interaction model defines how the user interface responds to inputs directed to the first element of the user interface. The processing unit is also configured to, while enabling display of the user interface, detect, via the one or more input device units, an input directed to the first element of the user interface; and, in response to detecting the input: update the user interface on the display unit based on characteristics of the input; in accordance with a determination that the input meets tactile output criteria specified by the first user interaction model, enable generation of a first tactile output corresponding to the input; and, in accordance with a determination that the input does not meet the tactile output criteria specified by the first user interaction model, forgo enabling generation of the first tactile output.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the touch-sensitive surface unit, and the one or more tactile output generator units. The processing unit is configured to: enable display, on the display unit, of a user interface; and detect an occurrence of a first condition that triggers a first user interface event that is associated with a tactile output. Generating the first user interface event includes enabling display of one or more changes to the user interface. The device will not be able to generate the tactile output associated with the first user interface event for a respective amount of time. The processing unit is also configured to, in response to detecting the occurrence of the first condition, in accordance with a determination that the first user interface event corresponds to a first user interface event category, enable generation of the tactile output that is associated with the first user interface event; delay generating the first user interface event for at least the respective amount of time; and, after delaying generating the first user interface event for at least the respective amount of time, enable display of the one or more changes to the user interface. The display of the one or more changes to the user interface is synchronized with the generation of the tactile output that is associated with the first user interface event.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the touch-sensitive surface unit, and the one or more tactile output generator units. The processing unit is configured to: while the one or more tactile output generator units are in a low-power state, receive an indication that a user interaction has started. A respective portion of the user interaction is associated with a tactile output. The low-power state is a state in which tactile outputs are generated with a first amount of latency. The processing unit is also configured to, in response to receiving the indication that the user interaction that is associated with the tactile output has started, in accordance with a determination that the indication meets tactile output generator preparation criteria, set the one or more tactile output generator units to a low-latency state at a first time. The low-latency state is a state in which the tactile outputs are generated with a second amount of latency that is lower than the first amount of latency. The processing unit is further configured to, after setting the one or more tactile output generator units to the low-latency state: in accordance with a determination that the user interaction has reached the respective portion of the user interaction that is associated with the tactile output before a predefined amount of time since the first time has elapsed and that the one or more tactile output generator units are still in the low-latency state, enable generation of the tactile output using the one or more tactile output generator units with the second amount of latency; and, in accordance with a determination that a tactile output has not been generated for at least the predefined amount of time since the first time, transition the one or more tactile output generator units from the low-latency state to the low-power state.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the one or more input device units, and the one or more tactile output generator units. The processing unit is configured to, while a first type of event is associated with a first tactile output and a second type of event that is distinct from the first type of event is associated with a second tactile output that is different from the first tactile output by an application-independent module: receive first information from a first application; and, in response to receiving the first information from the first application, enable generation of a response to the first information, including: in accordance with a determination that the first information corresponds to an application event of the first type, enable generation of the first tactile output using the one or more tactile output generator units; and, in accordance with a determination that the first information corresponds to an application event of the second type that is distinct from the first type, enable generation, using the one or more tactile output generator units, of the second tactile output that is different from the first tactile output. The processing unit is also configured to, after enabling generation of the response to the first information, receive second information from a second application that is distinct from the first application; and, in response to receiving the second information from the second application, enable generation of a response to the second information, including: in accordance with a determination that the second information corresponds to an application event of the first type, enable generation of the first tactile output using the one or more tactile output generator units; and, in accordance with a determination that the second information corresponds to an application event of the second type, enable generation of the second tactile output using the one or more tactile output generator units.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the touch-sensitive surface unit, and the one or more tactile output generator units. The processing unit is configured to receive, at an application-independent module, from an application-specific module that is associated with a first application, information about an input directed to a user interface of the first application. An operation performed in the user interface of the first application in response to detecting the input is associated with a tactile output pattern specified by the application-specific module. The information about the input includes information indicating a magnitude of the operation performed in the user interface in response to detecting the input. The processing unit is also configured to, in response to receiving the information about the input directed to the user interface of the first application, enable generation, via the one or more tactile output generator units, of a tactile output that corresponds to the operation performed in the user interface of the first application. The tactile output has the tactile output pattern specified by the application-specific module. The tactile output has an amplitude determined in accordance with the magnitude of the operation performed in the user interface of the first application in response to detecting the input.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the touch-sensitive surface unit, and the one or more tactile output generator units. The processing unit is configured to: enable display of a user interface on the display unit; while enabling display of the user interface on the display unit and while the one or more tactile output generator units are in a low-power state, detect a first user interaction via the touch-sensitive surface unit; in response to detecting the first user interaction, set the one or more tactile output generator units to a low-latency state; after setting the one or more tactile output generator units to the low-latency state, detect a second user interaction that is part of a same sequence of user interactions as the first user interaction; and, in response to detecting the second user interaction, enable generation of a tactile output that corresponds to the second user interaction.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the touch-sensitive surface unit, and the one or more tactile output generator units. The processing unit is configured to receive a first request for a first user interface operation. The first user interface operation is a first type of change in a respective user interface element that is associated with a first tactile output. The processing unit is also configured to, in response to receiving the first request: perform the first user interface operation and enable generation of the first tactile output; and, after performing the first user interface operation, receive a second request for a second user interface operation that is associated with a second tactile output. The processing unit is further configured to, in response to receiving the second request, in accordance with a determination that the second request for the second user interface operation comprises a request for an instance of the first type of change in the user interface that is associated with a second tactile output: determine a time interval from a point in time corresponding to a most recent prior instance of the first type of change in the respective user interface element for which a tactile output was generated to a point in time corresponding to the first type of change in the respective user interface element requested by the second request; in accordance with a determination that the time interval is less than a predefined time period, perform the second user interface operation without enabling generation of the second tactile output; and, in accordance with a determination that the time interval is greater than the predefined time period, perform the second user interface operation and enable generation of the second tactile output.

In accordance with some embodiments, an electronic device includes a display unit configured to display one or more user interfaces; a touch-sensitive surface unit configured to receive touch inputs; one or more tactile output generator units configured to generate one or more tactile outputs; and a processing unit coupled with the display unit, the touch-sensitive surface unit, and the one or more tactile output generator units. The processing unit is configured to receive, at an application-independent module, user interface information from an application. The user interface information corresponds to one or more displayed user interface elements with one or more dimensions defined by an application-specific module of the application. The processing unit is also configured to receive an input directed toward one or more of the displayed user interface elements; determine, at the application-independent module, one or more tactile outputs to be generated based on a magnitude of the input and the one or more dimensions defined by the applications-specific module; and enable generation of the determined one or more tactile outputs using the one or more tactile output generator units.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for providing tactile outputs, thereby increasing the effectiveness, efficiency, and user satisfaction with such devices. Such methods and interfaces may complement or replace conventional methods for providing tactile outputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 6A-6D are flow diagrams illustrating a method of generating tactile outputs based on user interaction models in accordance with some embodiments.

FIGS. 8A-8D are flow diagrams illustrating a method of synchronizing tactile outputs and user interface changes in accordance with some embodiments.

FIGS. 10A-10D are flow diagrams illustrating a method of setting power/latency states of tactile output generators in accordance with some embodiments.

FIGS. 12A-12D are flow diagrams illustrating a method of generating consistent tactile outputs for multiple applications in accordance with some embodiments.

FIGS. 14A-14B are flow diagrams illustrating a method of generating tactile outputs based on information from an application-specific module in accordance with some embodiments.

FIGS. 16A-16D are flow diagrams illustrating a method of setting power/latency states of tactile output generators based on user interaction events in accordance with some embodiments.

FIGS. 18A-18C are flow diagrams illustrating a method of conditionally generating tactile outputs based on a time interval from a previous tactile output generation in accordance with some embodiments.

FIGS. 20A-20B are flow diagrams illustrating a method of generating tactile outputs based on a magnitude of an input and dimensions of a user interface element in accordance with some embodiments.

FIG. 22B shows an example of a date picker.

DESCRIPTION OF EMBODIMENTS

Many electronic devices have graphical user interfaces that allow certain manipulations of displayed user interface objects in response to certain touch inputs. However, various software applications may be configured to respond in an inconsistent manner (e.g., providing different haptic feedback) to a same input, which makes it more challenging for a user to learn how to interact with different software applications and/or what particular haptic feedbacks indicate. The disclosed embodiments address these limitations and disadvantages by providing a common framework for providing haptic feedback (and/or tactile outputs). Because instructions for providing tactile outputs are provided in electronic devices (e.g., in an operating system), software applications can be developed faster and made smaller, thereby improving the efficiency in storing and executing such software applications on electronic devices. In addition, various software applications respond to a same input in a consistent manner (e.g., by providing a consistent haptic feedback) using the common framework, thereby improving user experience with such electronic devices. For battery-operated devices, the disclosed methods and devices conserve battery power and increase the time between battery charges. Furthermore, software applications can subscribe to different features of the common framework, thereby allowing the software applications to customize responses to inputs without losing the consistency and advanced features of the common framework.

Figure 18C:
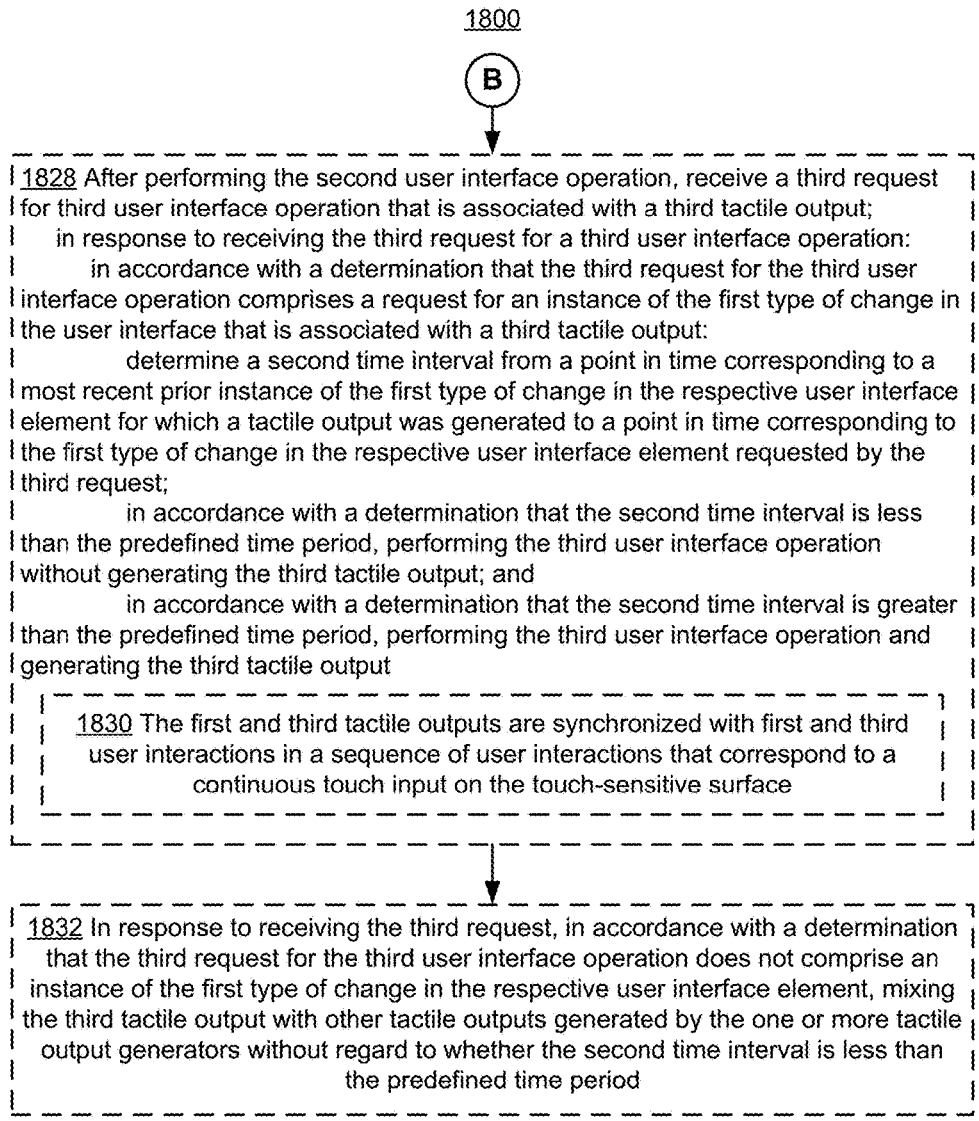

Below, FIGS. 1A-1E, 2A-2C, and 3 provide a description of example devices. FIGS. 4A-4B and 5A-5KKK illustrate example user interfaces and associated tactile outputs. FIGS. 6A-6D illustrate a flow diagram of a method of generating tactile outputs based on user interaction models. FIGS. 8A-8D illustrate a flow diagram of a method of synchronizing tactile outputs and user interface changes. FIGS. 10A-10D illustrate a flow diagram of a method of setting power/latency states of tactile output generators. FIGS. 12A-12D illustrate a flow diagram of a method of generating consistent tactile outputs for multiple applications. FIGS. 14A-14B illustrate a flow diagram of a method of generating tactile outputs based on information from an application-specific module. FIGS. 16A-16D illustrate a flow diagram of a method of setting power/latency states of tactile output generators based on user interaction events. FIGS. 18A-18C illustrate a flow diagram of a method of conditionally generating tactile outputs based on a time interval from a previous tactile output generation. FIGS. 20A-20B illustrate a flow diagram of a method of generating tactile outputs based on a magnitude of an input and dimensions of a user interface element. The user interfaces in FIGS. 5A-5KKK are used to illustrate the processes in FIGS. 6A-6D, 8A-8D, 10A-10D, 12A-12D, 14A-14B, 16A-16D, 18A-18C, and 20A-20B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
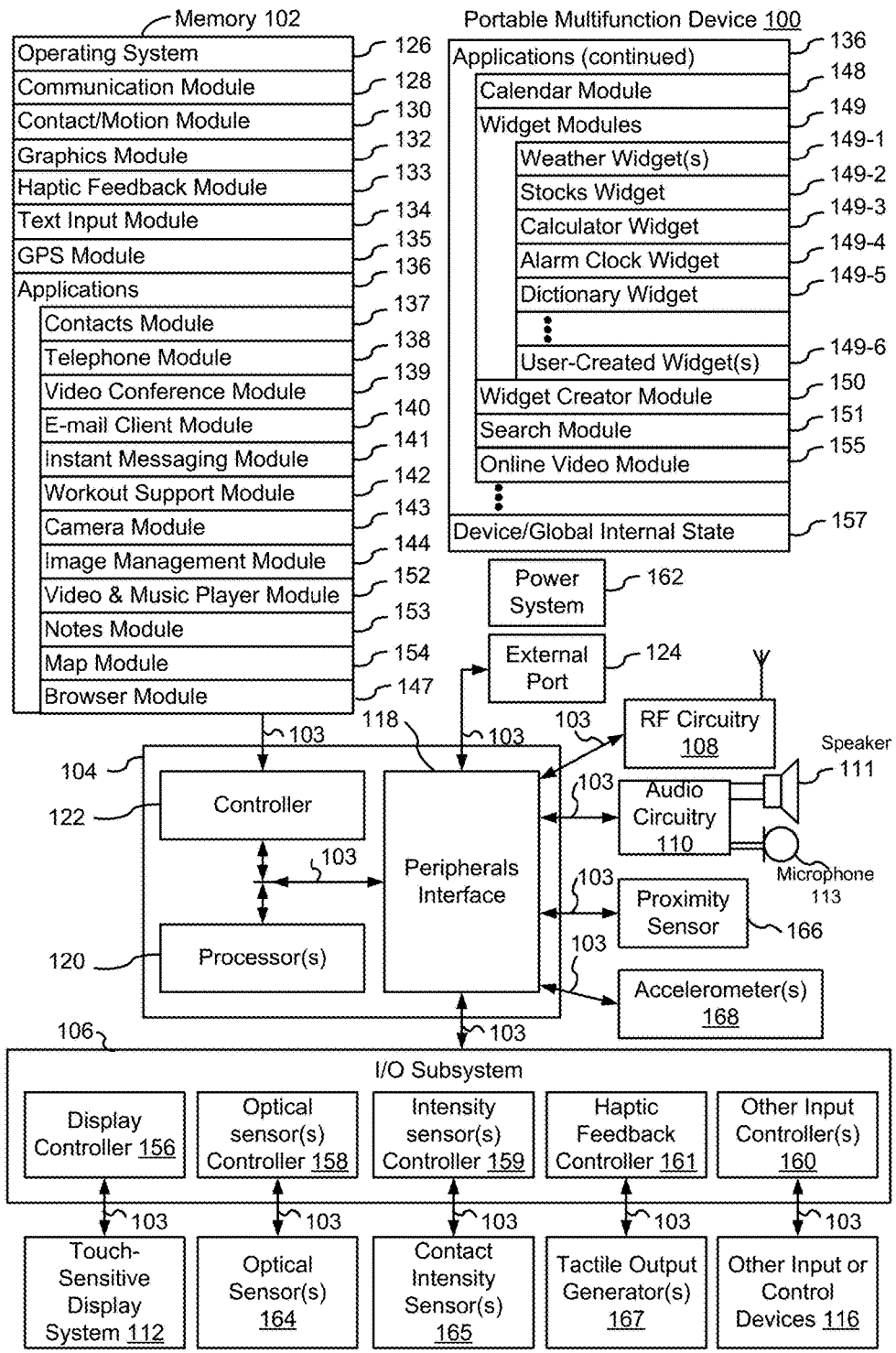
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
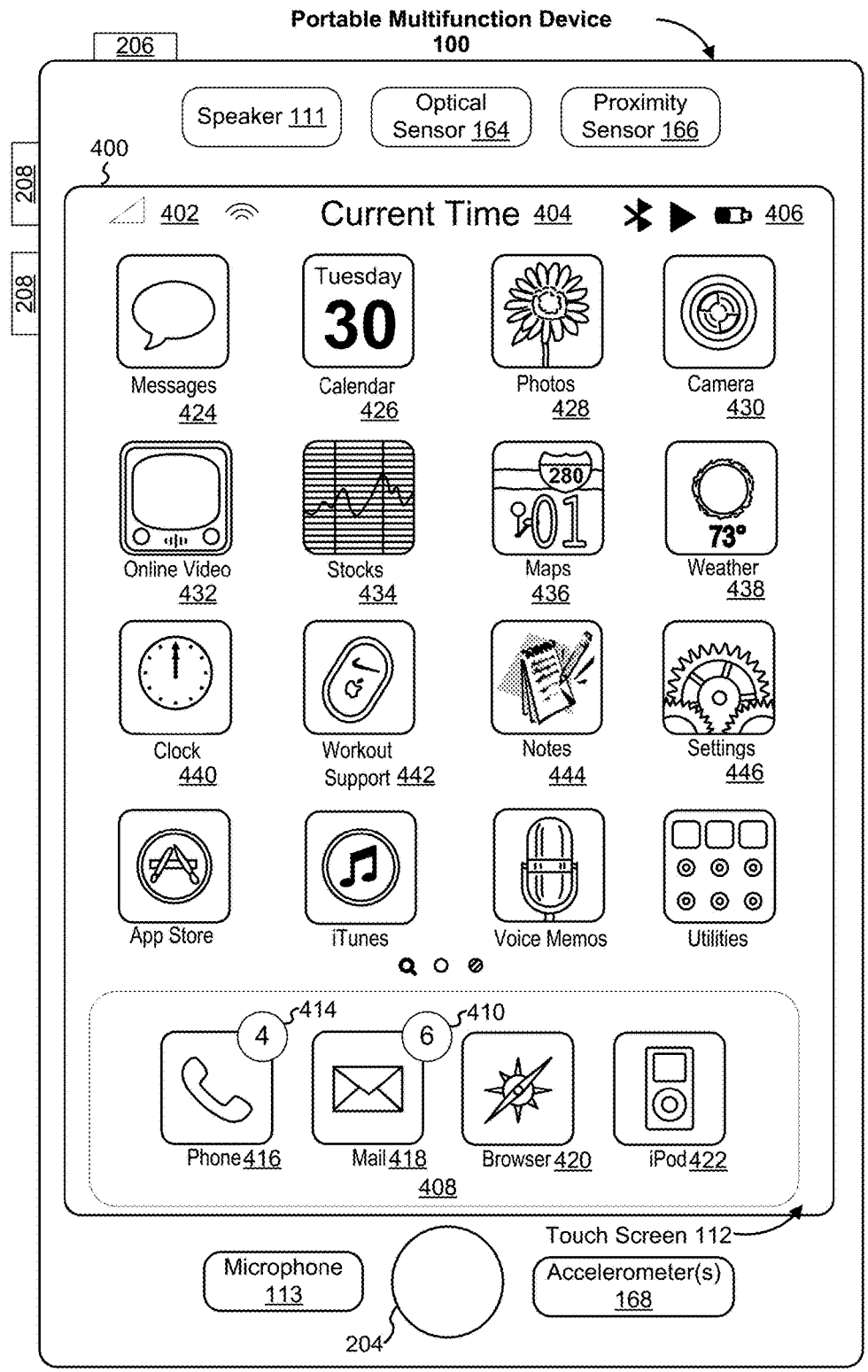
FIG. 4A illustrates an example user interface for a menu of applications on a portable multifunction device in accordance with some embodiments.
Figure 4C:
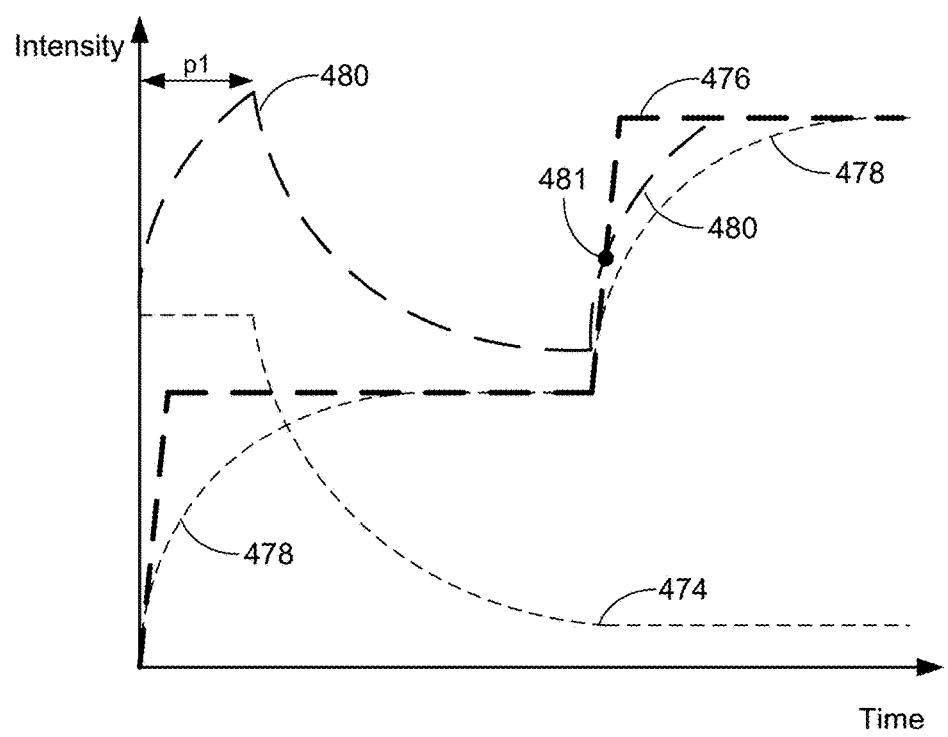
FIGS. 4C-4E illustrate examples of dynamic intensity thresholds in accordance with some embodiments.
Figure 4D:
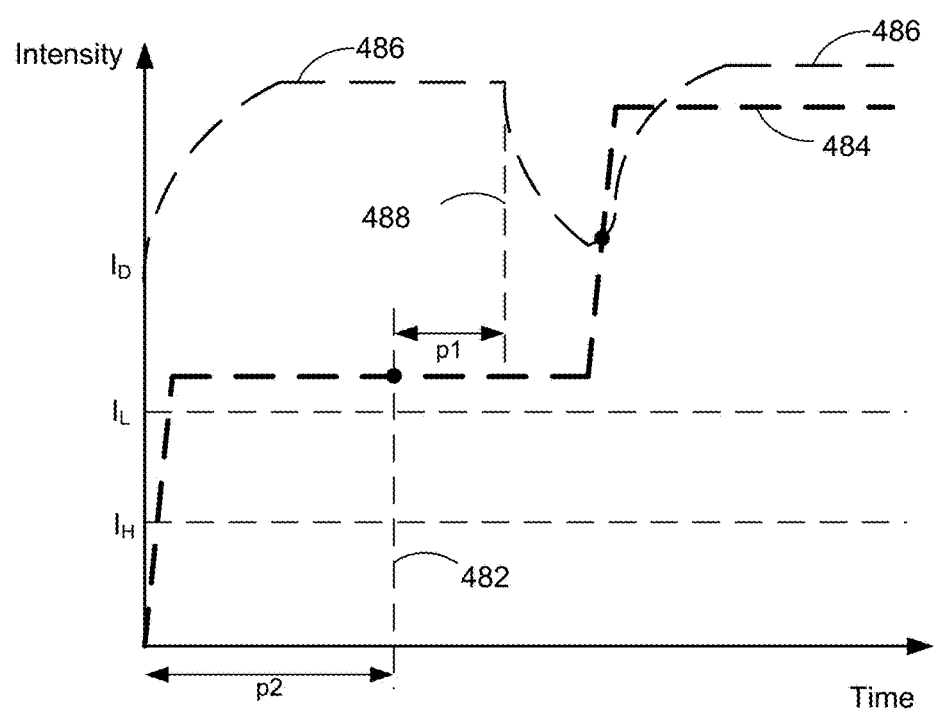
Figure 4E:
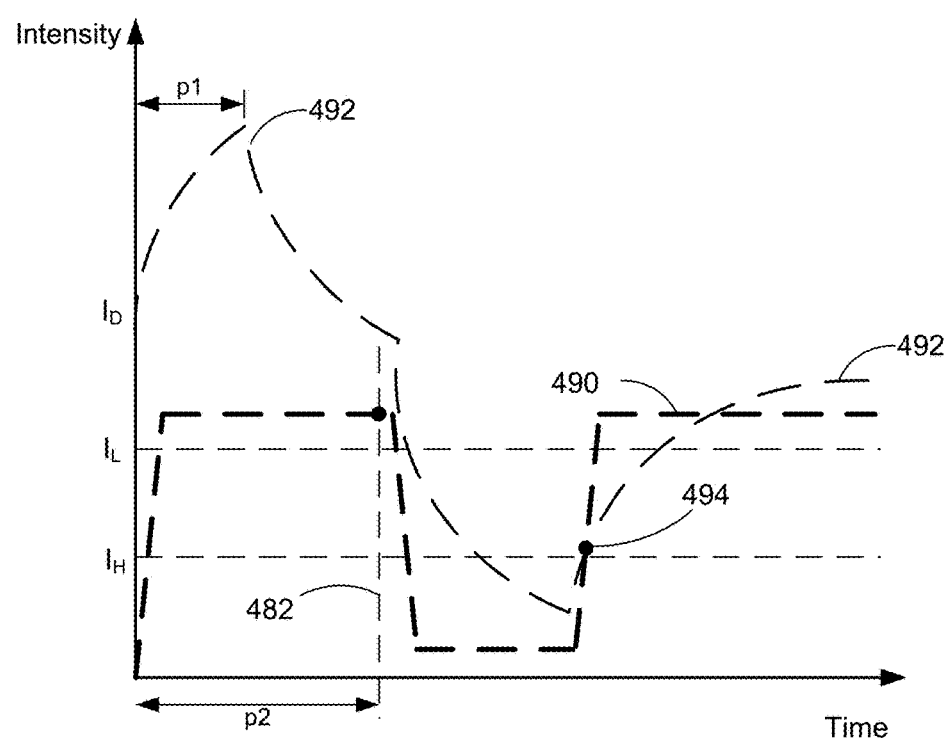
Figure 4F:
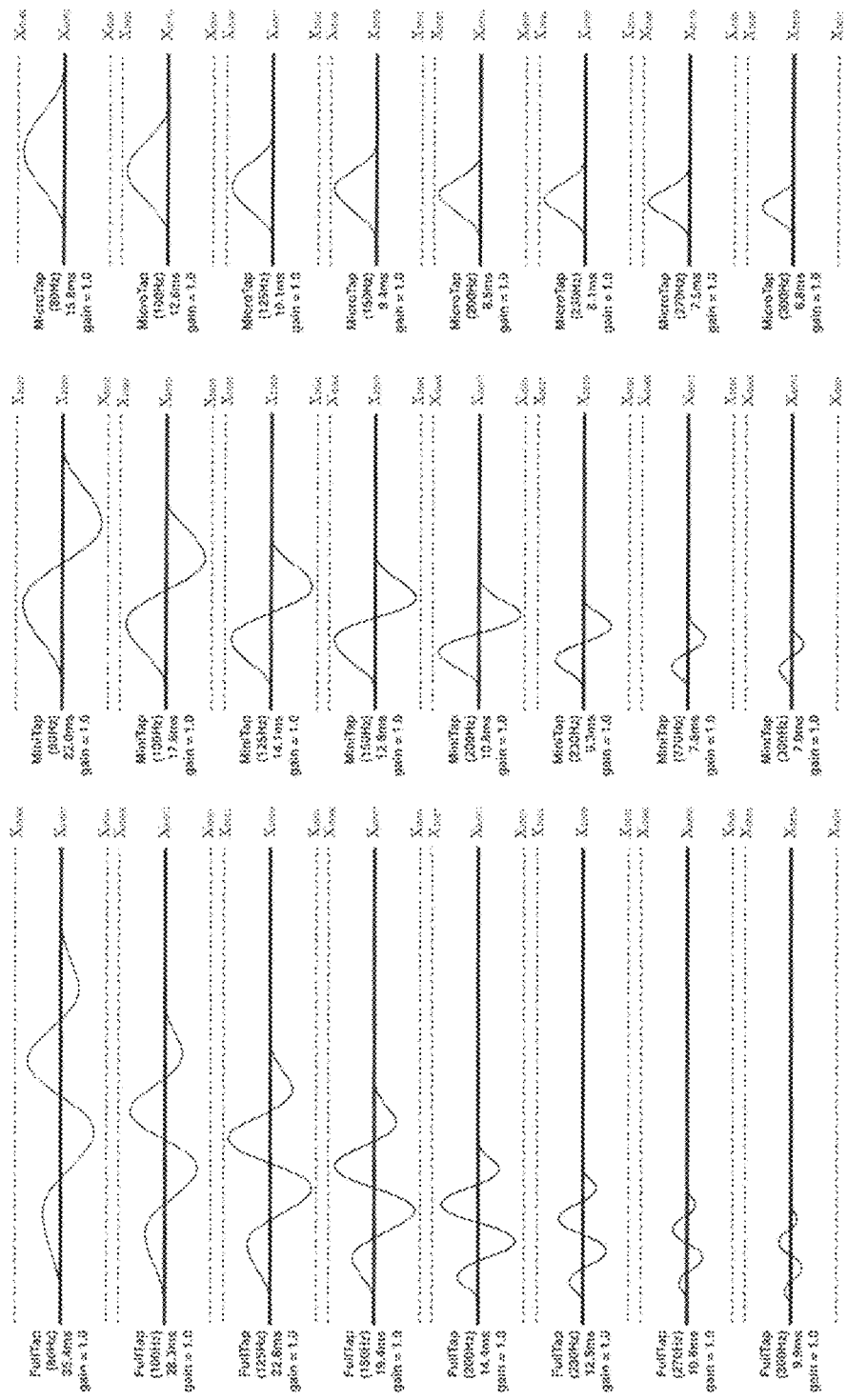
FIGS. 4F-4G illustrate a set of sample tactile output patterns in accordance with some embodiments.
Figure 4G:
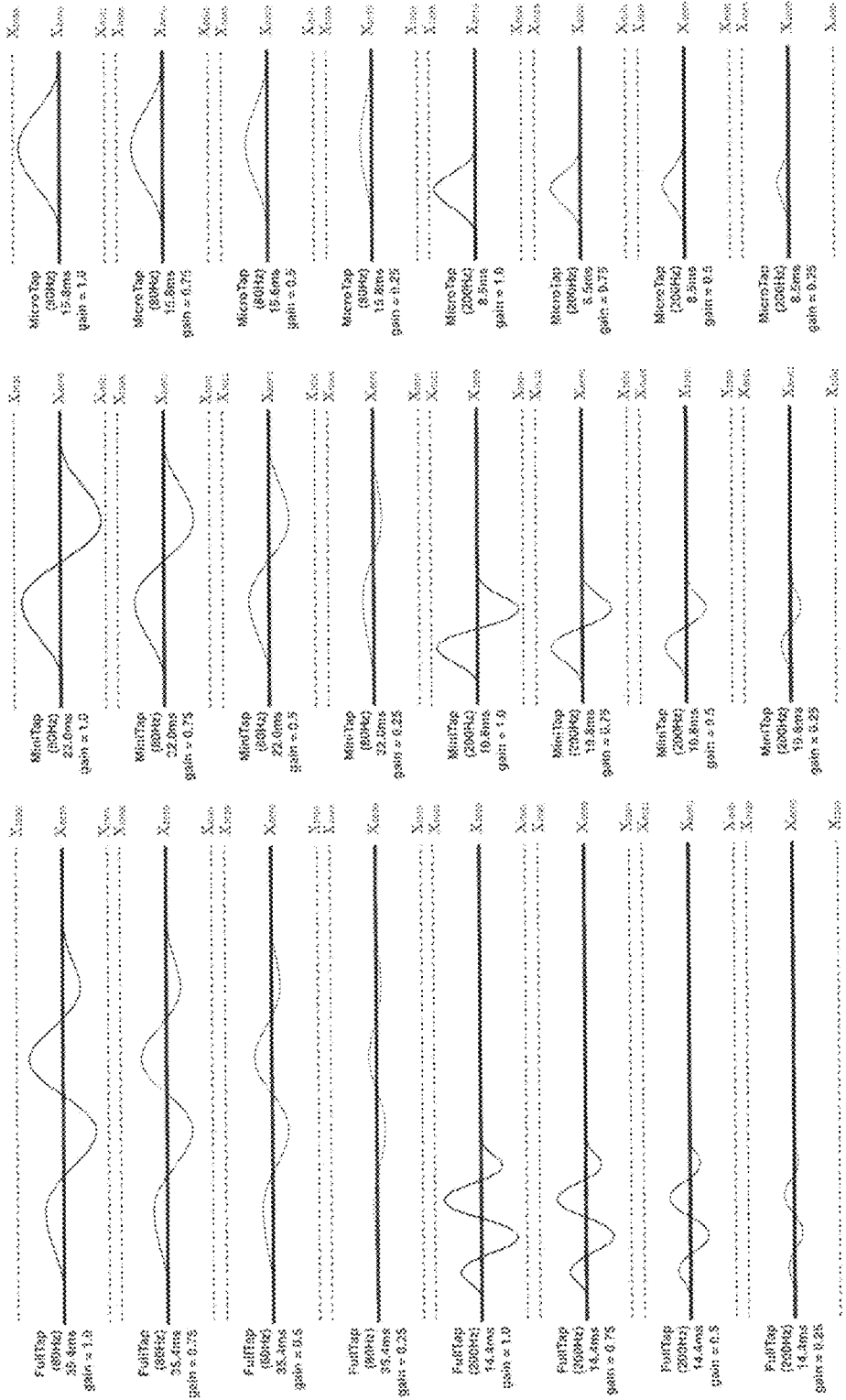

FIG. 4F provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G, which are each shown with variants having a gain of 1.0, 0.75, 0.5, and 0.25. As shown in FIG. 4G, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F, each column shows tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in the left column in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4F-4G include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4F-4G describes movement of a mass in 1 dimension, however similar principles would also apply to movement of a moveable mass in two or three dimensions.

As shown in FIG. 4F, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 provides examples of particular haptic feedback behaviors, configurations, and examples of their use.

TABLE 1

| Behavior Configuration | Feedback Configuration | Examples |
|---|---|---|
| User Interface Haptics | | |
| Retarget Default | MicroTap High (270 Hz) Gain: 0.4 Minimum Interval: 0.05 | Drag calendar event across day boundary Retarget in force-press quick action menu Sliding over origin point in a scrubber Reaching 0 degrees when cropping/straightening Rearranging a list when items snap together |
| Retarget Strong | MicroTap High (270 Hz) Gain: 0.5 Minimum Interval: 0.05 | Retarget in A-Z scrubber |
| Retarget Picker | MicroTap High (270 Hz) Gain: 0.4 Minimum Interval: 0.05 | Spinning a wheel in the wheels of time user interface |
| Impact Default | MicroTap Medium (150 Hz) Gain max: 0.8 Gain min: 0.0 | Changing scrubbing speed when adjusting a slider Creating a new calendar event by tapping and holding Activating a toggle switch (changing the switch from on to off or off to on) Reaching a predefined orientation on a compass (e.g., every 45 degrees from North) Reaching a level state (e.g., 0 degrees tilt in any axis for 0.5 seconds) Dropping a pin in a map Sending or receiving a message with an emphasis animation (e.g., "slam" effect) Sending or receiving an acknowledgment of a message Snapping a ruler to different orientations (e.g., every 45 degrees) Crossing over a suggested photo while scrubbing through a burst of photos Crossing over a detent in a scrubber (e.g., text size, haptic strength, display brightness, display color temperature) Transaction failure notification (ApplePay Failure) |
| Impact Light | MicroTap Medium (150 Hz) Gain max: 0.6 Gain min: 0.0 | Picking up an existing item (e.g., a calendar event, a favorite in web browser) Moving a time selector over a minor division of time (e.g., 15 min) in sleep alarm |
| Impact Strong | MicroTap Medium (150 Hz) Gain max: 1.0 Gain min: 0.0 | Moving a time selector over a major division of time (e.g., 1 hour) in sleep alarm |
| Edge Scrubber | MicroTap Medium (150 Hz) Gain max: 0.6 Gain min: 0.3 | Dragging a brightness scrubber to an edge of the scrubber Dragging a volume scrubber to an edge of the scrubber |
| Edge Zoom | MicroTap High (270 Hz) Gain: 0.6 | Reaching maximum zoom level when zooming into a photo Re-centering a map |
| Drag Default | MicroTap High (270 Hz) Gain Pickup: 1.0 Gain Drop: 0.6 | Pickup and drop an event in calendar |

TABLE 1-continued

| Behavior Configuration | Feedback Configuration | Examples |
|---|---|---|
| Drag Snapping | MicroTap High (270 Hz) Gain Pickup: 1.0 Gain Drop: 0.6 Gain Snap: 1.0 | Rearrange lists in weather, contacts, music, etc. |
| States Swipe Action | Swipe in: MiniTap High (270 Hz) Gain: 1.0 Swipe out: MicroTap High (270 Hz) Gain: 0.55 | Swipe to delete a mail message or conversation Swipe to mark a mail message as read/unread in mail Swipe to delete a table row (e.g., a document in a document creation/viewing application, a note in a notes application, a location in a weather application, a podcast in a podcast application, a song in a playlist in a music application, a voice memo in a voice recording application Swipe to delete a message while displaying a pressure-triggered preview Swipe to mark a message as read/unread while displaying a pressure-triggered preview Swipe to delete a news article Swipe to favorite/love a news article |
| Button Default | MicroTap High (270 Hz) Gain: 0.9 | Reply to message/conversation Adding a bookmark in an electronic book reader application Activating a virtual assistant Starting to record a voice memo Stopping recording a voice memo |
| Button Destructive | MiniTap Low (100 Hz) Feedback Intensity: 0.8 | Delete message/conversation |
| Event Success | FullTap Medium (200 Hz) Gain: 0.7 MiniTap High (270 Hz) Gain: 1.0 | Confirmation that a payment has been made Alert that authentication is needed to make a payment (e.g., biometric authentication or passcode authentication) Adding a payment account to an electronic wallet application |
| Event Error | MiniTap High (270 Hz) Gain: 0.85 Gain: 0.75 FullTap Medium (200 Hz) Gain: 0.65 FullTap Low (150 Hz) Gain: 0.75 | Failure to process a payment transaction Failure to authenticate a fingerprint detected on a fingerprint sensor Incorrect passcode/password entered in a passcode/password entry UI |
| Event Warning | FullTap High (300 Hz) Gain: 0.9 FullTap Custom (270 Hz) Gain: 0.9 | Shake to undo |

Force Press

| | | |
|---|---|---|
| States Preview | MicroTap Custom (200 Hz) Gain: 1.0 | Peek/Preview (e.g., peek at a mail message) |
| States Preview | FullTap Custom (150 Hz) Gain: 1.0 | Pop/Commit (e.g., pop into full mail message) |
| States Preview | MicroTap Custom (200 Hz) Gain: 1.0 | Unavailable (e.g., press hard on an app icon that doesn't have any associated quick actions) |

System Haptics

| | | |
|---|---|---|
| Device Locked | MicroTap Medium (150 Hz) Gain: 1.0 MiniTap | Press power button once to lock device |

TABLE 1-continued

| Behavior Configuration | Feedback Configuration | Examples |
|---|---|---|
| Vibe on Attach | Medium (150 Hz) Gain: 1.0 Vibe at 150 Hz that gradually increases or decreases in amplitude | Attach device to power source |
| Ringtones & Alerts | Custom tactile output using one or more of: Vibe 150 Hz MicroTap 150 Hz MiniTap 150 Hz FullTap 150 Hz | Receive phone call or text message |
| Solid-State Home Button | | |
| 1 ("Tick") | MiniTap 230 Hz Gain: 1.0 | Press home button with click option 1 selected |
| 2 ("Tak") | MiniTap 270 Hz Gain: 1.0 | Press home button with click option 2 selected |
| 3 ("Tock") | MiniTap 300 Hz Gain: 1.0 | Press home button with click option 3 selected |

The examples shown above in Table 1 are intended to illustrate a range of circumstances in which tactile outputs can be generated for different inputs and events. Table 1 should not be taken as a requirement that a device respond to each of the listed inputs or events with the indicated tactile output. Rather, Table 1 is intended to illustrate how tactile outputs vary and/or are similar for different inputs and/or events (e.g., based on the tactile output pattern, frequency, gain, etc.). For example Table 1 shows how an "event success" tactile output varies from an "event failure" tactile output and how a retarget tactile output differs from an impact tactile output.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
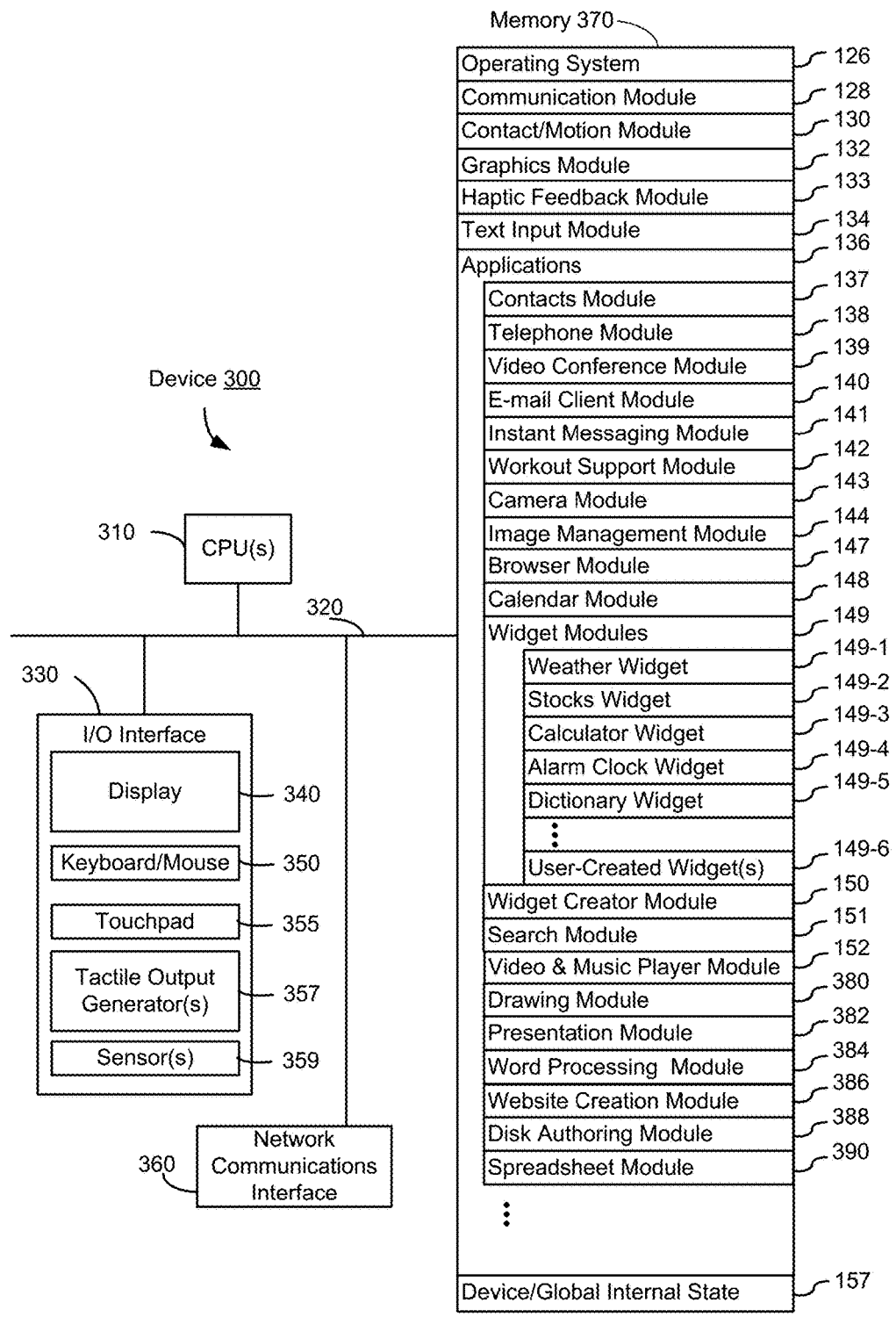
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture (e.g., on touch-sensitive display system 112) depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy input criteria that are configured to be met even when the characteristic intensity of a contact does not satisfy a given intensity threshold. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is configured to detect a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected (e.g., on touch-sensitive display system 112) based on the satisfaction of criteria that are independent of intensities of contacts included in the gesture. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that gesture recognition criteria are configured to be met when a contact in a gesture has an intensity below a respective intensity threshold means that the gesture recognition criteria are capable of being satisfied even if the contact(s) in the gesture do not reach the respective intensity threshold. It should be understood, however, that this statement does not preclude the gesture recognition criteria from being satisfied in circumstances where one or more of the contacts in the gesture do reach or exceed the respective intensity threshold. For example, a tap gesture is configured to be detected if the finger-down and finger-up event are detected within a predefined time period, without regard to whether the contact is above or below the respective intensity threshold during the predefined time period, and a swipe gesture is configured to be detected if the contact movement is greater than a predefined magnitude, even if the contact is above the respective intensity threshold at the end of the contact movement.

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria are configured to be met when a contact in a gesture has an intensity below a respective intensity threshold does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which are configured to be met when a gesture has an intensity below a respective intensity threshold—are in competition with second gesture recognition criteria for a second gesture—which are dependent on the gesture reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture are still configured to be met when a contact in the gesture has an intensity below the respective intensity because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that are configured to be met when an intensity of a contact remains below a respective intensity threshold will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
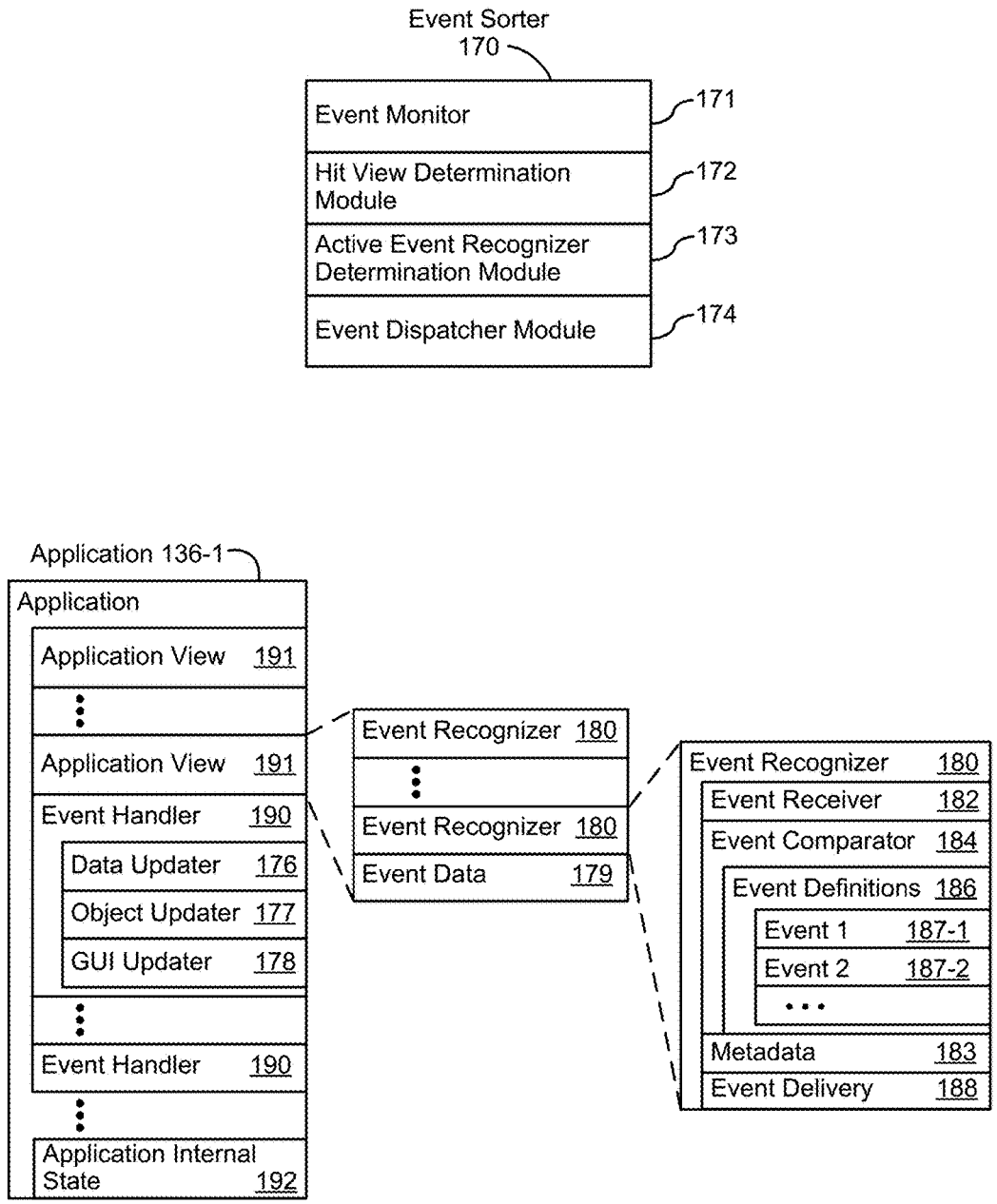
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
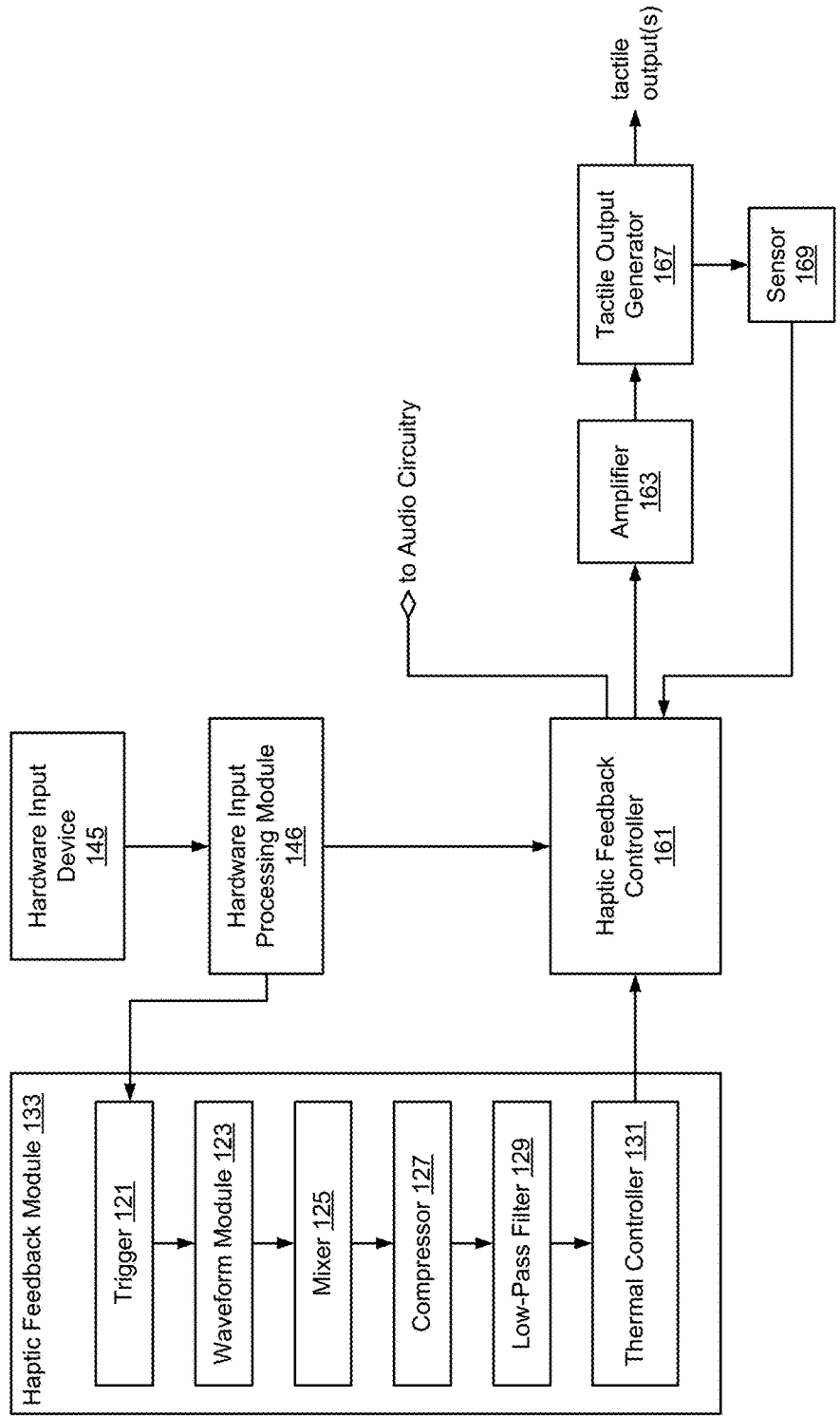
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button (e.g., as shown in FIG. 2B or a home button with a mechanical actuator as illustrated in FIG. 2C). In some embodiments, hardware input device 145 consists of an intensity-sensitive home button (e.g., as shown in FIG. 2B or a home button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 145, hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 1D:
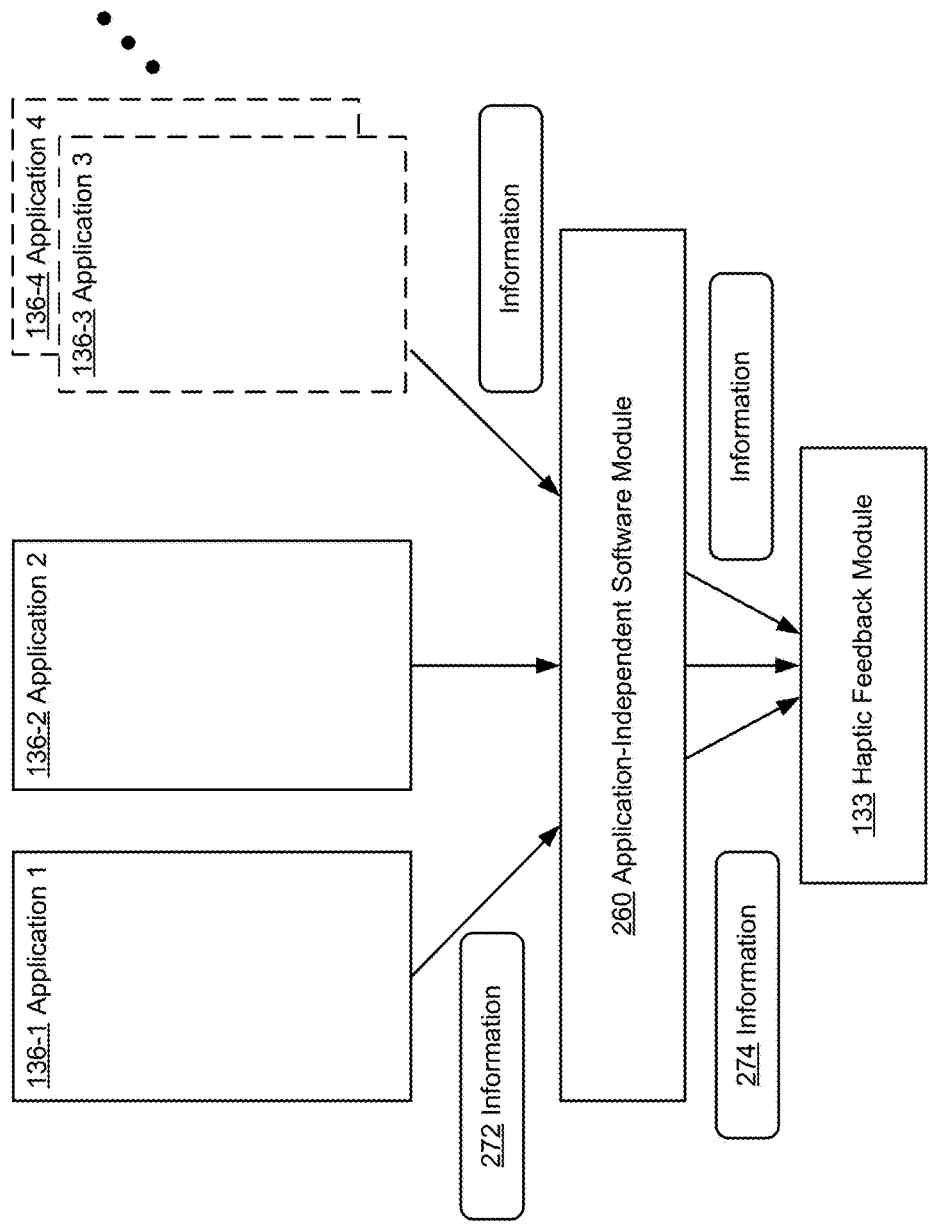
FIGS. 1D-1E are block diagrams illustrating application-independent software modules in accordance with some embodiments.
Figure 1E:
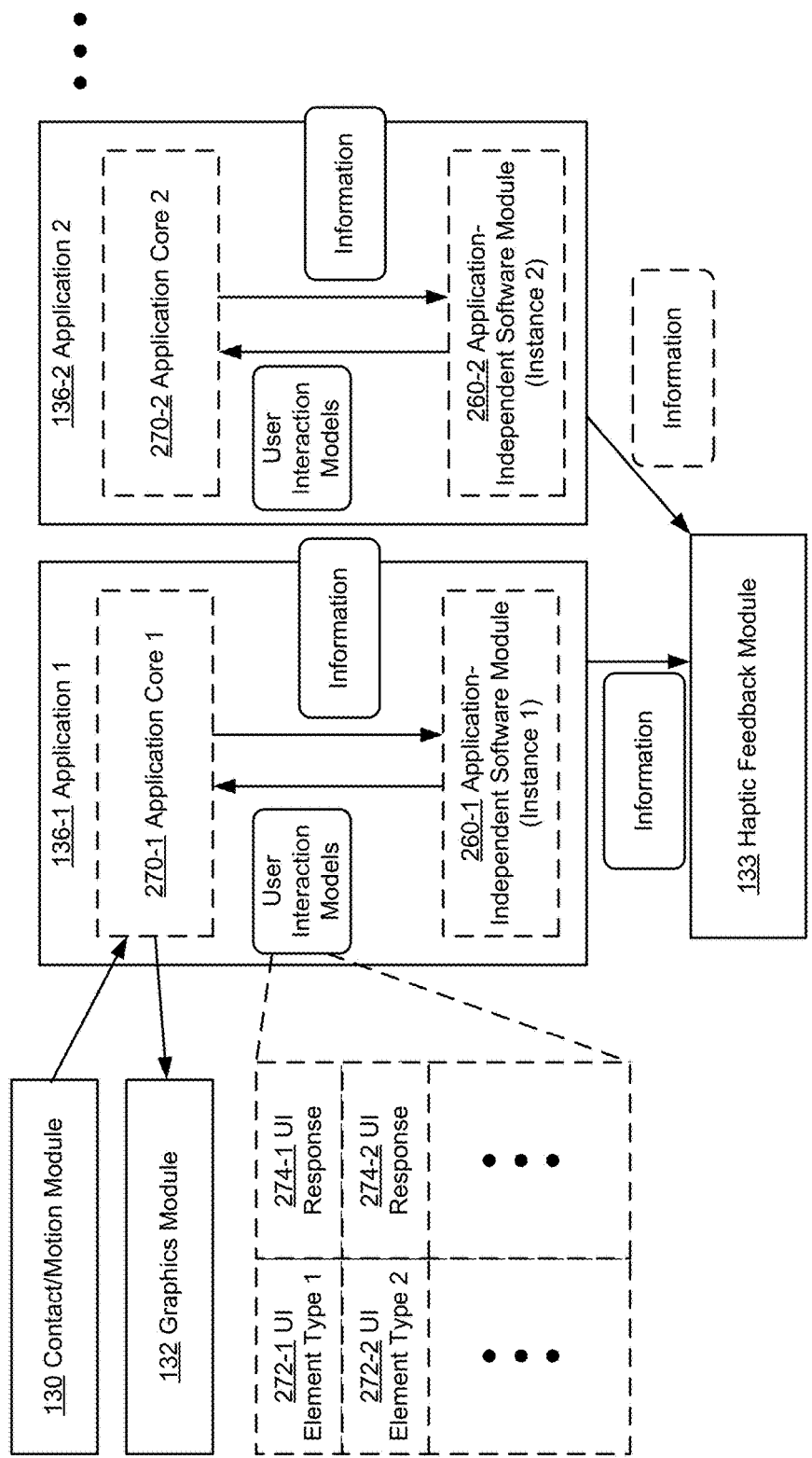

FIGS. 1D-1E are block diagrams illustrating application-independent software modules in accordance with some embodiments.

FIG. 1D illustrates that haptic feedback module 133 receives information related to user interactions with device 100. Haptic feedback module 133, in response to receiving the information, generates and provides tactile feedback generation instructions to haptic feedback controller 161, which in turn sends instructions to tactile output generators 167 for generating tactile outputs. In some embodiments, haptic feedback module 133 corresponds to a synthesizer illustrated in Appendix A and/or an AVHapticPlayer in Appendix B.

In some embodiments, applications (e.g., application 1 (136-1)) send information (e.g., information 272) related to user interactions with device 100 to application-independent software module 260, which processes the information and sends the processed information (e.g., information 274, which is distinct from information 272) to haptic feedback module 133. In some embodiments, applications correspond to Client App illustrated in Appendices A and B.

In some embodiments, application-independent software module 260 is distinct and separate from applications, as shown in FIG. 1D. In some embodiments, application-independent software module 260 includes the UIKit, and more particularly, the UIFeedbackGenerator in the UIKit, illustrated in Appendices A and B.

In some embodiments, applications use various functions and objects described in Appendices A and B to communicate with application-independent software module 260.

FIG. 1E is similar to FIG. 1D, except that each of application 1 (136-1, such as an e-mail client application) and application 2 (136-2, such as a browser application) includes a distinct instance (e.g., a distinct copy) of application-independent software module 260. In addition, each of the applications (e.g., application 1 and application 2) includes an application core that is specific to the application (e.g., application 1 (136-1) includes application core 1 (270-1) and/or application 2 (136-2) includes application core 2 (270-2)). For example, application core 1 (270-1) includes instructions for performing operations specific to application 1 (136-1) (e.g., retrieving e-mails from one or more e-mail servers) and application core 2 (260-2) includes instructions for performing operations specific to application 2 (136-2) (e.g., bookmarking a web page).

FIG. 1E also illustrates that an application core (e.g., application core 1 (270-1) receives user interaction models from application independent software module 260 or an instance of application independent software module 260. In some embodiments, the user interaction models include information identifying a plurality of user interface element types 272 (e.g., slider objects 272-1, switch objects 272-2, etc.) and associated user interface responses 274. In some embodiments, the user interface responses include information identifying tactile outputs to be generated in conjunction with user interaction with corresponding user interface elements (e.g., slider objects represented by slider object type 272-1 are associated with tactile output 274-1, and switch objects represented by switch object type 272-2 are associated with tactile output 274-2). For example, tactile output 274-1 defines which tactile outputs are to be generated when a corresponding slider thumb is moved and/or when the slider thumb reaches an end of the slider, and tactile output 274-2 defines which tactile outputs are to be generated when a corresponding switch object is turned on and/or off.

In some embodiments, user interaction models are predefined classes (e.g., the UIView class defining an area on a display and the interfaces for managing the content in that area). At run time, a view object is prepared (e.g., an instance of the UIView class is created) to handle the rendering of content in a corresponding area and also handle interactions with the content. In some embodiments, the UIView class includes one or more subclasses, such as a UIControl class configured for implementing visual elements that are used for specific actions, a UITableView class configured for displaying and editing hierarchical lists of information, a UIDatePicker class configured for displaying a wheel of time to allow a user to select dates and/or times, a UISlider class configured for selecting a single value from a continuous range of values, and a UIScrollView class configured for displaying content that is larger than a corresponding display area. In some embodiments, the UITableView class, the UIDatePicker class, the UISlider class, and the UIScrollView class are subclasses of the UIControl class.

Figure 2A:
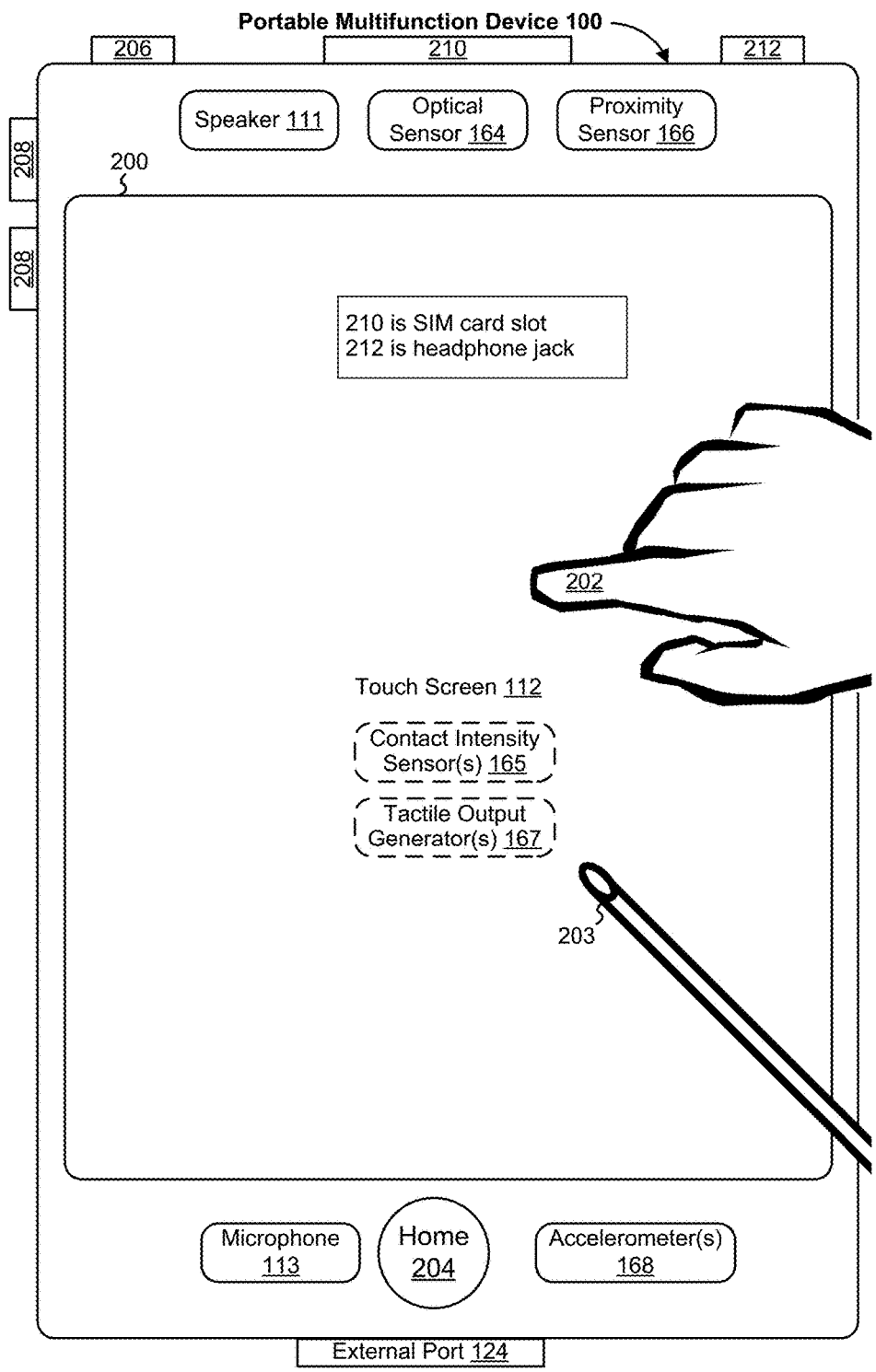
FIG. 2A illustrates a portable multifunction device having a touch screen in accordance with some embodiments.
Figure 2B:
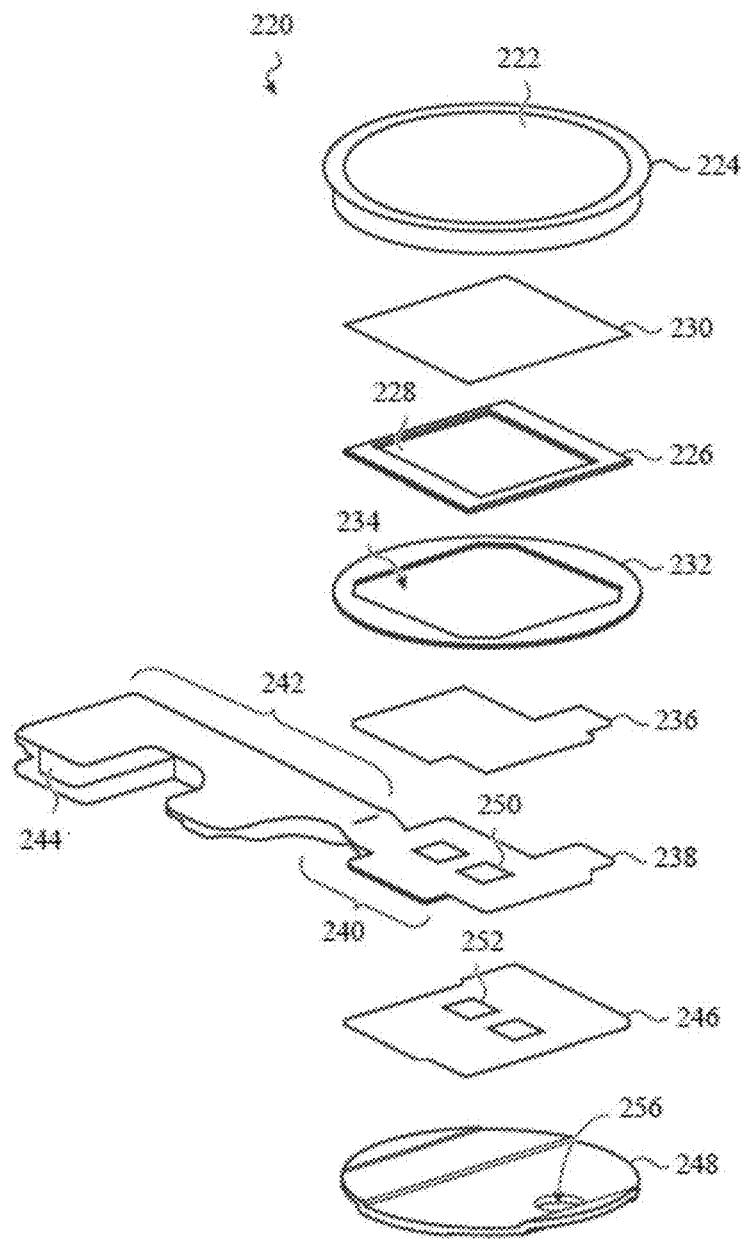
FIGS. 2B-2C show exploded views of an intensity-sensitive input device in accordance with some embodiments.
Figure 2C:
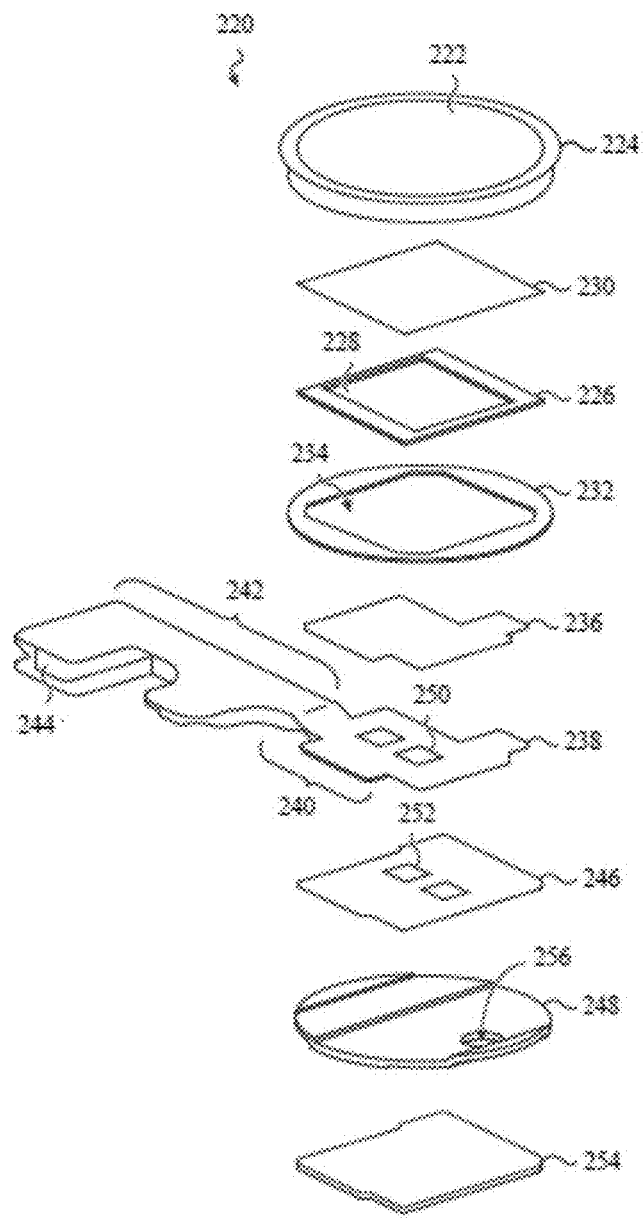

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

In some embodiments, an application (e.g., an application core of the application, such as application core 1 (270-1)) generates a user interface by populating a user interface element (e.g., a slider) identified in the user interaction models with content provided by the application core (e.g., application core 1 (270-1) provides a range of the slider element and locations and/or values of major and minor tick marks).

In some embodiments, the application sends the user interface to graphics module 132 for display.

In some embodiments, the application receives information representing user interactions with device 100 from contact/motion module 130. In some embodiments, the application relays the information representing user interactions with device 100 to an application-independent software module or an instance thereof (e.g., 260-1), and the application-independent software module send the information or a subset thereof to haptic feedback module 133 for generating tactile outputs. In some embodiments, the application also sends information identifying one or more dimensions of a selected user interface. In some embodiments, the information representing user interactions with device 100 includes a magnitude (e.g., a speed) and/or a location of a user input.

In some embodiments, haptic feedback module 133 receives the information representing user interactions with device 100 directly from contact/motion module 130 (e.g., without going through the application).

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
a Bluetooth indicator;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a stylus input). Similarly, when multiple user inputs are simultaneously detected, it should be understood that multiple finger contacts, or a combination of finger contacts and stylus inputs are used simultaneously.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Although only specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

FIGS. 5A-5KKK illustrate example user interfaces and associated tactile outputs in accordance with some embodiments. The user interfaces in these figures are used to illustrate the processes described below, including the processes in FIGS. 6A-6D, 8A-8D, 10A-10D, 12A-12D, 14A-14B, 16A-16D, 18A-18C, and 20A-20B. For convenience of explanation, some of the embodiments will be discussed with reference to operations performed on a device with a touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5H illustrate a user interface for displaying control settings for tactile outputs and audio outputs, in accordance with some embodiments. For ease of explanation, in the example shown in FIGS. 5A-5H, user interface

500 illustrates a tactile output setting and two audio output settings in the same user interface. In other embodiments, tactile output settings (e.g., including the tactile output setting shown in user interface 500) may be presented instead in one or more user interfaces separate from user interface(s) used for presenting audio settings (e.g., the audio output settings shown in user interface 500). FIGS. 5A-5H illustrate that user interface 500 is displayed on touch screen 112 of portable multifunction device 100.

Figure 5A:
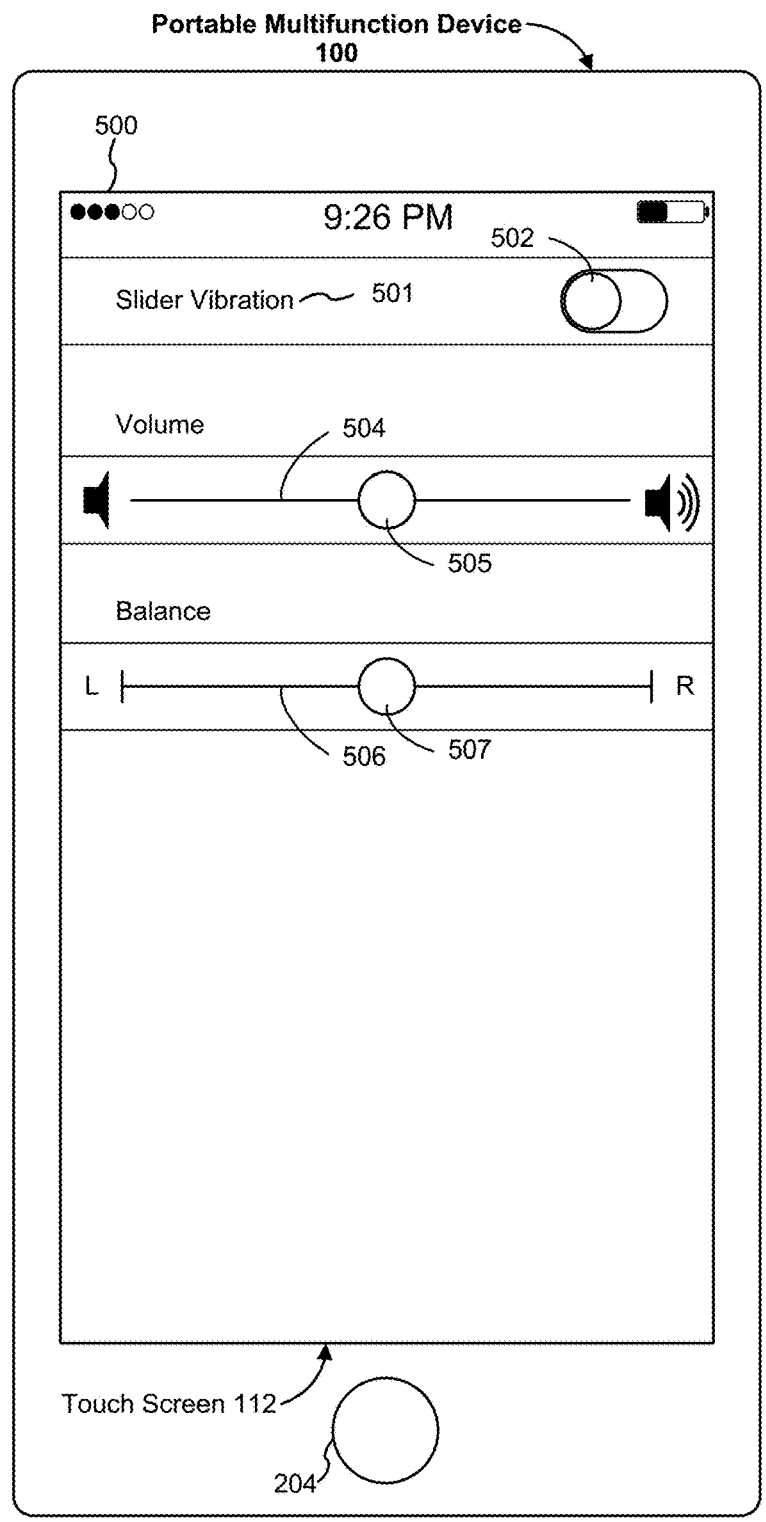
FIGS. 5A-5KKK illustrate example user interfaces and tactile outputs in accordance with some embodiments.

FIG. 5A illustrates that user interface 500 includes a slider vibration control region for controlling a slider vibration setting, indicated by label 501 "Slider Vibration" and corresponding switch object 502. Switch object 502 controls a state of the slider vibration setting. FIG. 5A illustrates that switch object 502 is initially at the left position (e.g., corresponding to an "off" state of the slider vibration setting).

User interface 500 in FIG. 5A also includes an audio volume control region for controlling an audio volume level, indicated by the label "Volume" and corresponding volume slider 504 set to an audio volume level corresponding to volume slider position 505. In addition, user interface 500 includes an audio balance control region for controlling an audio balance setting, indicated by the label "Balance" and corresponding balance slider 506 set to an audio balance setting corresponding to balance slider position 507. In some embodiments, device 100 includes one or more audio speakers (e.g., one or more speakers 111, FIG. 1A). In some embodiments, device 100 generates audio outputs using the one or more audio speakers included in device 100. In some embodiments, device 100 transmits audio control signals to one or more external audio speakers outside of device 100. In some embodiments, the audio volume setting represented by volume slider 504 controls the volume of audio outputs generated by device 100 (e.g., generated by one or more audio speakers included in device 100) and/or generated by the one or more external audio speakers based on the audio control signals from device 100. In some embodiments in which device 100 includes a plurality of audio speakers (e.g., a plurality of speakers 111, FIG. 1A), the audio balance setting represented by balance slider 506 controls the distribution of audio output between the plurality of audio speakers. In some embodiments in which device 100 transmits audio control signals to a plurality of external audio speakers, the audio balance setting represented by balance slider 506 controls the distribution of audio output between the plurality of external audio speakers. For example, as shown in FIG. 5A, the audio balance setting represented by balance slider 506 controls the distribution of audio output between a speaker labeled "L" (e.g., a left audio channel speaker) and a speaker labeled "R" (e.g., a right audio channel speaker).

Figure 5B:
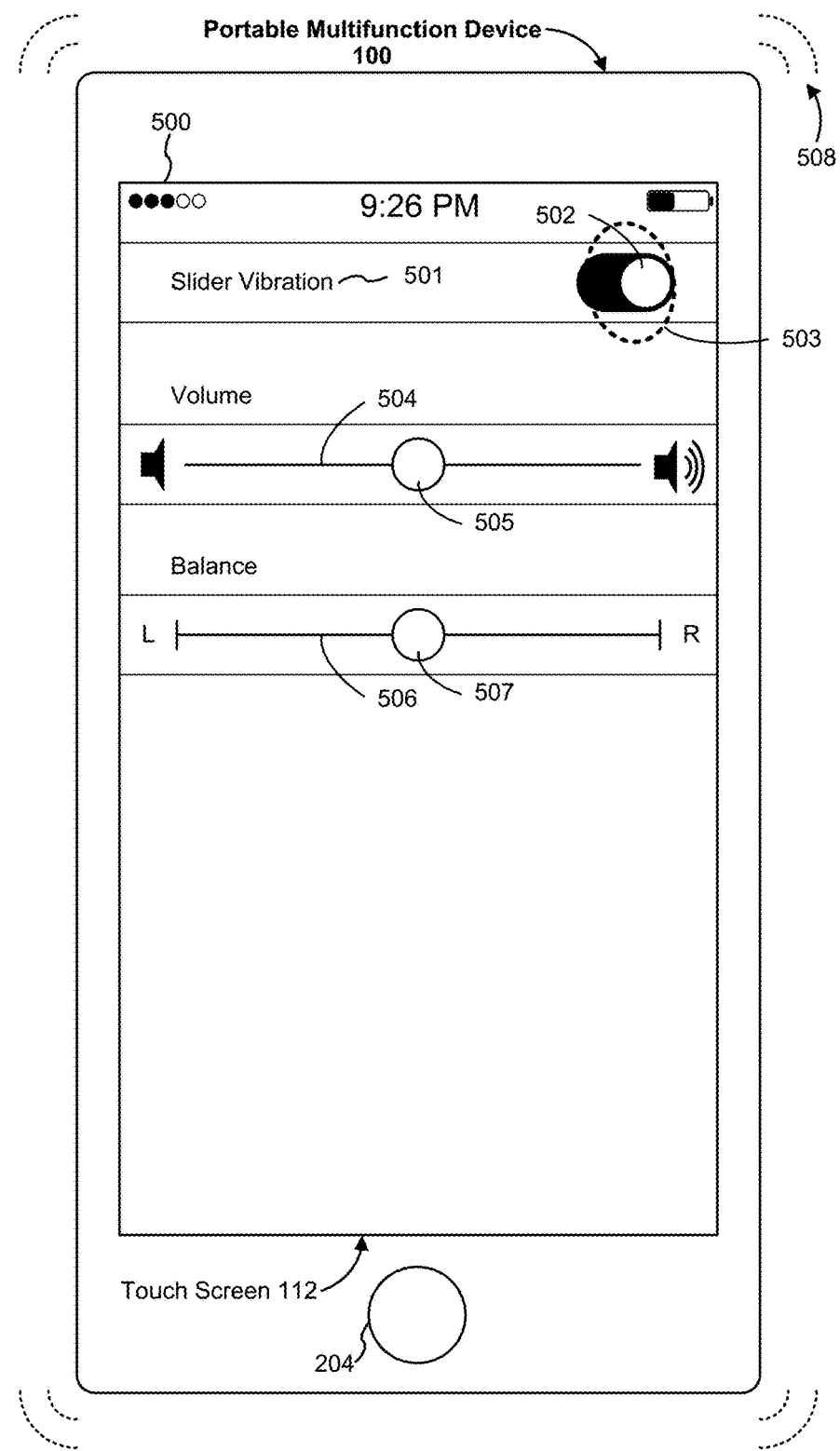

FIG. 5B illustrates a transition of user interface 500 from user interface 500 in FIG. 5A. In particular, FIG. 5B illustrates user input 503 (e.g., a tap gesture) detected while displaying user interface 500 as presented in FIG. 5A. In response to detecting user input 503, switch object 502 is toggled from the left position to the right position (e.g., in accordance with user input 503 toggling switch object 502, the slider vibration setting is toggled from the "off state" to an "on" state). Also, in response to detecting user input 503, device 100 generates tactile output 508 (e.g., MicroTap Medium (150 Hz), gain max: 0.8, gain min: 0.0).

Figure 5C:
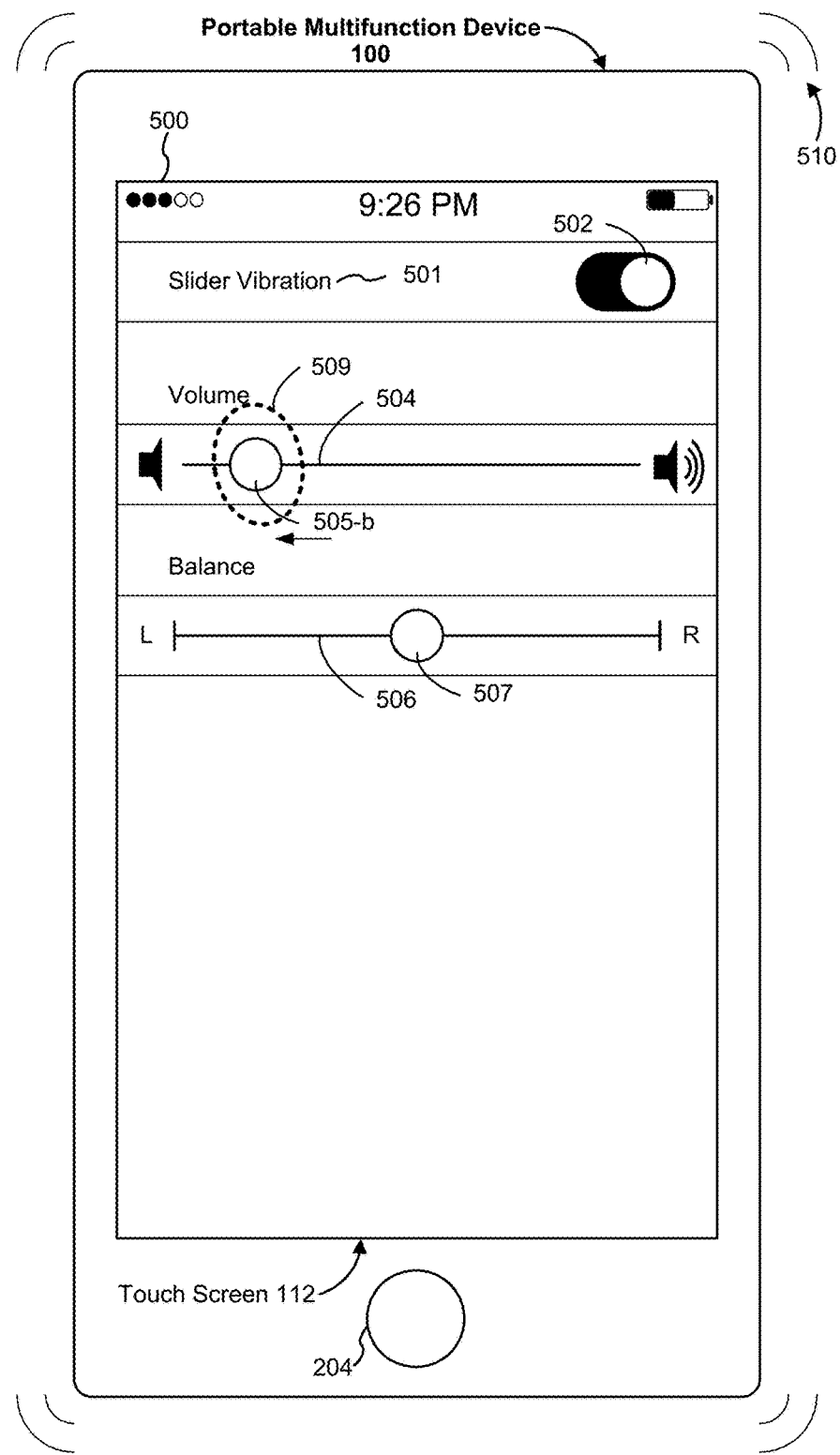
Figure 5D:
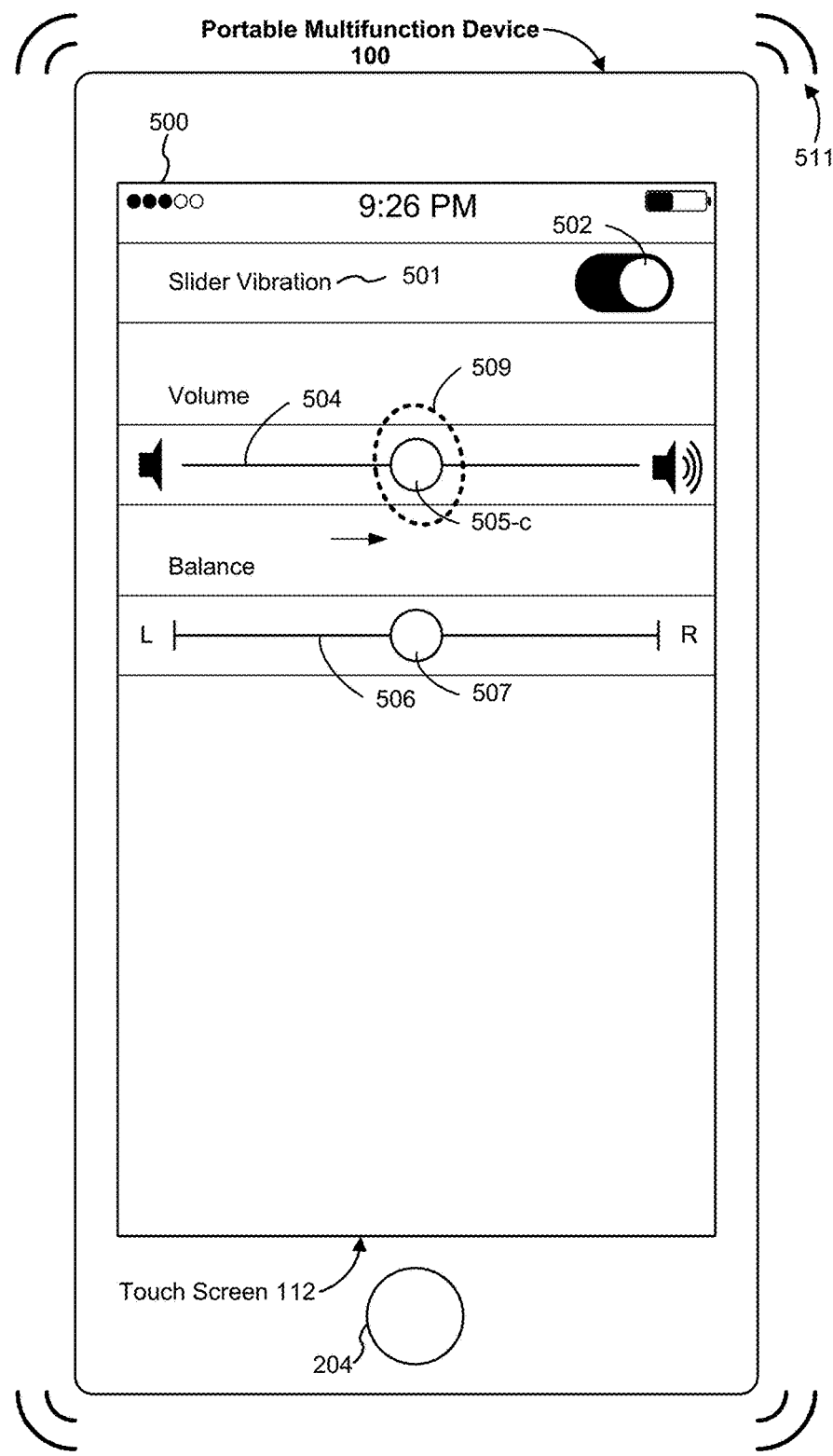
Figure 5E:
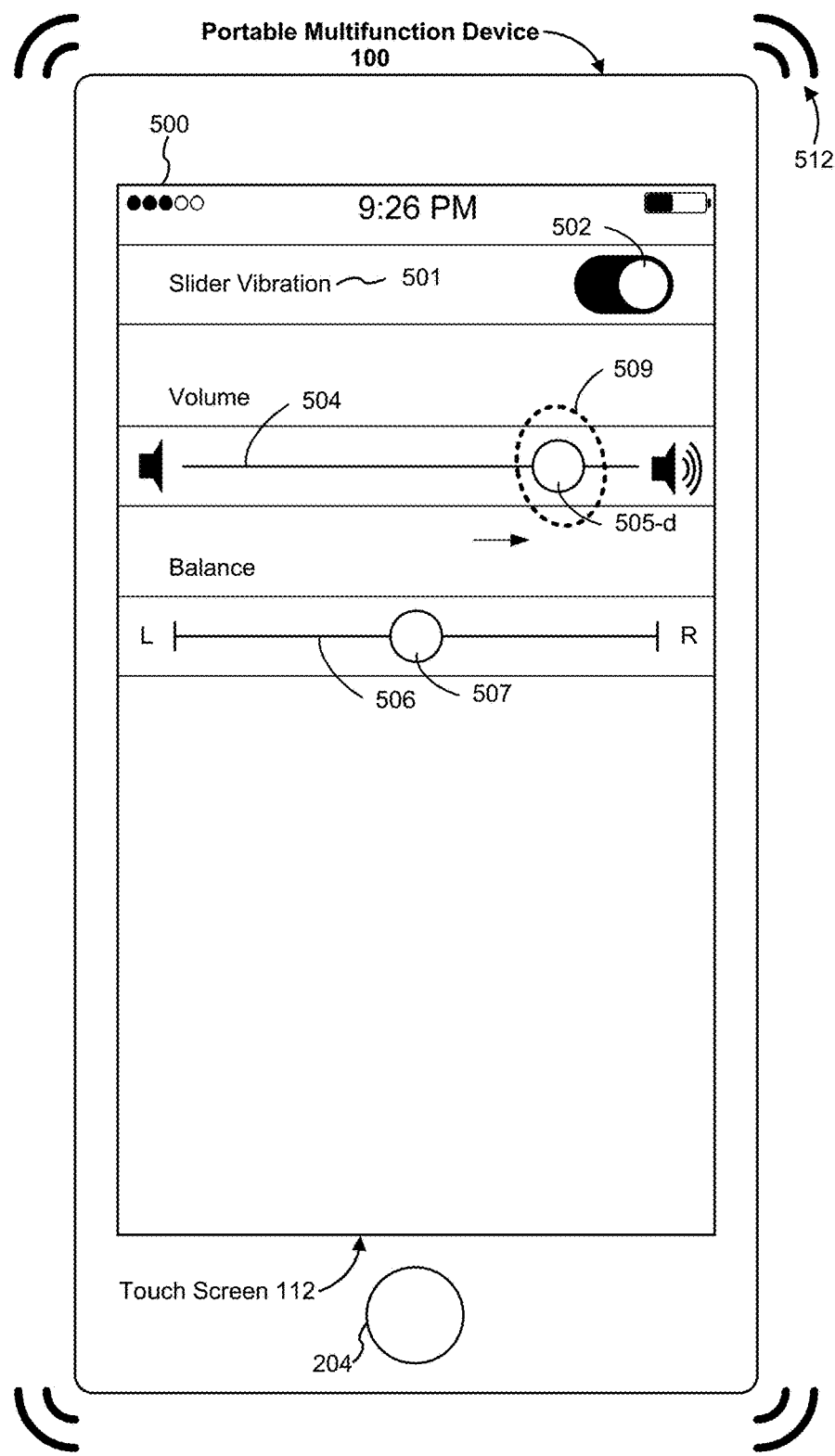

FIGS. 5C-5E illustrate a series of transitions of user interface 500 from user interface 500 in FIG. 5B. In particular, FIGS. 5C-5E illustrate generation of tactile outputs in response to changes in volume slider position 505 with respect to volume slider 504. In some embodiments, as shown in FIGS. 5C-5E, tactile outputs are generated using a tactile output level (e.g., gain) that corresponds to the respective audio volume level indicated by a respective volume slider position.

For example, FIG. 5C illustrates movement of user input 509 toward the left edge of device 100 (e.g., user input 509 is an input gesture, such as a drag gesture, leftward from an initial contact at a position corresponding to volume slider position 505, as illustrated in FIG. 5B). In response to user input 509, the audio volume level indicated by volume slider 504 is changed to an audio volume level corresponding to volume slider position 505-*b* (e.g., from an audio volume level corresponding to volume slider position 505, FIG. 5B). In addition, device 100 generates tactile output 510. In accordance with volume slider position 505-*b* indicating an audio volume level near a minimum audio volume level (e.g., zero audio volume), tactile output 510 is generated as a light tactile output (e.g., MicroTap Medium (150 Hz) with a gain of 0.1).

FIG. 5D illustrates a transition of user interface 500 from user interface 500 in FIG. 5C. In particular, FIG. 5D illustrates movement of user input 509 away from the left edge of device 100. In response to user input 509, the audio volume level indicated by volume slider 504 is changed to an audio volume level corresponding to volume slider position 505-*c* (e.g., from an audio volume level corresponding to volume slider position 505-*b*, FIG. 5C). In addition, device 100 generates tactile output 511. In accordance with volume slider position 505-*c* indicating an audio volume level near a moderate audio volume level, tactile output 511 is generated as a moderate tactile output (e.g., MicroTap Medium (150 Hz) with a gain of 0.4).

FIG. 5E illustrates a transition of user interface 500 from user interface 500 in FIG. 5D. In particular, FIG. 5E illustrates movement of user input 509 toward the right edge of device 100. In response to user input 509, the audio volume level indicated by volume slider 504 is changed to an audio volume level corresponding to volume slider position 505-*d* (e.g., from an audio volume level corresponding to volume slider position 505-*c*, FIG. 5D). In addition, device 100 generates tactile output 512. In accordance with volume slider position 505-*d* indicating an audio volume level near a maximum audio volume level, tactile output 512 is generated as a strong tactile output (e.g., MicroTap Medium (150 Hz) with a gain of 0.7).

Figure 5F:
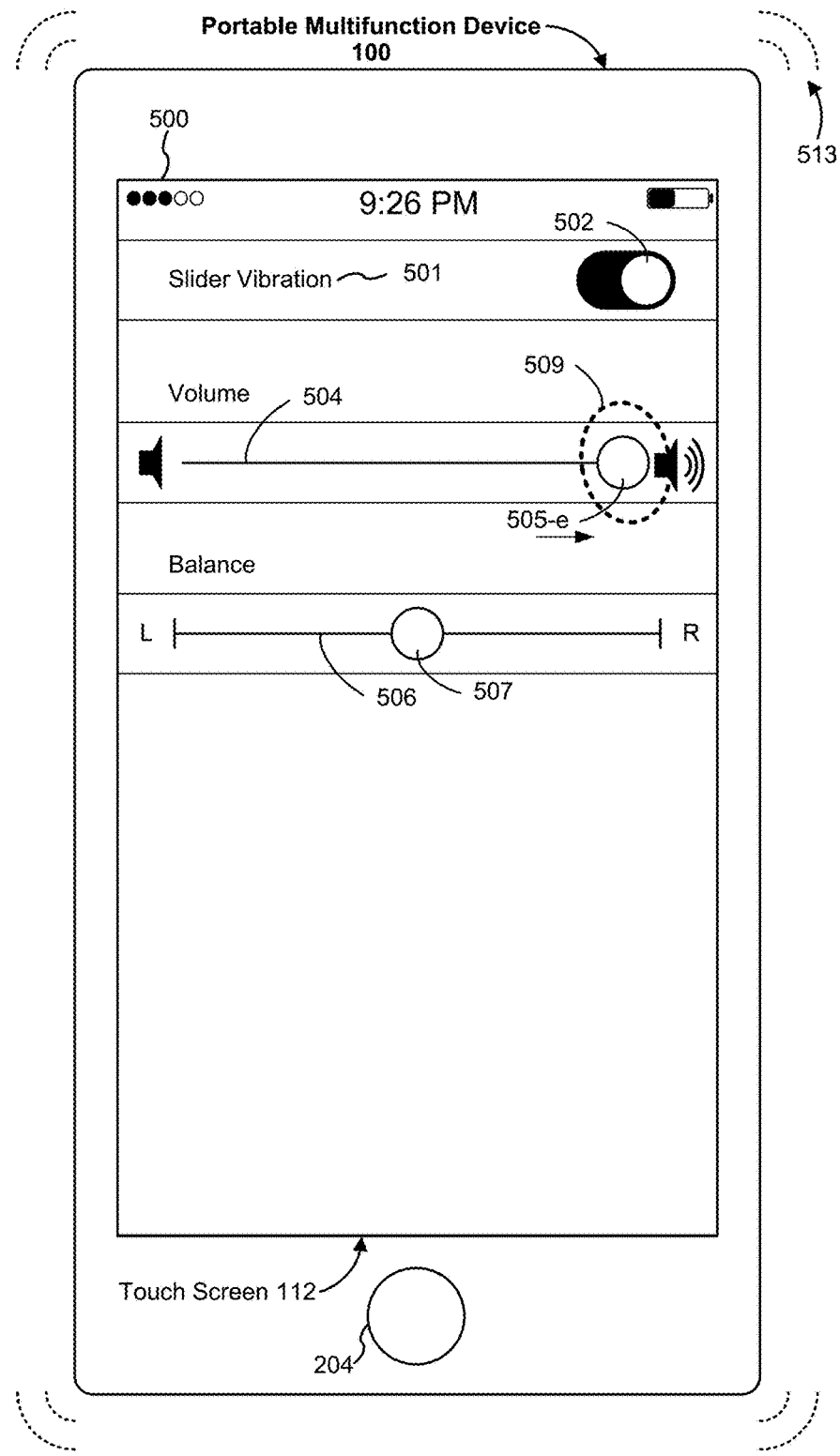

FIG. 5F illustrates a transition of user interface 500 from user interface 500 in FIG. 5E. In particular, FIG. 5F illustrates continued movement of user input 509 toward the right edge of device 100. In response to user input 509, the audio volume level indicated by volume slider 504 is changed to an audio volume level corresponding to volume slider position 505-*e* (e.g., from an audio volume level corresponding to volume slider position 505-*d*, FIG. 5E). In the example shown in FIG. 5F, volume slider position 505-*e* is an end position of volume slider 504 (e.g., corresponding to a maximum audio volume level). Accordingly, device 100 generates tactile output 513 (e.g., MicroTap Medium (150 Hz), gain max: 0.6, gain min: 0.3) to indicate that an end of volume slider 504 has been reached.

Figure 5G:
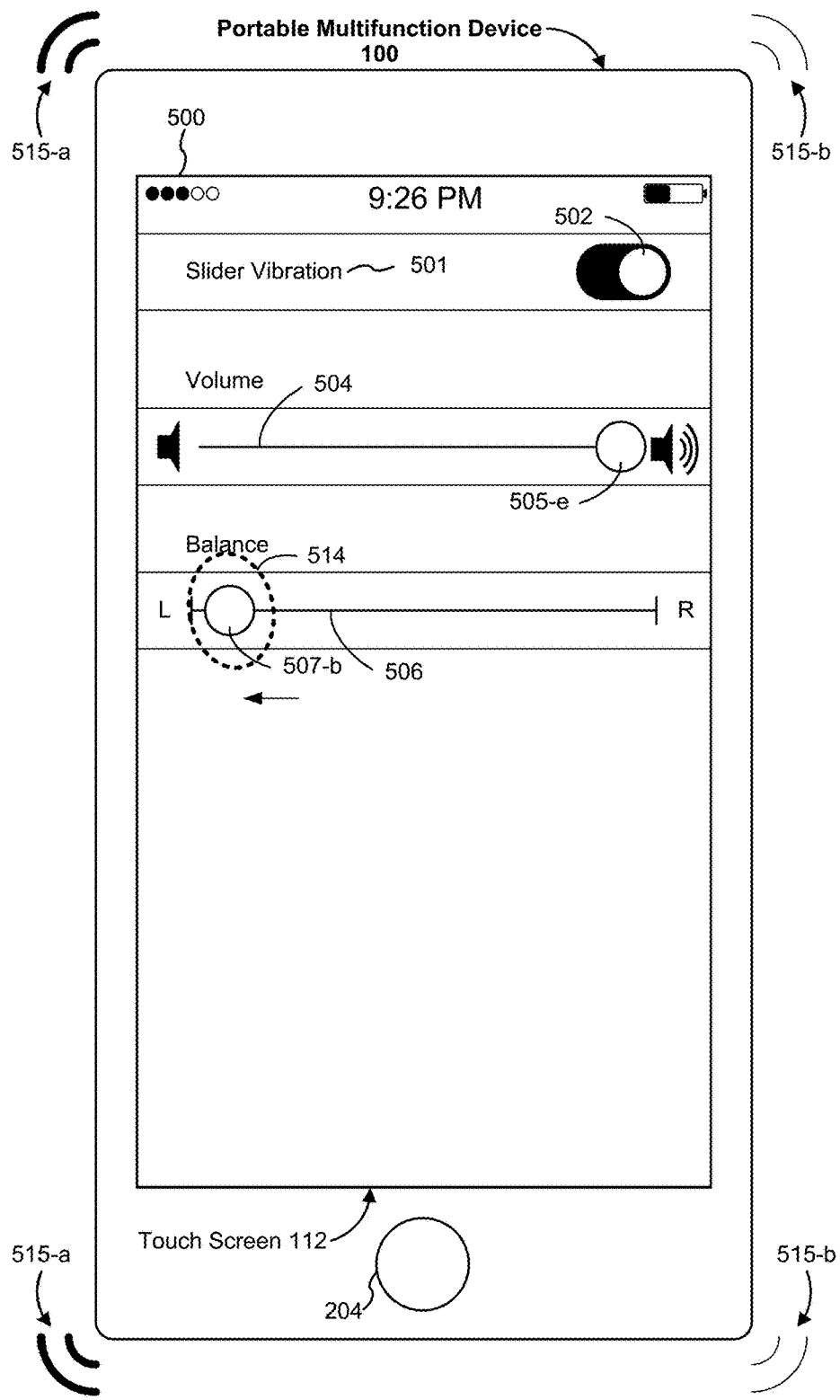
Figure 5H:
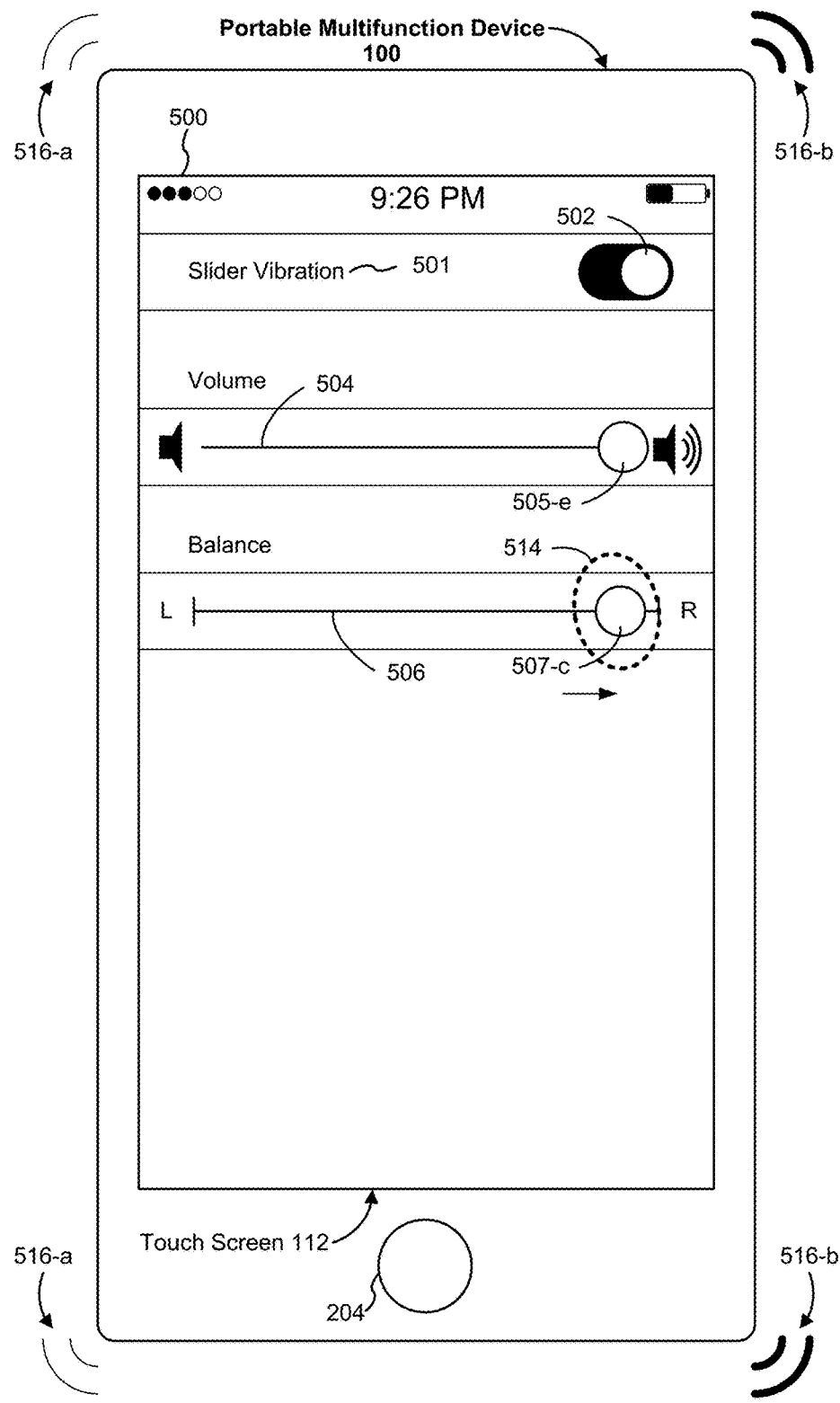

FIGS. 5G-5H illustrate a series of transitions of user interface 500 from user interface 500 in FIG. 5F. In particular, FIGS. 5G-5H illustrate generation of tactile outputs in response to changes in balance slider position 507 with respect to balance slider 506. As discussed above with respect to FIG. 5A, the audio balance setting represented by balance slider 506 controls the distribution of audio output between a speaker labeled "L" (e.g., a left audio channel speaker) and a speaker labeled "R" (e.g., a right audio channel speaker). In some embodiments, as shown in FIGS. 5G-5H, tactile outputs are generated using a tactile output level (e.g., gain) that corresponds to the respective audio balance setting indicated by a respective balance slider position.

For example, FIG. 5G illustrates movement of user input 514 toward the left edge of device 100 (e.g., user input 514 is an input gesture, such as a drag gesture, leftward from an initial contact at a position corresponding to balance slider position 507, as illustrated in FIG. 5F). In response to user input 514, the audio balance setting indicated by balance slider 506 is changed (e.g., from an audio balance setting corresponding to balance slider position 507, FIG. 5F) to an audio balance setting corresponding to balance slider position 507-b. As shown in FIG. 5G, balance slider position 507-b is near an edge (e.g., the left edge) of balance slider 506. In some embodiments, balance slider position 507-b indicates an audio balance setting having close to a maximum allocation of audio output to the "L" speaker and close to a minimum allocation of audio output to the "R" speaker. In response to user input 514, device 100 generates left-side tactile output 515-a (e.g., using one or more tactile output generator(s) 167, FIG. 1A, that are located in a left region of device 100) and right-side tactile output 515-b (e.g., using one or more tactile output generator(s) 167, FIG. 1A, that are located in a right region of device 100). In addition, in accordance with balance slider position 507-b indicating an audio balance setting having close to a maximum allocation of audio output to the "L" speaker, left-side tactile output 515-a is generated as a strong tactile output (e.g., MicroTap Medium (150 Hz) with a gain of 0.7). In accordance with balance slider position 507-b indicating an audio balance setting having close to a minimum allocation of audio output to the "R" speaker, right-side tactile output 515-b is generated as a light tactile output (e.g., MicroTap Medium (150 Hz) with a gain of 0.1).

FIG. 5H illustrates a transition of user interface 500 from user interface 500 in FIG. 5G. In particular, FIG. 5H illustrates movement of user input 514 away from the left edge and toward the right edge of device 100. In response to user input 514, the audio balance setting indicated by balance slider 506 is changed (e.g., from an audio balance setting corresponding to balance slider position 507-b, FIG. 5G) to an audio balance setting corresponding to balance slider position 507-c. As shown in FIG. 5H, balance slider position 507-c is near an edge (e.g., the right edge) of balance slider 506. In some embodiments, balance slider position 507-c indicates an audio balance setting having close to a maximum allocation of audio output to the "R" speaker and close to a minimum allocation of audio output to the "L" speaker. In response to user input 514, device 100 generates left-side tactile output 516-a (e.g., using one or more tactile output generator(s) 167, FIG. 1A, that are located in a left region of device 100) and right-side tactile output 516-b (e.g., using one or more tactile output generator(s) 167, FIG. 1A, that are located in a right region of device 100). In addition, in accordance with balance slider position 507-c indicating an audio balance setting having close to a maximum allocation of audio output to the "R" speaker, right-side tactile output 516-b is generated as a strong tactile output (e.g., MicroTap Medium (150 Hz) with a gain of 0.7). In accordance with balance slider position 507-c indicating an audio balance setting having close to a minimum allocation of audio output to the "L" speaker, left-side tactile output 516-a is generated as a light tactile output (e.g., MicroTap Medium (150 Hz) with a gain of 0.1).

Figure 5I:
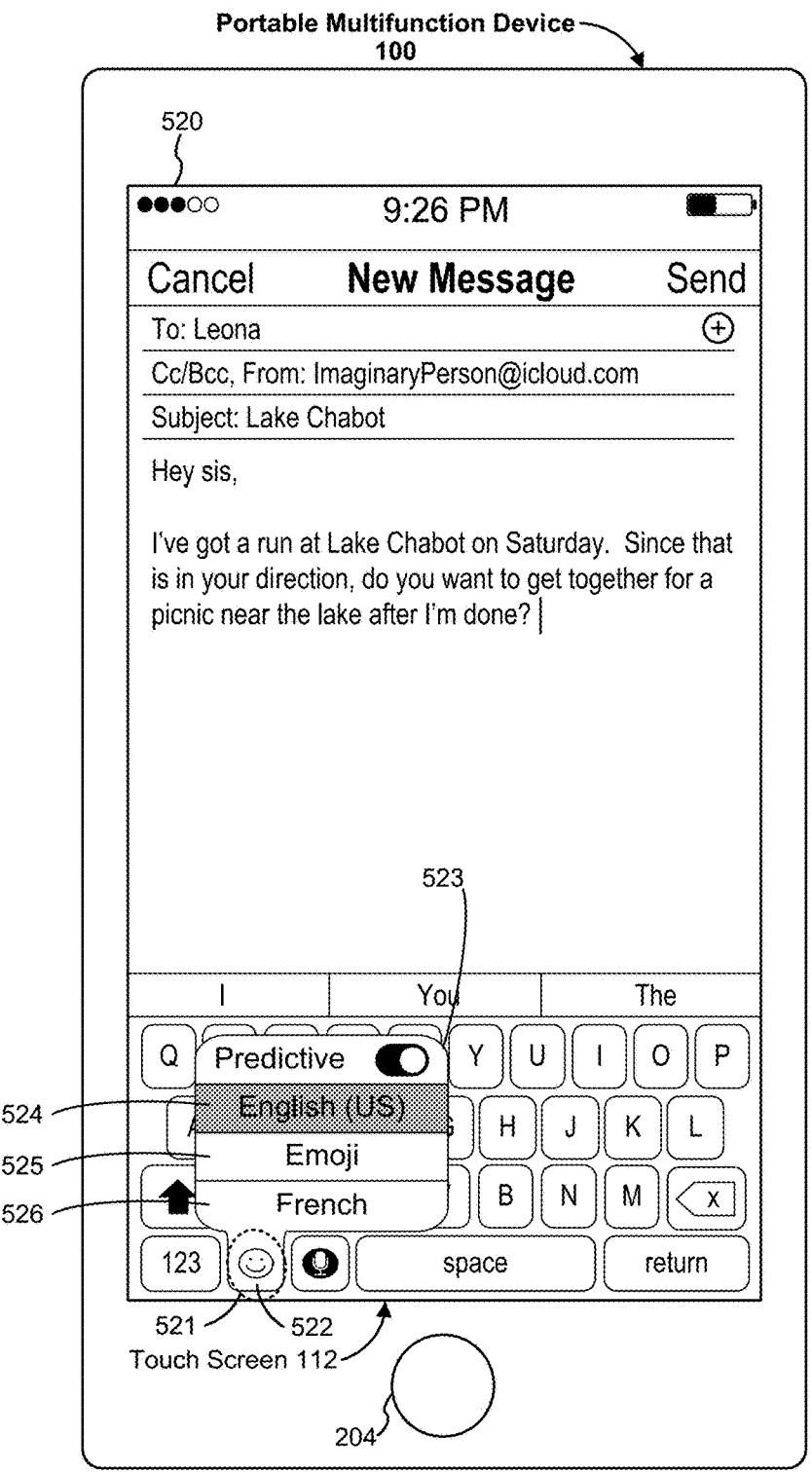
Figure 5J:
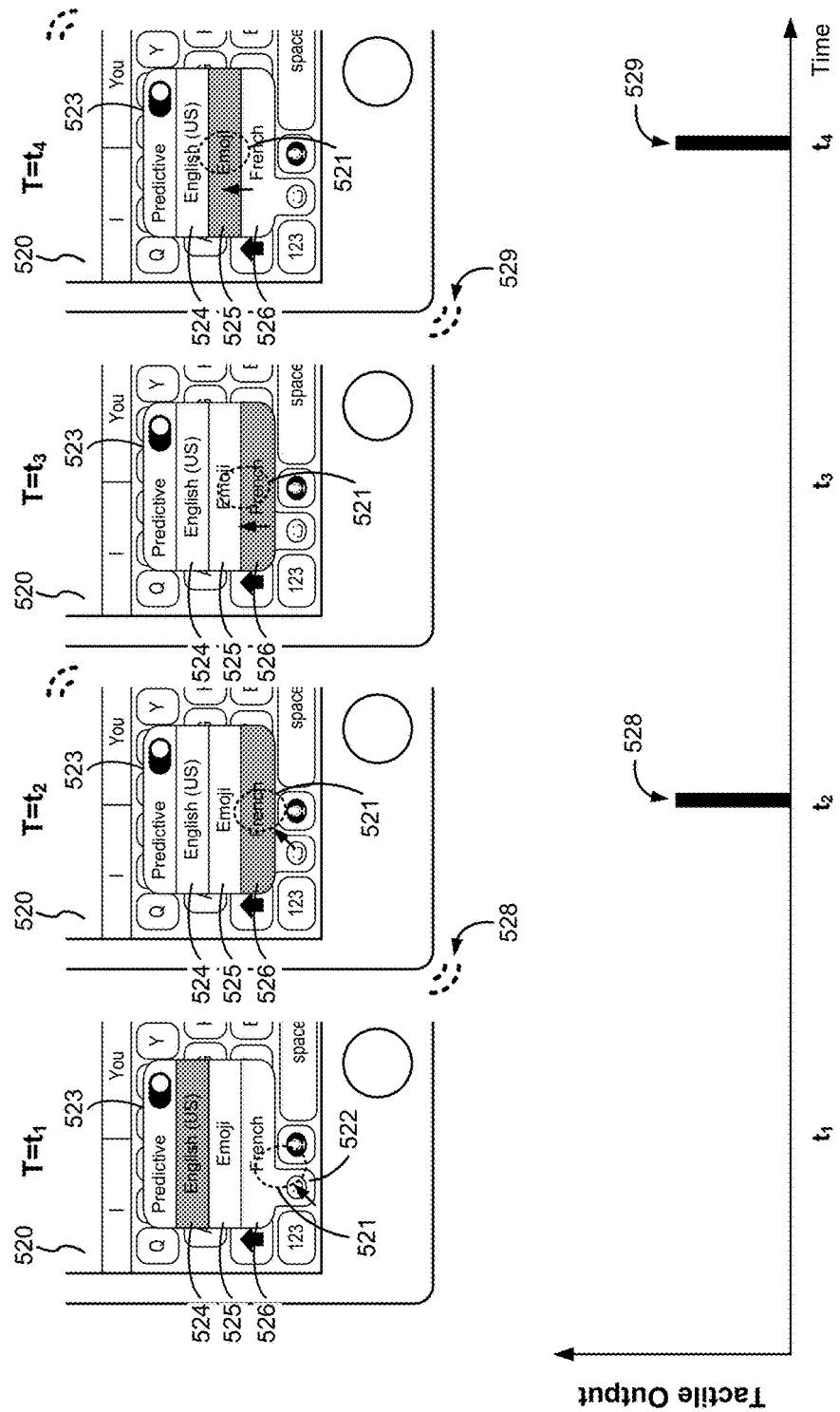

FIGS. 5I-5J illustrate an example user interface for generating tactile outputs when a user input moves across displayed menu items, in accordance with some embodiments. In particular, FIG. 5I illustrates user input 521 (e.g., a contact) detected at a location on touch screen 112 that corresponds to keyboard interface menu icon 522 in user interface 520. In response to detecting user input 521, keyboard interface menu 523 is displayed. Keyboard interface menu 523 includes a plurality of displayed menu item affordances representing keyboard interface options, including keyboard option affordance 524 (for selecting an English-language keyboard interface), keyboard option affordance 525 (for selecting an Emoji keyboard interface), and keyboard option affordance 526 (for selecting a French-language keyboard interface). Prior to movement of user interface 521, a current selection indication (e.g., shading) is displayed on keyboard option affordance 524 to indicate that the keyboard interface corresponding to keyboard option affordance 524 (e.g., an English-language keyboard interface) is the currently displayed keyboard interface.

FIG. 5J illustrates a series of transitions of user interface 520 over time from 520 in FIG. 5I. FIG. 5J illustrates movement of user input 521 (e.g., user input 521 is a continuous input gesture from an initial contact at a position corresponding to keyboard option menu icon 522, as illustrated in FIG. 5I) across the displayed menu item affordances of keyboard option menu 523. At $T=t_1$, user input 521 has moved toward keyboard option affordance 526 but has not reached a position that corresponds to (e.g., activates selection of) keyboard option affordance 526. Accordingly, the current selection indication continues to be displayed on keyboard option affordance 526.

At $T=t_2$, user input 521 has moved to a position that activates selection of keyboard option affordance 526. In accordance with user input 521 activating selection of keyboard option affordance 526, tactile output 528 is generated (e.g., MicroTap High (270 Hz), gain: 0.4). In addition, a current selection indication (e.g., shading) is displayed on keyboard option affordance 526 to indicate that keyboard option affordance 526 is the currently selected keyboard option affordance. Accordingly, the current selection indication is no longer displayed on keyboard option affordance 524. In some embodiments, upon ceasing to detect user input 521 while the current selection indication is displayed on keyboard option affordance 526, the keyboard interface corresponding to keyboard option affordance 526 becomes the currently displayed keyboard interface.

At $T=t_3$, user input 521 has moved toward keyboard option 525 but has not reached a position that corresponds to (e.g., activates selection of) keyboard option affordance 525. Accordingly, the current selection indication continues to be displayed on keyboard option affordance 526.

At $T=t_4$, user input 521 has moved to a position that activates selection of keyboard option affordance 525. In accordance with user input 521 activating selection of keyboard option affordance 525, tactile output 529 is generated. In some embodiments, a tactile output is generated in accordance with a user input activating selection of a respective menu item affordance (e.g., one of keyboard option affordances 524, 525, 526) in a menu (e.g., keyboard interface menu 523). In some embodiments, a tactile output is generated in accordance with a user input activating selection of a respective menu item affordance that is distinct from a previously selected menu item. In some embodiments, tactile outputs generated in accordance with a user input activating selection of respective menu item affordances in keyboard interface menu 523 are of a same type. For example, tactile output 529, generated at T=$t_4$ in accordance with user input 521 activating selection of keyboard option affordance 525, is a same type of tactile output (e.g., MicroTap High (270 Hz), gain: 0.4) as tactile output 528, generated at T=$t_3$ in accordance with user input 521 activating selection of keyboard option affordance 526.

FIGS. 5K-5O illustrate an example user interface for generating tactile outputs when a moveable component rotates in accordance with one or more scroll inputs, in accordance with some embodiments. In the example shown in FIGS. 5K-5O, user interface 530 displayed on touch screen 112 includes a user interface for a time picker (e.g., generated by using a UIDatePicker class described in Appendix B). User interface 530 includes moveable component 531 that further includes moveable elements, e.g., hour wheel 532 for selecting an hour value from 0-23 hours and minute wheel 533 for selecting a minute value from 0-59 min. In some embodiments, user interface 530 is a date picker (e.g., including a movable component for selecting a year, a month, and a date value from a plurality of year, month, and date values, respectively). In some embodiments, tactile outputs are generated when moveable component 531, or a moveable element of moveable component 531, such as hour wheel 532 or minute wheel 533, moves through respective markers (e.g., a position marked by a stationary indicator, such as "hours" for hour wheel 532, or "min" for minute wheel 533).

Figure 5K:
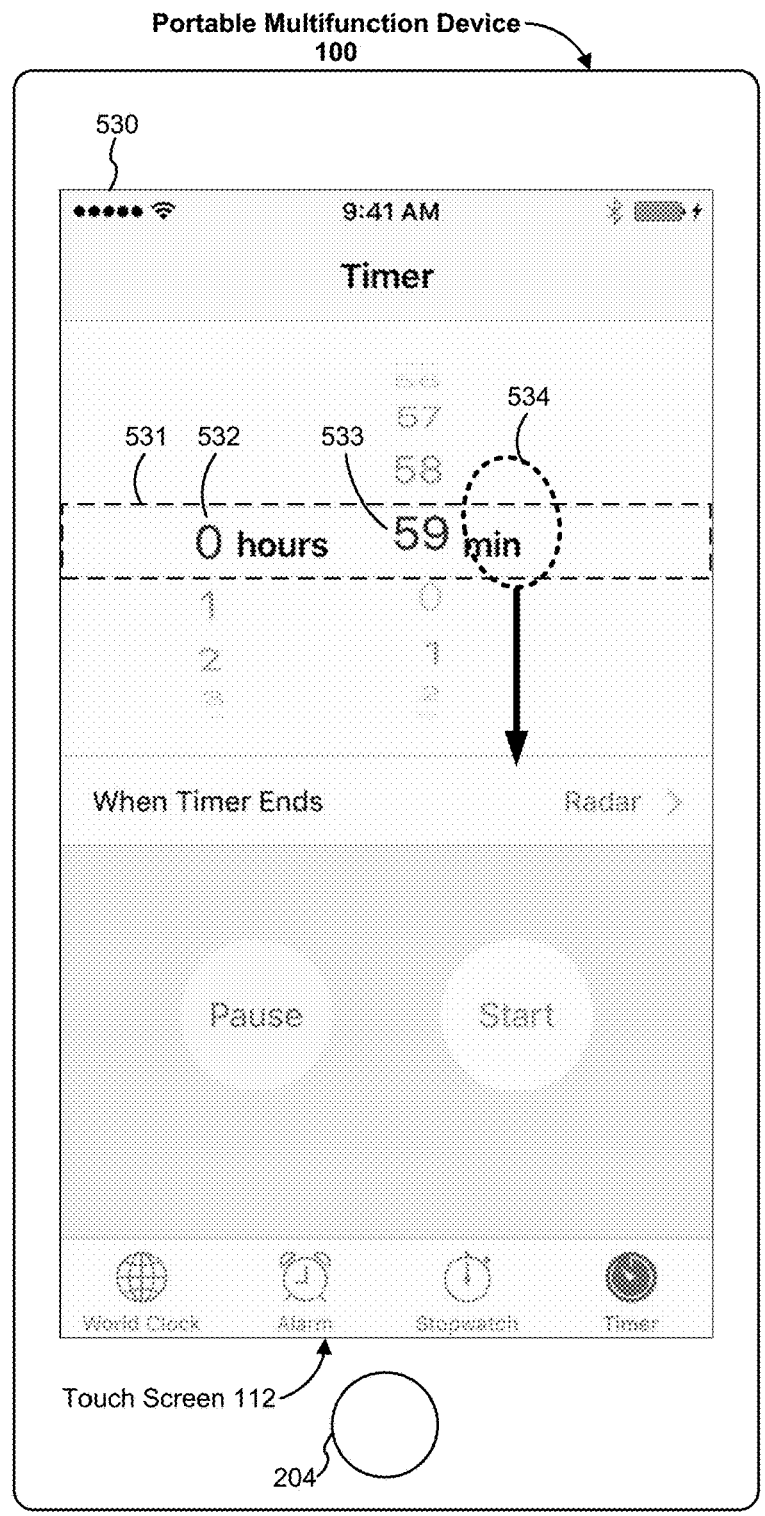

FIGS. 5K-5O illustrate moving minute wheel 533 and tactile outputs generated in connection with moving minute wheel 533. FIG. 5K illustrates that minute wheel 533 of moveable component 531 initially displays a selected minute value of "59 min." In addition, FIG. 5K illustrates user input 534 (e.g., a scroll input) detected by device 100 at a location on touch screen 112 corresponding to minute wheel 533. In some embodiments, user input 532 includes downward movement of a contact from an initial position corresponding to minute wheel 533 and subsequent liftoff of the contact.

FIGS. 5L-5O illustrate that, in response to detecting user input 534, minute wheel 533 is moved through respective markers. In some embodiments, as illustrated in FIGS. 5L-5O, after device 100 ceases to detect user input 534 (e.g., detecting liftoff of the contact of user input 534), minute wheel 533 continues to move (e.g., rotate) in accordance with a moment of inertia, and the continued movement slows down gradually until minute wheel 533 stops.

Figure 5L:
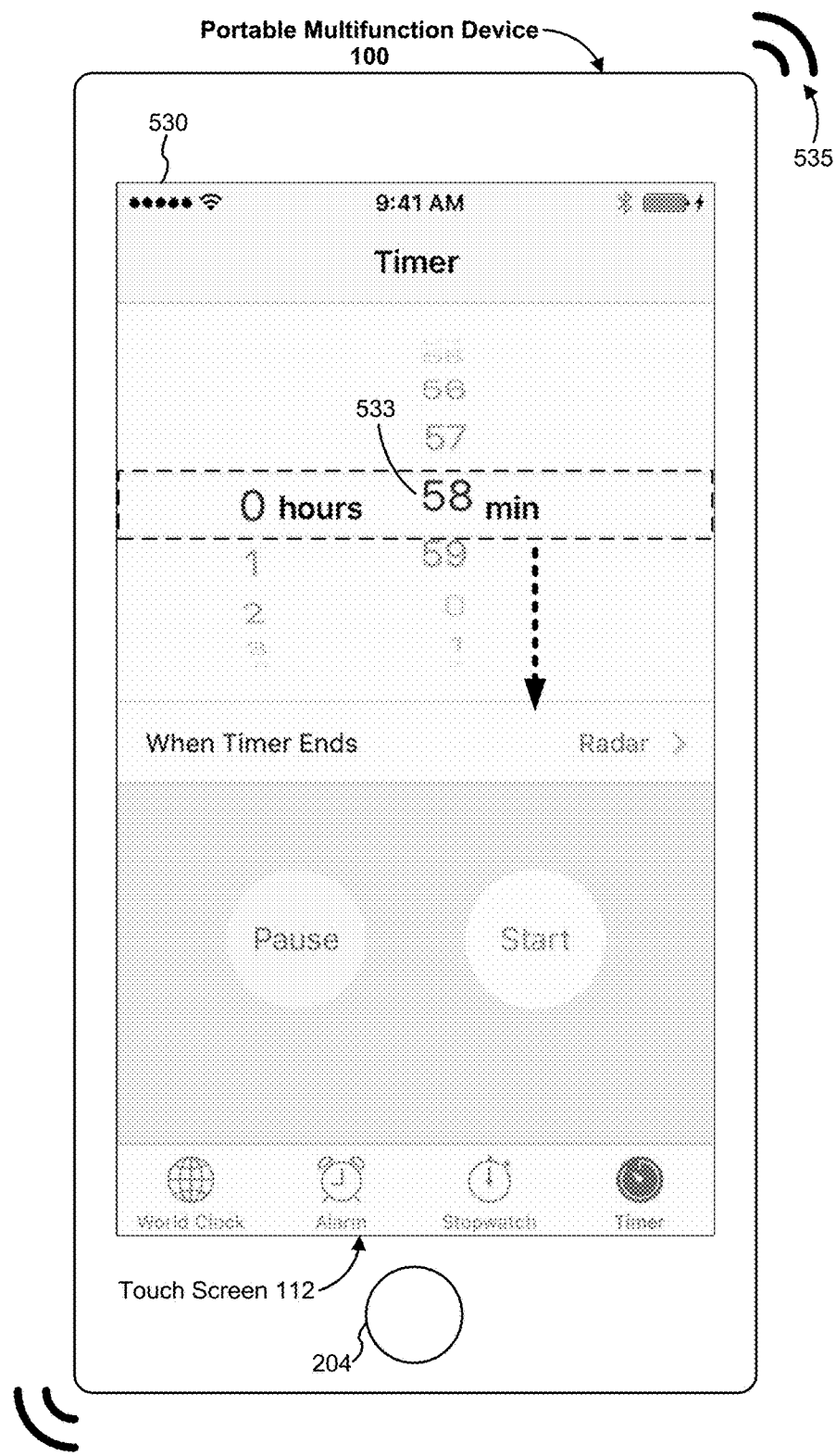

FIG. 5L illustrates that in response to user input 534, minute wheel 533 has moved to a minute value "58 min." In accordance with minute wheel 533 moving to minute value "58 min," device 100 generates tactile output 535 (e.g., MicroTap High (270 Hz) with a gain of 0.4 and minimum interval 0.05 seconds). In some embodiments, device 100 also generates an audio output (e.g., an audio output that accompanies the tactile output).

Figure 5M:
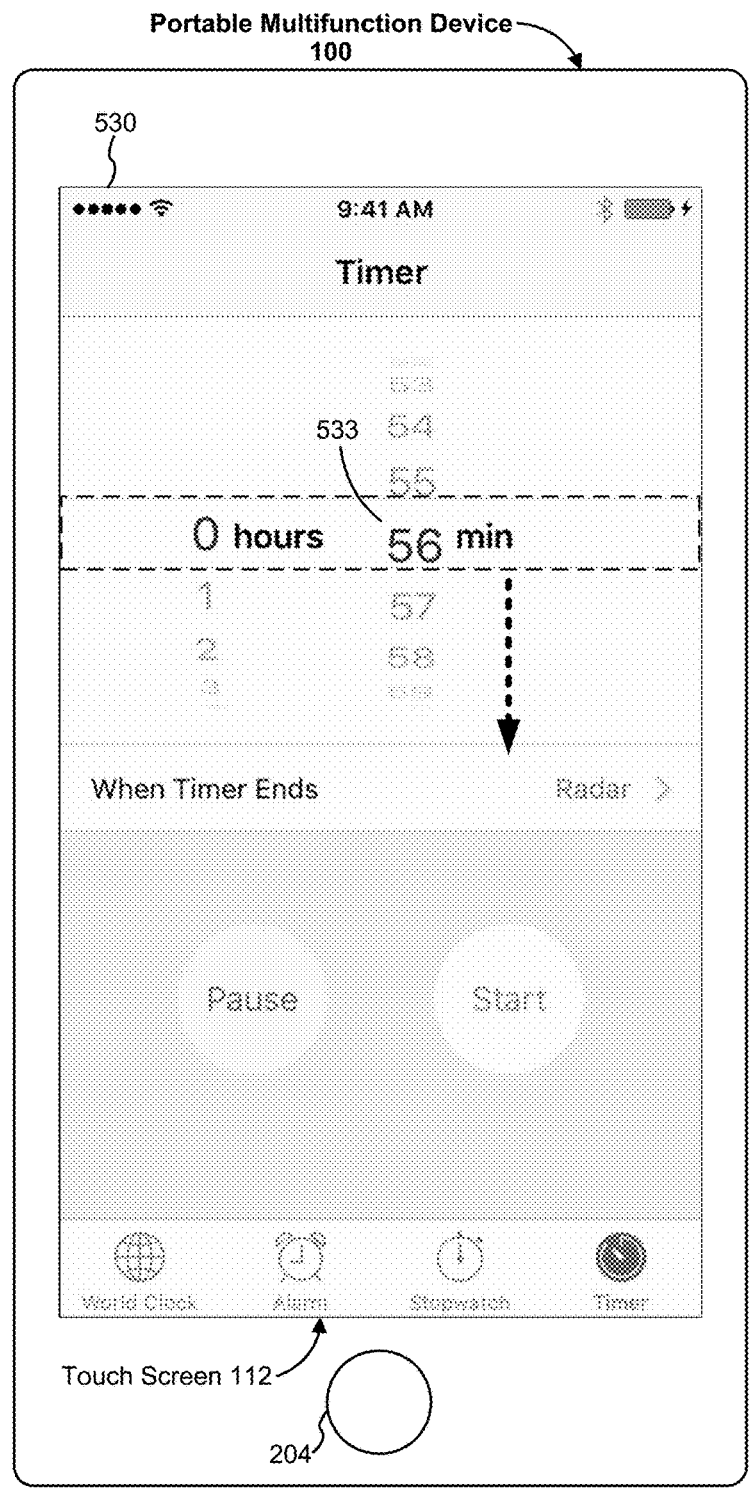

FIG. 5M illustrates that minute wheel 533 has moved to a minute value "56 min" (e.g., after moving through a minute value "57 min"). In some embodiments, generation of a tactile output corresponding to minute wheel 533 moving to a respective marker is forgone when minute wheel 533 moves fast in response to a user input (e.g., in response to a flick gesture). For example, a time interval is determined from a point in time corresponding to a most recently generated tactile output and a point in time corresponding to the anticipated tactile output corresponding to minute wheel 533 moving to the respective marker. In some embodiments, in accordance with a determination that the time interval is less than a threshold value (e.g., 0.05 seconds), generation of the tactile output corresponding to minute wheel 533 moving to the respective marker is forgone. For example, as illustrated in FIG. 5M, no tactile output is generated when minute wheel 533 moves to "56 min" because the time interval between a time corresponding to generation of a most recently generated tactile output (e.g., tactile output 535 corresponding to minute wheel 533 passing "58 min," FIG. 5L) and a time corresponding to anticipated generation of a tactile output corresponding to minute wheel 533 passing "56 min" is less than a threshold value. In other words, a tactile output is skipped when a tactile output rate limit is reached, e.g., the determined time interval is less than a minimum interval threshold (e.g., 0.05 seconds).

Figure 5N:
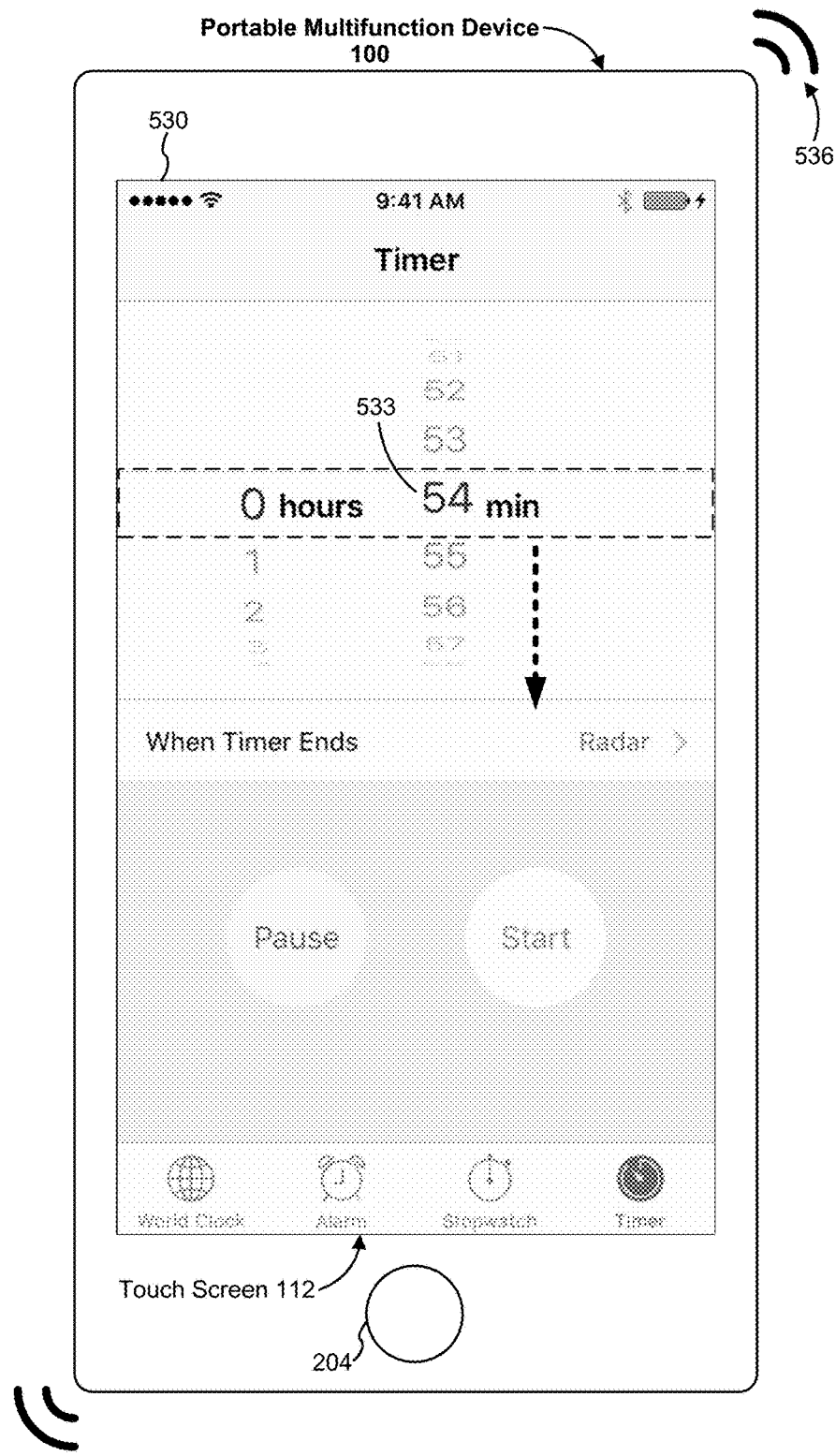

FIG. 5N illustrates that minute wheel 533 has moved to a minute value "54 min" (e.g., after moving through a minute value "55 min"). As illustrated in FIG. 5N, device 100 generates tactile output 536 (e.g., MicroTap High (270 Hz) with a gain of 0.4 and minimum interval 0.05 seconds) in conjunction with minute wheel 533 moving to minute value "54 min." In some embodiments, a time interval is determined between a time corresponding to the most recently generated tactile output (e.g., tactile output 535 corresponding to minute wheel 533 passing "58 min," FIG. 5L) and a time corresponding to tactile output 536. In some embodiments, tactile output 536 is generated in accordance with the determined time interval being at least (e.g., greater than or equal to) the threshold value.

Figure 5O:
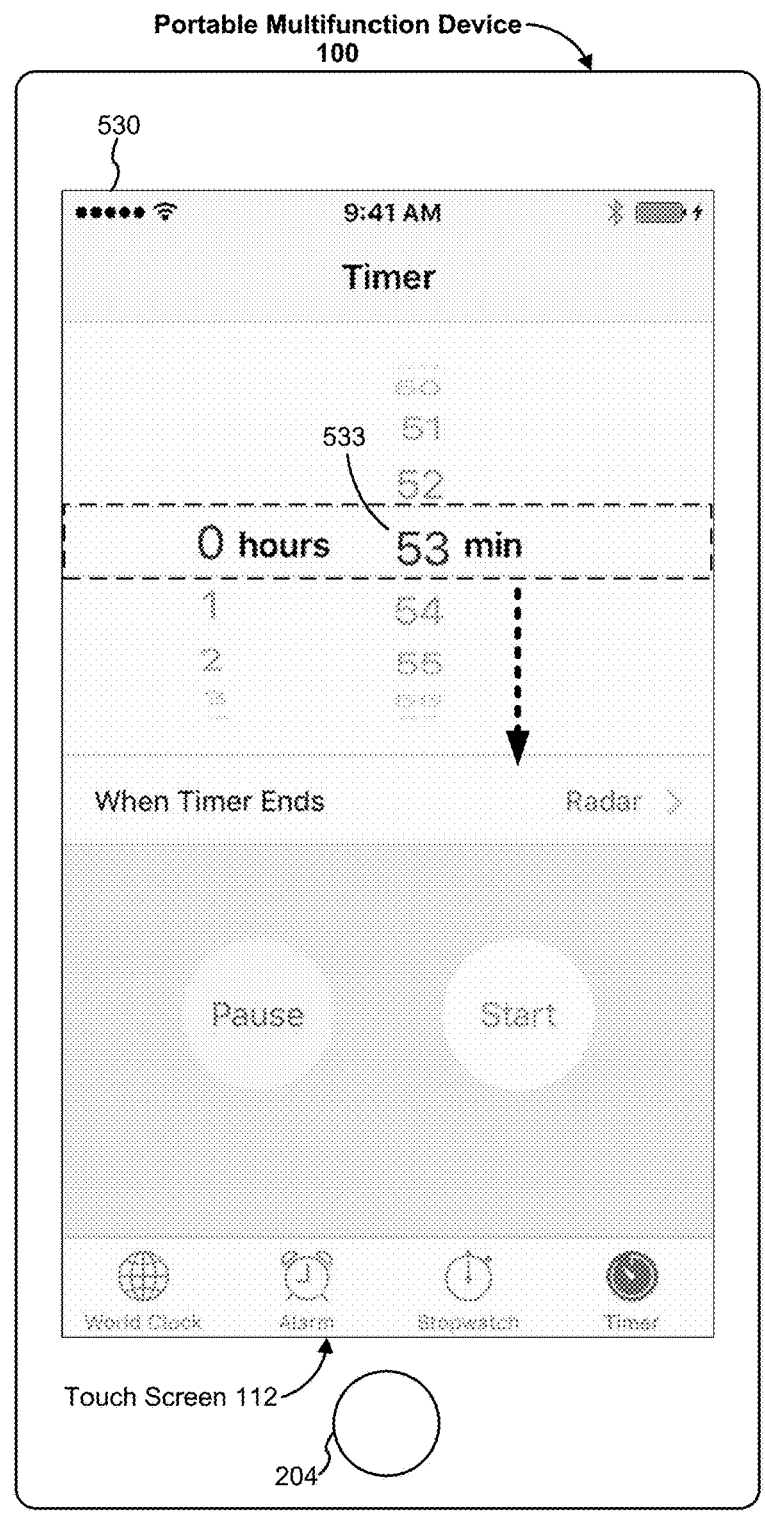

FIG. 5O illustrates that minute wheel 533 has moved to a minute value "53 min" (e.g., from minute value "54 min," FIG. 5N). As illustrated in FIG. 5O, no tactile output is generated when minute wheel 533 moves to "53 min" because a time interval between a time corresponding to generation of a most recently generated tactile output (e.g., tactile output 536 corresponding to minute wheel 533 passing "54 min," FIG. 5N) and a time corresponding to anticipated generation of a tactile output corresponding to minute wheel 533 passing "53 min" is less than the threshold value.

Figure 5P:
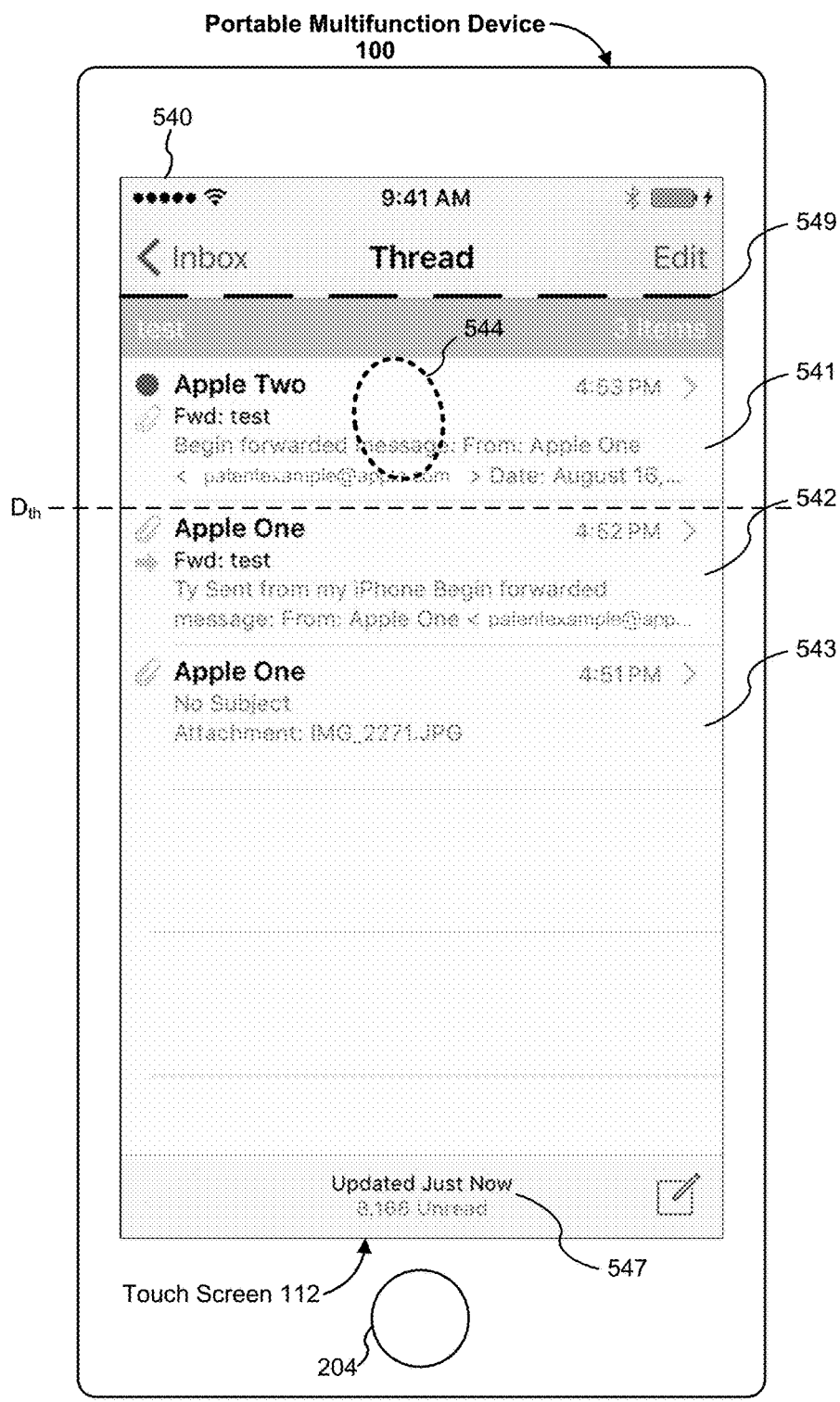

FIGS. 5P-5II illustrate example user interfaces for generating tactile outputs to indicate thresholds associated with user interface elements.

FIGS. 5P-5W illustrate an example user interface for generating a tactile outputs to indicate a threshold associated with a list of e-mail summary items in an e-mail application (e.g., e-mail client module 140, FIGS. 1A and 3), such as a threshold for refreshing content displayed in the e-mail application. In some embodiments, the example user interface is generated using a UIRefreshControl class described in Appendix B. In the example shown in FIGS. 5P-5W, user interface 540 includes a list of e-mail summary items that includes e-mail summary items 541, 542, and 543. A dashed line (which is typically not displayed to a user) represents edge 549 (e.g., a top edge) of the list of e-mail summary items. A current status of the list of e-mail summary items (e.g., "Updated Just Now") is indicated by status indicator field 547. A second dashed line labeled $D_{th}$ indicates a movement threshold for refreshing content displayed in the list of e-mail summary items of user interface 540.

In FIG. 5P, device 100 detects user input 544 (e.g., a contact) at a location on touch screen 112 that corresponds to the list of e-mail summary items (e.g., corresponding to e-mail summary item 541).

Figure 5Q:
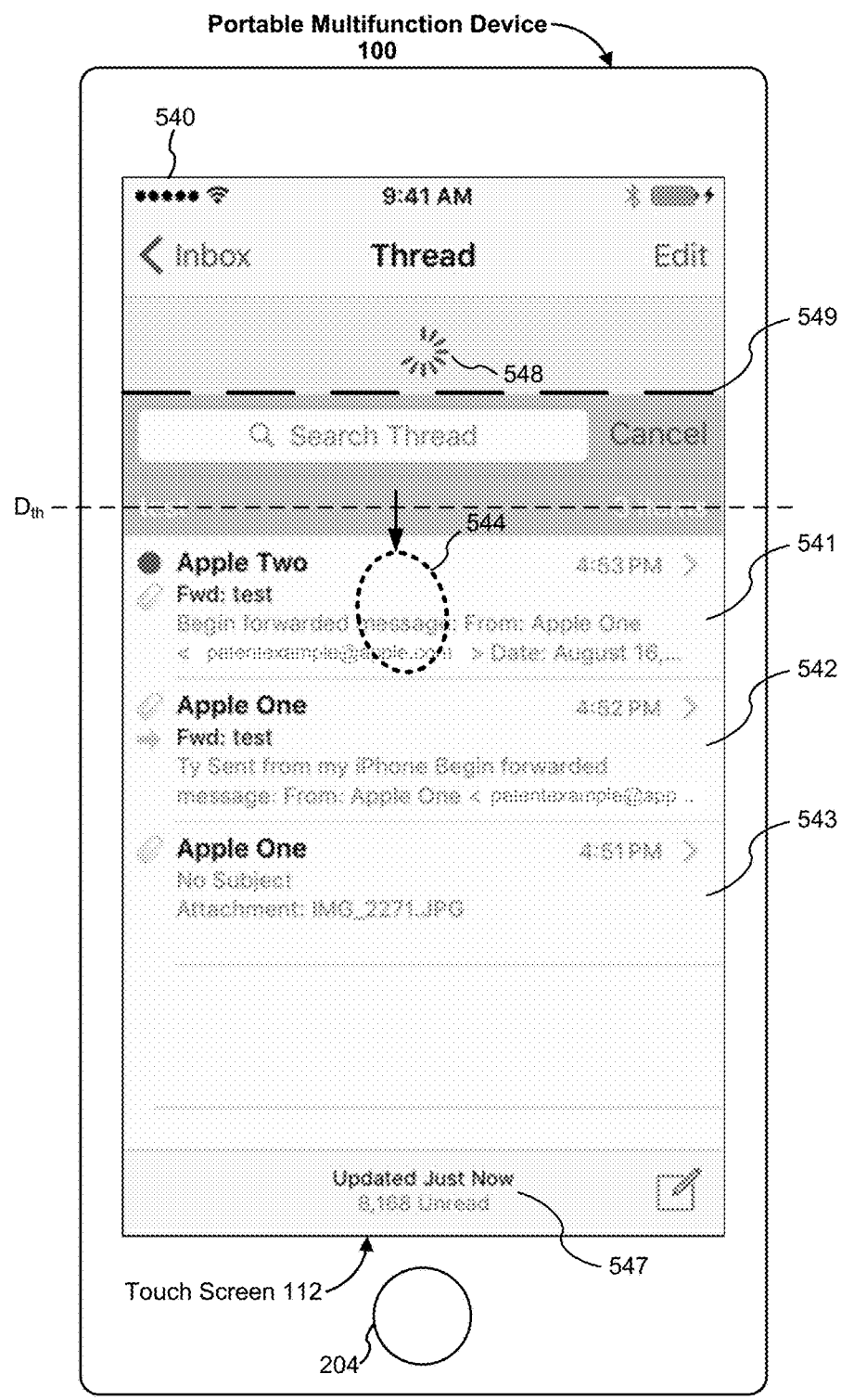

FIG. 5Q illustrates a transition of user interface 540 from user interface 540 in FIG. 5P. In particular, FIG. 5Q illustrates downward movement of user input 544 (e.g., user input is a drag gesture that includes an initial contact on touch screen 112 as illustrated in FIG. 5P followed by downward movement of the contact.) In response to the downward movement of user input 544, the list of e-mail summary items moves downward (e.g., e-mail summary items 541, 542, and 543 move downward in user interface 540), and, accordingly, edge 549 of the list of e-mail summary items moves downward. In some embodiments, in response to user input 544, a progress indicator 548 is displayed in a region above the list of e-mail summary items revealed by the downward movement of the list of e-mail summary items. Progress indicator 548 indicates, for example, whether the movement of user input 544 meets refresh criteria for refreshing the list of e-mail summary items and/or whether a refresh process to download and present newly received e-mails is ongoing. As shown in FIG. 5Q, prior to user input 544 crossing movement threshold $D_{th}$, progress indicator 548 is displayed with less than a full ring of progress indicator spokes.

Figure 5R:
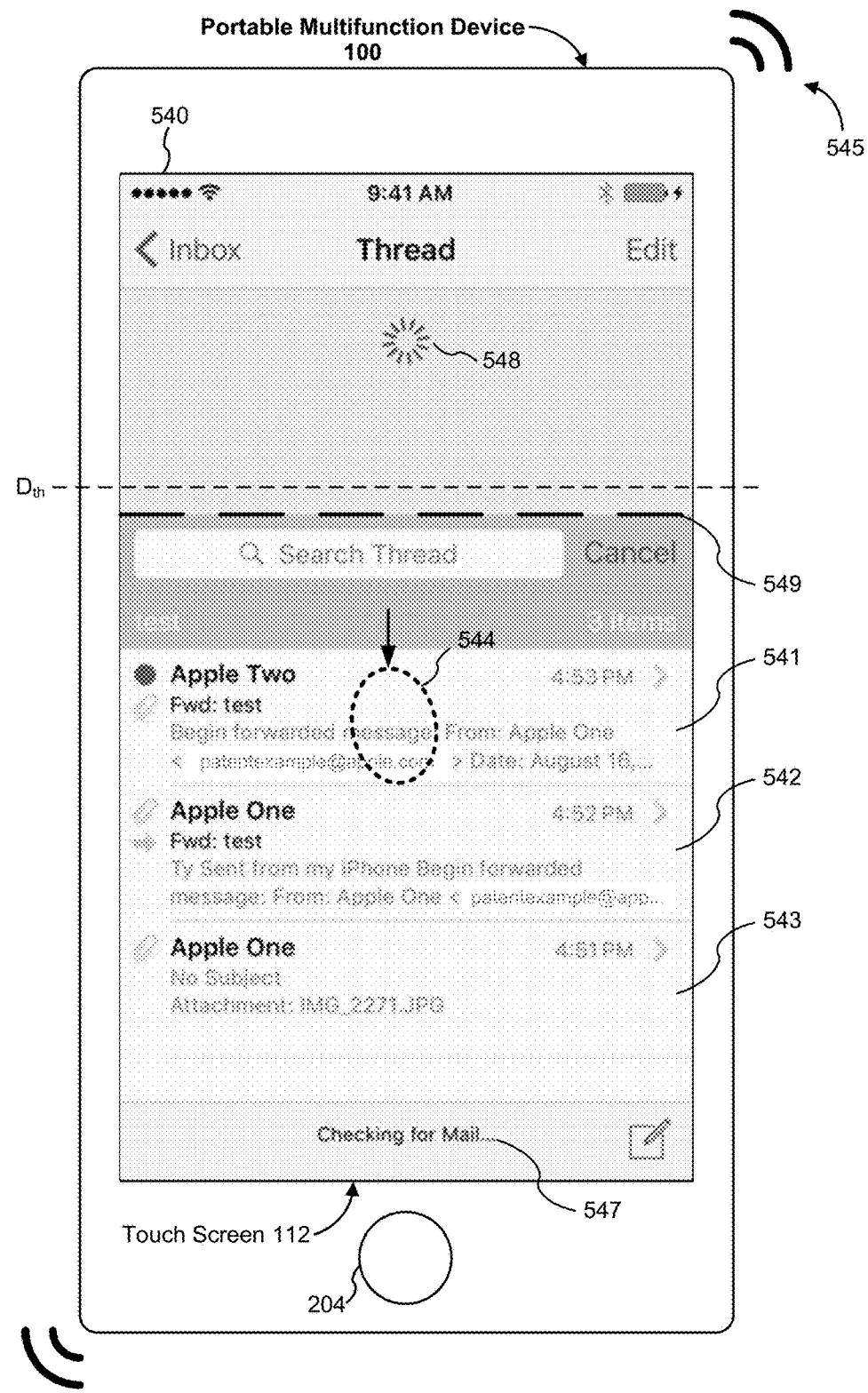

FIG. 5R illustrates a transition of user interface 540 from user interface 540 in FIG. 5Q. In particular, FIG. 5R illustrates further downward movement of user input 544 from its position as shown in FIG. 5Q (e.g., a continuation of the drag gesture shown in FIG. 5Q). In response to the downward movement of user input 544, the list of e-mail summary items moves further downward from its position as shown in FIG. 5Q (e.g., e-mail summary items 541, 542, and 543 move further downward in user interface 540). As shown in FIG. 5R, in response to user input 544, edge 549 of the list of e-mail summary items has crossed movement threshold $D_{th}$. Accordingly, in some embodiments, progress indicator 548 is displayed with a full ring of progress indicator spokes. In some embodiments, the status indicated in status indicator field 547 is updated to indicate that a content refresh process is initiated (e.g., "Checking for Mail . . . "), such as a content refresh process to check for e-mail received since a last time that content was refreshed. In addition, device 100 generates tactile output 545. In some embodiments, device 100 generates tactile output 545 (e.g., MicroTap High (270 Hz), gain: 0.6) in response to edge 549 crossing movement threshold $D_{th}$. In some embodiments, in accordance with continued movement of user input 544, edge 549 is at a position beyond movement threshold $D_{th}$ when tactile output 545 is generated.

Figure 5S:
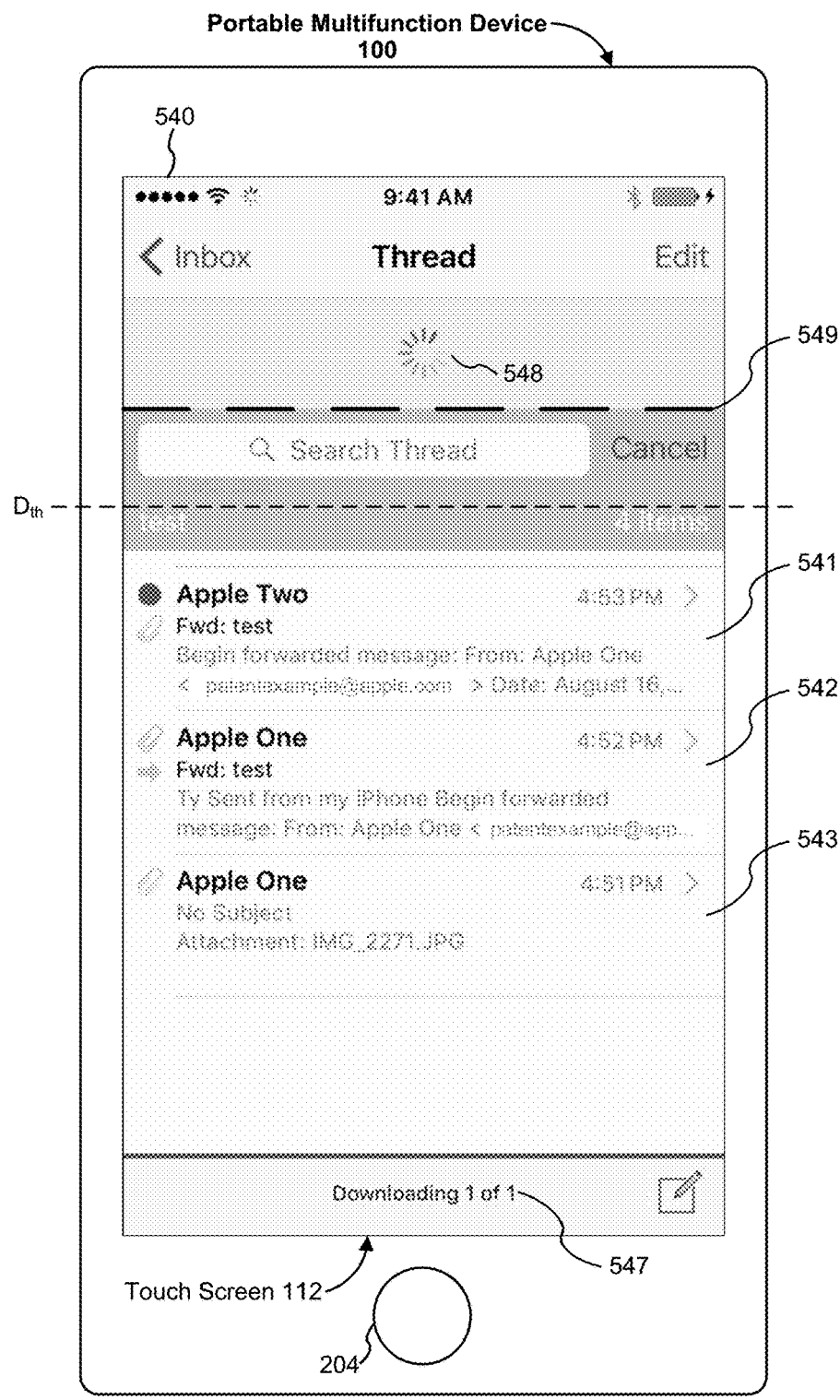
Figure 5T:
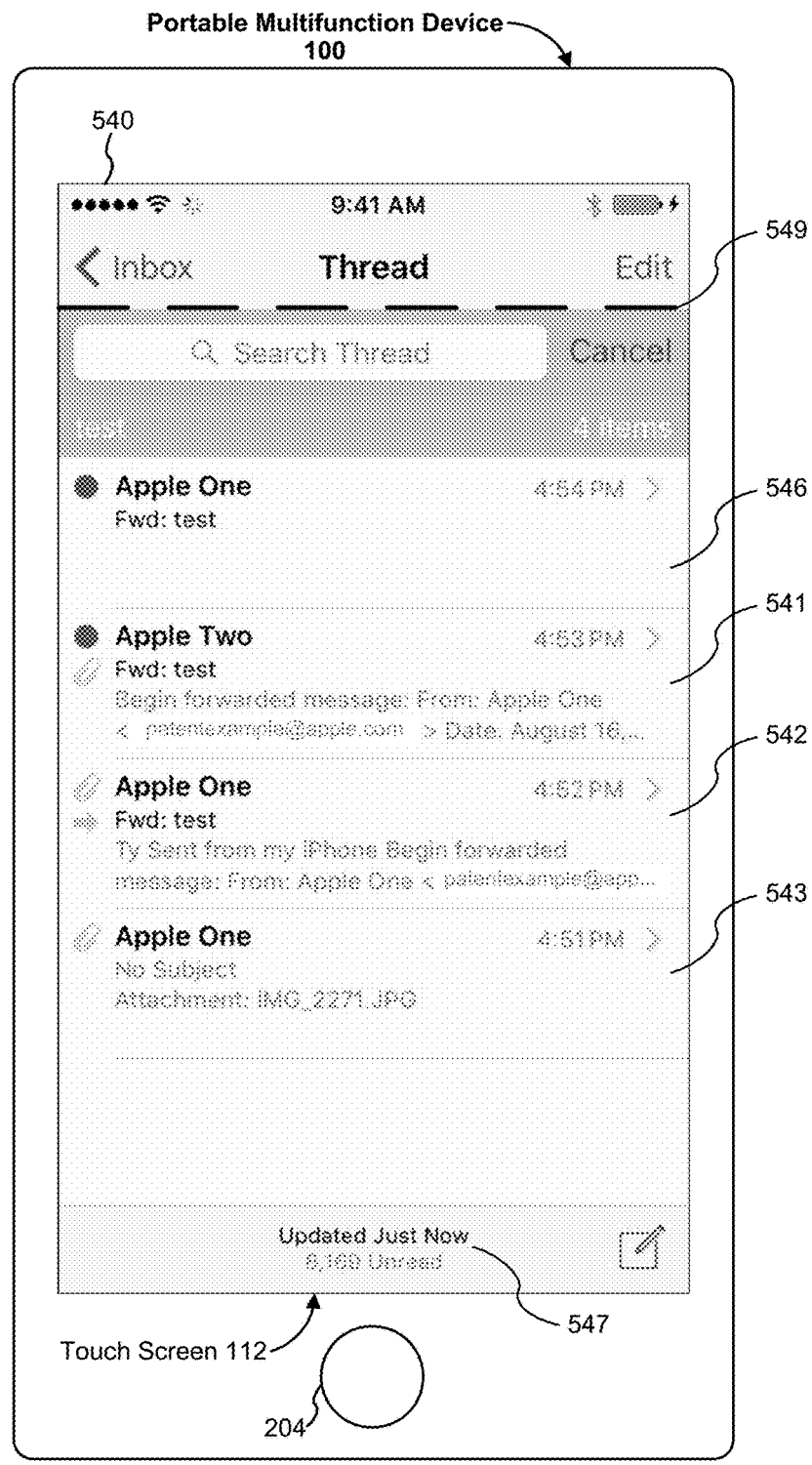

FIG. 5S illustrates a transition of user interface 540 from user interface 540 in FIG. 5R. In particular, FIG. 5S illustrates user interface 540 in response to ceasing to detect user input 544 (e.g., in response to liftoff of the contact by user input 544) from a position corresponding to edge 549 crossing movement threshold $D_{th}$ (e.g., as described above with reference to FIG. 5R). In response to ceasing to detect user input 544, the list of e-mail summary items is released and gradually returns to its initial position (e.g., moves upward), as illustrated in FIGS. 5S-5T. In addition, status indicator field 547 is updated to indicate that a new e-mail message is being downloaded (e.g., "Downloading 1 of 1"). In the example illustrated in FIG. 5S, progress indicator 548 is updated to indicate that a content refresh process is in progress.

FIG. 5T illustrates a transition of user interface 540 from user interface 540 in FIG. 5S. In particular, FIG. 5S illustrates that, after device 100 ceases to detect user input 544, the list of e-mail summary items has returned to its initial position as illustrated in FIG. 5P. In accordance with the content refresh process described above with reference to FIGS. 5R-5S, an e-mail summary item 546 that corresponds to a new downloaded e-mail message is shown in the list of e-mail summary items. In some embodiments, as illustrated in FIG. 5T, status indicator field 547 is updated to indicate that the list of e-mail summary items has been updated (e.g., "Updated Just Now").

Figure 5U:
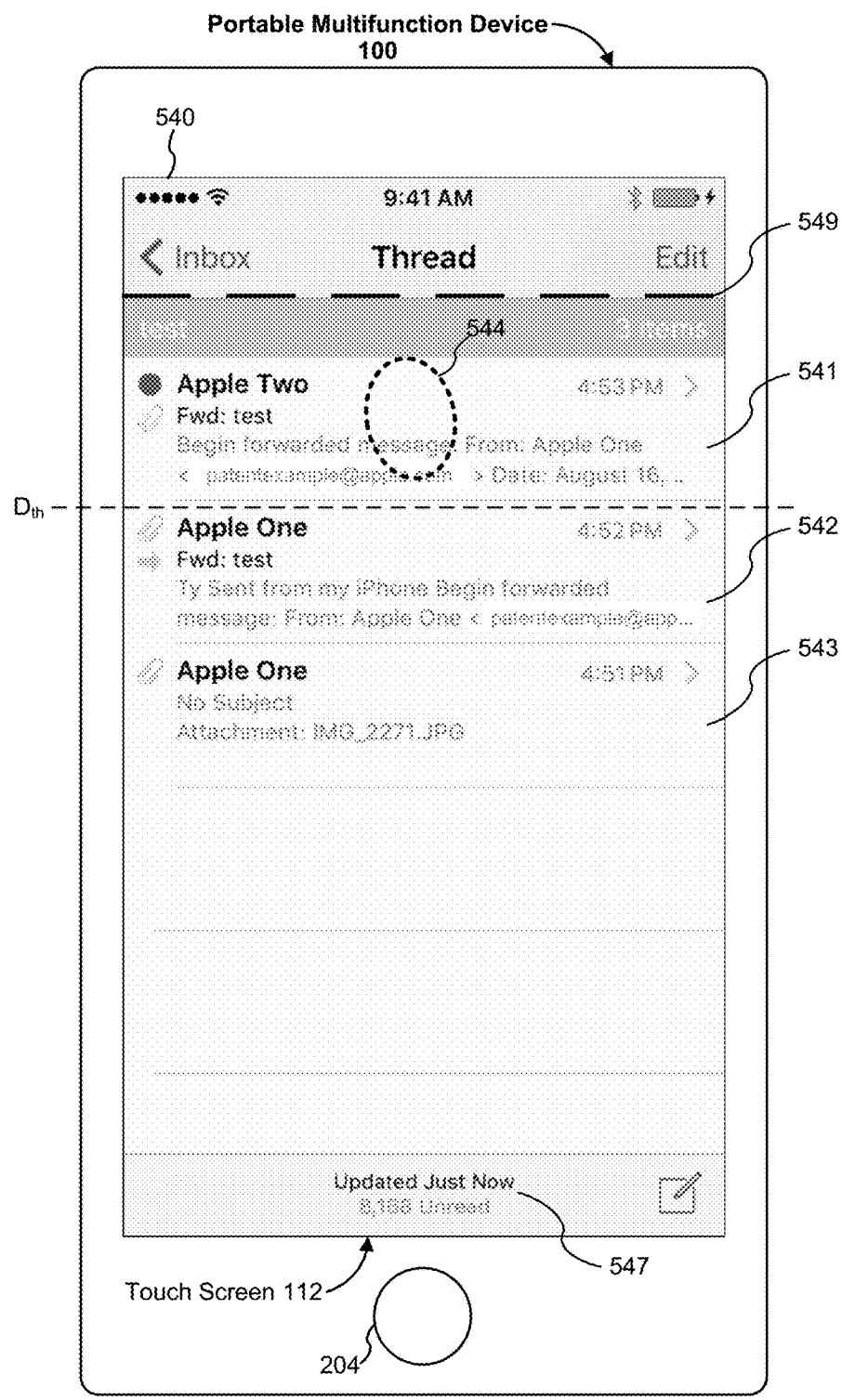
Figure 5V:
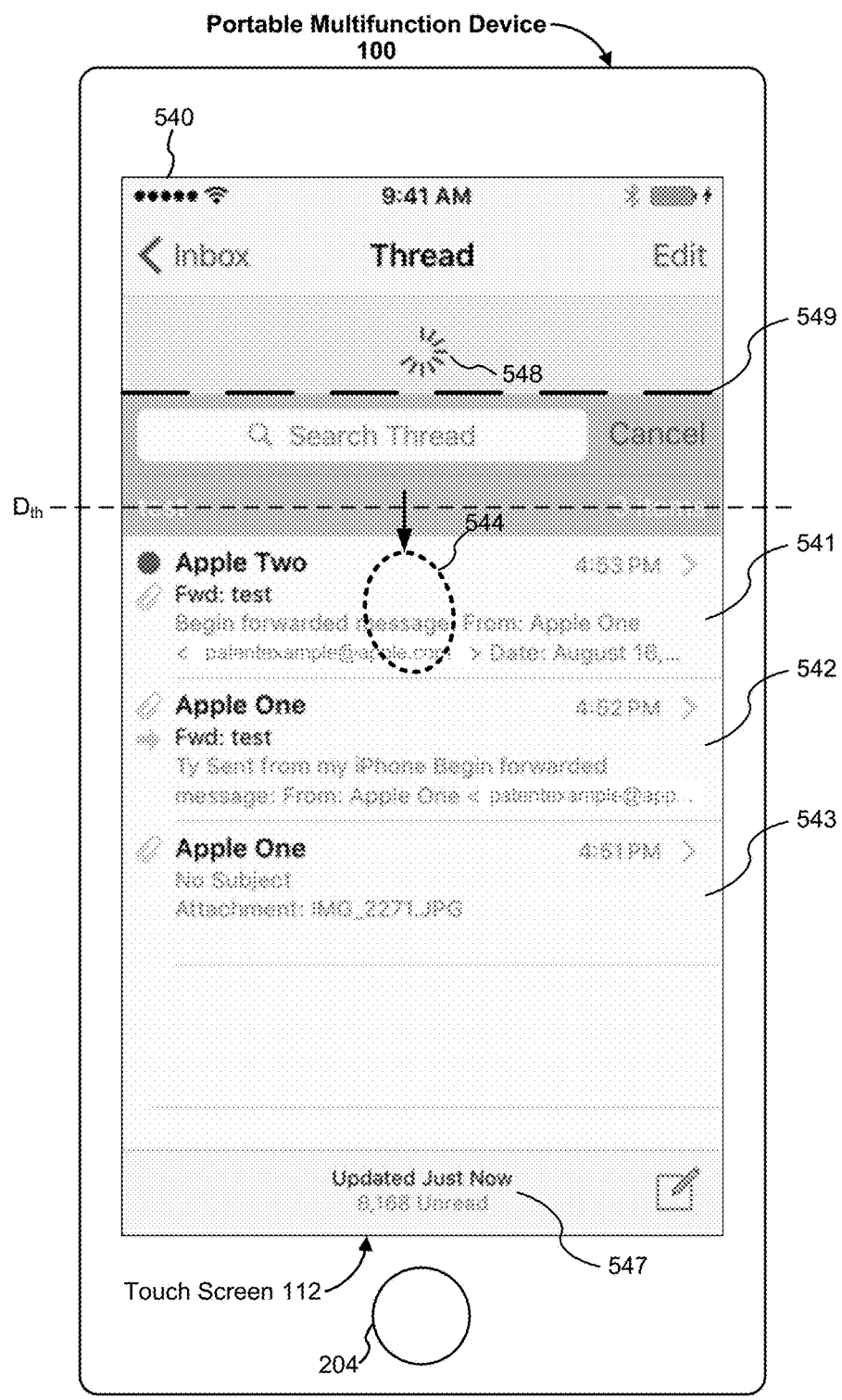
Figure 5W:
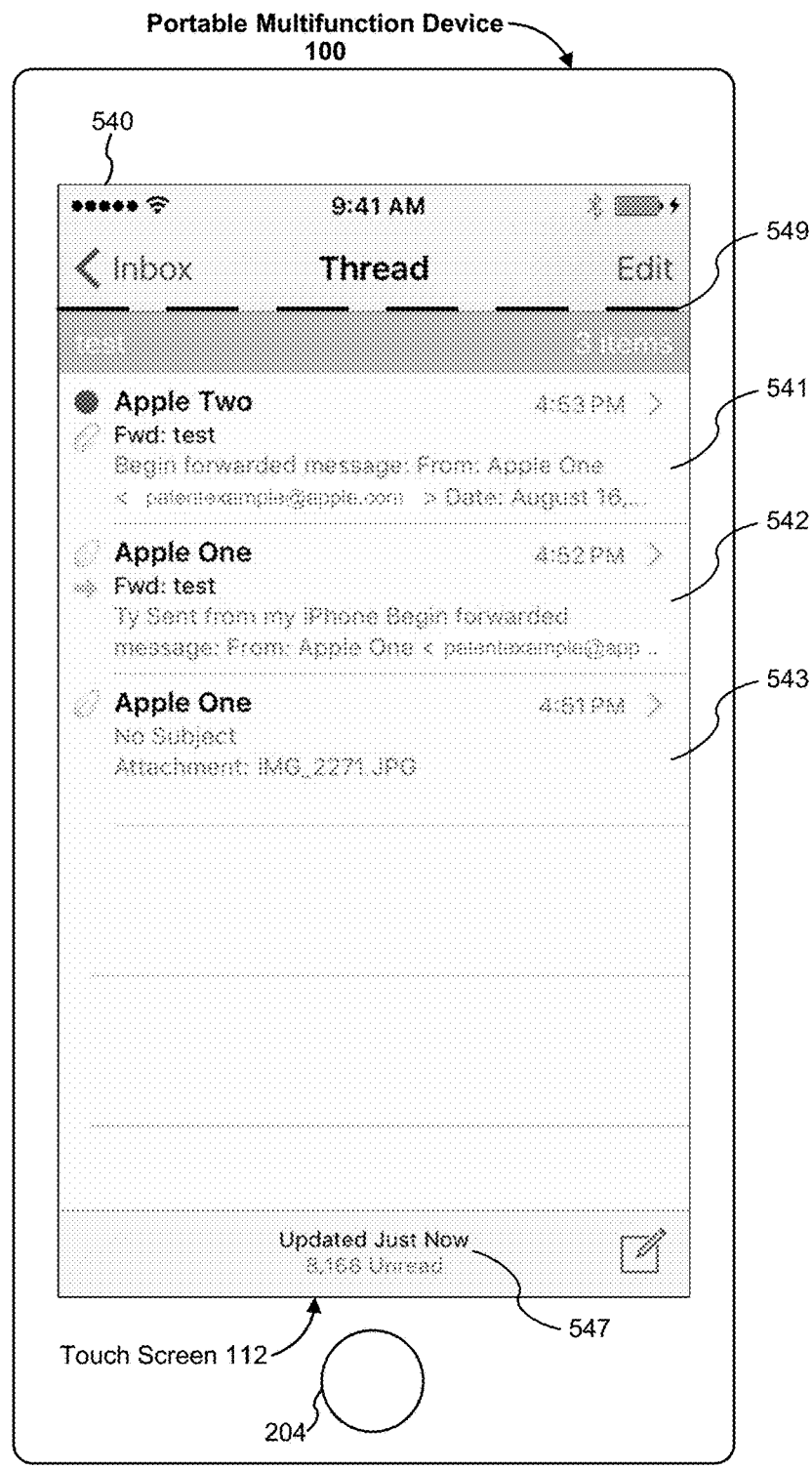

FIGS. 5U-5V are similar to FIGS. 5P-5Q, as described above. In particular, FIG. 5U illustrates user input 544 (e.g., an initial contact) detected at a location on touch screen 112 corresponding to the list of e-mail summary items (e.g., corresponding to e-mail summary item 541) in user interface 540, and FIG. 5V illustrates a transition of user interface 540 in response to downward movement of user input 544 (e.g., a drag gesture that includes the initial contact followed by downward movement of the contact), including downward movement of the list of e-mail summary items and edge 549. In some embodiments, if device 100 ceases to detect user input 544 (e.g., device 100 detects liftoff of the contact) before edge 549 has crossed movement threshold $D_{th}$, a tactile output is not generated in response to movement of edge 549. FIG. 5W illustrates an example of such a transition of user interface 540 from user interface 540 in FIG. 5V. FIG. 5W illustrates that, in response to ceasing to detect user input 544, user interface 540 returns to its initial position (e.g., moves upward), and a tactile output is not generated.

Figure 5X:
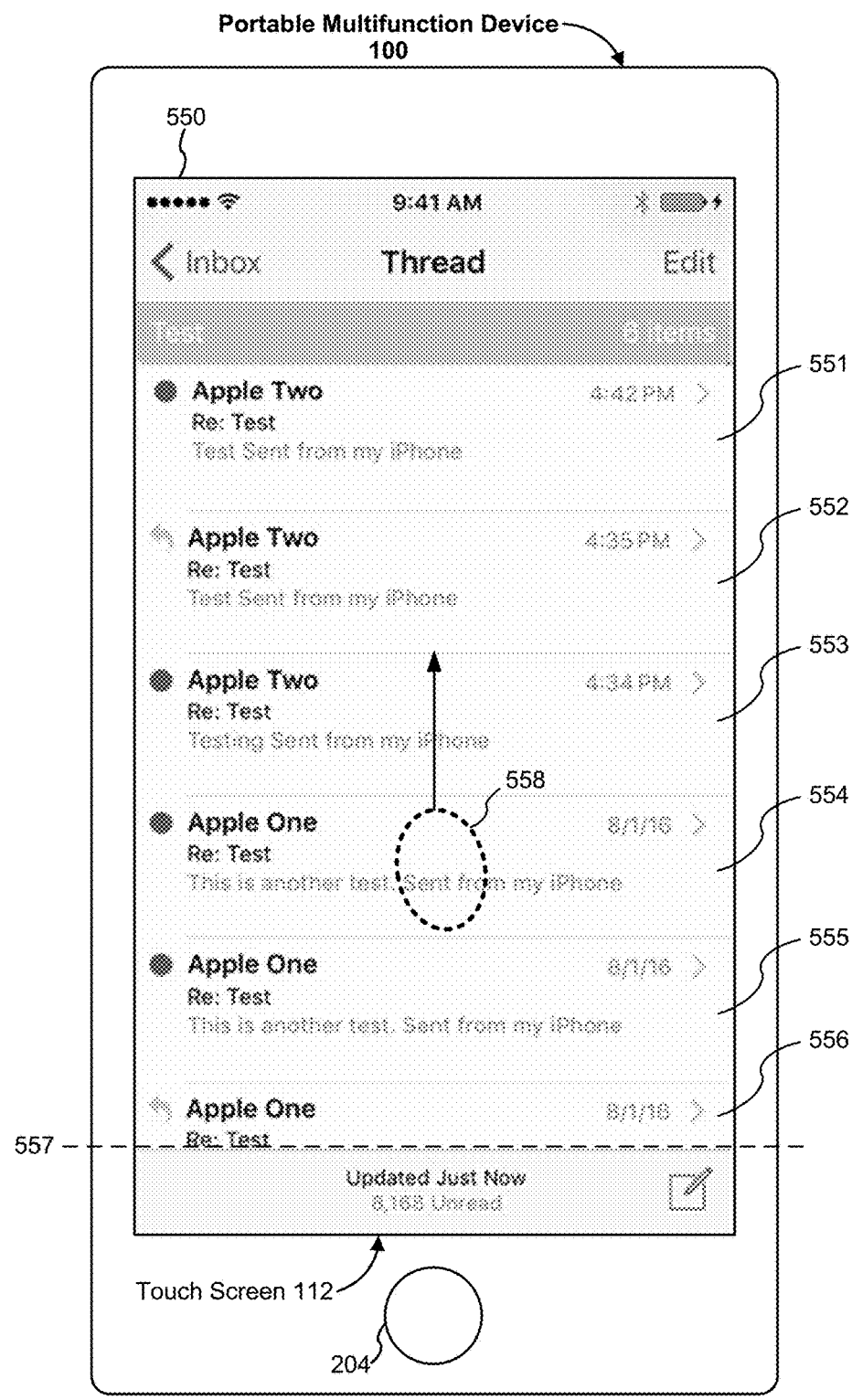
Figure 5Y:
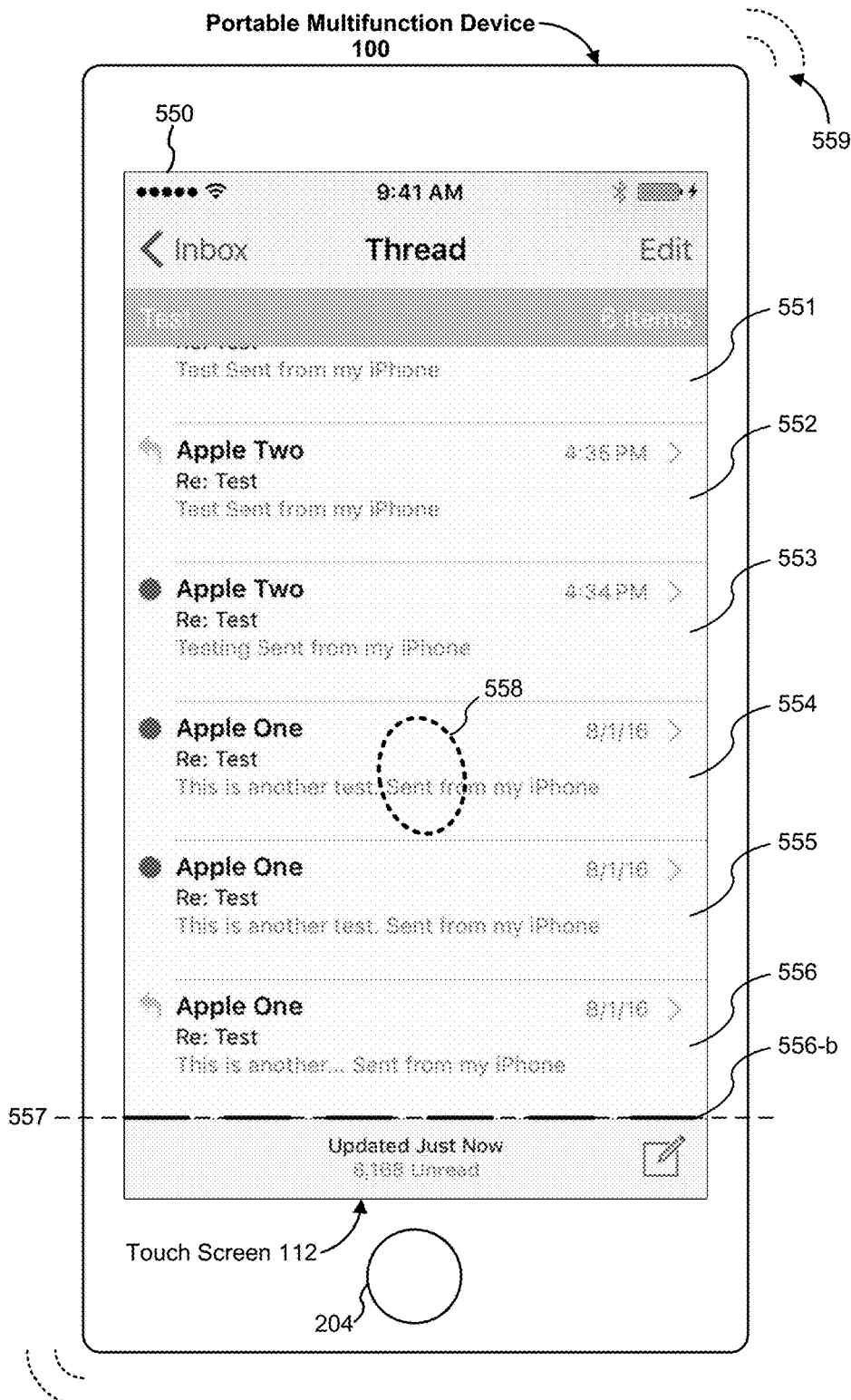

FIGS. 5X-5Y illustrate an example user interface for generating a tactile output to indicate a threshold associated with a list of e-mail summary items in an e-mail application (e.g., e-mail client module 140, FIGS. 1A and 3), such as a threshold at an edge of the list of e-mail summary items. In the example shown in FIGS. 5X-5Y, user interface 550 includes a list of e-mail summary items that includes e-mail summary items 551, 552, 553, 554, 555, and 556. A dashed line (which is typically not displayed to a user) represents a threshold 557, which indicates a bottom edge of a display region for the list of e-mail summary items. As illustrated in FIG. 5X, at least a portion of e-mail summary item 556 in the list of e-mail summary items is below threshold 557. Accordingly, the portion of e-mail summary item 556 that is below threshold 557 is not displayed. Additionally, FIG. 5X illustrates a user input 558 detected at a location on touch screen 112 that corresponds to the list of e-mail summary items. For example, as shown in FIG. 5X, user input 558 includes an initial contact that corresponds to e-mail summary item 554 of the list of e-mail summary items followed by upward movement of the contact.

FIG. 5Y illustrates that, in response to the upward movement of user input 558, the list of e-mail summary items moves upward (e.g., e-mail summary items 551, 552, 553, 554, and 556 move upward in user interface 550), such that e-mail summary item 556 is displayed entirely in the display region for the list of e-mail summary items. Accordingly, a portion of e-mail summary item 551 (e.g., the topmost e-mail summary item) moves past a top edge of the display region for the list of e-mail summary items. As shown in FIG. 5Y, the portion of e-mail summary item above the top edge of the display region is not displayed. In accordance with the upward movement of the list of e-mail summary items such that e-mail summary item 556 is displayed entirely, bottom edge 556-*b* of e-mail summary item 556, which is represented by a second, thicker dashed line, crosses threshold 557. In some embodiments, in accordance with bottom edge 556-*b* crossing threshold 557, device 100 generates tactile output 559 (e.g., MicroTap High (270 Hz), gain: 0.6).

Figure 5Z:
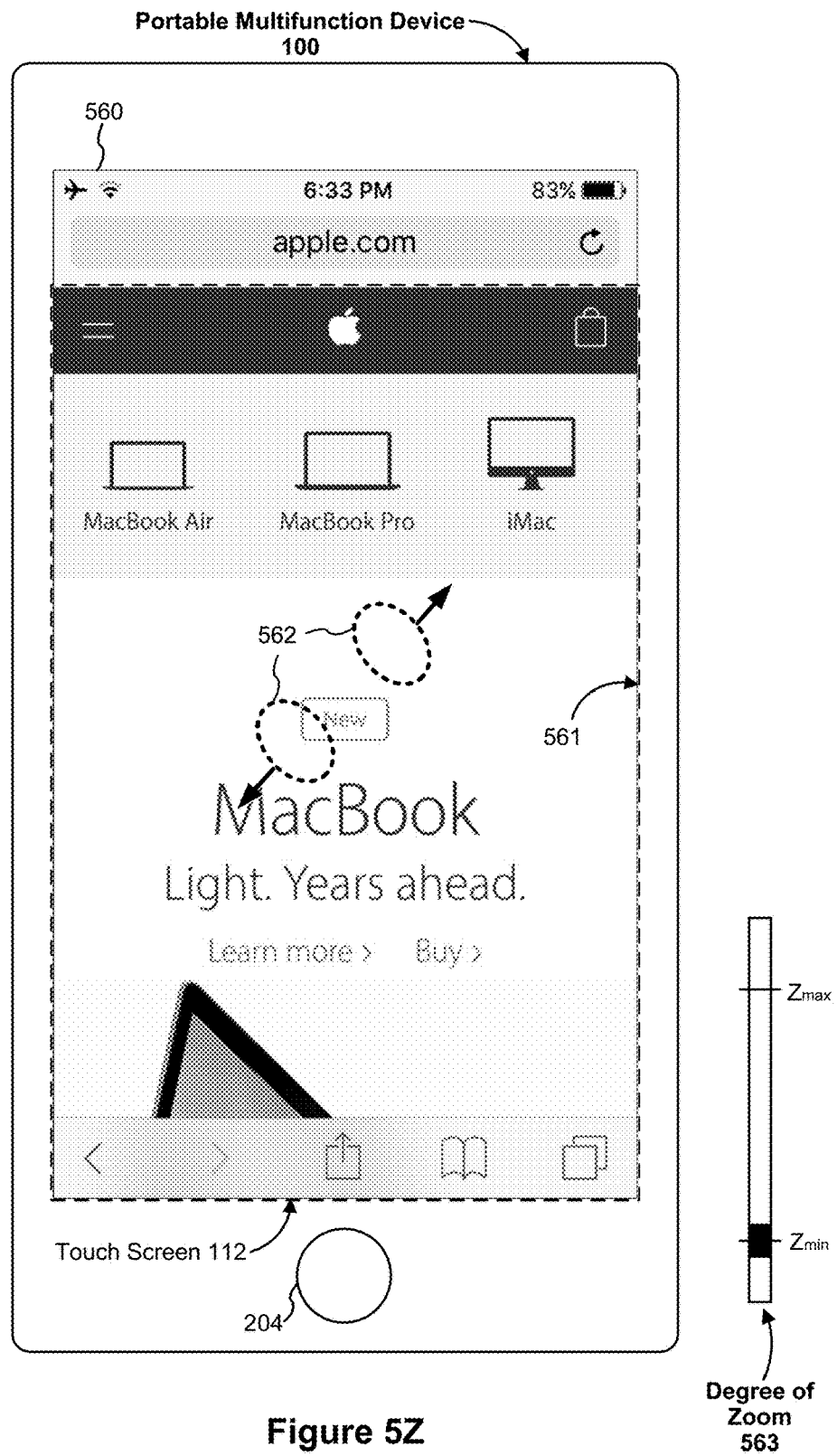
Figure 5A:
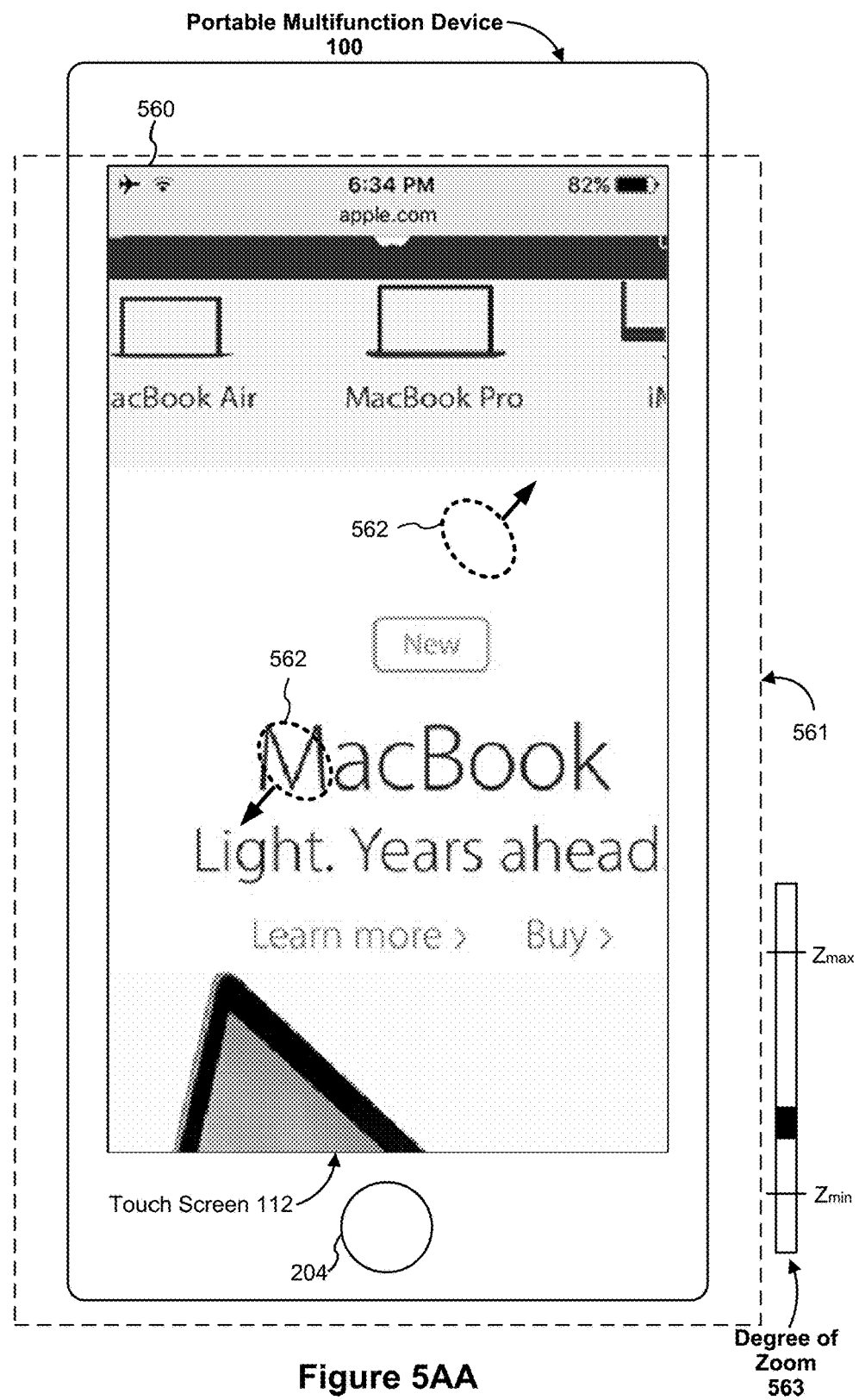
Figure 5B:
Figure 5C:
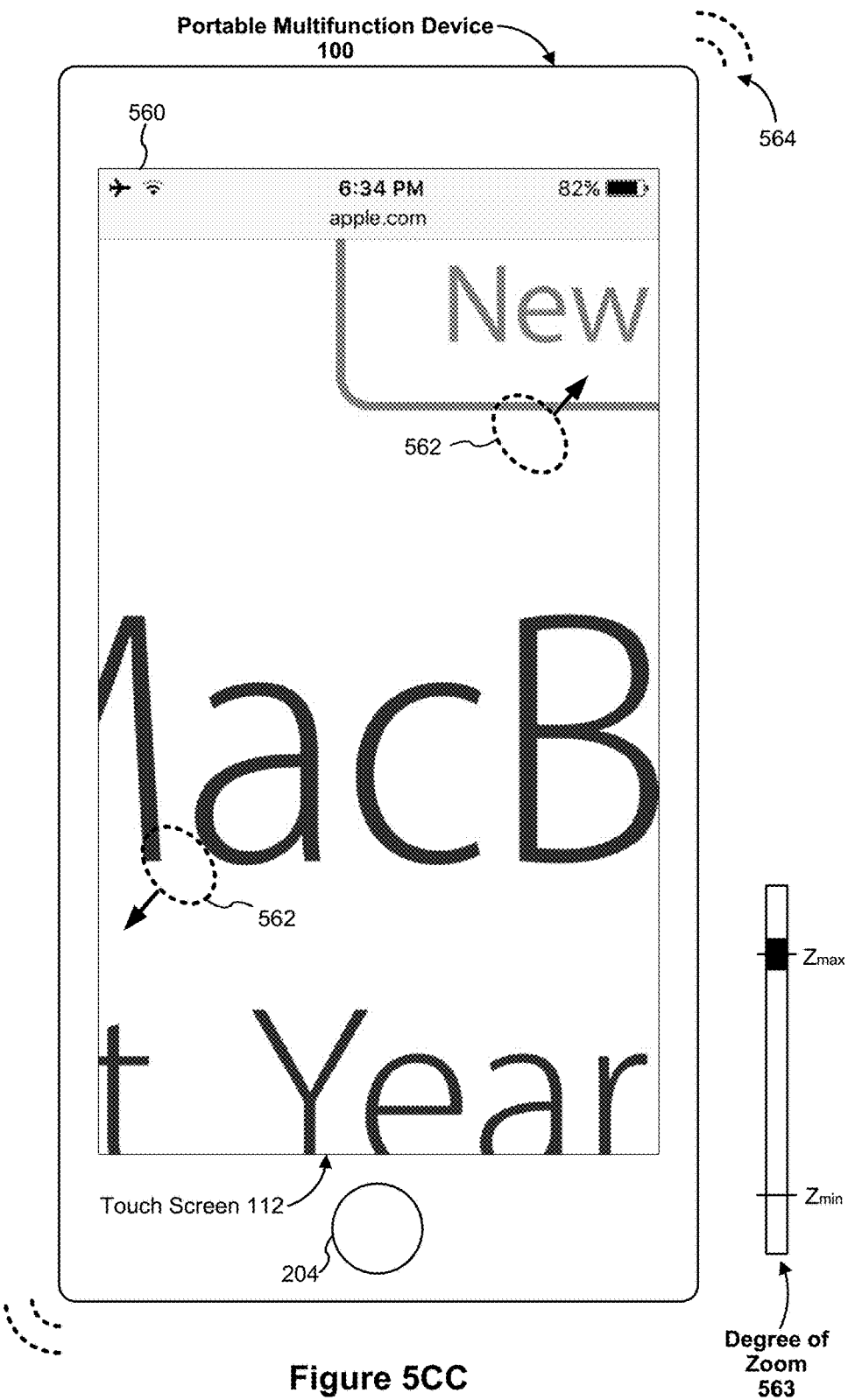
Figure 5D:
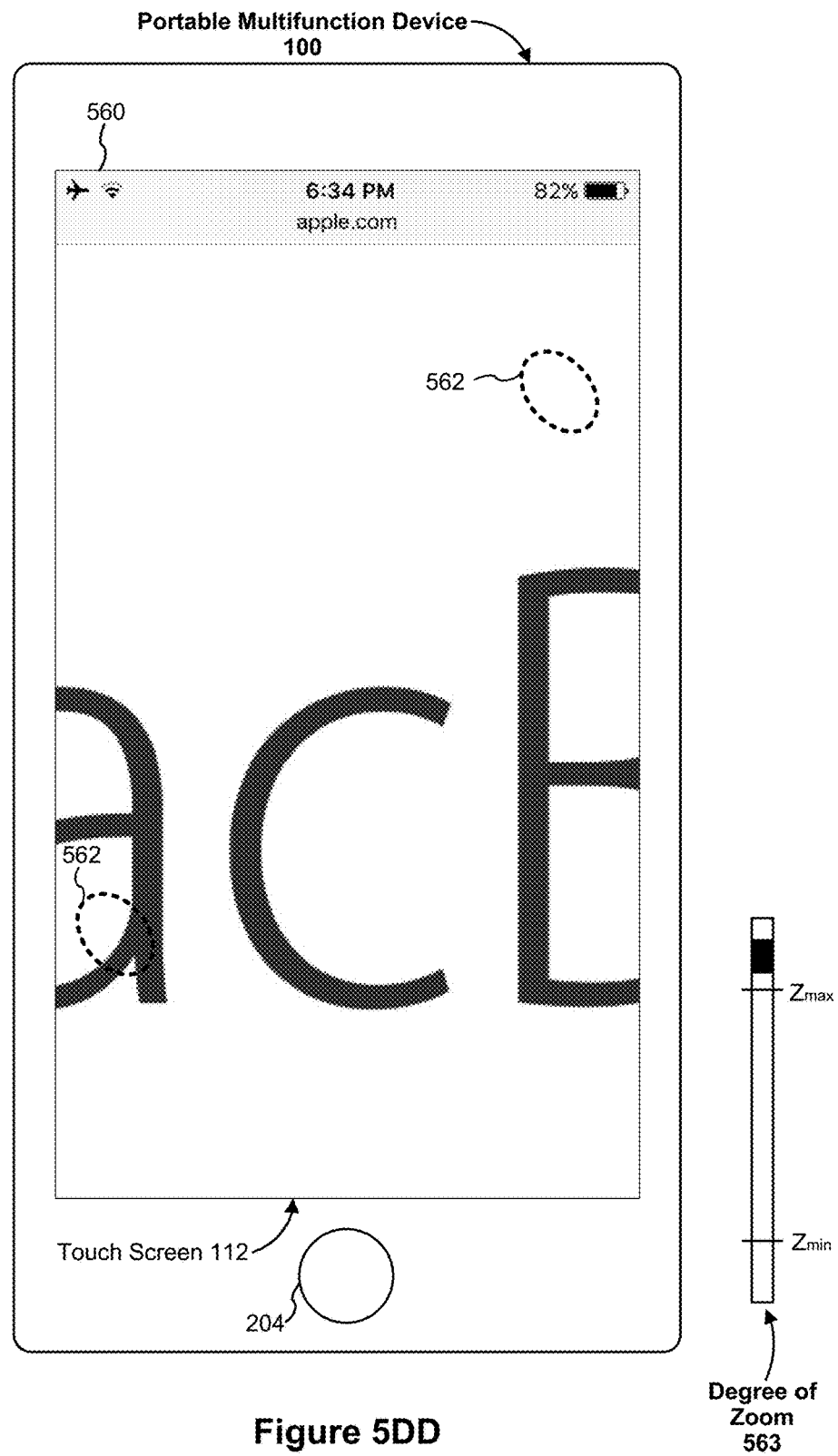
Figure 5E:
Figure 5F:
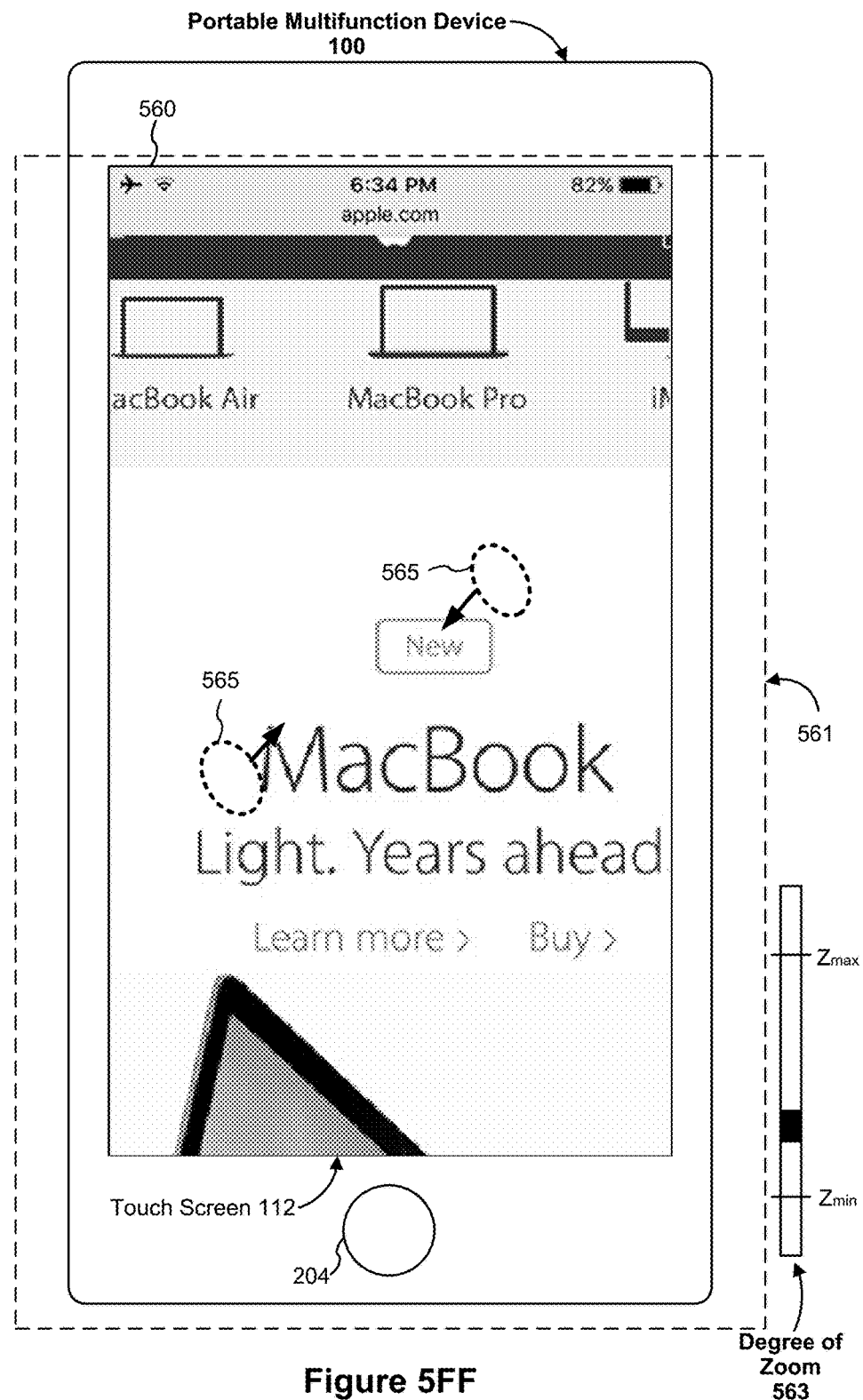
Figure 5G:
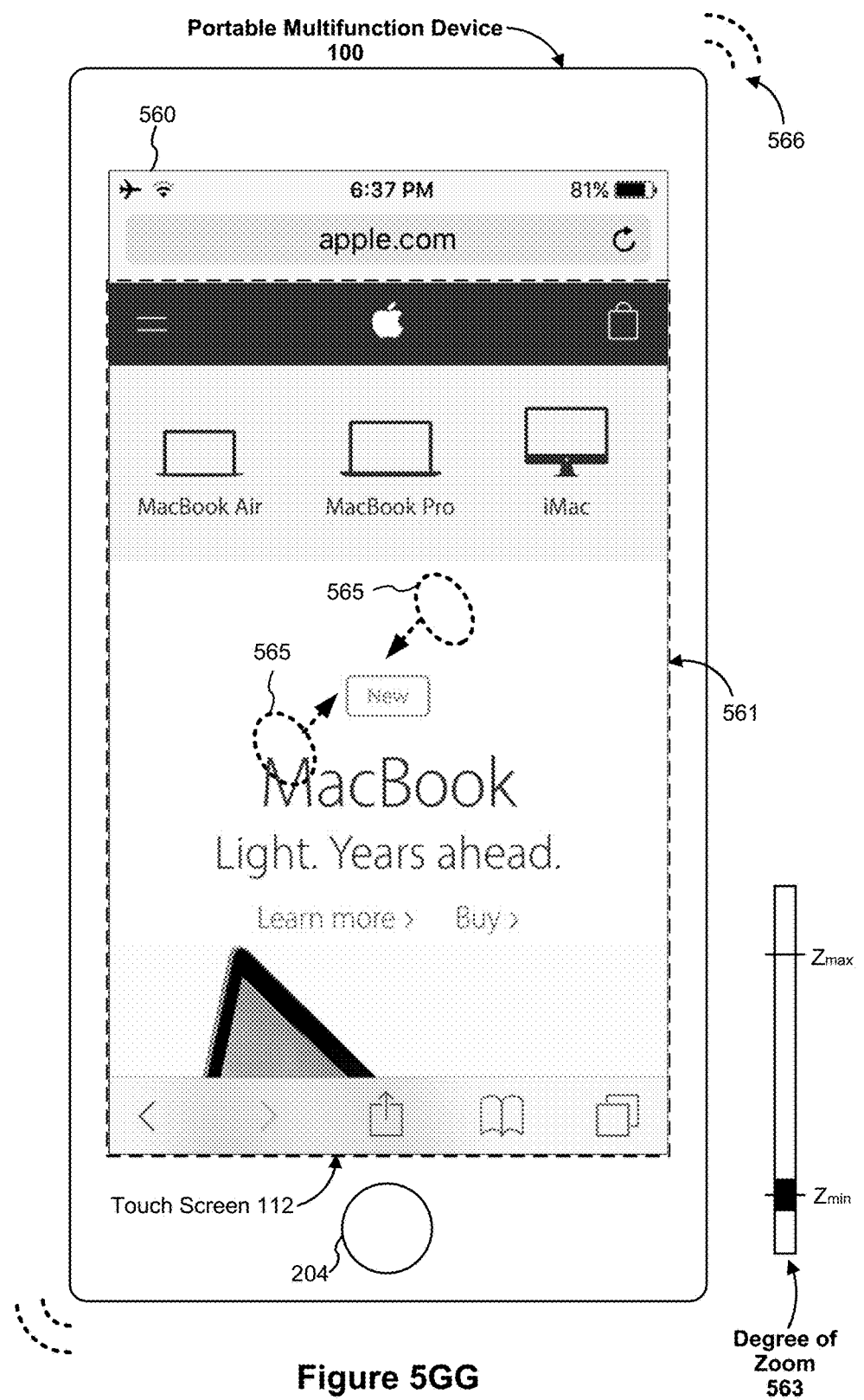
Figure 5H:
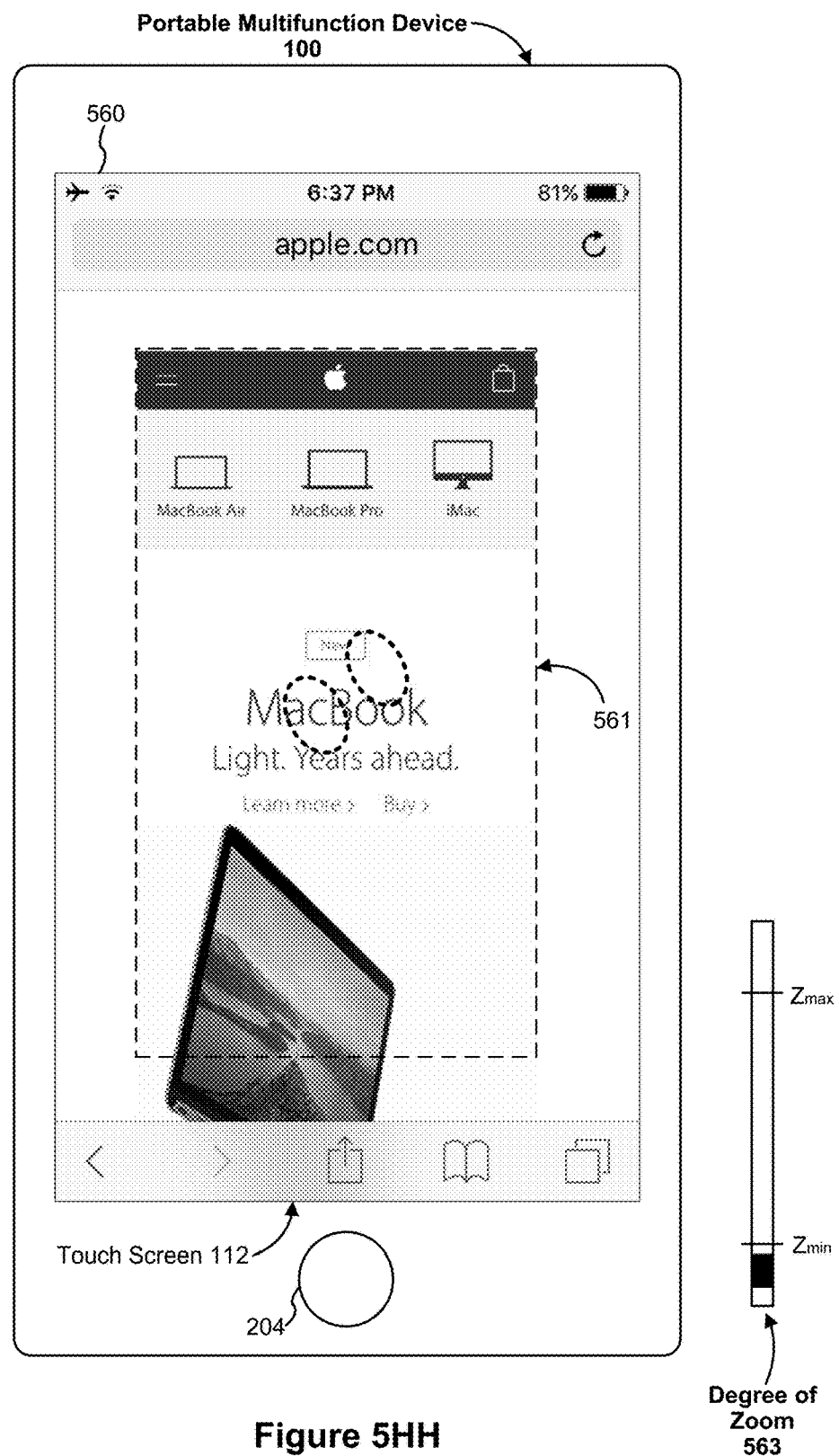
Figure 5I:
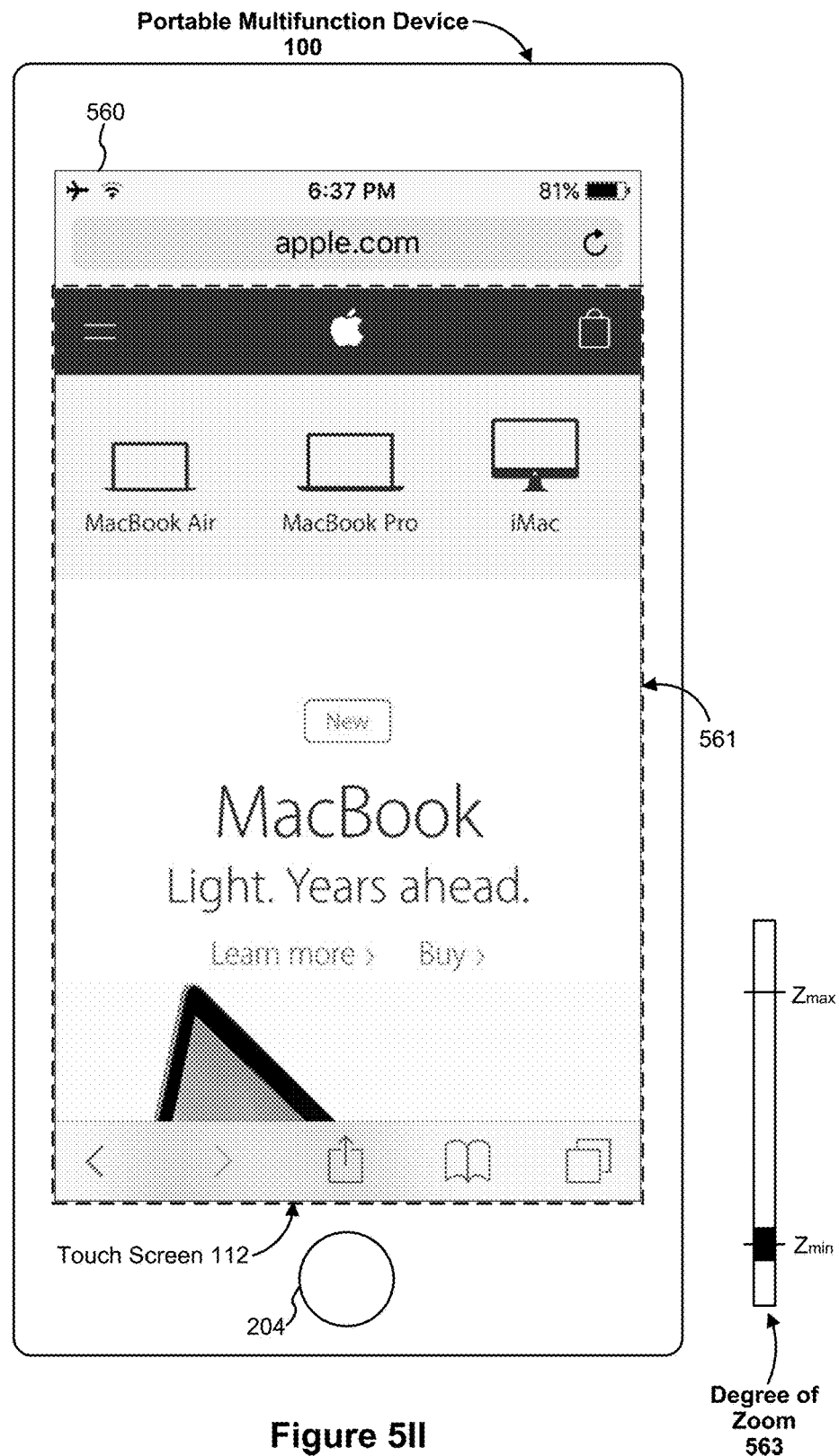
Figure 5J:
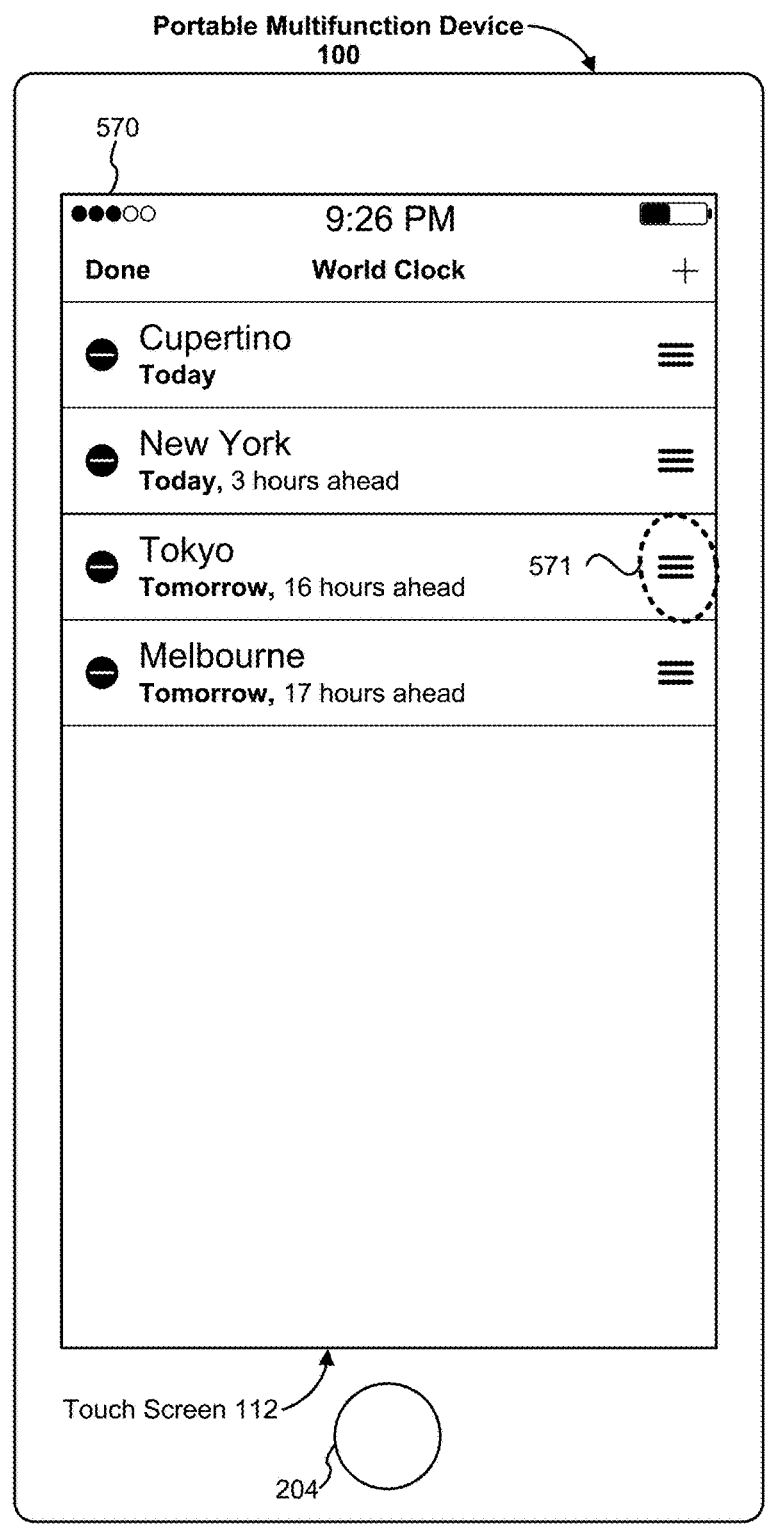
Figure 5K:
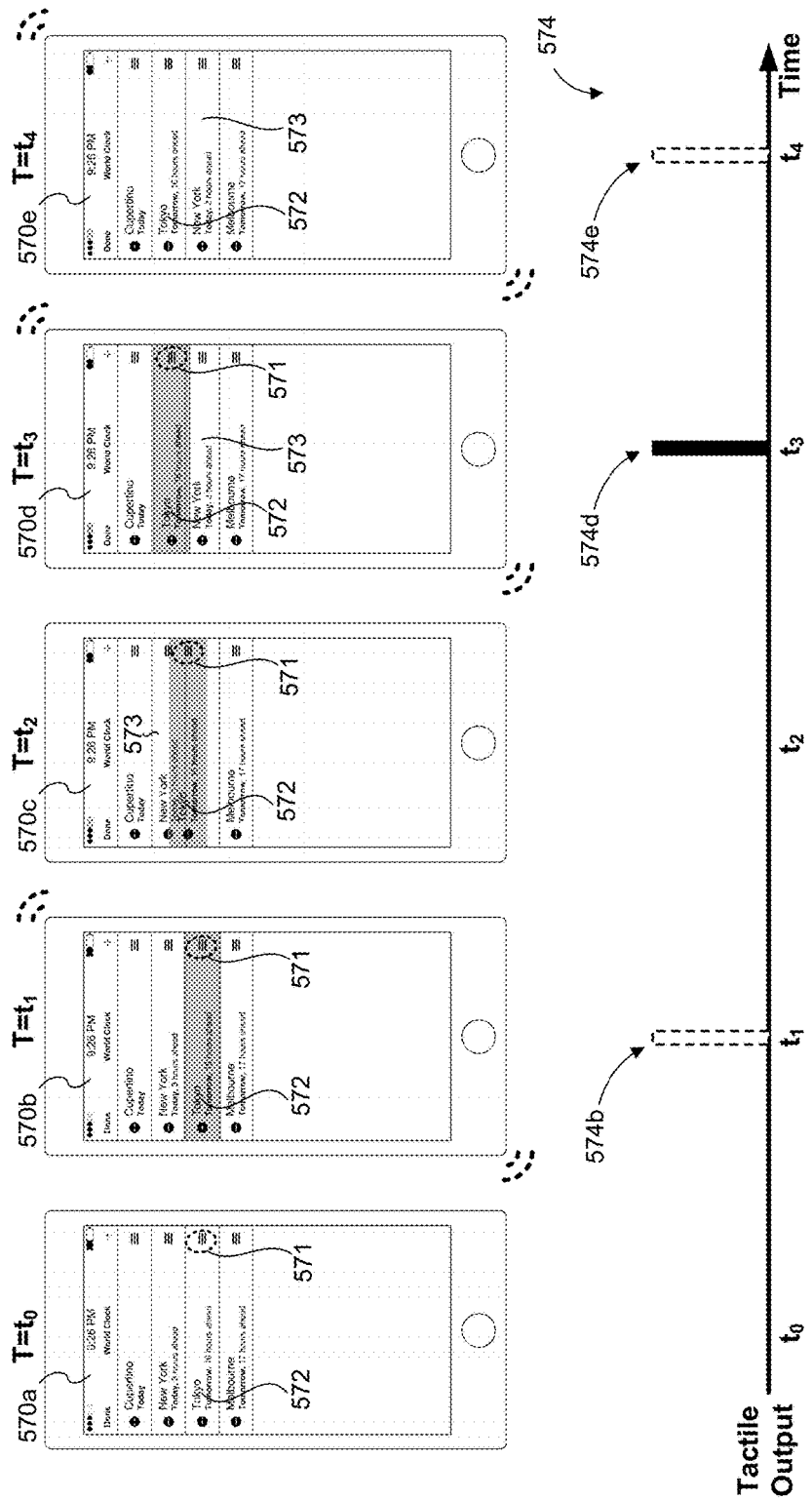
Figure 5L:
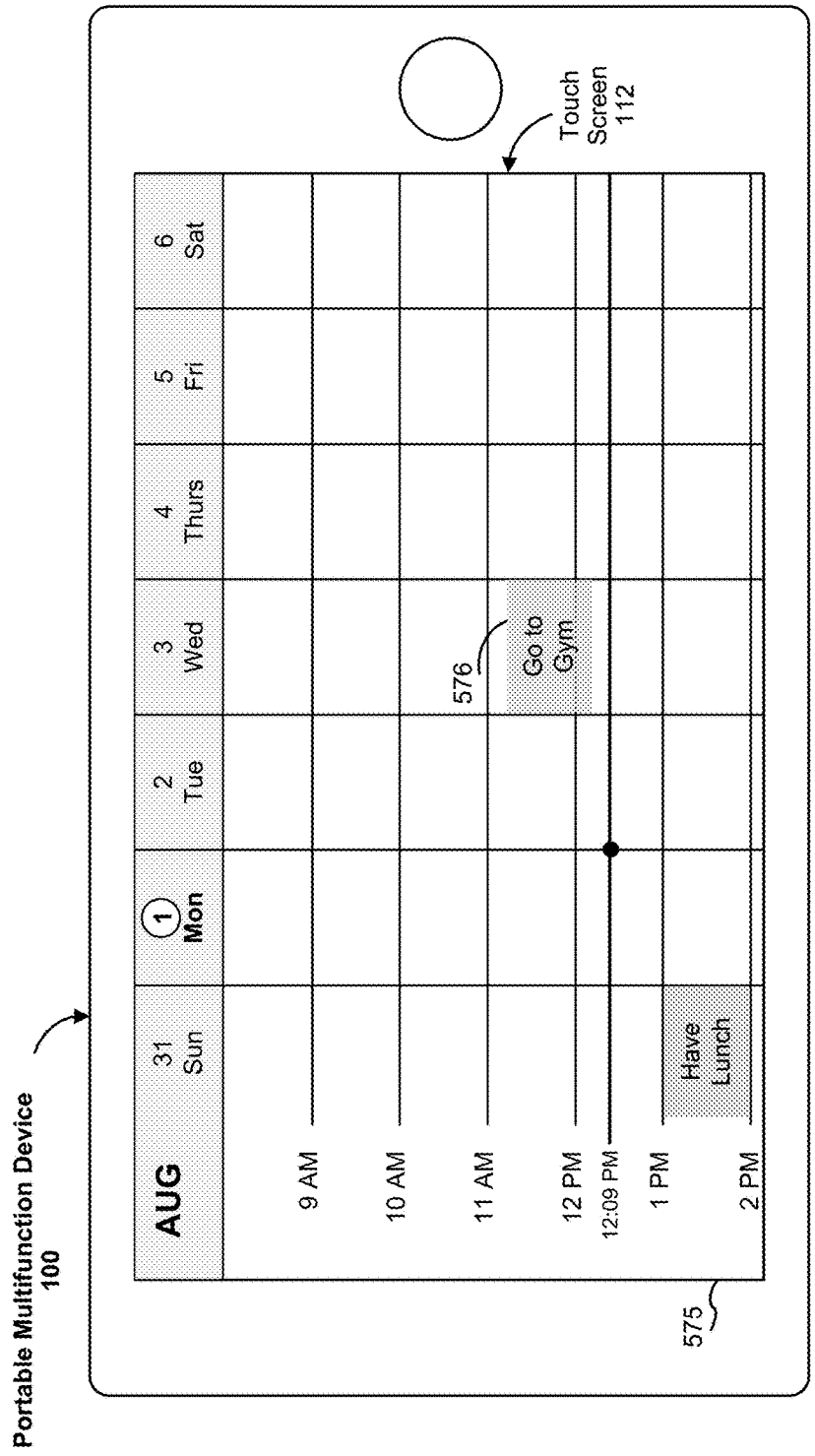
Figure 5M:
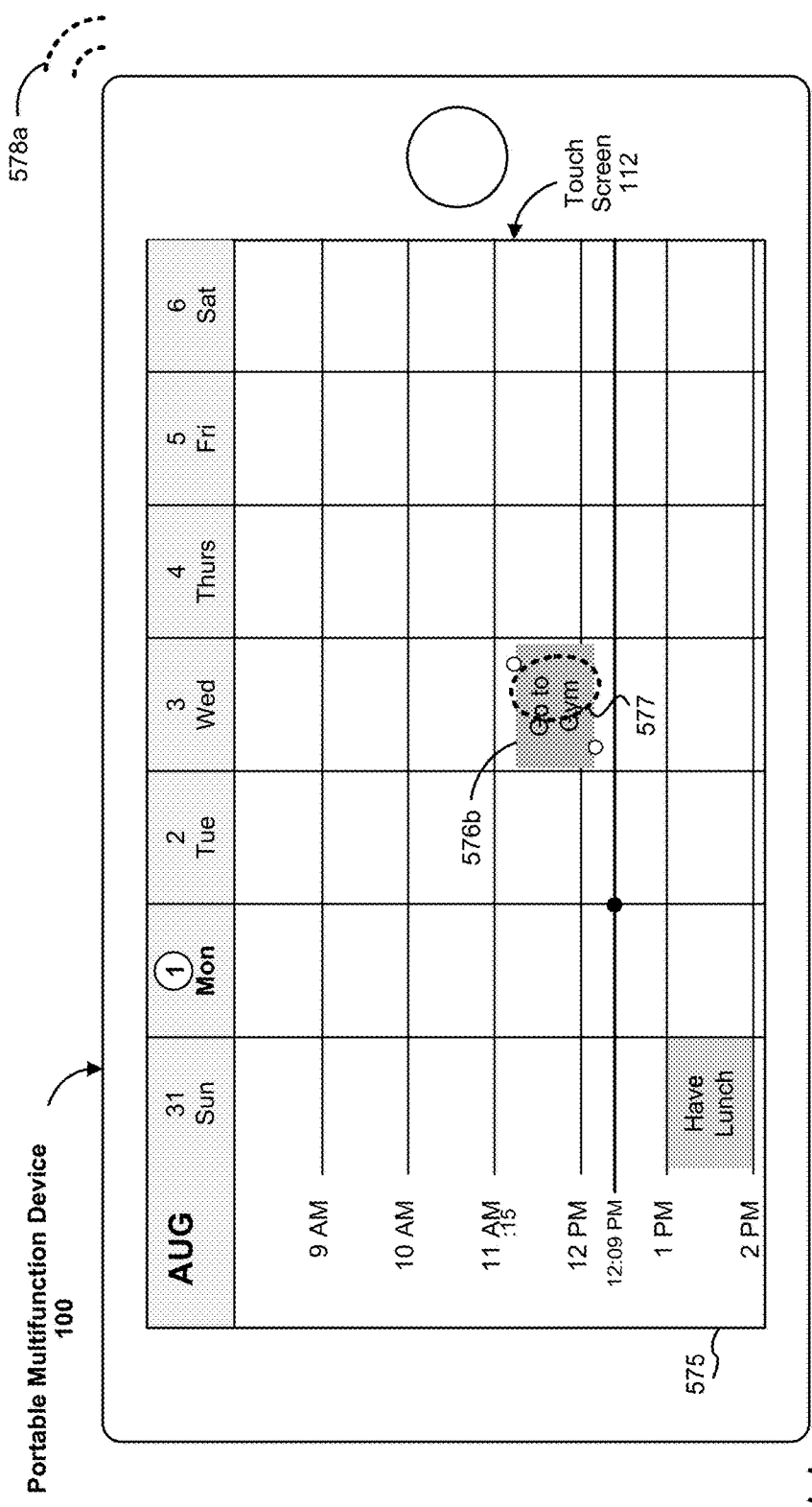
Figure 5N:
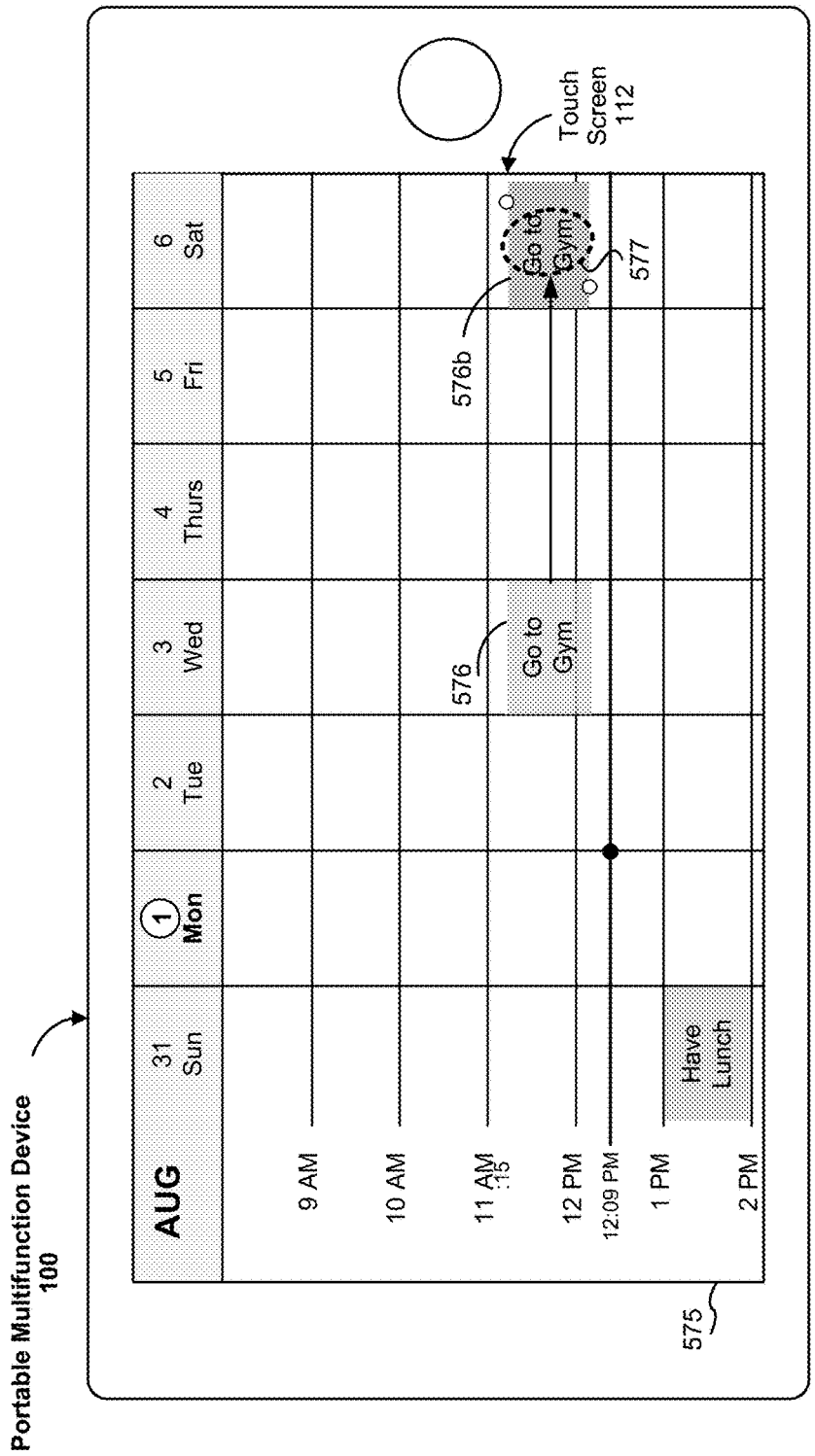
Figure 5O:
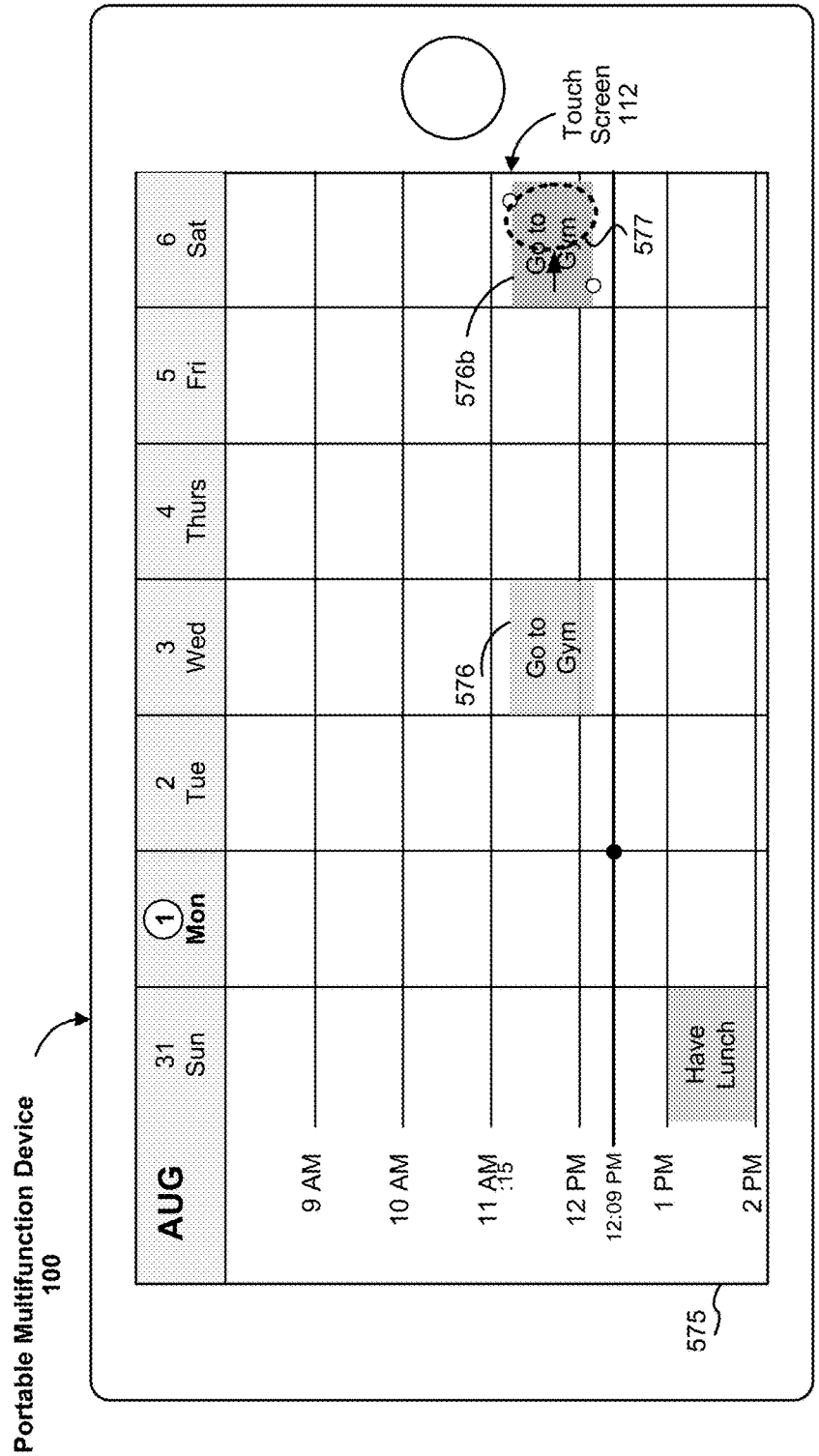
Figure 5P:
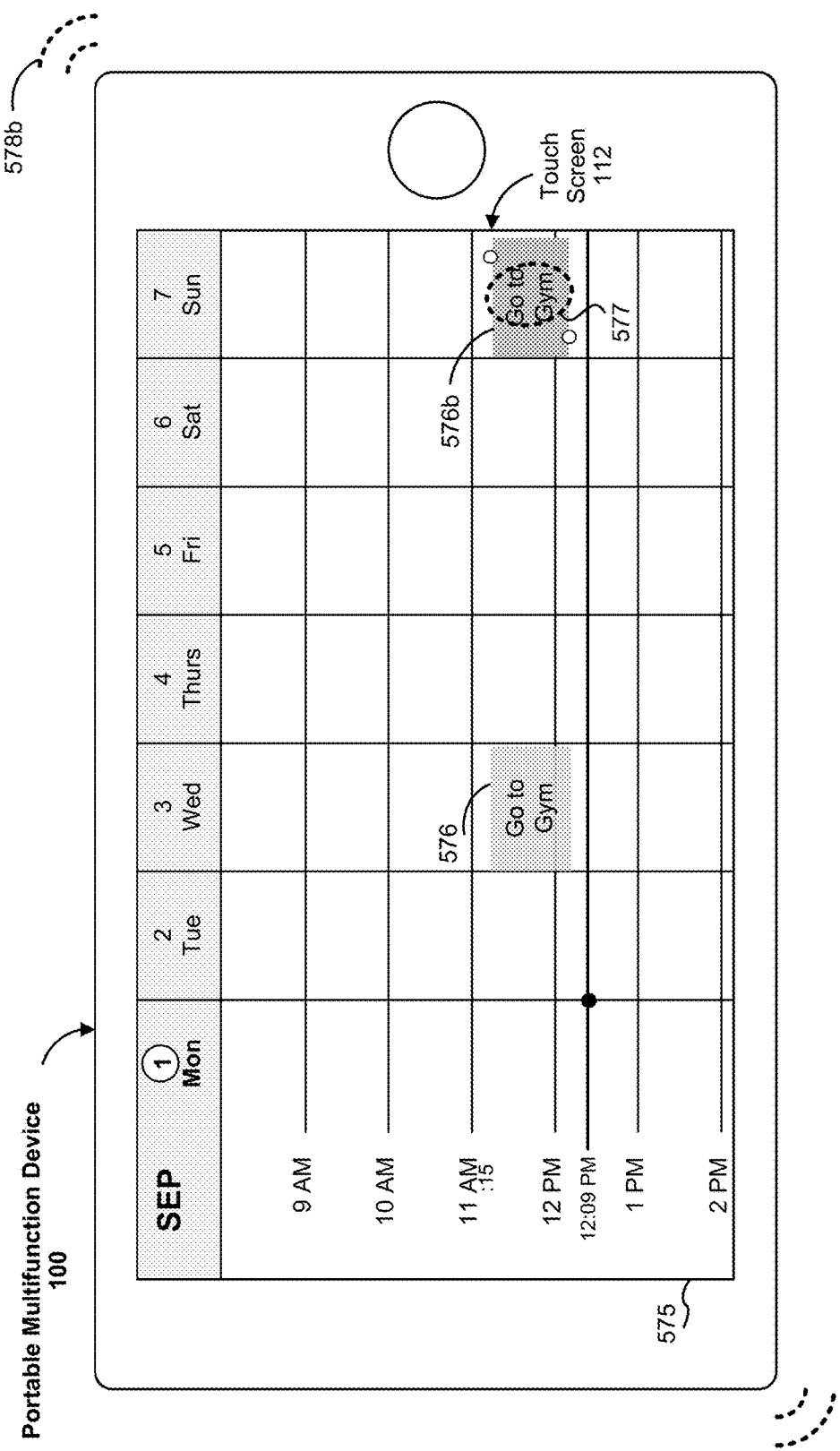
Figure 5Q:
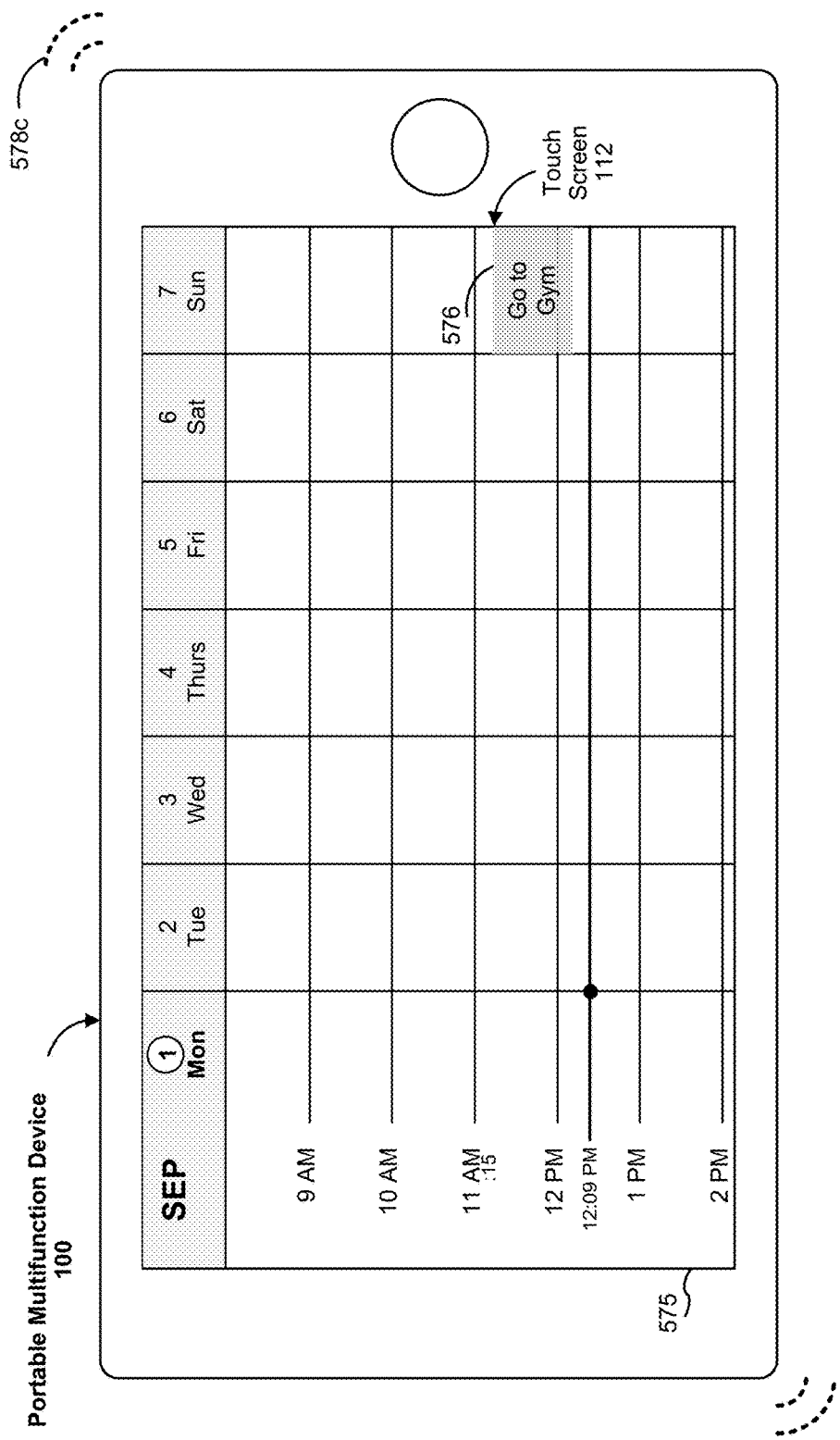
Figure 5R:
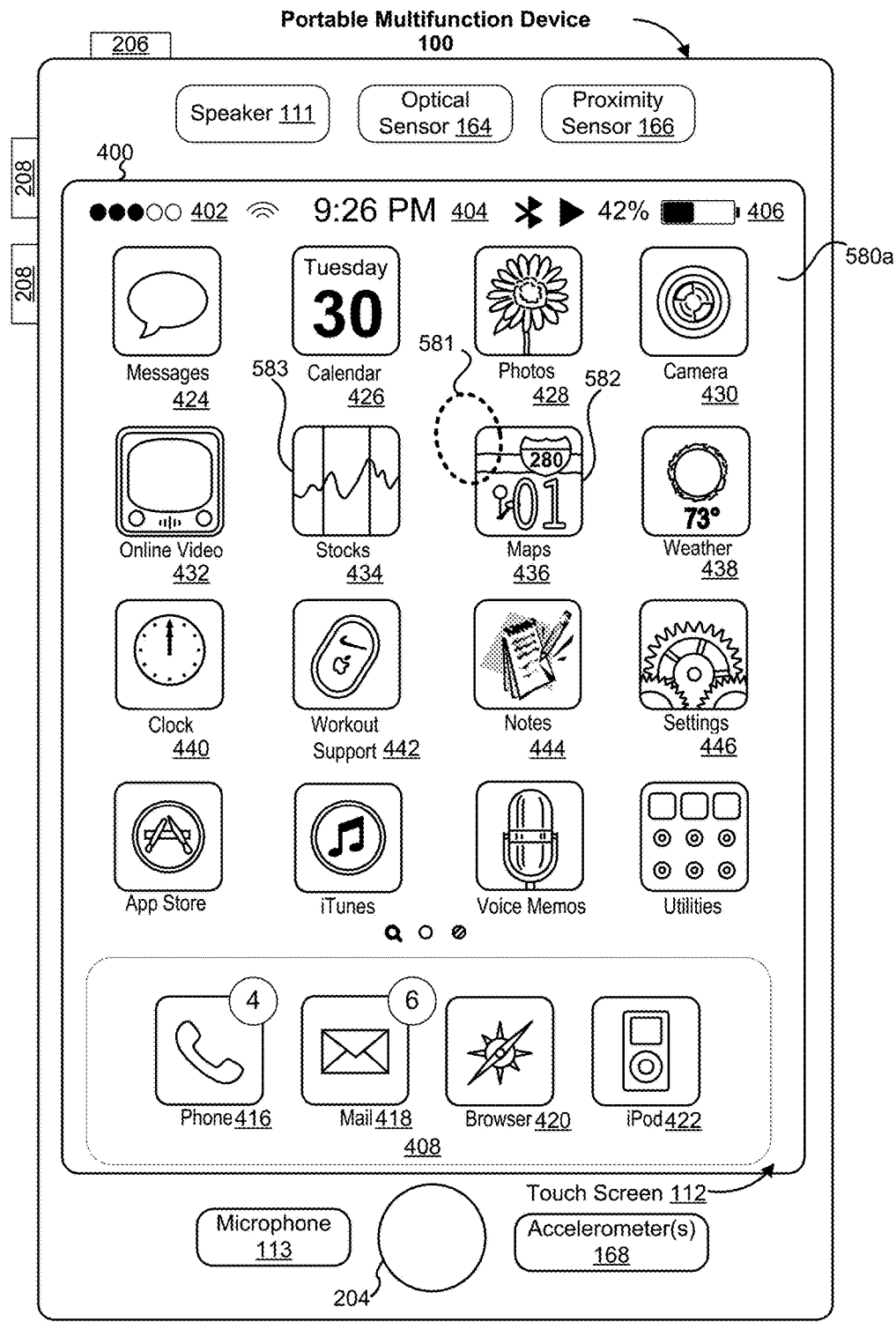
Figure 5S:
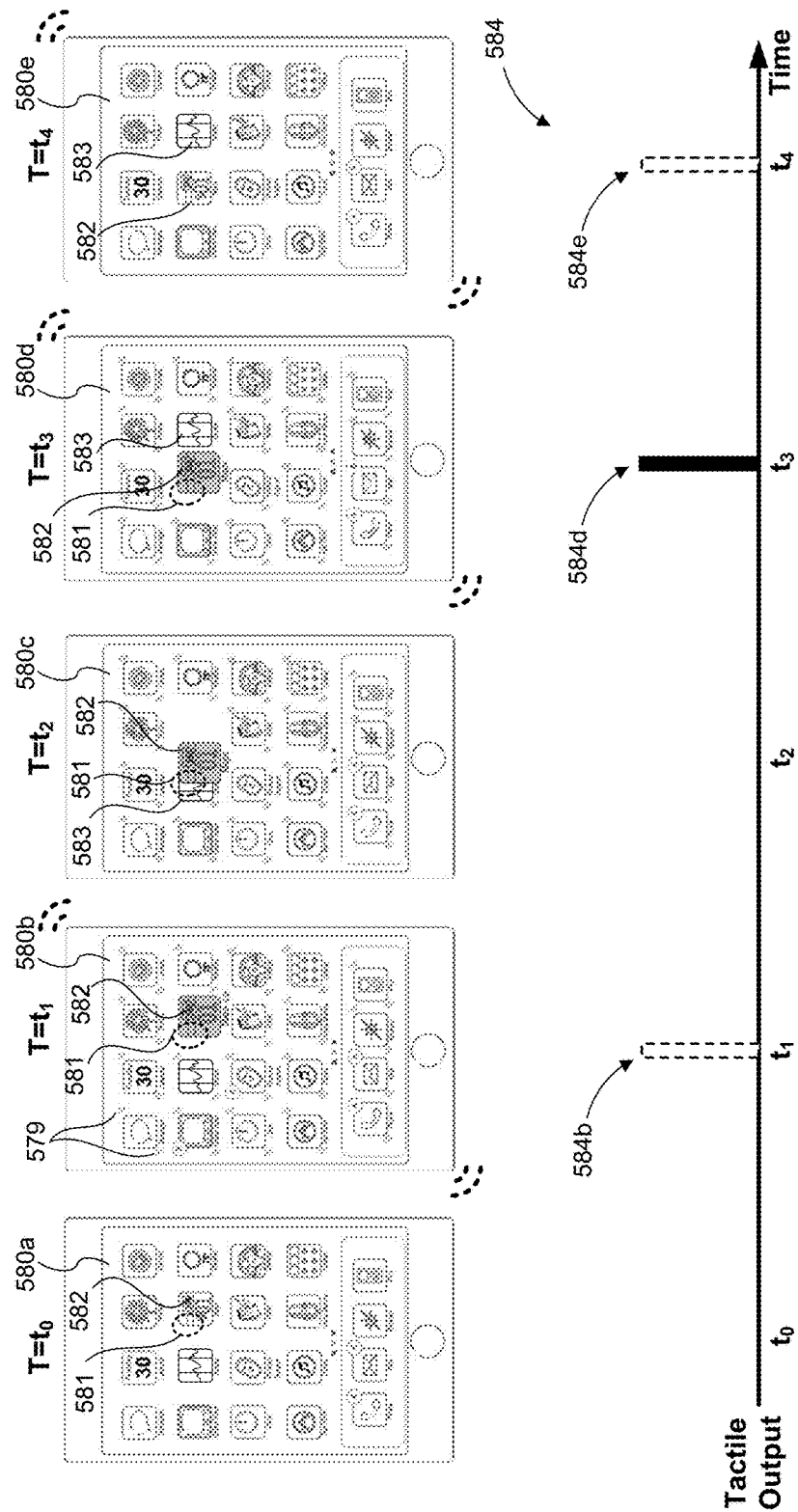
Figure 5T:
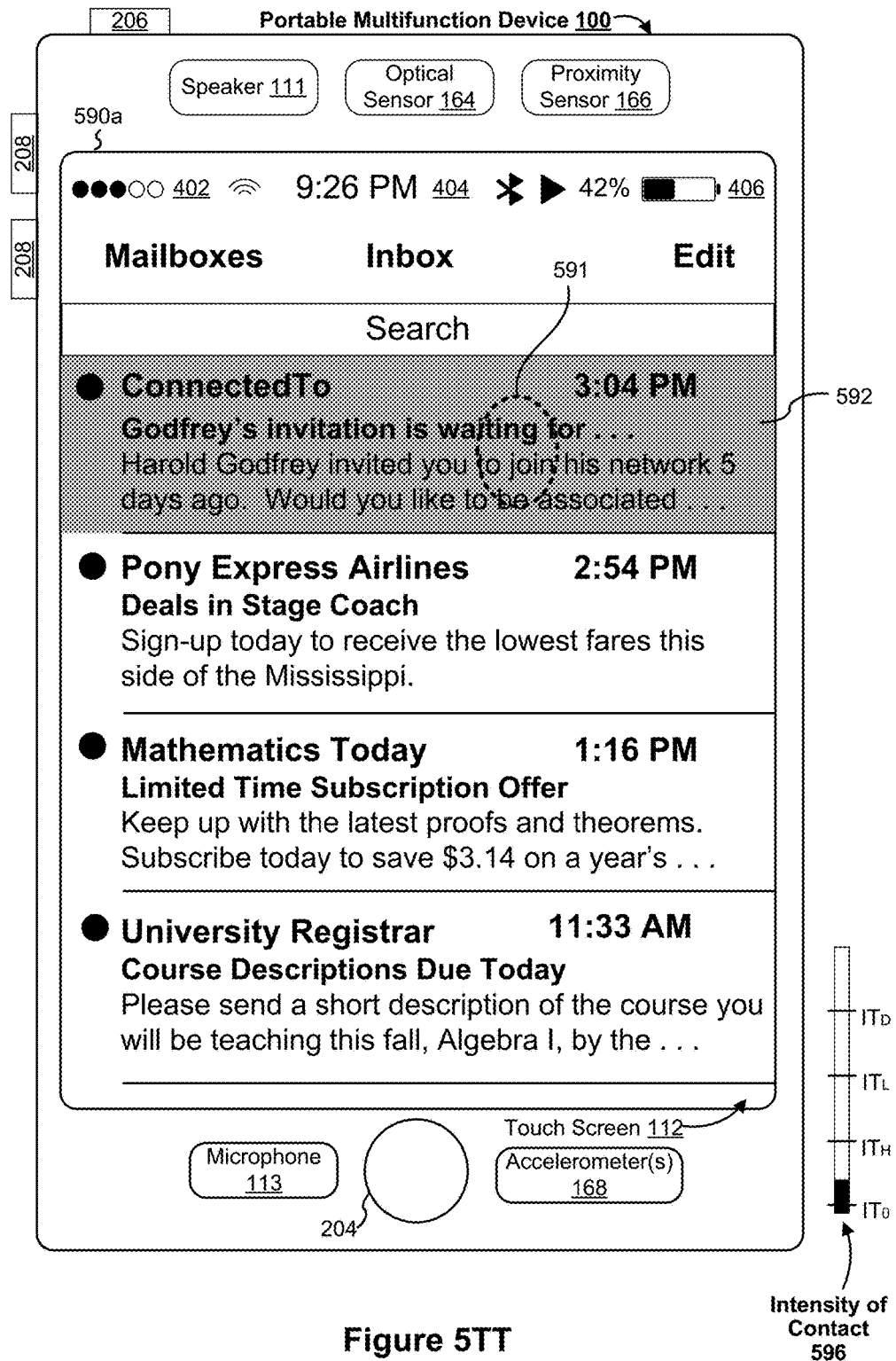
Figure 5U:
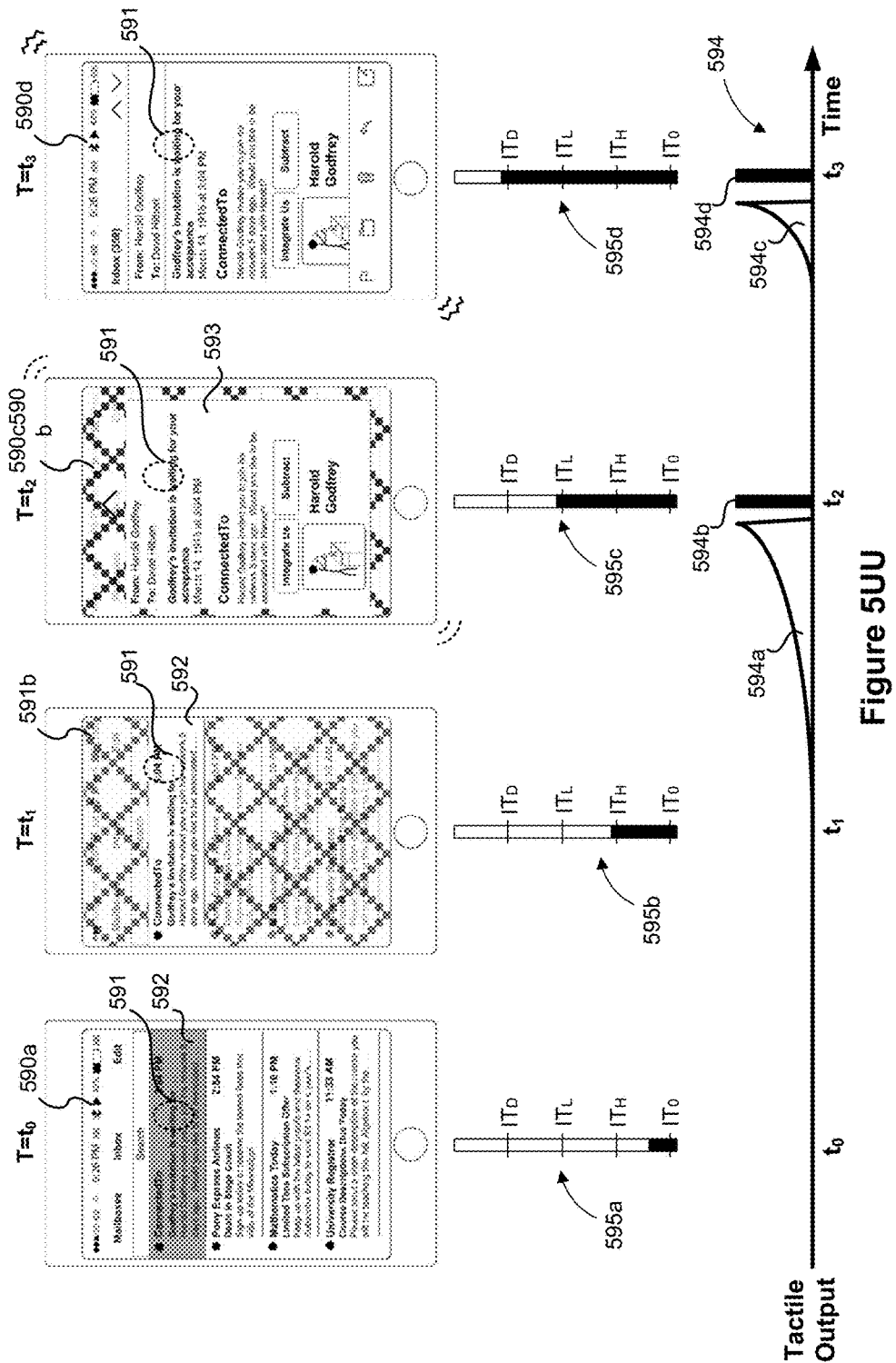
Figure 5V:
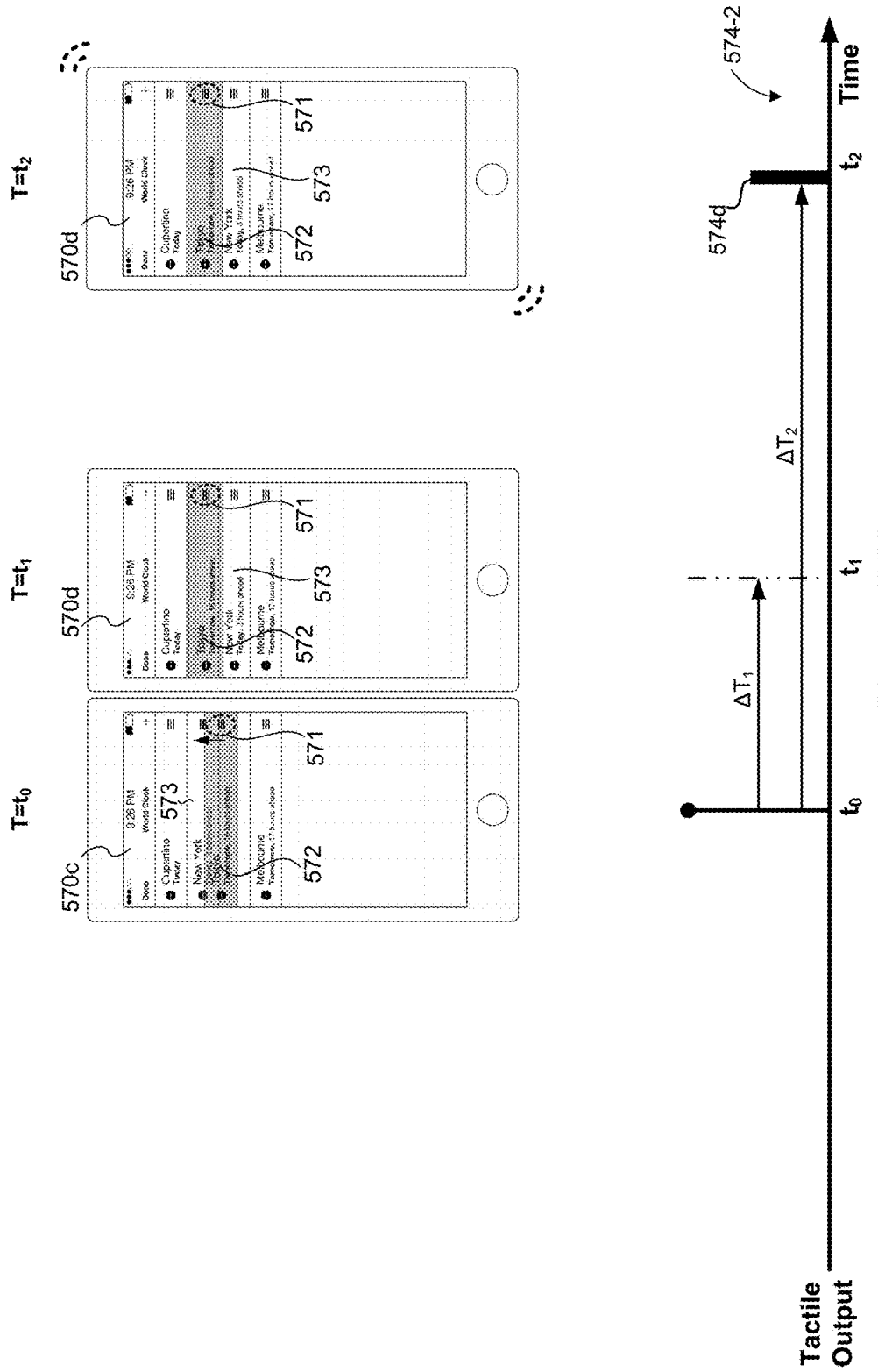
Figure 5W:
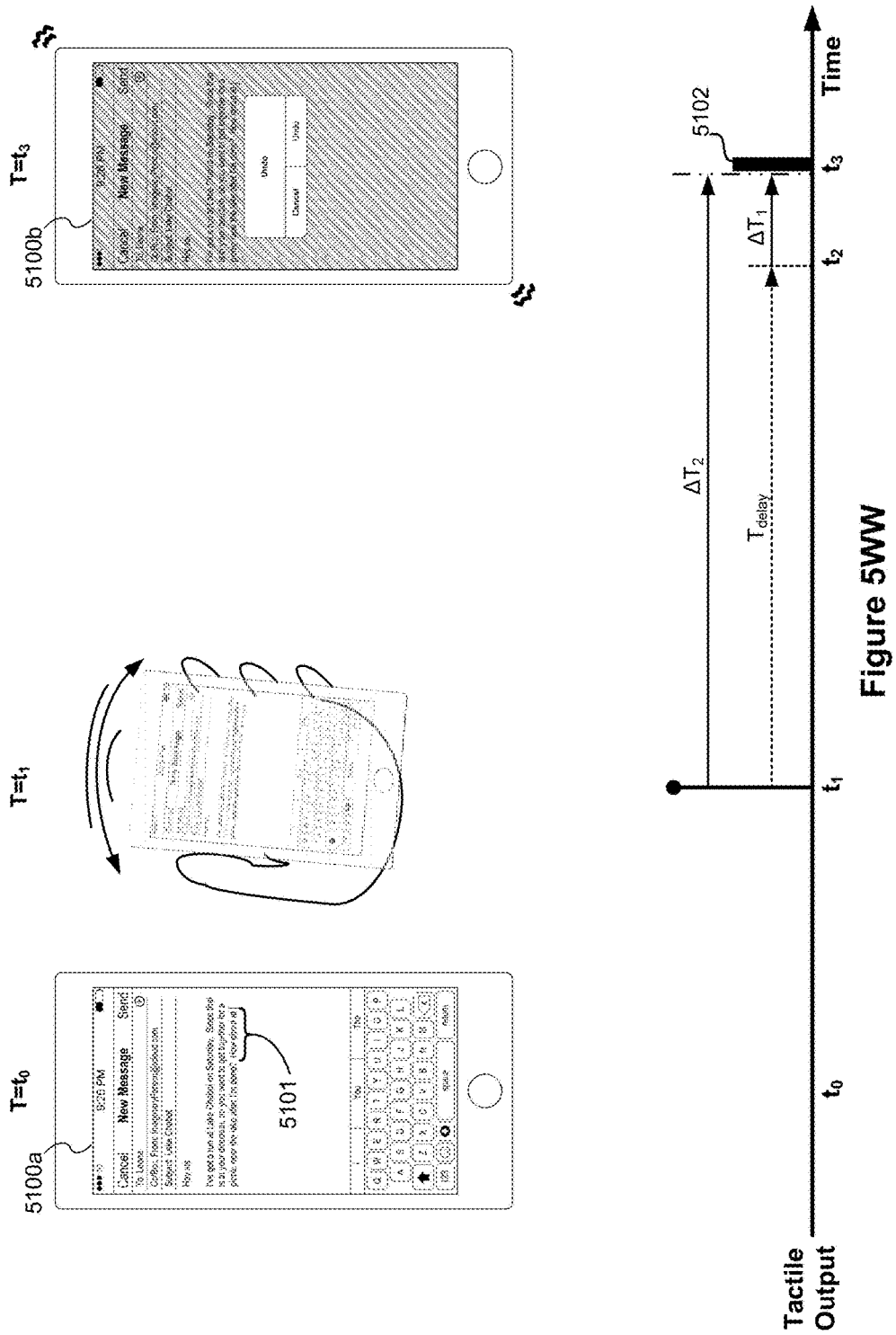
Figure 5Y:
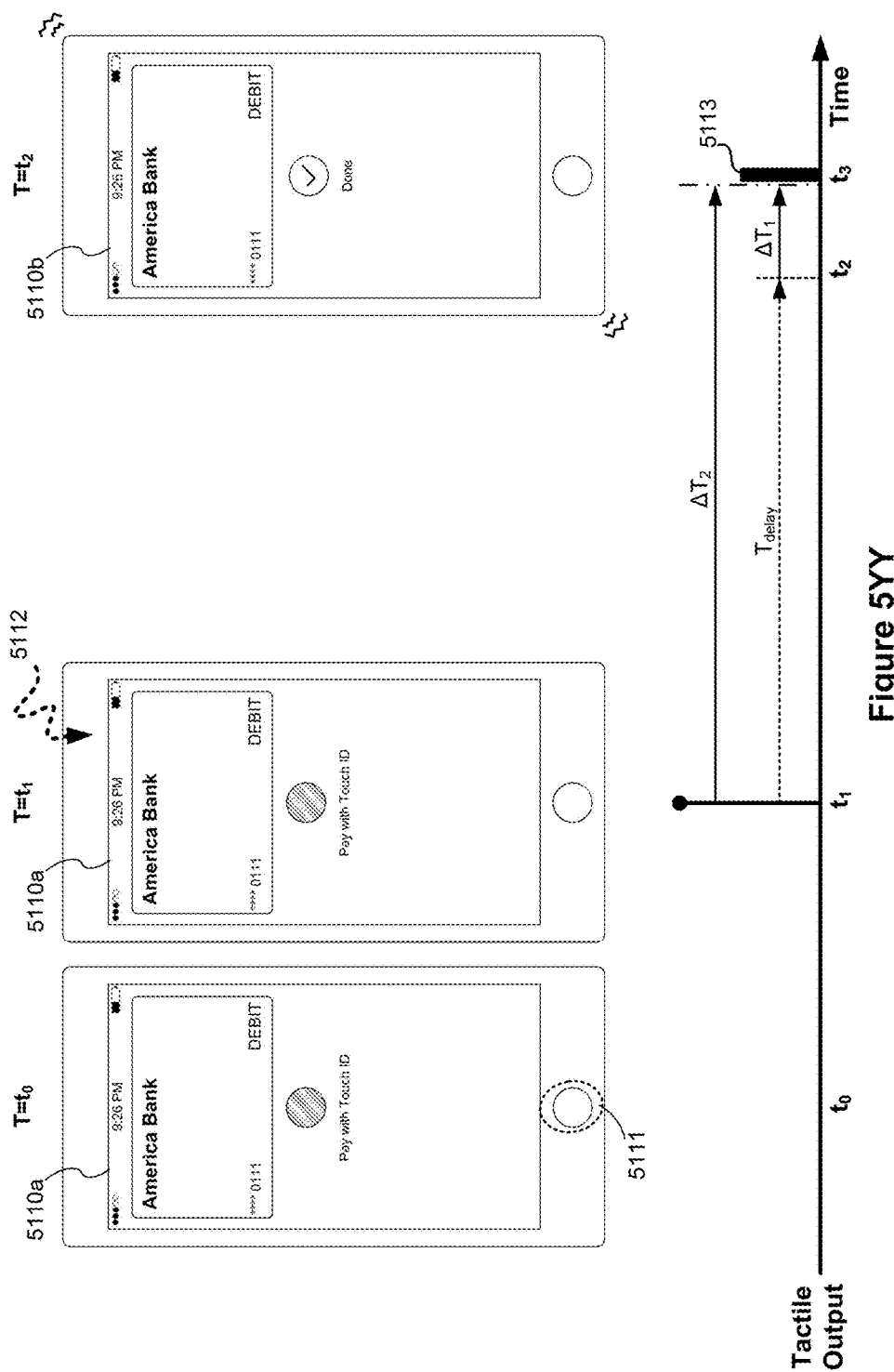
Figure 5Z:
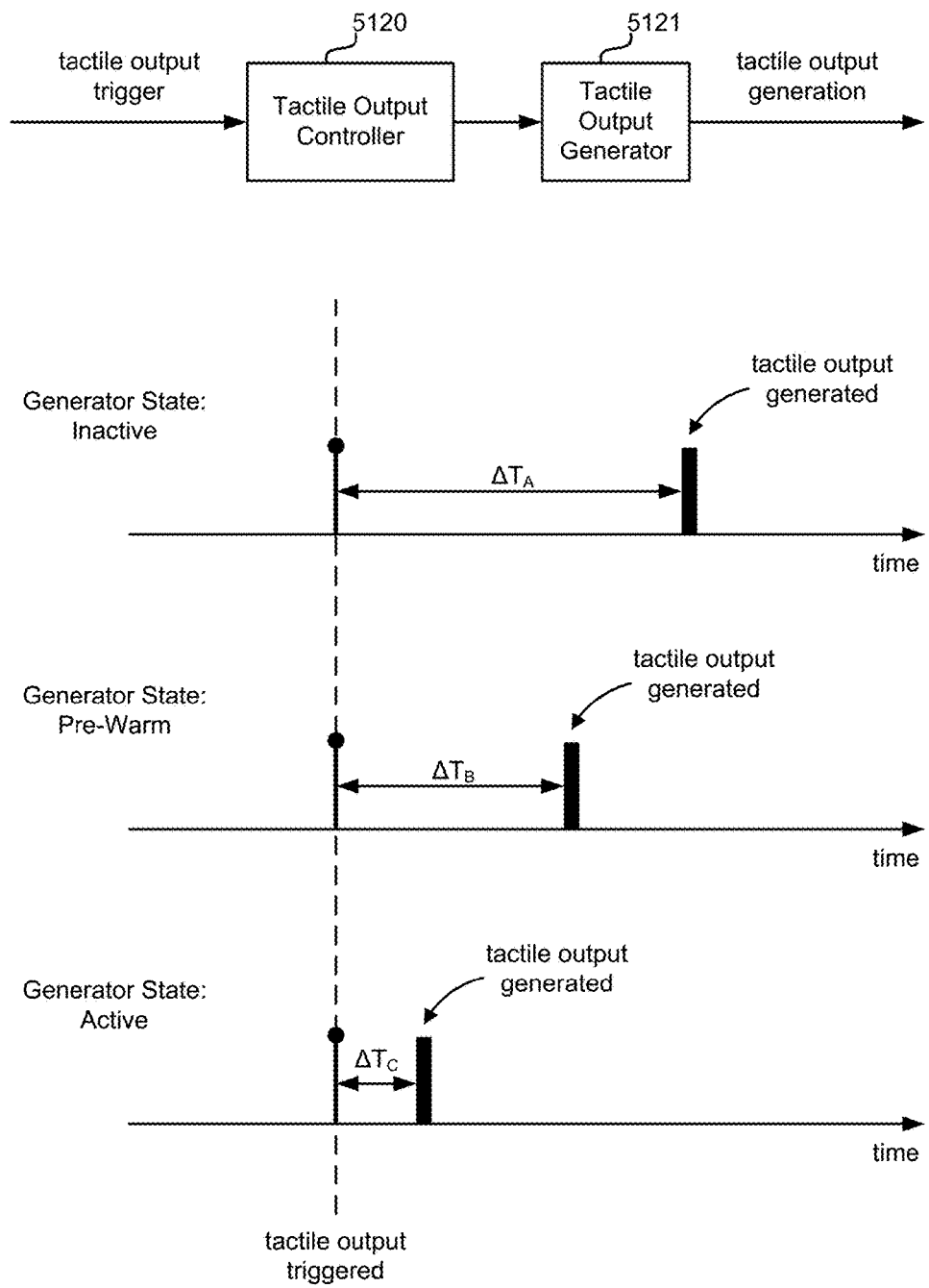

FIGS. 5Z-5II illustrate an example user interface for generating tactile outputs to indicate thresholds associated with zoom operations. In particular, FIGS. 5Z-5EE illustrate an example user interface for generating a tactile output in accordance with a zoom scale of displayed user interface elements crossing a maximum zoom threshold during a zoom-in operation. FIGS. 5FF-5II illustrate an example user interface for generating a tactile output in accordance with a zoom scale of displayed user interface elements crossing a minimum zoom threshold during a zoom-out operation. In the example shown in FIGS. 5Z-5II, user interface 560 includes a user interface of a web browser application (e.g., browser module 147, FIG. 1A).

FIG. 5Z illustrates user interface 560 displayed on touch screen 112. In some embodiments, as shown in FIG. 5Z, user interface 560 includes user interface region 561, indicated by the dashed outline (which is typically not displayed to a user). For example, in FIG. 5Z, user interface region 561 includes content of a webpage that corresponds to the web address "apple.com," including a plurality of user interface elements (e.g., a top menu bar including an apple icon, icons for "MacBook Air," "MacBook Pro," and "iMac," etc.). Degree of zoom scale 563 indicates a zoom scale of user interface region 561 with respect to minimum zoom threshold $Z_{min}$ and maximum zoom threshold $Z_{max}$. In FIG. 5Z, for example, degree of zoom scale 563 indicates that the zoom scale of user interface region 561 corresponds to minimum zoom threshold $Z_{min}$. FIG. 5Z also illustrates user input 562 corresponding to a depinch gesture (e.g., detection of two finger contacts at the initial positions shown in FIG. 5Z and movement of the two contacts away from each other as indicated by the arrows) detected on user interface 560 at locations corresponding to (e.g., within) user interface region 561. In some embodiments, the user interface illustrated in FIG. 5Z is generated by using a UIZoomEdgeFeedbackGenerator class described in Appendix B.

FIG. 5AA illustrates a transition of user interface 560 from user interface 560 in FIG. 5Z. In some embodiments, in response to detecting user input 562 (e.g., the depinch gesture), user interface region 561 is expanded (e.g., the zoom scale of user interface region 561 is increased) such that user interface region 561 extends beyond touch screen 112 (e.g., an outer edge of user interface region 561 extends beyond one or more outer edges of touch screen 112). As a result, only a portion of user interface region 561 is displayed on touch screen 112 (e.g., portions of the top menu bar, including the apple icon, and portions of the icons for "MacBook Air" and "iMac" are not displayed on touch screen 112). Degree of zoom scale 563 indicates that the zoom scale of user interface region 561 has increased above minimum zoom threshold $Z_{min}$.

FIG. 5BB illustrates a transition of user interface 560 from user interface 560 in FIG. 5AA. In particular, FIG. 5BB illustrates that, in response to a continuation of user input 562 (e.g., a continuation of the depinch gesture by continued movement of the two contacts away from each other), user interface region 561 is further expanded (e.g., the zoom scale of user interface region 561 is further increased) such that user interface region 561 extends further beyond touch screen 112. As a result, a lesser portion of user interface 561 is displayed on touch screen 112 in FIG. 5BB than in FIG. 5AA (e.g., the top menu bar and the icons for "MacBook Air," "MacBook Pro," and "iMac" are not displayed on touch screen 112). Degree of zoom scale 563 indicates that the zoom scale of user interface region 561 has increased further above minimum zoom threshold $Z_{min}$ but remains below maximum zoom threshold $Z_{max}$.

FIG. 5CC illustrates a transition of user interface 560 from user interface 560 in FIG. 5BB. In particular, FIG. 5CC illustrates that, in response to a further continuation of user input 562 (e.g., a further continuation of the depinch gesture by further continued movement of the two contacts away from each other), user interface region 561 is further expanded (e.g., the zoom scale of user interface region 561 is further increased) such that user interface region 561 extends further beyond touch screen 112. As a result, a lesser portion of user interface 561 is displayed on touch screen 112 in FIG. 5CC than in FIG. 5BB. Degree of zoom scale 563 indicates that the zoom scale of user interface region 561 has increased further above minimum zoom threshold $Z_{min}$ to maximum zoom threshold $Z_{max}$. In accordance with the zoom scale of user interface region 561 reaching maximum zoom threshold $Z_{max}$, device 100 generates tactile output 564 (e.g., MicroTap High (270 Hz), gain: 0.6).

FIG. 5DD illustrates a transition of user interface 560 from user interface 560 in FIG. 5CC. In particular, FIG. 5DD illustrates that, in response to a continuation of user input 562 (e.g., the two contacts of the depinch gesture continue to be detected after further movement of the two contacts away from each other), user interface region 561 is further expanded (e.g., the zoom scale of user interface region 561 is further increased) such that user interface region 561 extends further beyond touch screen 112. As a result, a lesser portion of user interface 561 is displayed on touch screen 112 in FIG. 5DD than in FIG. 5CC. Degree of zoom scale 563 indicates that the zoom scale of user interface region 561 has increased above maximum zoom threshold $Z_{max}$. In some embodiments, the zoom scale of user interface region 561 is increased temporarily above maximum zoom threshold $Z_{max}$ in response to the continuation of user input 562.

FIG. 5EE illustrates a transition of user interface 560 from user interface 560 in FIG. 5DD. In particular, FIG. 5EE illustrates user interface 560 in response to ceasing to detect user input 562 (e.g., in response to liftoff of the two contacts of the depinch gesture). While FIG. 5DD illustrates that the zoom scale of user interface region 561 is temporarily increased above maximum zoom threshold $Z_{max}$ in response to user input 562, FIG. 5EE illustrates that, in response to ceasing to detect user input 562, the zoom scale of user interface region 561 is restored to $Z_{max}$, as indicated by degree of zoom scale 563.

FIGS. 5FF-5II illustrate alternate transitions of user interface 560 corresponding to generating a tactile output in accordance with the zoom scale of user interface region 561 crossing minimum zoom threshold $Z_{min}$ during a zoom-out operation. FIG. 5FF is similar to FIG. 5AA and illustrates that user interface region 561 of user interface 560 is expanded such that user interface region 561 extends beyond touch screen 112 (e.g., user interface region 561 extends beyond one or more outer edges of touch screen 112). As a result, only a portion of user interface region 561 is displayed on touch screen 112 (e.g., portions of the top menu bar, including the apple icon, and portions of the icons for "MacBook Air" and "iMac" are not displayed on touch screen 112). Degree of zoom scale 563 indicates that the zoom scale of user interface region 561 is above minimum zoom threshold $Z_{min}$ at a zoom scale similar to the zoom scale shown in FIG. 5AA. FIG. 5FF also illustrates user input 565 corresponding to a pinch gesture (e.g., detection of two finger contacts at the initial positions shown in FIG. 5FF and movement of the two contacts toward each other as indicated by the arrows) detected on user interface 560 at locations corresponding to (e.g., within) user interface region 561.

FIG. 5GG illustrates a transition of user interface 560 from user interface 560 in FIG. 5FF. In some embodiments, in response to detecting user input 565 (e.g., the pinch gesture), device 100 shrinks user interface region 561 (e.g., decreases the zoom scale of user interface region 561) such that user interface region 561 does not extend beyond touch screen 112 (e.g., user interface region 561 is fully displayed on touch screen 112). Degree of zoom scale 563 indicates that the zoom scale of user interface region 561 is at minimum zoom threshold $Z_{min}$ (e.g., the zoom scale of user interface region 561 has decreased from the zoom scale shown in FIG. 5FF to $Z_{min}$). In response to the zoom scale of user interface region 561 reaching minimum zoom threshold $Z_{min}$, device 100 generates tactile output 566 (e.g., MicroTap High (270 Hz), gain: 0.6).

FIG. 5HH illustrates a transition of user interface 560 from user interface 560 in FIG. 5GG. In FIG. 5HH, in response to detecting a continuation of user input 565 (e.g., the two contacts of the pinch gesture continue to be detected after further movement of the two contacts toward each other), device 100 shrinks user interface further (e.g., the zoom scale of user interface region 561 is further decreased) such that an outer edge of user interface region 561 is within touch screen 112. Degree of zoom scale 563 indicates that the zoom scale of user interface region 561 has decreased below minimum zoom threshold $Z_{min}$ In some embodiments, the zoom scale of user interface region 561 is decreased temporarily below minimum zoom threshold $Z_{min}$ in response to the continuation of user input 565.

FIG. 5II illustrates a transition of user interface 560 from user interface 560 in FIG. 5HH. In particular, FIG. 5II illustrates user interface 560 in response to ceasing to detect user input 565 (e.g., in response to liftoff of the two contacts of the pinch gesture). While FIG. 5HH illustrates that the zoom scale of user interface region 561 is temporarily decreased below minimum zoom threshold $Z_{min}$, in response to user input 565, FIG. 5II illustrates that, in response to ceasing to detect user input 565, the zoom scale of user interface region 561 is restored to $Z_{min}$, as indicated by degree of zoom scale 563.

FIGS. 5JJ-5SS illustrate example user interfaces for generating tactile outputs with respect to operations for picking up, dragging, and dropping user interface objects, in accordance with some embodiments.

FIGS. 5JJ-5KK illustrate an example list user interface for generating tactile outputs with respect to rearranging list elements in the list, in accordance with some embodiments. The rearrangement is performed due to movement of a list element in accordance with movement of a user input (e.g., a drag gesture that includes an initial contact followed by movement of the contact). In FIG. 5JJ, user interface 570a includes an example clock interface for editing a list of clocks for displaying local times associated with a plurality of cities (e.g., based on time zones associated with the cities "Cupertino," "New York," "Tokyo," and "Melbourne"). User interface 570a includes a plurality of predetermined snap positions that correspond to a plurality of positions for displaying list elements. As shown in FIG. 5JJ, the list elements (e.g., clocks) are displayed in respective predetermined snap positions, including list element 572, labeled "Tokyo," and list element 573, labeled "New York." FIG. 5JJ also illustrates a user input 571 detected at a location on touch screen 112 that corresponds to list element 572 (e.g., corresponding to a reordering affordance located near the right edge of list element 572).

FIG. 5KK illustrates a series of transitions of user interface 570a from user interface 570a in FIG. 5JJ. The series of transitions of user interface 570a includes user interfaces 570b, 570c, 570d, and 570e corresponding to first, second, third, and fourth portions of user input 571, respectively. In FIG. 5KK, time $T=t_0$ corresponds to user interface 570a as shown in and described above with reference to FIG. 5JJ. At time $T=t_1$, user interface 570b illustrates that list element 572 is selected in response to the first portion of user input 571 (e.g., an initial contact or a long press gesture). Device 100 visually indicates that list element 572 is selected (e.g., by highlighting and/or enlarging selected list element 572). Optionally, in some embodiments, in response to the first portion of user input 571 selecting list element 572, device 100 generates tactile output 574b (e.g., MicroTap High (270 Hz) with a gain of 1.0) to indicate that list element 572 has been selected.

In some embodiments, while list element 572 is selected, the second portion of user input 571 is detected. For example, the second portion of user input 571 includes continued contact followed by upward movement of the contact (e.g., upward movement following the initial contact or long press gesture). At time $T=t_2$, user interface 570c illustrates that, in accordance with upward movement of user input 571 during the second portion of user input 571, selected list element 572 is moved upwards. For example, selected list element 572 moves upward towards a position of unselected list element 573 (e.g., "New York"). Accordingly, selected list element 572 is displayed over at least a portion of unselected list element 573.

At time $T=t_3$, user interface 570d illustrates continued upward movement of user input 571, detected during the third portion of user input 571, from the position of user input 571 as shown in user interface 570c corresponding to time $T=t_2$. In accordance with the continued upward movement of user input 571, selected list element 572 moves into a predetermined snap position corresponding to the previous position of unselected list element 573 (e.g., as shown in user interface 570c). In some embodiments, the predetermined snap position corresponding to the previous position of selected list element 572 (e.g., as shown in user interface 570a) becomes vacant. In accordance with selected list element 572 moving into the predetermined snap position corresponding to the previous position of unselected list element 573, unselected list element 573 moves downward into the predetermined snap position corresponding to the previous position of selected list element 572 (e.g., unselected list element 573 and selected list element 572 are displayed as having switched positions). In some embodiments, in conjunction with selected list element 572 moving into the predetermined snap position previously corresponding to unselected list element 573, device 100 generates tactile output 574d (e.g., MicroTap High (270 Hz) with a gain of 1.0).

At time $T=t_4$, device 100 has ceased to detect user input 571 (e.g., device 100 has detected the fourth portion of user input 571, the fourth portion of user input 571 including liftoff of the contact) while selected list element 572 is at the predetermined snap position as shown in user interface 570d corresponding to time $T=t_3$. Accordingly, list element 572 settles into and is displayed (e.g., as an unselected list element) in the position previously occupied by list element 573, while list element 573 is displayed in the position previously occupied by list element 572 (e.g., as shown in user interface 570a). Optionally, in some embodiments, in response to list element 572 settling into the list of clocks, device 100 generates tactile output 574e (e.g., MicroTap High (270 Hz) with a gain of 0.6) to indicate that list element 572 has been dropped.

FIGS. 5LL-5QQ illustrate an example calendar user interface for generating tactile outputs with respect to moving calendar objects, in accordance with some embodiments.

FIG. 5LL illustrates that user interface 575 includes two existing calendar objects corresponding to existing calendar entries (e.g., "Have Lunch" and "Go to Gym"). Calendar object 576, labeled "Go to Gym" is initially scheduled for Wednesday, September 3 at 11:15 AM. In some embodiments, user interface 575 is generated by using a UITableView class described in Appendix B.

FIG. 5MM illustrates a transition of user interface 575 from user interface 575 in FIG. 5LL. In particular, FIG. 5MM illustrates a first portion of user input 577 (e.g., a long press gesture) detected at a location on touch screen 112 that corresponds to calendar object 576. In response to the first portion of user input 577, calendar object 576 is selected (e.g., picked up). In some embodiments, a visual indication is displayed to indicate that a calendar object has been selected, such that the calendar object appears to be lifted from the surface of a user interface in the virtual z-direction and/or floating on or above the surface of the user interface. For example, in FIG. 5MM, selected calendar object 576b is displayed in place of calendar object 576 (as in FIG. 5LL). Selected calendar object 576b is displayed with two handles. In addition, a color of selected calendar object 576b is darkened (e.g., with respect to calendar object 576, FIG. 5LL), and a shadow is displayed such that calendar object 576b appears to be lifted from the surface of user interface 575 (e.g., calendar object 576b appears to be casting a shadow onto user interface 575). In some embodiments, in conjunction with visually indicating the selection of calendar object 576 (e.g., by displaying selected calendar object 576b), device 100 generates tactile output 578 (e.g., MicroTap High (270 Hz) with a gain of 1.0).

FIG. 5NN illustrates a transition of user interface 575 from user interface 575 in FIG. 5MM. In particular, FIG. 5NN illustrates a second portion of user input 577 that includes lateral movement of user input 577 (e.g., from the position of user input 577 as illustrated in FIG. 5MM) toward a right edge of touch screen 112. In response to the lateral movement of the second portion of user input 577, selected calendar object 576b is dragged toward the right edge of touch screen 112 in user interface 575. In some embodiments, while selected calendar object 576b is dragged by movement of user input 577, calendar object 576 is displayed (e.g., a ghost image of the moving object that indicates an existing or pre-movement position of the moving object, in some embodiments having the same appearance as unselected objects, such as the unselected object "Have Lunch"). In some embodiments, while selected calendar object 576b is dragged, selected calendar object 576b snaps to one or more respective snap positions (e.g., corresponding to respective days or hours) when selected calendar object 576b approaches respective snap positions.

FIG. 5OO illustrates a transition of user interface 575 from user interface 575 in FIG. 5NN, in response to a third portion of user input 577 that includes further movement of user input 577 (e.g., movement of continued contact corresponding to selected calendar object 576b) toward the right edge of touch screen 112. In some embodiments, movement of user input 577 to a boundary (e.g., an edge) of the displayed calendar interface, or to within a predetermined distance from a boundary of the displayed calendar interface, triggers updating the calendar interface in accordance with the movement of user input 577. For example, in accordance with movement of user input 577 to a boundary of the displayed calendar interface, or to within a predetermined distance from the boundary of the displayed calendar interface, an additional portion of the calendar interface that corresponds to (e.g., is adjacent to) the boundary is displayed. In some embodiments, in conjunction with an additional portion of the calendar interface being displayed, a portion of the calendar interface opposite the boundary is no longer displayed (e.g., a displayed date range or a displayed time range of the calendar interface is shifted forward or backward by at least one date or time interval). For example, in FIG. 5OO, in accordance with the further movement of user input 577 toward the right edge of touch screen 112, user input 577 moves within a predetermined distance from a right edge of user interface 575 that corresponds to a date boundary for Saturday, September 6 (e.g., a date boundary between Saturday, September 6 and Sunday, September 7, not visible in user interface 575 in FIG. 5OO).

In response to the further movement of the third portion of user input 577 as illustrated in FIG. 5OO, FIG. 5PP illustrates a transition of user interface 575 from user interface 575 in FIG. 5OO. In particular, FIG. 5PP illustrates that, in response to user input 577, a date range displayed in user interface 575 is shifted forward in time by one day (e.g., user interface 575 is updated to include display of Sunday, September 7 in the rightmost date column and to exclude display of Sunday, August 31 in the leftmost date column). In some embodiments, a position of selected calendar object 576b is maintained while the date range is shifted forward (e.g., selected calendar object 576b appears to float above the surface of user interface 575 while the date range appears to slide forward underneath selected calendar object 576b). For example, the position of selected calendar object 576b is maintained in the leftmost date column while user interface 575 is updated from displaying Saturday, September 6 in the leftmost date column (FIG. 5OO) to displaying Sunday, September 7 in the leftmost date column, as shown in FIG. 5PP. Accordingly, selected calendar object 576b snaps to a respective snap position on Sunday, September 7. In some embodiments, in accordance with selected calendar object 576b snapping to the respective snap position, device 100 generates tactile output 578b (e.g., MicroTap High (270 Hz) with a gain of 0.4).

FIG. 5QQ illustrate a transition of user interface 575 from user interface 575 in FIG. 5PP. In particular, FIG. 5QQ illustrates user interface 575 in response to ceasing to detect user input 577 (e.g., in response to detecting a fourth portion of user input 577 that includes liftoff of the contact). In response to ceasing to detect user input 577, device 100 visually indicates deselection of selected calendar object 576b (e.g., corresponding to dropping selected calendar object 576b in the respective position indicated in FIG. 5QQ) by ceasing to display calendar object 576 (e.g., the ghost object) in its previous position (e.g., as shown in FIG. 5PP) and/or changing the appearance of selected calendar object 576b to appear unselected (e.g., by displaying calendar object 576 in place of selected calendar object 576b and ceasing to display selected calendar object 576b) such that calendar object 576 appears to have been moved. In some embodiments, in accordance with selected calendar object 576b being dropped (e.g., calendar object 576 being moved), device 100 generates tactile output 578c (e.g., MicroTap High (270 Hz) with a gain of 0.6).

FIGS. 5RR-5SS illustrate an example user interface for generating tactile outputs with respect to rearranging array elements in an array, in accordance with some embodiments. In FIG. 5RR, user interface 580a includes an example home screen interface for displaying an array of elements (e.g., application icons), including application icon 582, labeled "Maps," and application icon 583, labeled "Stocks." The array of elements includes a plurality of predetermined snap positions that correspond to a plurality of positions for displaying array elements. As shown in FIG. 5RR, user input 581 (e.g., a contact) is detected at a location on touch screen 112 that corresponds to application icon 582 in user interface 580a. In some embodiments, user interface 580a is generated by using a UICollectionView class described in Appendix B.

FIG. 5SS illustrates a series of transitions of user interface 580a from user interface 580a in FIG. 5RR. The series of transitions of user interface 580a includes user interfaces 580b, 580c, 580d, and 580e corresponding to first, second, third, and fourth portions of user input 581, respectively. In FIG. 5SS, time $T=t_0$ corresponds to user interface 580a as shown in and described above with reference to FIG. 5RR. At time $T=t_1$, user interface 580b illustrates that application icon 582 is selected in response to the first portion of user input 581 (e.g., a long press gesture). In some embodiments, device 100 visually indicates that application icon 582 is selected (e.g., by shading application icon 582 and/or enlarging application icon 582). Optionally, in some embodiments, in response to the first portion of user input 581 selecting application icon 582, device 100 generates tactile output 584b (e.g., MicroTap High (270 Hz) with a gain of 1.0), as shown in tactile output graph 584, to indicate that application icon 582 has been selected. In some embodiments, device 100 provides a visual indication that user interface 580b corresponds to an array element rearrangement mode (e.g., by animating one or more application icons, such as by using a shaking animation as indicated at 579) while application icon 582 is selected.

In some embodiments, while application icon 582 is selected, the second portion of user input 581 is detected. For example, the second portion of user input 581 includes continued contact followed by movement of the contact to the left toward "Stocks" application icon 583. At time $T=t_2$, user interface 580c illustrates that, in accordance with the movement of user input 581 during the second portion of user input 581, application icon 582 moves to the left and passes over application icon 583. Accordingly, application icon 582 is displayed over at least a portion of application icon 583.

At time $T=t_3$, user interface 580d illustrates continued movement of user input 581 toward the left. In accordance with the continued movement of user input 581, application icon 582 moves into a predetermined snap position corresponding to the previous position of unselected application icon 583 (e.g., as shown in user interface 580c). In some embodiments, the predetermined snap position corresponding to the previous position of unselected application icon 583 (e.g., as shown in user interface 580a) becomes vacant. Accordingly, in some embodiments, unselected application icon 583 moves to the right into the predetermined snap position vacated by application icon 583. In some embodiments, in conjunction with selected application icon 582 moving into the predetermined snap position previously occupied by unselected application icon 583, device 100 generates tactile output 584d (e.g., MicroTap High (270 Hz) with a gain of 1.0).

At time $T=t_4$, device 100 has ceased to detect user input 581 (e.g., device 100 has detected the fourth portion of user input 581 including liftoff of the contact) while selected application icon 582 is at the predetermined snap position as shown in user interface 580d corresponding to time $T=t_3$. Accordingly, application icon 582 settles into and is displayed (e.g., as an unselected application icon in the array) in the position previously occupied by application icon 583, while application icon 583 is displayed in the position previously occupied by application icon 582 (e.g., application icon 582 and application icon 583 are displayed in switched positions). Optionally, in some embodiments, in response to application icon 582 setting into the array, device 100 generates tactile output 584e (e.g., MicroTap High (270 Hz) with a gain of 0.6) to indicate that application icon 582 has been dropped.

FIGS. 5TT-5UU illustrate a tactile output that varies based on a characteristic intensity of a user input. FIG. 5TT illustrates user interface 590a that includes an example user interface of a list of e-mail summary items in an e-mail application (e.g., e-mail client module 140, FIGS. 1A and 3) and a first portion of user input 591 (e.g., a contact) detected at a location on touch screen 112 corresponding to e-mail 592 in the list of e-mail summary items. A characteristic intensity of the contact is above a detection threshold intensity IT0 and below a hint threshold intensity ITH, as indicated by intensity meter 596. In response to detecting user input 591, device 100 displays a visual indication (e.g., highlighting) to indicate that e-mail 592 is selected.

FIG. 5UU illustrates a series of transitions of user interface 590a from user interface 590a in FIG. 5TT. The series of transitions of user interface 590a include user interfaces 590b, 590c, and 590d corresponding to increases in a characteristic intensity of user input 591. In FIG. 5UU, user interface 590a as shown in and described above with reference to FIG. 5TT is displayed at time $T=t_0$. At time $T=t_1$, the characteristic intensity of user input 591 has increased to hint threshold intensity $IT_H$. Accordingly, device 100 displays a hint state of e-mail 592, as shown in user interface 590b. In some embodiments, the characteristic intensity of user input 591 continues to increase between $t_1$ and $t_2$ toward light press threshold intensity $IT_L$. In some embodiments, as the characteristic intensity of user input 591 approaches light press threshold intensity $IT_L$, device 100 generates tactile output 594a (e.g., as a tactile indication of the detected increase in the characteristic intensity of user input 591). In some embodiments, as the characteristic intensity of user input 591 increases toward light press threshold intensity $IT_L$, device 100 gradually increases a characteristic of tactile output 594a (e.g., an amplitude of tactile output 594a increases from zero) as shown in tactile output graph 594. In some embodiments, device 100 gradually increases the characteristic of tactile output 594a as the characteristic intensity of user input 591 increases from zero. In some embodiments, device 100 gradually increases the characteristic of tactile output 594a as the characteristic intensity of user input 591 increases from hint threshold intensity $IT_H$ (e.g., as shown in tactile output graph 594).

At time $T=t_2$, the characteristic intensity of user input 591 crosses light press threshold intensity $IT_L$. In accordance with the characteristic intensity of user input 591 crossing light press threshold intensity $IT_L$, user interface 590c illustrates display of a preview of information corresponding to e-mail 592 (e.g., a short preview of content of e-mail 592). In some embodiments, device 100 generates tactile output 594b (e.g., a discrete tap, such as a MicroTap Custom (200 Hz) with a gain of 1.0) when the characteristic intensity of user input 591 reaches light press threshold intensity $IT_L$.

In some embodiments, the characteristic intensity of user input 591 continues to increase between $t_2$ and $t_3$ toward deep press threshold intensity $IT_D$. In some embodiments, as the characteristic intensity of user input 591 approaches deep press threshold intensity, device 100 generates tactile output 594c (e.g., as a tactile indication of the detected increase in the characteristic intensity of user input 591. In some embodiments, device 100 gradually increases a characteristic of tactile output 594*c* (e.g., an amplitude of tactile output 594*c* increases from zero) as shown in tactile output graph 594.

At time T=$t_3$, the characteristic intensity of user input 591 crosses deep press threshold intensity $IT_D$. In accordance with the characteristic intensity of user input 591 crossing deep press threshold intensity $IT_D$, user interface 590*d* illustrates display of e-mail 592 (e.g., the preview of content of e-mail 592 expands to a full screen display of e-mail 592). In some embodiments, device 100 generates tactile output 594*d* (e.g., a discrete tap, such as a FullTap Custom (150 Hz) with a gain of 1.0) when the characteristic intensity of user input 591 reaches deep press threshold $IT_D$.

FIGS. 5VV-5YY illustrate example user interfaces and timing diagrams for displaying user interface changes and generating tactile outputs corresponding to user interface events.

FIG. 5VV illustrates an example user interface and timing diagram for displaying one or more user interface changes and generating a tactile output corresponding to a user interface event in response to a user input (e.g., in response to direct manipulation of the user interface by a touch input). In some embodiments, display of the one or more user interface changes is initiated immediately in response to the user input. For example, in FIG. 5VV, user interface 570*c* is a user interface of a list of clocks as described above with reference to FIGS. 5JJ-5KK. In accordance with upward movement of user input 571 detected at time to, device 100 initiates display of changes to user interface 570*c* including movement of selected list element 572 upward into the position previously occupied by unselected list element 573, and movement of unselected list element 573 is downward into the position previously occupied by selected list element 572. In addition, in accordance with the upward movement of user input 571 detected at time to, device 100 initiates generation of tactile output 574*d* corresponding to selected list element 572 moving into a predetermined snap position (e.g., corresponding to the previous position of unselected list element 573), as shown in tactile output graph 574-2. In some embodiments, the one or more changes to user interface 570*c* are displayed at time T=$t_1$ as user interface 570*d*, after a first time interval $\Delta T_1$ (from $t_0$ to $t_1$) has passed. In some embodiments, generation of tactile output 574*d* occurs at time T=$t_2$, after a second time interval $\Delta T_2$ (from $t_0$ to $t_2$) associated with generation of tactile outputs has elapsed. In some embodiments, the second time interval $\Delta T_2$ (e.g., 50-200 ms) is longer than the first time interval $\Delta T_1$ (e.g., 5 ms). In some embodiments, generation of tactile outputs is associated with a longer latency than a latency associated with displaying changes to the user interface.

In some embodiments, display of one or more user interface changes associated with a user interface event (e.g., a user interface event that is independent of direct manipulation of the user interface in response to a touch input) is delayed such that the one or more user interface changes is displayed concurrently with generation of a tactile output corresponding to the user interface event.

For example, FIG. 5WW illustrates display of user interface changes and generation of a tactile output in accordance with a user interface event that is not in response to a user input (e.g., a user interface event that is an alert or other notification that is independent of or not in response to direct manipulation of the user interface in response to touch input). At time T=$t_0$, user interface 5100*a* includes a user interface for composing an e-mail message. Text 5101 represents a previously (e.g., most recently) entered portion of text in user interface 5100*a*. At time T=$t_1$, movement of device 100 is detected. In some embodiments, the movement of device 100 meets predefined input pattern criteria (e.g., a pattern of shaking the device back and forth) corresponding to a user interface event that includes undoing a previously performed operation (e.g., removing a portion of previously entered text). As illustrated in FIG. 5WW, the movement of device 100, detected at time $t_1$, corresponds to a user interface event to remove previously entered text 5101 (e.g., by displaying undo prompt interface 5100*b*) and to generate tactile output 5102. In response to detecting the movement of device 100 at time $t_1$, device 100 initiates, at time $t_1$, generation of tactile output 5102. In conjunction, in some embodiments, device 100 delays initiating display of the one or more changes to user interface 5100*a* by delay time interval $T_{delay}$ (e.g., device 100 initiates displaying undo prompt interface 5100*b* at time $t_2$, after delay time interval $T_{delay}$ has elapsed). In some embodiments, generation of tactile output 5102 occurs at time $t_3$ after delay time interval $\Delta T_2$ associated with generation of tactile outputs has elapsed. Accordingly, in some embodiments, display of the one or more changes to user interface 5100*a* (e.g., display of undo prompt interface 5100*b*) is synchronized with generation of tactile output 5102 (e.g., at time $t_3$).

In another example, FIG. 5XX illustrates display of user interface changes and generation of a tactile output in accordance with a user interface event that includes a notification that is independent of direct manipulation of the user interface in response to touch input. At time T=$t_0$, user interface 5105 includes a user interface of a lock screen of device 100. At time T=$t_1$, input 5106 (e.g., a notification of a received calendar event invitation) is received (e.g., from an information source external to device 100). In response to receiving input 5106 at time $t_1$, device 100 initiates, at time $t_1$, generation of tactile output 5107. In conjunction, device 100 delays initiating display of changes to user interface 5105 (e.g., display of calendar event invitation affordance 5108 on user interface 5105) by delay time interval $T_{delay}$ (e.g., device 100 initiates displaying calendar event invitation affordance 5108 at time $t_2$, after delay time interval $T_{delay}$ has elapsed). In some embodiments, generation of tactile output 5107 occurs at time $t_3$ after delay time interval $\Delta T_2$ associated with generation of tactile outputs has elapsed. Accordingly, in some embodiments, display of the one or more changes to user interface 5105 (e.g., display of calendar event invitation affordance 5108) is synchronized with generation of tactile output 5107 (e.g., at time $t_3$).

In yet another example, FIG. 5YY illustrates display of user interface changes and generation of a tactile output in accordance with a user interface event that includes a notification initiated in accordance with completion of a transaction initiated by a user. At time T=$t_0$, user interface 5110*a* includes a user interface prompting a user to provide authentication (e.g., a finger contact on a fingerprint sensor, illustrated as user input 5111) to complete a transaction. At time T=$t_1$, device 100 receives an input 5112 that includes authentication for completion of the transaction. In response to receiving input 5112 at time $t_1$, device 100 initiates, at time $t_1$, generation of tactile output 5113. In conjunction, device 100 delays initiating display of changes to user interface 5110*a* (e.g., displaying user interface 5110*b* confirming completion of the transaction) by delay time interval $T_{delay}$ (e.g., device 100 initiates displaying user interface 5110*b* at time $t_2$, after delay time interval $T_{delay}$ has elapsed). In some embodiments, generation of tactile output 5113 occurs at time $t_3$ after delay time interval $\Delta T_2$ associated with generation of tactile outputs has elapsed. Accordingly, in some embodiments, display of the one or more changes to user interface 5110a (e.g., display of user interface 5110b) is synchronized with generation of tactile output 5113 (e.g., at time t₃).

FIG. 5ZZ illustrates timing diagrams for generating tactile outputs based on states of tactile output generators, in accordance with some embodiments. In some embodiments, one or more tactile output triggers are received by tactile output controller 5120 (e.g., haptic feedback controller 161, FIG. 1A). In some embodiments, in response to the tactile output triggers, tactile output controller 5120 transmits control signals to one or more tactile output generators 5121 (e.g., tactile output generator(s) 167, FIG. 1A). In response to the control signals, tactile output generator 5121 generates tactile outputs.

In some embodiments, in accordance with latency associated with generating tactile outputs, tactile output generator 5121 generates tactile outputs after a period of time after a tactile output trigger is received. The period of time between receipt of a tactile output trigger and generation of a corresponding tactile output varies in accordance with a state of tactile output generator 5121. For example, as illustrated in FIG. 5ZZ, if a tactile output trigger is received while tactile output generator 5121 is in an inactive state, a tactile output is generated after a time period $\Delta T_A$ (e.g., 200 ms) after the tactile output trigger is received. In some embodiments, if a tactile output trigger is received while tactile output generator 5121 is in a low-latency state (e.g., a pre-warm state or an active state), a tactile output is generated after a time period that is less than $\Delta T_A$. For example, FIG. 5ZZ illustrates that if a tactile output trigger is received while tactile output generator 5121 is in a pre-warmed state, a tactile output is generated after a time period $\Delta T_B$ (e.g., 100-150 ms) after the tactile output trigger is received. In some embodiments, if a tactile output trigger is received while tactile output generator 5121 is in an active state, a tactile output is generated after a time period $\Delta T_C$ (e.g., 50 ms) after the tactile output trigger is received. In some embodiments, the time period associated with the active state is less than the time period associated with the pre-warm state.

FIGS. 5AAA-5CCC illustrate example user interfaces and timing for generating tactile outputs in accordance with user interface events for different types of user interface events (e.g., success, failure, and warning events).

FIG. 5AAA illustrates an example of one or more tactile outputs generated for success events. FIG. 5AAA includes user interface 5130 for entering authentication credentials for connecting to a wireless network (e.g., "HomeWireless"), displayed at time T=t₀. At time T=t₁, in accordance with a determination that authentication of the password entered in user interface 5130 was successful, user interface 5131 is displayed (e.g., indicating successful connection to the requested wireless network "HomeWireless") and tactile output 5132 corresponding to a success event is generated (e.g., FullTap Medium (200 Hz) with a gain of 0.7 followed by a MiniTap High (270 Hz) with a gain of 1.0).

FIG. 5BBB illustrates an example of one or more tactile outputs generated for failure events. FIG. 5BBB includes user interface 5130 for entering authentication credentials for connecting to a wireless network (e.g., "HomeWireless"), displayed at time T=t₀. At time T=t₁, in accordance with a determination that authentication of the password entered in user interface 5130 failed, user interface 5133 is displayed (e.g., indicating that an incorrect password was entered for the requested wireless network "HomeWireless") and tactile output 5134 corresponding to a failure event is generated (e.g., MiniTap High (270 Hz) with a gain of 0.75-0.85, followed by a FullTap Medium (200 Hz) with a gain of 0.65, followed by a FullTap Low (150 Hz) with a gain of 0.75).

FIG. 5CCC illustrates an example of one or more tactile outputs generated for warning events. FIG. 5CCC includes user interface 5135 for composing an e-mail message, as described above with reference to FIG. 5WW. At time T=t₀, movement of device 100 is detected (e.g., a pattern of shaking the device back and forth corresponding to a request to undo a previous operation). At time T=t₁, in accordance with the request to undo the previous operation, undo prompt interface 5100b is displayed, as described above with reference to FIG. 5WW, and tactile output 5135 corresponding to a warning event is generated (e.g., FullTap High (300 Hz) with a gain of 0.9 followed by a FullTap Custom (270 Hz) with a gain of 0.9).

FIGS. 5DDD-5GGG illustrate an example user interface for generating tactile outputs in accordance with magnitudes of operations performed in the user interface in response to user input, in accordance with some embodiments. In particular, FIGS. 5DDD-5GGG illustrate tactile outputs generated during variable rate scrubbing, in accordance with movement of a user input across boundaries.

FIG. 5DDD illustrates user interface 5140 for a media content player that includes slider control 5141, including adjustable progress indicator 5142 that indicates a current position in the content being played on the device. In some embodiments, user interface 5140 includes a plurality of other media content player controls for controlling playback of content in the media content player. FIG. 5DDD illustrates user input 5143, initially detected at a location on touch screen 112 that corresponds to an initial position of progress indicator 5142 in slider control 5141. FIG. 5DDD also illustrates movement of user input 5143 away from its initial location (e.g., user input 5143 includes a drag gesture that includes an initial contact followed by movement of the contact) corresponding to slider control 5141. In some embodiments, boundaries 5144, 5145, and 5146 separate areas of user interface 5140 that correspond to different scrubbing rates for adjusting the position of progress indicator 5142 in slider control 5141. In some embodiments, boundaries 5144, 5145, and 5146 are not typically displayed to a user. In some embodiments, while user input 5143 is above boundary 5144, the position of progress indicator 5142 in slider control 5141 moves by the same amount as a horizontal component of movement of user input 5143 on touch screen 112 that includes movement parallel to the slider control (sometimes referred to as "full-speed scrubbing"). In some embodiments, while user input 5143 is between boundary 5144 and boundary 5145, the position of progress indicator 5142 in slider control 5141 moves by an amount that is a fraction (e.g., one-half or equivalently 50%) of the horizontal component of movement of user input 5143 on touch screen 112 that is parallel to slider control 5141 (sometimes referred to as "half-speed scrubbing"). In some embodiments, while user input 5143 is between boundary 5145 and boundary 5146, the position of progress indicator 5142 in slider control 5141 moves by an amount that is a smaller fraction (e.g., one-quarter or equivalently 25%) of the horizontal component of movement of user input 5143 on touch screen 112 that is parallel to slider control 5141 (sometimes referred to as "quarter-speed scrubbing"). In some embodiments, while user input 5143 is below boundary 5146, the position of progress indicator 5142 in slider control 5141 moves by an amount that is an even smaller fraction (e.g., one-eighth or equivalently 12.5%) of the horizontal component of movement of user input 5143 on touch screen 112 that is parallel to slider control 5141 (sometimes referred to as "fine-speed scrubbing"). It is noted that the fractional scrubbing rates used here (50%, 25%, and 12.5%) are merely examples, and that different scrubbing rates that progressively decrease as vertical distance between a user input and slider control 5141 increases may also be used.

In some embodiments, device 100 generates tactile outputs in accordance with user input 5143 crossing respective boundaries. In some embodiments, the tactile outputs are generated in accordance with a characteristic of user input 5143 that corresponds to an operation in user interface 5140. For example, the tactile outputs are generated in accordance with a velocity of user input 5143 when crossing a respective boundary that corresponds to a change in a scrubbing rate. In some embodiments, a stronger tactile output is generated when user input 5143 crosses a respective boundary with a high velocity. In some embodiments, a lighter tactile output is generated when user input 5143 crosses a respective boundary with a low velocity.

FIG. 5EEE illustrates movement of user input 5143 downward and toward the right with respect to its initial position (e.g., as shown in FIG. 5DDD), away from slider control 5141 and crossing boundary 5144. In accordance with user input 5143 crossing boundary 5144, device 100 generates tactile output 5148. In accordance with a velocity of the movement of user input 5143 being above a moderate velocity threshold $V_M$ and below a high velocity threshold $V_H$, as indicated by velocity of contact meter 5147, tactile output 5148 is generated as a moderate tactile output (e.g., MicroTap Medium (150 Hz) with a gain of 0.4).

FIG. 5FFF illustrates further movement of user input 5143 downward and toward the right with respect to its position as shown in FIG. 5EEE, further away from slider control 5141 and crossing boundary 5145. In accordance with user input 5143 crossing boundary 5145, device 100 generates tactile output 5149. In accordance with the velocity of the movement of user input 5143 being above a high velocity threshold $V_F$, as indicated by velocity of contact meter 5147, tactile output 5149 is generated as a strong tactile output (e.g., MicroTap Medium (150 Hz) with a gain of 0.7).

FIG. 5GGG illustrates even further movement of user input 5143 downward and toward the right with respect to its position as shown in FIG. 5FFF, further away from slider control 5141 and crossing boundary 5146. In accordance with user input 5143 crossing boundary 5146, device 100 generates tactile output 5150. In accordance with the velocity of the movement of user input 5143 being below the moderate velocity threshold $V_M$ and above a movement detection threshold $V_0$ (e.g., zero velocity), as indicated by velocity of contact meter 5147, tactile output 5150 is generated as a light tactile output (e.g., MicroTap Medium (150 Hz) with a gain of 0.1).

FIGS. 5HHH-5III illustrate timing diagrams for generating tactile outputs in accordance with detecting a continuous user interaction and in accordance with a state of one or more tactile output generates used to generate the tactile outputs. In particular, FIG. 5HHH illustrates slider 5160 having a position indicator 5161 in an initial position at time $T=t_0$. A tactile output generator for generating one or more tactile outputs in accordance with position indicator 5161 of slider 5160 crossing a respective marker on slider 5160 is initially in a low-power state, as shown in generator state graph 5164. In accordance with a first portion of a user interaction that moves position indicator 5161 to the position shown at time $T=t_1$, position indicator 5161 approaches but does not cross marker 5162. The tactile output generator remains in the low-power state (e.g., the state of the tactile output generator is maintained or not changed). At time $T=t_2$, in accordance with a second portion of the user interaction, position indicator 5161 crosses marker 5162. Accordingly, generation of a tactile output is initiated at time $t_2$, as shown in tactile output graph 5165. In some embodiments, in accordance with latency associated with the low-power state, tactile output 5163 is generated at time $t=t_4$, after time period $\Delta T_A$ (e.g., 200 ms) after the tactile output trigger is received at time $t_2$. As shown in FIG. 5HHH, by time $t_4$ (at which tactile output 5163 is generated), position indicator 5161 has moved past marker 5162 in accordance with continued movement of the user input.

In some embodiments, the state of the tactile output generator is changed in anticipation of generating a tactile output, such as in accordance with movement of a user input that approaches a threshold. For example, FIG. 5III illustrates slider 5160 having a position indicator 5161 in an initial position at time $T=t_0$. A tactile output generator for generating one or more tactile outputs in accordance with position indicator 5161 of slider 5160 crossing a respective marker on slider 5160 is initially in a low-power state, as shown in generator state graph 5166. In accordance with a first portion of a user interaction that moves position indicator 5161 to the position shown at time $T=t_1$, position indicator 5161 approaches but does not cross marker 5162. In some embodiments, in response to position indicator 5161 approaching marker 5162 (e.g., in anticipation of position indicator 5161 crossing marker 5162, for which a tactile output will be generated), the state of the tactile output generator is changed from the low-power state to the low-latency state (or alternatively, in some embodiments, the active state). At time $T=t_2$, in accordance with a second portion of the user interaction, position indicator 5161 crosses marker 5162. Accordingly, generation of a tactile output is initiated at time $t_2$, as shown in tactile output graph 5167. In some embodiments, in accordance with latency associated with the low-latency state, tactile output 5168 is generated at time $t=t_3$, after time period $\Delta T_B$ (e.g., 100-150 ms) after the tactile output trigger is received at time $t_2$. In some embodiments, time period $\Delta T_B$ associated with the low-latency state is less than time period $\Delta T_A$ associated with the low-power state. As shown in FIG. 5III, the time $t_3$ at which tactile output 5168 is generated occurs before time $t_4$ at which tactile output 5163 is generated as shown in FIG. 5HHH. In some embodiments, in accordance with changing the state of the tactile output generator, tactile outputs are generated with lower latency. In addition, in FIG. 5III, position indicator 5161 has moved past marker 5162 in accordance with continued movement of the user input to a lesser extent than in FIG. 5HHH.

FIG. 5JJJ illustrates generation of a sequence of tactile outputs by an electronic device (e.g., portable multifunction device 100, FIG. 1A) while enforcing a minimum time between repeated tactile outputs, in accordance with some embodiments. Tactile output graph 5170*a* illustrates triggers for tactile outputs and generated tactile outputs associated with a first type of tactile output. Tactile output graph 5170*b* illustrates triggers for tactile outputs and generated tactile outputs associated with a second type of tactile output. At time $t_1$, generation of a tactile output of the first type is triggered (e.g., the device generates the trigger, or the device receives a trigger from an external source), as shown in tactile output graph 5170*a*. In response, the device generates tactile output 5171 at a point in time following the trigger at $t_1$ and before a subsequent trigger at $t_2$. At time $t_2$, a second instance of the first type of tactile output is triggered. In some embodiments, the device determines that anticipated generation of a tactile output in response to the trigger at $t_2$ is within a predetermined time from generation of tactile output 5171 (e.g., a most recent instance of the first type of tactile output that was generated). Accordingly, the device forgoes generation of the tactile output in response to the trigger at $t_2$.

Similarly, at time $t_3$, a third instance of the first type of tactile output is triggered, as shown in tactile output graph 5170a. In response, the device generates tactile output 5172 at a point in time following the trigger at $t_3$ and before a subsequent trigger at $t_4$ (e.g., in accordance with a determination that most recently generated tactile output 5171 of the first type of tactile output is at least the predetermined time from anticipated generation of tactile output 5172). At time $t_4$, a fourth instance of the first type of tactile output is triggered, as shown in tactile output graph 5170a. In addition, at time $t_4$, a first instance of a second type of tactile output is triggered, as shown in tactile output graph 5170b. In some embodiments, the device determines that anticipated generation of a tactile output of the first type in response to the trigger at $t_4$ is within the predetermined time from generation of tactile output 5172 (e.g., the most recent instance of the first type of tactile output that was generated, determined with respect to the trigger for the first type of tactile output at $t_4$). Accordingly, the device forgoes generation of the tactile output in response to the trigger for the first type of tactile output at $t_4$. In some embodiments, the device generates tactile output 5176 in response to the trigger for the second type of tactile output at $t_4$ (e.g., without regard to timing of tactile outputs of the first type). In some embodiments, the device generates tactile output 5176 in accordance with a determination that generation of tactile output 5176 will be at least a predetermined time from generation of a most recent instance of the second type of tactile output.

At time $t_5$, a fifth instance of the first type of tactile output is triggered, as shown in tactile output graph 5170a. In response, the device generates tactile output 5173 at a point in time following the trigger at $t_5$ and before a subsequent trigger at $t_6$ (e.g., in accordance with a determination that most recently generated tactile output 5172 of the first type of tactile output is at least the predetermined time from anticipated generation of tactile output 5173). At time $t_6$, a sixth instance of the first type of tactile output is triggered, as shown in tactile output graph 5170a. In some embodiments, the device determines that anticipated generation of a tactile output in response to the trigger at $t_6$ will be at least the predetermined time from generation of tactile output 5173 (e.g., the most recent instance of the first type of tactile output that was generated). Accordingly, the device generates tactile output 5174 in response to the trigger at $t_6$. Subsequently, at time $t_7$, a seventh instance of the first type of tactile output is triggered. In some embodiments, the device determines that anticipated generation of a tactile output in response to the trigger at $t_7$ is within a predetermined time from generation of tactile output 5174 (e.g., a most recent instance of the first type of tactile output that was generated). Accordingly, the device forgoes generation of the tactile output in response to the trigger at $t_7$.

At time $t_8$, an eighth instance of the first type of tactile output is triggered, as shown in tactile output graph 5170a. In addition, at time $t_8$, a second instance of the second type of tactile output is triggered, as shown in tactile output graph 5170b. In some embodiments, the device determines that anticipated generation of a tactile output of the first type in response to the trigger at $t_8$ is at least the predetermined time from generation of tactile output 5174 (e.g., the most recent instance of the first type of tactile output that was generated, determined with respect to the trigger for the first type of tactile output at $t_8$). Accordingly, the device generates tactile output 5175 in response to the trigger for the first type of tactile output at $t_8$. In addition, the device generates tactile output 5177 in response to the trigger for the second type of tactile output at $t_8$ (e.g., without regard to timing of tactile outputs of the first type). In some embodiments, the device generates tactile output 5177 in accordance with a determination that anticipated generation of tactile output 5177 is at least a predetermined time from generation of a most recent instance of the second type of tactile output (e.g., tactile output 5176).

FIG. 5KKK illustrates a conceptual flow diagram of method 5180 for controlling a state of one or more tactile output generators (e.g., tactile output generator(s) 167, FIG. 1A). In some embodiments, method 5180 is performed by an application-independent module of an electronic device (e.g., portable multifunction device 100, FIG. 1A).

In some embodiments, the application-independent module waits (5182) for input from an application-specific module (e.g., a trigger for generating a tactile output, such as a user input that is associated with a tactile output). In some embodiments, while the application-independent module is waiting for input, the tactile output generators are in an inactive state.

In some embodiments, the application-independent module receives (5184) an input from the application-specific module. In response to receiving the input from the application-specific module, the application-independent module determines (5186) whether to prepare one or more tactile output generators for generating tactile outputs (e.g., whether the input meets tactile output generation criteria).

In accordance with a determination that one or more tactile output generators should not be prepared (5186—No), the application-independent module returns to the wait state (5182) to wait for an additional input, and the tactile output generators are maintained in the inactive state.

In accordance with a determination that the one or more tactile output generators should be prepared (5186—Yes) (e.g., in anticipation of generating tactile outputs), the application-independent module determines (5188) whether to prepare the tactile output generators by setting the tactile output generators to a pre-warm state (e.g., associated with a lower latency than the inactive state) or an active state (e.g., associated with a lower latency than both the inactive state and the pre-warm state).

In accordance with a determination that the tactile outputs should be set to the pre-warm state (5188—Pre-Warm), the application-independent module prepares the tactile output generators by setting (5190) the tactile output generators to the pre-warm state. In accordance with a determination that the tactile outputs should be set to the active state (5188—Active), the application-independent module prepares the tactile output generators by setting (5192) the tactile output generators to the active state.

Next, in some embodiments, the application-independent module determines (5194) whether to return the tactile output generators from the pre-warm or active state to the inactive state (e.g., whether to exit the respective preparation state). In accordance with a determination to exit the preparation state (5194—Yes) (e.g., the electronic device is in a battery conservation mode of operation, or a predetermined timeout period has elapsed during which no tactile outputs were generated), the application-independent module returns to the wait state (5182). In accordance with a determination not to exit the preparation state (5194—No) (e.g., the predetermined timeout period has not elapsed since preparation of the tactile output generators was requested, or the predetermined time period has not elapsed since generation of a most recent prior tactile output), the application-independent module maintains the respective preparation state of the tactile output generators (e.g., the pre-warm state or the active state).

FIGS. 6A-6D are flow diagrams illustrating method 600 of generating tactile outputs based on user interaction models in accordance with some embodiments. Method 600 is performed at an electronic device (e.g., device 300, FIG. 3, or portable multifunction device 100, FIG. 1A) with a display, one or more input devices (e.g., a touch-sensitive surface, and/or one or more sensors to detect intensity of contacts with the touch-sensitive surface), and one or more tactile output generators. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an enhanced way to provide tactile outputs using an application-independent software module. Providing tactile outputs using application-independent software based on information from application software provides common user interface framework that provides consistent user experience when various software applications are used. Providing a common user interface frame work to the user enhances the usability of such software applications and the device executing such software applications. In turn, this enhances the operability of the device and makes the user-device interface more efficient (e.g., by helping the user to provide proper inputs and reducing user mistakes and/or unintended operations when operating/interacting with the device). In addition, the method reduces the size of software applications and makes execution of such software applications faster. For battery-operated electronic devices, enabling a user to use software applications faster and more efficiently conserves power and increases the time between battery charges.

In some embodiments, the device stores (e.g., in memory) application software (e.g., a first software application, such as application 1 (136-1) in FIG. 1D) and application-independent software (e.g., application-independent software module 260 in FIG. 1D) that is available for use by a plurality of software applications (e.g., the first software application, such as application 1 (136-1), and one or more other software applications, such as application 2 (136-2) in FIG. 1D) on the electronic device (e.g., the electronic device stores the plurality of software applications).

The device displays (602), on the display, a user interface for a first software application (e.g., the user interface for a settings application shown in FIG. 5A). The user interface includes (604) a plurality of elements (e.g., switch object 502, slider object 504 and slider object 506) to which user interaction models from a plurality of user interaction models provided by an application-independent module have been assigned. The plurality of elements includes a first element to which a first user interaction model has been assigned (e.g., slider object 502). The plurality of elements has content provided by an application-specific module for the first software application (e.g., slider object 502 includes speaker icons provided by the settings application).

In some embodiments, the device assigns (606) the first user interaction model to the first element using a predefined application programming interface (API). For example, the device assigns a particular user interaction model to the first element using an API for the application-independent software module.

The first user interaction model defines (608) how the user interface responds to inputs directed to the first element of the user interface. For example, the first user interaction model defines whether or not to generate a tactile output and/or a condition for generating the tactile output. In some embodiments, the first user interaction model also defines how the first element is visually updated in response to a user input (e.g., moving a slider thumb, flipping on or off a switch, etc.).

While displaying the user interface, the device detects (610), via the one or more input devices, an input directed to the first element of the user interface (e.g., input 509 directed to slider thumb 505 in FIG. 5C).

In response to detecting the input (612), the device updates (614) the user interface on the display based on characteristics of the input (e.g., magnitude of movement, direction of movement, start location, stop location, magnitude of intensity, rate of change of intensity). For example, a position of slider thumb 505 changes in response to a change to input 509, as shown in FIG. 5D.

In some embodiments, the device updates (616) the user interface on the display based on characteristics of the input and the first user interaction model.

Also in response to detecting the input (612), and in accordance with a determination that the input meets tactile output criteria specified by the first user interaction model, the device generates (618) a first tactile output corresponding to the input.

In some embodiments, the first element includes (620) a slider object (e.g., UISlider) generated at least in part based on information provided by the application-specific module for the first software application, and the first user interaction model specifies generating tactile outputs (e.g., the first tactile output) in accordance with user manipulation of the slider object with touch inputs.

In some embodiments, the device generates (622) a predefined modulation selection tactile output in response to a touch input that selects a modulation type for the slider object. For example, in FIG. 5B, a predefined tactile output is generated in response to input 503. In another example, a switch object or a list of options is configured to be used to select a modulation type for a slider object (e.g., whether the slider object is a volume slider or a balance slider), and the device generates the predefined modulation selection tactile output in response to a touch input at a location that corresponds to the switch object or the list of options.

In some embodiments, the first user interaction model specifies (624) generating the first tactile output in accordance with a modulation type of the slider object and a parameter of the first software application modulated in accordance with user manipulation of the slider object with touch inputs. For example, as shown in FIGS. 5C-5E, in accordance with a determination that the modulation type of the slider object is a volume slider, a tactile output increases in its magnitude as a volume represented by the slider object increases. In accordance with a determination that the modulation type of the slider object is a balance slider, the balance of a tactile output is adjusted based on a location of the slider thumb as shown in FIGS. 5G-5H.

In some embodiments, the first user interaction model specifies (626) generating a distinct tactile output in accordance with a moveable portion of the slider object reaching an end position (e.g., in FIG. 5F, distinct tactile output 513 is generated in accordance with the slider thumb reaching an end position of the slider).

In some embodiments, the first element includes (628) a switch object (e.g., UISwitch) generated at least in part based on information provided by the application-specific module for the first software application, and the first user interaction model specifies generating the first tactile output when the input corresponds to an action that changes a state of the switch object (e.g., the first input causes the switch to be flipped from a prior state to a new state different from the prior state, such as from off to on or vice versa as shown in FIGS. 5A-5B).

In some embodiments, the first element includes (630) a value selection object (e.g., using a UIPickerView class or a UIDatePicker class described in Appendix B or their instances) generated at least in part based on information provided by the application-specific module for the first software application, and the first user interaction model specifies generating the first tactile output when the input corresponds to an action that changes a value selected using the value selection object. For example, if the value selection object corresponds to a scrollable wheel or list having a sequence of different values, the device generates a sequence of tactile outputs as the first input causes the value selection objection to scroll through the sequence of different values (e.g., the wheel of time shown in FIGS. 5K-5O). In one example, different values in the sequence are date values, for example, values for the year, month, day, hour or minute of a specified date or time.

In some embodiments, the first element includes content that is refreshed (632) in response to a pull down gesture reaching a refresh threshold (e.g., using a UIRefreshControl class described in Appendix B or its instance). The first user interaction model specifies generating a predefined impact tactile output in accordance with a determination that the input corresponds to a pull down gesture reaching the refresh threshold (e.g., content is refreshed in response to a pull down gesture reaching a refresh threshold as shown in FIGS. 5P-5T).

In some embodiments, the first element includes (634) a region or object (e.g., using a UIZoomEdgeFeedbackGenerator class or a UIScrollView class described in Appendix B or their instances), the size of which changes in response to the input comprising a zoom gesture. The first user interaction model specifies generating a predefined size limit tactile output in accordance with a determination that the size of the region or object has reached a predefined limit (e.g., in accordance with a determination that the size of the region or object, or equivalently a zoom scaling factor, has reached a predefined limit). For example, the predefined size limit tactile output is generated in accordance with a determination that the size of the displayed web page has reached a predefined limit in response to a depinch gesture, as shown in FIGS. 5Z-5CC.

In some embodiments, the first element includes (636) a table (e.g., using a UITableView class described in Appendix B or its instance), having cells organized in rows and columns, generated at least in part based on information provided by the application-specific module for the first software application (e.g., a calendar application provides dates and times of interest and/or calendar entries for the calendar view illustrated in FIGS. 5LL-5QQ). The first user interaction model specifies generating the first tactile output when the input moves from any cell in the table to any other cell in the table, or moves from outside the table to a cell inside the table (e.g., an input moves from outside the table to cell 576b inside the table to select cell 576b, as shown in FIGS. 5LL-5MM). In some embodiments, when the first input corresponds to a drag gesture for dragging a content item, the device generates a snapping feedback tactile output when the first input moves an object into a cell in the table and the object "automatically" snaps into place in the cell, where the table is displayed by an application and the application controls or specifies the a snapping action.

In some embodiments, the first element includes (638) a table (e.g., using a UITableView class described in Appendix B or its instance), having cells organized in rows and columns, generated at least in part based on information provided by the application-specific module for the first software application. The first user interaction model specifies generating the first tactile output when two or more rows of the cells are reordered in response to the input. For example, a tactile output is generated when two or more entries in a list are reordered as shown in FIG. 5KK. Similarly, in some embodiments, a tactile output is generated when two or more entries in different rows are reordered in a table (e.g., by moving a calendar entry in a calendar view to another calendar entry in an adjacent row so that the two calendar entries are reordered).

In some embodiments, the input causes (640) the first software application to select an item, in a collection of distinct items (e.g., using a UICollectionView class described in Appendix B or its instance), to be moved to a predefined position within the first element, and the first user interaction model specifies generating the first tactile output in conjunction with the selected item being moved to the predefined position within the first element (e.g., a tactile output is generated when application icon 582 is moved to a predefined position, namely a position for an adjacent application icon 583 as shown in FIG. 5SS). In some embodiments, the first user interaction model specifies generating one or more tactile outputs in conjunction with the selected item moving to the predefined position in accordance with a predefined snapping behavior. For example, the selected item snaps into a place when a drag gesture brings the selected item within a predefined distance of a predefined snap-in-place location (e.g., a grid location in a predefined grid).

In some embodiments, the first user interaction model specifies (642) generating the first tactile output when the input or an object manipulated in accordance with the input approaches a next predefined state (e.g., a force-press gesture), and generating a second tactile output, distinct from the first tactile output, when the input or an object manipulated in accordance with the input reaches the next predefined state (e.g., in FIG. 5UU, the device generates tactile output 594a when the input intensity approaches the intensity threshold $IT_L$, and generates tactile output 594b when the input intensity reaches the intensity threshold $IT_L$). In some embodiments, the first behavior model specifies generating a sequence of distinct tactile outputs as the intensity of the first touch input reaches each of a sequence of intensity thresholds.

In accordance with a determination that the input does not meet the tactile output criteria specified by the first user interaction model, the device forgoes (644) generation of the first tactile output (e.g., as shown in FIG. 5AA, when the size of the region or object, or equivalently a zoom scaling factor, has not reached a predefined limit, the first tactile output, such as tactile output 564 shown in FIG. 5CC, is not generated).

In some embodiments, the plurality of elements includes (646) a second element to which a second user interaction model from the plurality of user interaction models provided by the application-independent module has been assigned. While displaying the user interface, the device detects, via the one or more input devices, a second input directed to the second element of the user interface; and, in response to detecting the second input directed to the second element of the user interface: updates the user interface on the display based on characteristics of the detected second input; in accordance with a determination that the second input meets tactile output criteria specified by the second user interaction model, generates a second tactile output corresponding to the second input (e.g., a tap gesture or a horizontal swipe gesture on switch object 502 flips a state of switch object 502 and initiates generation of the second tactile output indicating that the state of switch object 502 has been flipped); and, in accordance with a determination that the second input does not meet the tactile output criteria specified by the second user interaction model, forgoes generation of the second tactile output (e.g., a vertical swipe gesture on switch object 502 does not flip the state of switch object 502 and the second tactile output is not generated).

It should be understood that the particular order in which the operations in FIGS. 6A-6D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, 1200, 1400, 1600, 1800, and 2000) are also applicable in an analogous manner to method 600 described above with respect to FIGS. 6A-6D. For example, the tactile outputs, slider objects, switch objects, value selection objects, content refreshing operations, zooming operations, scrolling operations, table manipulations, and selecting and moving user interface objects described above with reference to method 600 optionally have one or more of the characteristics of the tactile outputs, slider objects, switch objects, value selection objects, content refreshing operations, zooming operations, scrolling operations, table manipulations, and selecting and moving user interface objects described herein with reference to other methods described herein (e.g., methods 800, 1000, 1200, 1400, 1600, 1800, and 2000). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, in accordance with some embodiments, the device displays, on the display, a user interface for a first software application. The user interface is generated by populating a first user interaction template from a plurality of user interaction templates provided by an application-independent module with content provided by an application-specific module for the first software application. The first user interaction template defines how the user interface responds to inputs directed to the user interface. While displaying the user interface, the device detects, via the one or more input devices, an input directed to the user interface. In response to detecting the input, the device updates the user interface on the display based on characteristics of the detected input (e.g., magnitude of movement, direction of movement, start location, stop location, magnitude of intensity, rate of change of intensity) and the first user interaction template; in accordance with a determination that the input meets tactile output criteria specified by the first user interaction template, generates a first tactile output corresponding to the input; and, in accordance with a determination that the input does not meet the tactile output criteria specified by the first user interaction template, forgoes generation of the first tactile output.

The operations in the information processing methods described above are, optionally implemented by running one or more functional modules in information processing apparatus such as general purpose processors (e.g., as described above with respect to FIGS. 1A and 3) or application specific chips.

Figure 7:
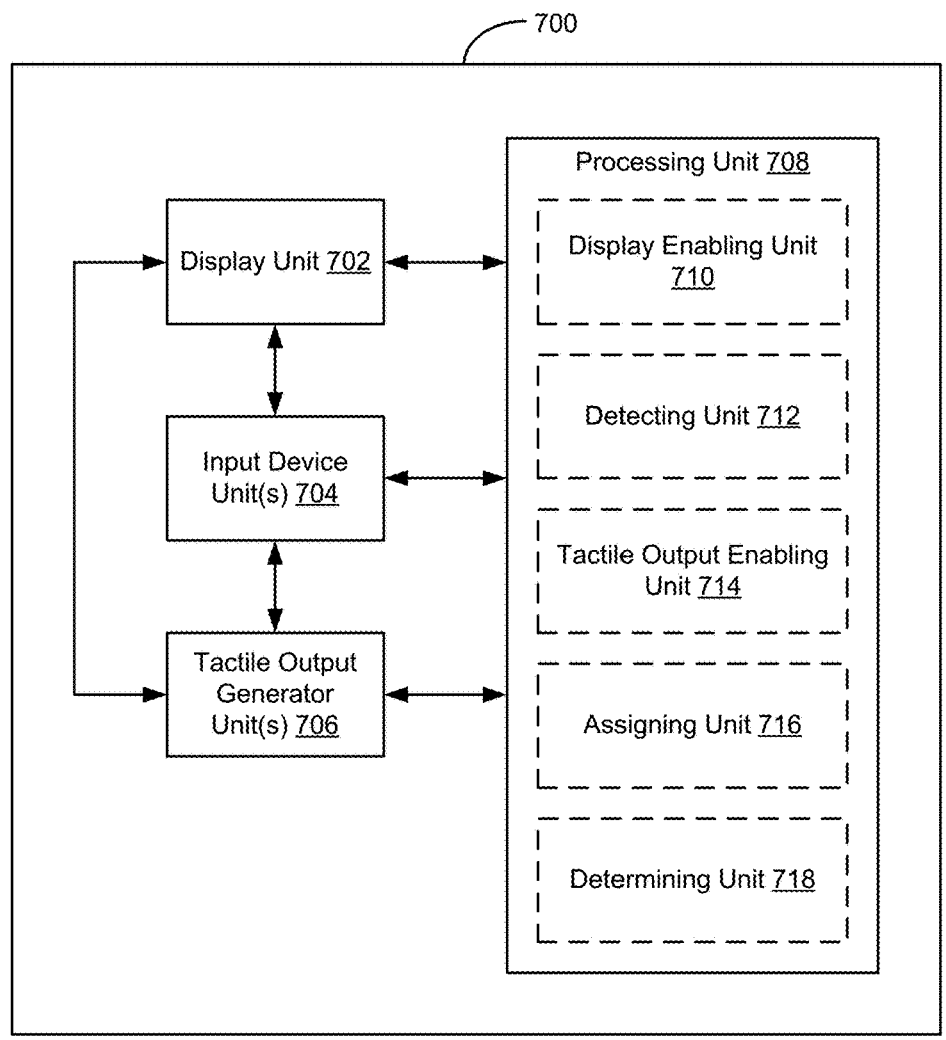
FIG. 7 is a functional block diagram of an electronic device in accordance with some embodiments.

In accordance with some embodiments, FIG. 7 shows a functional block diagram of electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, electronic device 700 includes display unit 702 (e.g., including display 112) configured to display user interfaces, one or more input device unit(s) 704 configured to receive inputs (e.g., touch inputs on a surface, such as a display surface of display unit 702), and processing unit 708 coupled with display unit 702 and the one or more input device unit(s) 704. In some embodiments, electronic device 700 also includes one or more tactile output generator unit(s) 706 configured to generate one or more tactile outputs, also coupled to processing unit 708. In some embodiments, processing unit 708 includes one or more of the following sub-units: display enabling unit 710, detecting unit 712, tactile output enabling unit 714, assigning unit 716, and determining unit 718.

In some embodiments, processing unit 708 is configured to enable display (e.g., using display enabling unit 702), on display unit 702, of a user interface for a first software application, wherein the user interface includes a plurality of elements to which user interaction models from a plurality of user interaction models provided by an application-independent module have been assigned (e.g., using assigning unit 716), the plurality of elements include a first element to which a first user interaction model has been assigned, and the plurality of elements have content provided by an application-specific module for the first software application. In some embodiments, the first user interaction model defines how the user interface responds to inputs directed to the first element of the user interface. While enabling display of the user interface, processing unit 708 is configured to detect (e.g., using detecting unit 712), via input device unit(s) 704, an input directed to the first element of the user interface. In response to detecting the input, processing unit 708 updates (e.g., using display enabling unit 710) the user interface on the display unit based on characteristics of the detected input. In accordance with a determination (e.g., made using determining unit 718) that the input meets tactile output criteria specified by the first user interaction model, processing unit 708 enables generation of a first tactile output corresponding to the input (e.g., using tactile output enabling unit 714). In accordance with a determination (e.g., made using determining unit 718) that the input does not meet the tactile output criteria specified by the first user interaction model, processing unit 708 forgoes enabling generation of the first tactile output (e.g., using tactile output enabling unit 714).

In some embodiments, processing unit 708 updates (e.g., using display enabling unit 710) the user interface on display unit 702 based on characteristics of the detected input and the first user interaction model. In some embodiments, processing unit 708 assigns (e.g., using assigning unit 716) the first user interaction model to the first element using a predefined application programming interface (API).

In some embodiments, the plurality of elements includes a second element to which a second user interaction model from the plurality of user interaction models provided by the application-independent module has been assigned (e.g., using assigning unit 716), and while displaying the user interface, processing unit 708 detects (e.g., using detecting unit 712), via the one or more input device units 704, a second input directed to the second element of the user interface. In response to detecting the second input directed to the second element of the user interface, processing unit 708 updates (e.g., using display enabling unit 710) the user interface on the display unit based on characteristics of the detected second input. In accordance with a determination (e.g., made using determining unit 718) that the second input meets tactile output criteria specified by the second user interaction model, processing unit 708 enables (e.g., using tactile output enabling unit 714) generation of a second tactile output corresponding to the second input, and in accordance with a determination (e.g., made using determining unit 718) that the second input does not meet the tactile output criteria specified by the second user interaction model, processing unit 708 forgoes enabling generation of the second tactile output.

In some embodiments, the first element includes a slider object generated at least in part based on information provided by the application-specific module for the first software application, and the first user interaction model specifies generating tactile outputs (e.g., using tactile output enabling unit 714) in accordance with user manipulation of the slider object with touch inputs. In some embodiments, processing unit 708 is further configured to enable generation of a predefined modulation selection tactile output (e.g., using tactile output enabling unit 714) in response to a touch input that selects a modulation type for the slider object.

In some embodiments, the first user interaction model specifies generating the first tactile output (e.g., using tactile output enabling unit 714) in accordance with a modulation type of the slider object and a parameter of the first software application modulated in accordance with user manipulation of the slider object with touch inputs.

In some embodiments, the first user interaction model specifies generating a distinct tactile output (e.g., using tactile output enabling unit 714) in accordance with a moveable portion of the slider object reaching an end position.

In some embodiments, the first element includes a switch object generated at least in part based on information provided by the application-specific module for the first software application, and the first user interaction model specifies generating the first tactile output (e.g., using tactile output enabling unit 714) when the first input corresponds to an action that changes a state of the switch object.

In some embodiments, the first element includes a value selection object generated at least in part based on information provided by the application-specific module for the first software application, and the first user interaction model specifies generating the first tactile output (e.g., using tactile output enabling unit 714) when the first input corresponds to an action that changes a value selected using the value selection object.

In some embodiments, the first element includes content that is refreshed in response to a pull down gesture reaching a refresh threshold, and the first user interaction model specifies generating a predefined impact tactile output (e.g., using tactile output enabling unit 714) in accordance with a determination (e.g., made using determining unit 718) that the first input corresponds to a pull down gesture reaching the refresh threshold.

In some embodiments, the first element includes a region or object, the size of which changes in response to the first input comprising a zoom gesture, and the first user interaction model specifies generating a predefined size limit tactile output (e.g., using tactile output enabling unit 714) in accordance with a determination (e.g., made using determining unit 718) that the size of the region or object has reached a predefined limit.

In some embodiments, the first element includes a table, having cells organized in rows and columns, generated at least in part based on information provided by the application-specific module for the first software application, and the first user interaction model specifies generating the first tactile output (e.g., using tactile output enabling unit 714) when the first input moves from any cell in the table to any other cell in the table, or moves from outside the table to a cell inside the table.

In some embodiments, the first element includes a table, having cells organized in rows and columns, generated at least in part based on information provided by the application-specific module for the first software application, and the first user interaction model specifies generating the first tactile output (e.g., using tactile output enabling unit 714) when two or more rows of the cells are reordered in response to the first input.

In some embodiments, the first input causes the first software application to select an item, in a collection of distinct items, to be moved to a predefined position within the first element, and the first user interaction model specifies generating the first tactile output (e.g., using tactile output enabling unit 714) in conjunction with the selected item being moved to the predefined position within the first element.

In some embodiments, the first user interaction model specifies generating (e.g., using tactile output enabling unit 714) the first tactile output when the first input or an object manipulated in accordance with the first input approaches a next predefined state, and generating a second tactile output, distinct from the first tactile output, when the first input or an object manipulated in accordance with the first input reaches the next predefined state.

The operations described above with reference to FIGS. 6A-6D are, optionally, implemented by components depicted in FIGS. 1A-1B or FIG. 7. For example, detection operation 610, updating operation 614, and generating operation 618 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8D are flow diagrams illustrating method 800 of synchronizing tactile outputs and user interface changes in accordance with some embodiments. Method 800 is performed at an electronic device (e.g., device 300, FIG. 3, or portable multifunction device 100, FIG. 1A) with a display, a touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to provide tactile outputs in conjunction with user interface events. Providing tactile outputs takes longer than updating a user interface. Thus, user interface events (e.g., time-flexible user interface events) are delayed so that the delayed user interface events are synchronized with generation of tactile outputs. Synchronizing generation of tactile outputs and user interface updates provides intuitive user interfaces. On the other hand, for time-critical user interface events, user interface events are not delayed, which maintains the responsiveness of the device for such time-critical user interface events. The method reduces the number, extent, and/or nature of the inputs from a user when interacting with user interfaces, thereby creating a more efficient human-machine interface. For battery-operated electronic devices, enabling a user to interact with user interfaces faster and more efficiently conserves power and increases the time between battery charges.

The device displays (802), on the display, a user interface (e.g., user interface 5105 as illustrated for $T=t_0$ in FIG. 5XX).

The device detects (804) an occurrence of a first condition (e.g., a user input, a scheduled event such as an alarm or a timer, or an externally triggered event such as an incoming notification) that triggers a first user interface event that is associated with a tactile output (e.g., receiving a calendar event invitation as illustrated for $T=t_1$ in FIG. 5XX). Generating the first user interface event includes (806) displaying one or more changes to the user interface (e.g., display of calendar event invitation affordance 5108 on user interface 5105 in FIG. 5XX).

In some embodiments, the occurrence of the first condition includes (808) detected movement of the electronic device that meets predefined input pattern criteria (e.g., a pattern of shaking the device back and forth as illustrated in FIG. 5WW for $T=t_1$) and the one or more changes to the user interface include undoing a previously performed operation (e.g., undoing an auto-correction, redisplaying one or more deleted characters, removing one or more previously typed characters, undoing deletion of an item, and/or displaying an undo operation affordance as illustrated in FIG. 5WW for $T=t_3$).

The device will not be able to generate (810) the tactile output associated with the first user interface event for a respective amount of time (e.g., due to other tactile outputs being generated and/or the tactile output generators not being ready to generate the tactile output because the tactile output generators are in a low-power state). In some embodiments, the device is not configured to generate the tactile output associated with the first user interface event for the respective amount of time (e.g., it takes at least the respective amount of time, such as $T_{delay}$ illustrated in FIG. 5WW or more, from a point of time when the tactile output associated with the first user interface event is requested or initiated to when the tactile output is generated).

In response to detecting the occurrence of the first condition, in accordance with a determination that the first user interface event corresponds to a first user interface event category (812) (e.g., the first user interface event is not in response to a user input such as an alert or other notification that is not direct manipulation of the user interface in response to touch input), the device delays (814) generating the first user interface event for at least the respective amount of time (e.g., in FIG. 5WW, the device delays generating the first user interface event for $T_{delay}$).

In some embodiments, the device, when the respective amount of time is a first amount of time, delays (816) displaying the one or more changes to the user interface for the first amount of time, and when the respective amount of time is a second amount of time, delays displaying the one or more changes to the user interface for the second amount of time (e.g., the device delays displaying the one or more changes to the user interface based on the time it takes to generate a tactile output).

In some embodiments, the determination that the first user interface event corresponds to the first user interface event category includes (818) a determination that the first user interface event is a notification event that does not correspond to a user input currently detected on the touch-sensitive surface (e.g., receiving a calendar event invitation as illustrated for $T=t_1$ in FIG. 5XX). In some embodiments, the determination that the first user interface event corresponds to the first user interface event category includes a determination that the first user interface event is independent of any user input on the touch-sensitive surface that is detected at the same time as, or immediately preceding, the notification event.

In some embodiments, the determination that the first user interface event corresponds to the first user interface event category includes (820) a determination that the first user interface event is a notification event initiated in accordance with receiving electronically delivered information from an information source external to the electronic device (e.g., receiving a calendar event invitation as illustrated for $T=t_1$ in FIG. 5XX).

In some embodiments, the determination that the first user interface event corresponds to the first user interface event category includes (822) a determination that the first user interface event is a notification event initiated in accordance with receiving electronically delivered information from an application executed by the electronic device (e.g., receiving a calendar event invitation as illustrated for $T=t_1$ in FIG. 5XX) and independent of any user input on the touch-sensitive surface that is detected at the same time as, or immediately preceding, the notification event.

In some embodiments, the determination that the first user interface event corresponds to the first user interface event category includes (824) a determination that the first user interface event is a notification event initiated in accordance with completion of a transaction initiated by a user of the electronic device (e.g., transmission of payment credentials via a short range wireless communication signal to a payment terminal such as an NFC payment, successful authorization of a payment via a biometric sensor such as a fingerprint sensor, or receiving authorization of a payment by a remote payment server as shown in FIG. 5YY).

In some embodiments, the determination that the first user interface event corresponds to the first user interface event category includes (826) a determination that the first user interface event is provided to an application programming interface (API) with a value indicating that the one or more changes to the user interface can be delayed until the device is ready to generate the tactile output (e.g., the first user interface event is provided from an application to the application programming interface (and to application-independent software module 260 illustrated in FIG. 1D) with information indicating whether the first user interface event is a flexible event or an inflexible event).

After delaying generating the first user interface event for at least the respective amount of time, the device displays (828) the one or more changes to the user interface and generating the tactile output that is associated with the first user interface event. The display of the one or more changes to the user interface is synchronized (830) with the generation of the tactile output that is associated with the first user interface event (e.g., so that the one or more changes to the user interface are displayed with the generation of the first tactile output as shown in FIG. 5WW) (e.g., using a prepareWithCompletionHandler function described in Appendix B).

In some embodiments, in response to detecting the occurrence of the first condition, in accordance with a determination that the first user interface event corresponds to a second user interface event category (e.g., the first user interface event is in response to a user input, such as changes to the user interface that correspond to direct manipulation of the user interface in response to touch input), the device displays (832) the one or more changes to the user interface before the respective amount of time has elapsed and generates the tactile output that is associated with the one or more changes in the user interface after the respective amount of time has elapsed (e.g., in FIG. 5VV, the one or more changes to the user interface are displayed without the delay to provide a prompt visual feedback).

In some embodiments, the first user interface event category includes (834) events where the respective amount of time for the one or more changes to the user interface is flexible (e.g., user interface events that are independent of immediately preceding user inputs). The second user interface event category includes events where the respective amount of time for the one or more changes to the user interface is inflexible (e.g., user interface events initiated by user inputs).

In some embodiments, the first user interface event category includes (836) events where the one or more changes to the user interface do not simulate direct manipulation of the user interface by user inputs (e.g., receiving a calendar event invitation as illustrated for T=$t_1$ in FIG. 5XX). The second user interface event category includes events where the one or more changes to the user interface simulate direct manipulation of the user interface by user inputs (e.g., user inputs that triggered the first user interface event, such movement of a contact that corresponds to movement of a user interface object in the user interface as shown in FIG. 5VV or an increase in intensity of a contact that corresponds to changing the appearance of a user interface object based on the pressure of the contact).

In some embodiments, the device detects (838) a user input on the touch-sensitive surface that triggers a second user interface event that is associated with a tactile output (e.g., user input 571 in FIG. 5VV). Generating the second user interface event includes displaying one or more changes to the user interface. In response to detecting the user input on the touch-sensitive surface, the device displays the one or more changes to the user interface for the second user interface event and generates the tactile output that is associated with the second user interface event (e.g., list element 572 and list element 573 are reordered in FIG. 5VV and a corresponding tactile output is generated). A first time interval between the display of the one or more changes to the user interface for the first user interface event and the generation of the tactile output that is associated with the first user interface event is less than a second time interval between the display of the one or more changes to the user interface for the second user interface event and the generation of the tactile output that is associated with the second user interface event (e.g., in some embodiments, the first time interval between the display of one or more changes to the user interface for the first user interface event and the generation of the tactile output that is associated with the first user interface event in FIG. 5WW is close to zero, and is less than the second time interval between $t_1$ and $t_2$ in FIG. 5VV).

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 1000, 1200, 1400, 1600, 1800, and 2000) are also applicable in an analogous manner to method 800 described above with respect to FIGS. 8A-8D. For example, the tactile outputs, user interface elements, user interface events, user interface event categories, notification events, and synchronization of tactile outputs with user interface events described above with reference to method 800 optionally have one or more of the characteristics of the tactile outputs, user interface elements, user interface events, user interface event categories, notification events, and synchronization of tactile outputs with user interface events described herein with reference to other methods described herein (e.g., methods 600, 1000, 1200, 1400, 1600, 1800, and 2000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 9:
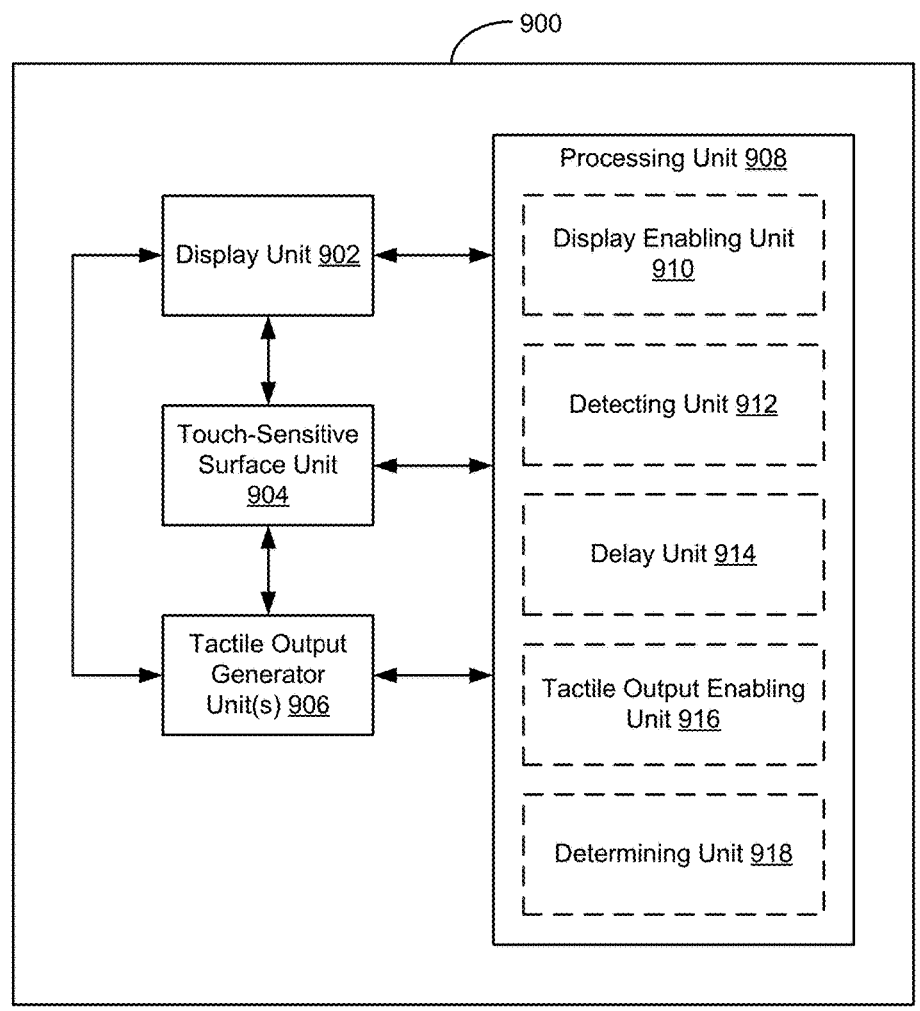
FIG. 9 is a functional block diagram of an electronic device in accordance with some embodiments.
Figure 10D:
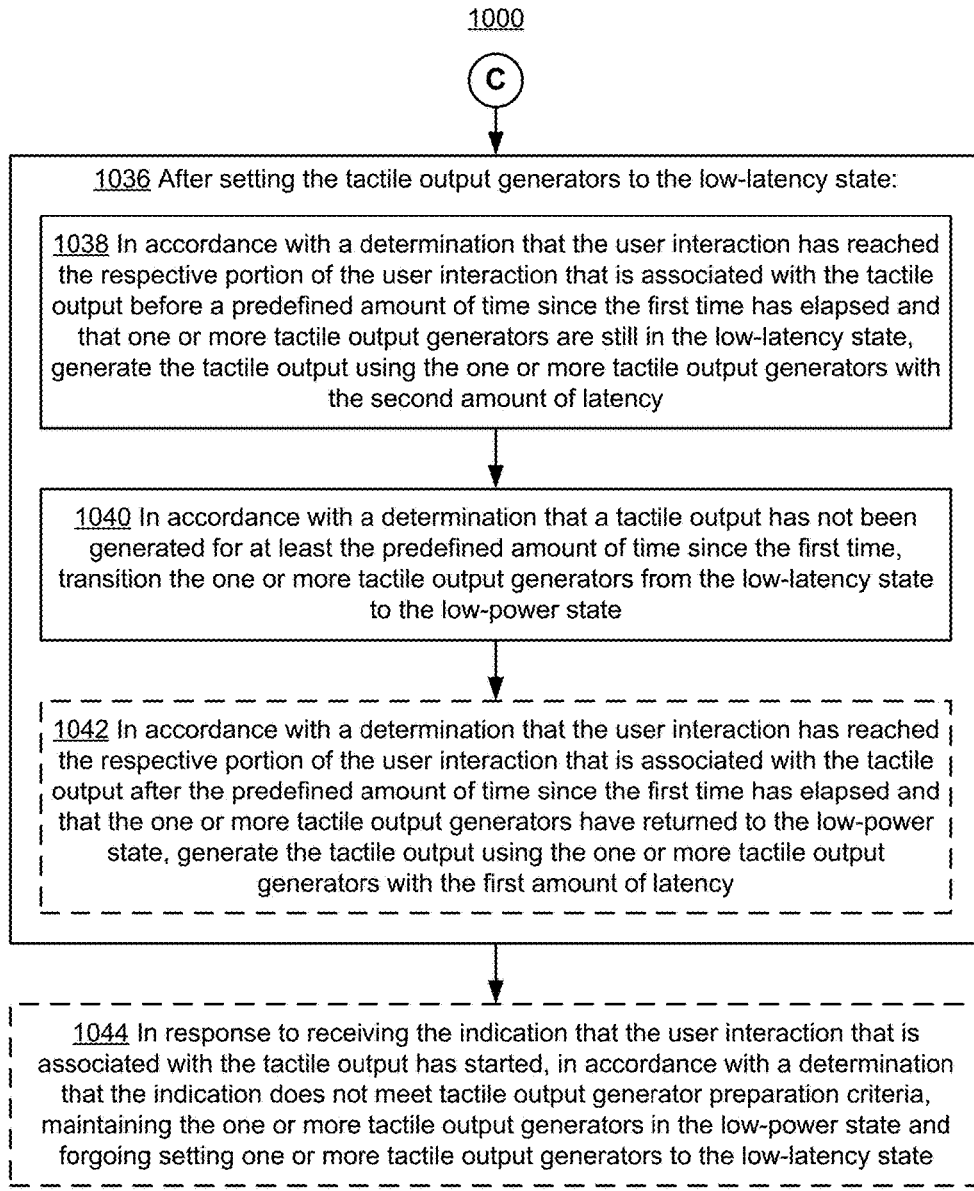

In accordance with some embodiments, FIG. 9 shows a functional block diagram of electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, electronic device 900 includes display unit 902 (e.g., including display 112) configured to display user interfaces, touch-sensitive surface unit 904 configured to receive touch inputs (e.g., on a display surface of display unit 902), one or more tactile output generator unit(s) 906 configured to generate one or more tactile outputs, and processing unit 908 coupled with display unit 902, touch-sensitive surface unit 904, and one or more tactile output generator unit(s) 906. In some embodiments, processing unit 908 includes one or more of the following sub-units: display enabling unit 910, detecting unit 912, delay unit 914, tactile output enabling unit 916, and determining unit 918.

In some embodiments, processing unit 908 is configured to enable display (e.g., using display enabling unit 910), on display unit 902, of a user interface. Processing unit 908 detects (e.g., using detecting unit 912) an occurrence of a first condition that triggers a first user interface event that is associated with a tactile output, wherein generating the first user interface event includes enabling display (e.g., using display enabling unit 910) of one or more changes to the user interface. In some embodiments, the device (e.g., device 900) will not be able to generate the tactile output (e.g., using tactile output generator units 906) associated with the first user interface event for a respective amount of time, and in response to detecting (e.g., using detecting unit 912) the occurrence of the first condition, in accordance with a determination (e.g., made using determining unit 918) that the first user interface event corresponds to a first user interface event category, processing unit 908 enables generation (e.g., using tactile output enabling unit 916) and delays (e.g., using delay unit 914) generation of the first user interface event for at least the respective amount of time. After delaying (e.g., using delay unit 914) generation of the first user interface event for at least the respective amount of time, processing unit 908 enables display (e.g., using display enabling unit 910) of the one or more changes to the user interface, wherein the display of the one or more changes to the user interface is synchronized with the generation of the tactile output that is associated with the first user interface event.

In some embodiments, processing unit 908 is further configured to, when the respective amount of time is a first amount of time, delay (e.g., using delay unit 914) displaying the one or more changes to the user interface for the first amount of time, and when the respective amount of time is a second amount of time, delay (e.g., using delay unit 914) displaying the one or more changes to the user interface for the second amount of time.

In some embodiments, processing unit 908 is configured to, in response to detecting the occurrence of the first condition, in accordance with a determination (e.g., made using determining unit 918) that the first user interface event corresponds to a second user interface event category, enable display of the one or more changes to the user interface (e.g., using display enabling unit 910) before the respective amount of time has elapsed, wherein the tactile output (e.g., using tactile feedback unit 918) that is associated with the one or more changes in the user interface is generated after the respective amount of time has elapsed.

In some embodiments, the first user interface event category includes events where the timing of the one or more changes to the user interface is flexible, and the second user interface event category includes events where the timing of the one or more changes to the user interface is inflexible.

In some embodiments, the first user interface event category includes events where the one or more changes to the user interface do not simulate direct manipulation of the user interface by user inputs, and the second user interface event category includes events where the one or more changes to the user interface simulate direct manipulation of the user interface by user inputs.

In some embodiments, processing unit 908 is configured to detects a user input on touch-sensitive surface unit 904 that triggers a second user interface event that is associated with a tactile output, wherein generating the second user interface event includes enabling display (e.g., using display enabling unit 910) of one or more changes to the user interface. In response to detecting the user input on touch-sensitive surface unit 904, processing unit 908 is configured to enable display (e.g., using display enabling unit 910) of the one or more changes to the user interface for the second user interface event and enable generation of the tactile output (e.g., using tactile output enabling unit 916) that is associated with the second user interface event, wherein a first time interval between the display of the one or more changes to the user interface for the first user interface event and the generation of the tactile output that is associated with the first user interface event is less than a second time interval between the display of the one or more changes to the user interface for the second user interface event and the generation of the tactile output that is associated with the second user interface event.

In some embodiments, the occurrence of the first condition includes detected movement of electronic device 900 that meets predefined input pattern criteria and the one or more changes to the user interface include undoing a previously performed operation.

In some embodiments, the determination that the first user interface event corresponds to the first user interface event category includes a determination (e.g., made using determining unit 918) that the first user interface event is a notification event that does not correspond to a user input currently detected on touch-sensitive surface unit 904.

In some embodiments, the determination that the first user interface event corresponds to the first user interface event category includes a determination (e.g., made using determining unit 918) that the first user interface event is a notification event initiated in accordance with receiving electronically delivered information from an information source external to electronic device 900.

In some embodiments, the determination that the first user interface event corresponds to the first user interface event category includes a determination (e.g., made using determining unit 918) that the first user interface event is a notification event initiated in accordance with receiving electronically delivered information from an application executed by electronic device 900 and independent of any user input on touch-sensitive surface unit 904 that is detected at the same time as, or immediately preceding, the notification event.

In some embodiments, the determination that the first user interface event corresponds to the first user interface event category includes a determination (e.g., made using determining unit 918) that the first user interface event is a notification event initiated in accordance with completion of a transaction initiated by a user of electronic device 900.

In some embodiments, the determination that the first user interface event corresponds to the first user interface event category includes a determination (e.g., made using determining unit 918) that the first user interface event is provided to an application programming interface (API) with a value indicating that the one or more changes to the user interface can be delayed until device 900 is ready to generate the tactile output.

The operations described above with reference to FIGS. 8A-8D are, optionally, implemented by components depicted in FIGS. 1A-1B or FIG. 9. For example, detection operation 804, delaying operation 814, and displaying and generating operation 828 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10D are flow diagrams illustrating method 1000 of setting power/latency states of tactile output generators in accordance with some embodiments. Method 1000 is performed at an electronic device (e.g., device 300, FIG. 3, or portable multifunction device 100, FIG. 1A) with a display, a touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, method 1000 provides an enhanced way to provide tactile outputs based on states of tactile output generators. Predicting an upcoming tactile output generation event and transitioning tactile output generators into a low-latency mode reduces the latency in generating tactile outputs, which makes the device more responsive to user inputs, thereby creating a more efficient human-machine interface. For battery-operated electronic devices, placing the tactile output generators in the low-latency mode based on prediction of upcoming tactile output generation events conserves power over maintaining the tactile output generators in the low-latency mode all the time and increases the time between battery charges.

While the one or more tactile output generators are in a low-power state (e.g., at operation 5182, FIG. 5KKK), the device receives (1002) an indication that a user interaction has started (e.g., detecting a first portion of an input such as a touch on a touch sensitive surface or the beginning of a drag and drop operation as shown in FIG. 5III, or receiving a "prepare" request from a first software application in which the user interaction has started, such as at operation 5184, FIG. 5KKK).

A respective portion of the user interaction is associated (1004) with a tactile output (e.g., a portion of the user interaction that corresponds to an overlap of position indicator 5161 with marker 5162 is associated with a tactile output so that an overlap of position indicator 5161 and marker 5162 initiates a tactile output).

The low-power state is (1006) a state in which tactile outputs are generated with a first amount of latency (e.g., it will take at least a warm-up amount of time, such as $\Delta T_A$, FIGS. 5ZZ and 5HHH to generate the tactile output with the one or more tactile output generators).

In some embodiments, the low-power state is (1008) a predefined inactive state of the one or more tactile output generators (e.g., "inactive" state, FIG. 5ZZ). In some embodiments, the one or more tactile output generators consume no power in the low-power state.

In some embodiments, the user interaction that is associated with the tactile output includes (1010) location information corresponding to a touch input having a location on the touch-sensitive surface (e.g., a location of position indicator 5161 in FIG. 5III) or a user interface object having a location on the touch-sensitive surface.

In some embodiments, the device determines (1012) a location of the tactile output in accordance with the location information for the user interaction (e.g., when the device includes multiple tactile output generators, the tactile output is generated using one or more tactile output generators located adjacent to the location of the user interaction).

In some embodiments, the one or more tactile output generators include (1014) two or more tactile output generators, each having a corresponding location, or location and size, and determining the location of the tactile output includes determining the location of the tactile output in accordance with the location information for the user interaction and the locations, or locations and sizes, of the two or more tactile output generators (e.g., as shown in FIGS. 5G-5H, the tactile output is generated at a location adjacent to a location of slider thumb 507).

In response to receiving the indication that the user interaction that is associated with the tactile output has started, in accordance with a determination that the indication meets tactile output generator preparation criteria (e.g., at operation 5186—Yes, FIG. 5KKK), the device sets (1016) the one or more tactile output generators to a low-latency state (e.g., a pre-warmed state has a lower latency than an inactive state, and, in some embodiments, a higher latency than a ready state) at a first time (e.g., at T=$t_1$ in FIG. 5III). The low-latency state is (1018) a state in which the tactile outputs are generated with a second amount of latency (e.g., $\Delta T_B$, FIGS. 5ZZ and 5III) that is lower than the first amount of latency (e.g., the low-latency state is a state in which it will take less than the warm-up amount of time to generate the tactile output with the one or more tactile output generators as shown in FIG. 5ZZ).

In some embodiments, the low-power state of the one or more tactile output generators has (1020) a lower power consumption than the low-latency state (e.g., the low-latency state is high-power state that consumes more power than the low-power state). The low-latency state has a lower latency for generating tactile outputs than the low-power state, as shown in FIG. 5ZZ (e.g., the low-power state is high-latency state that consumes less power than the low-latency state).

In some embodiments, the low-latency state is selected (1022) from a first low-latency state (e.g., a pre-warmed state with a reduced latency, such as a latency $\Delta T_B$ that is lower than a latency $\Delta T_A$ in the off or inactive state but is still perceptible to a user, as described herein with reference to FIG. 5ZZ) and a second low-latency state (e.g., a ready or active state where the one or more tactile output generators are ready to generate tactile outputs with a minimal latency, such as a latency $\Delta T_C$ that is below the threshold at which is perceptible to a user), as described for example with reference to operation 5188 of FIG. 5KKK. The first low-latency state consumes less power than the second low-latency state and has a higher latency than the second low-latency state. For example, when a lowest latency is required, the device selects the second low-latency state.

In some embodiments, the low-latency state is selected (1024) from the first low-latency state and the second low-latency state by an operating system of the device (e.g., operating system 126, FIG. 1A) based on energy conservation protocols used by the device (e.g., if the first software application has been asking to set the device into the ready state too frequently, or the device is in a battery conservation mode of operation, the operating system can decide to set the device into the pre-warmed state instead of the ready state so as to conserve power).

In some embodiments, the device issues (1026) from a first software application a command to set the one or more tactile output generators to the low-latency state. Setting the one or more tactile output generators to the low-latency state is performed in response to the command issued by the first software application to set the one or more tactile output generators to the low-latency state (e.g., information 272 from application 1 (136-1) in FIG. 1D includes one or more instructions and/or commands to set the one or more tactile output generators to the low-latency state).

In some embodiments, the device issues (1028) from a first software application (e.g., application 136-1, FIG. 1D) a command to set the one or more tactile output generators to the low-latency state, and at an operating system of the electronic device, receives the issued command and makes a determination of whether to set the one or more tactile output generators to the low-latency state.

In some embodiments, the device determines (1030), using an operating system of the electronic device, when to set the one or more tactile output generators to the low-latency state (e.g., operation 5186 in FIG. 5KKK).

In some embodiments, the operating system of the electronic device determines (1032) whether to set the one or more tactile output generators to the low-latency state in accordance with a state of the electronic device (e.g., if the device is in a battery conservation mode of operation, the operating system can decide whether to set the device into the low-latency state or not, so as to conserve power).

In some embodiments, the operating system of the electronic device determines (1034), in response to a first software application issuing a command to set the one or more tactile output generators to the low-latency state, whether to set the one or more tactile output generators to the low-latency state in accordance with historical information concerning prior commands by the first software application to set the one or more tactile output generators to the low-latency state (e.g., if an application requests to prepare too many times, without requesting a tactile output to be generated, the device ignores subsequent prepare requests).

After setting the one or more tactile output generators to the low-latency state (1036), in accordance with a determination that the user interaction has reached the respective portion of the user interaction that is associated with the tactile output before a predefined amount of time since the first time has elapsed and that the one or more tactile output generators are still in the low-latency state, the device generates (1038) the tactile output using the one or more tactile output generators with the second amount of latency (e.g., generating the tactile output takes less than the warm-up amount of time); and, in accordance with a determination that a tactile output has not been generated for at least the predefined amount of time since the first time (e.g., a timeout period), transitions (1040) the one or more tactile output generators from the low-latency state to the low-power state (e.g., an inactive state) (e.g., using a UIFeedbackGenerator prepare function described below in Appendix A), as described for example with reference to operation 5194, FIG. 5KKK.

In some embodiments, after setting the one or more tactile output generators to the low-latency state (1036), the device, in accordance with a determination that the user interaction has reached the respective portion of the user interaction that is associated with the tactile output after the predefined amount of time since the first time has elapsed and that the one or more tactile output generators have returned to the low-power state, generates (1042) the tactile output using the one or more tactile output generators with the first amount of latency (e.g., generating the tactile output takes at least the warm-up amount of time).

In some embodiments, in response to receiving the indication that the user interaction that is associated with the tactile output has started, in accordance with a determination that the indication does not meet tactile output generator preparation criteria (e.g., because the device is in a battery conservation mode of operation or because the first application has been requesting that the device prepare to generate tactile outputs too frequently), the device maintains (1044) the one or more tactile output generators in the low-power state and forgoes setting the one or more tactile output generators to the low-latency state (e.g., if the first software application has been asking to set the device into the ready state too frequently, or the device is in a battery conservation mode of operation, the operating system can ignore the request in order to conserve battery power), as described for example with reference to operation 5186—No, FIG. 5KKK.

It should be understood that the particular order in which the operations in FIGS. 10A-10D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1200, 1400, 1600, 1800, and 2000) are also applicable in an analogous manner to method 1000 described above with respect to FIGS. 10A-10D. For example, the tactile outputs, tactile output generators, tactile output generator states, and software applications described above with reference to method 1000 optionally have one or more of the characteristics of the tactile outputs, tactile output generators, tactile output generator states, and software applications described herein with reference to other methods described herein (e.g., methods 600, 800, 1200, 1400, 1600, 1800, and 2000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 11:
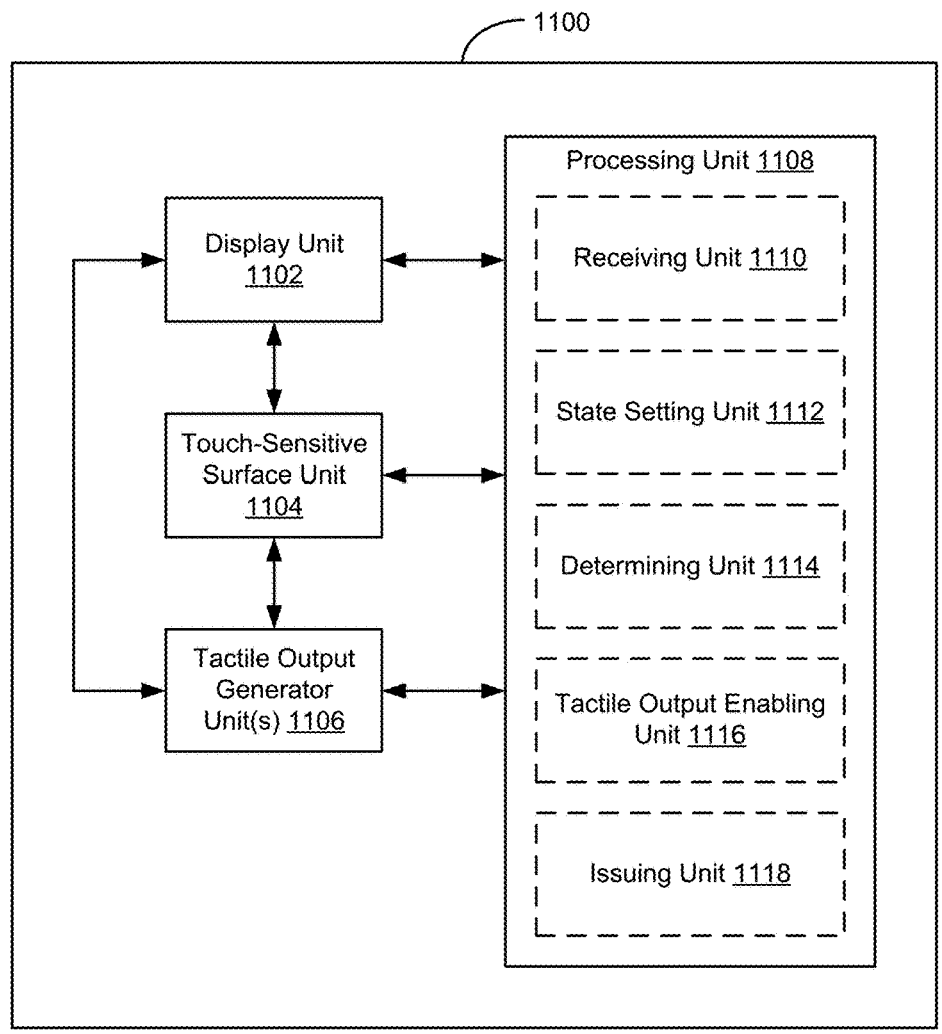
FIG. 11 is a functional block diagram of an electronic device in accordance with some embodiments.
Figure 12C:
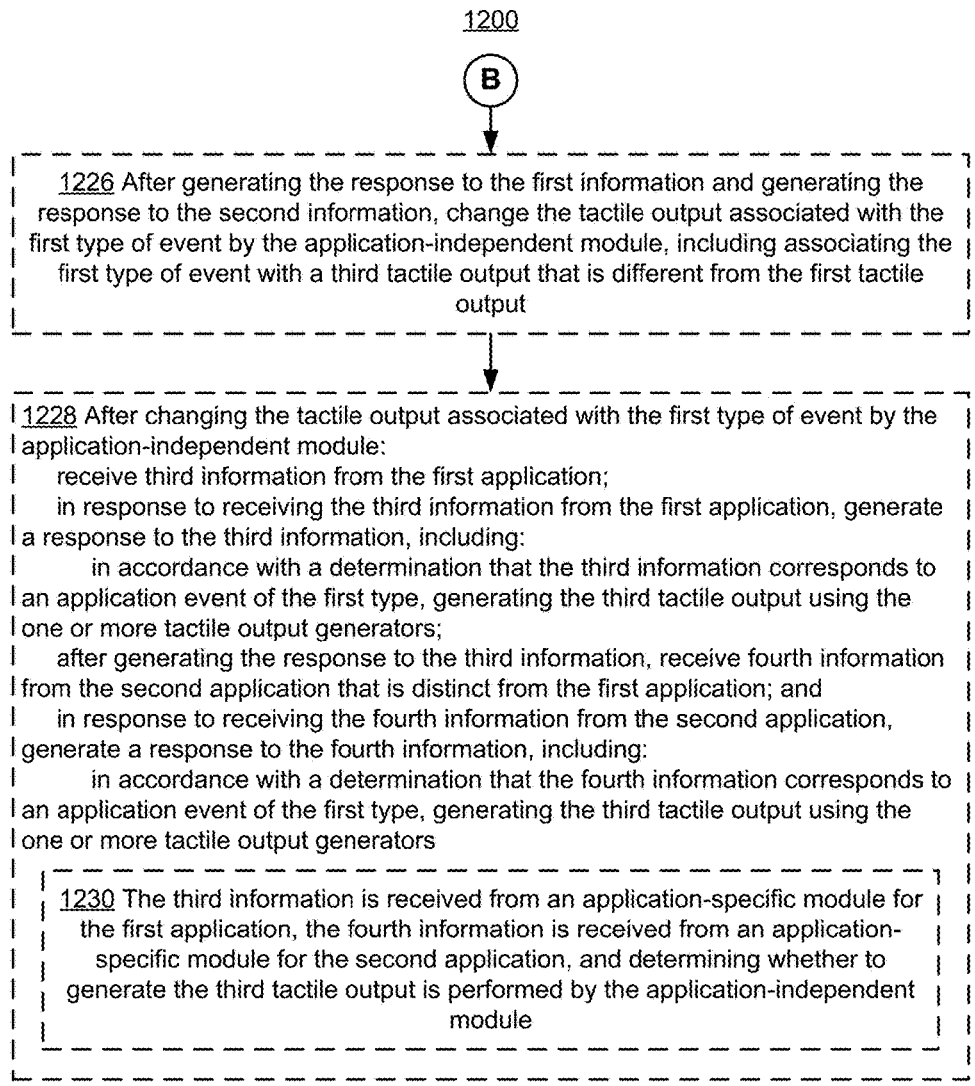
Figure 12D:
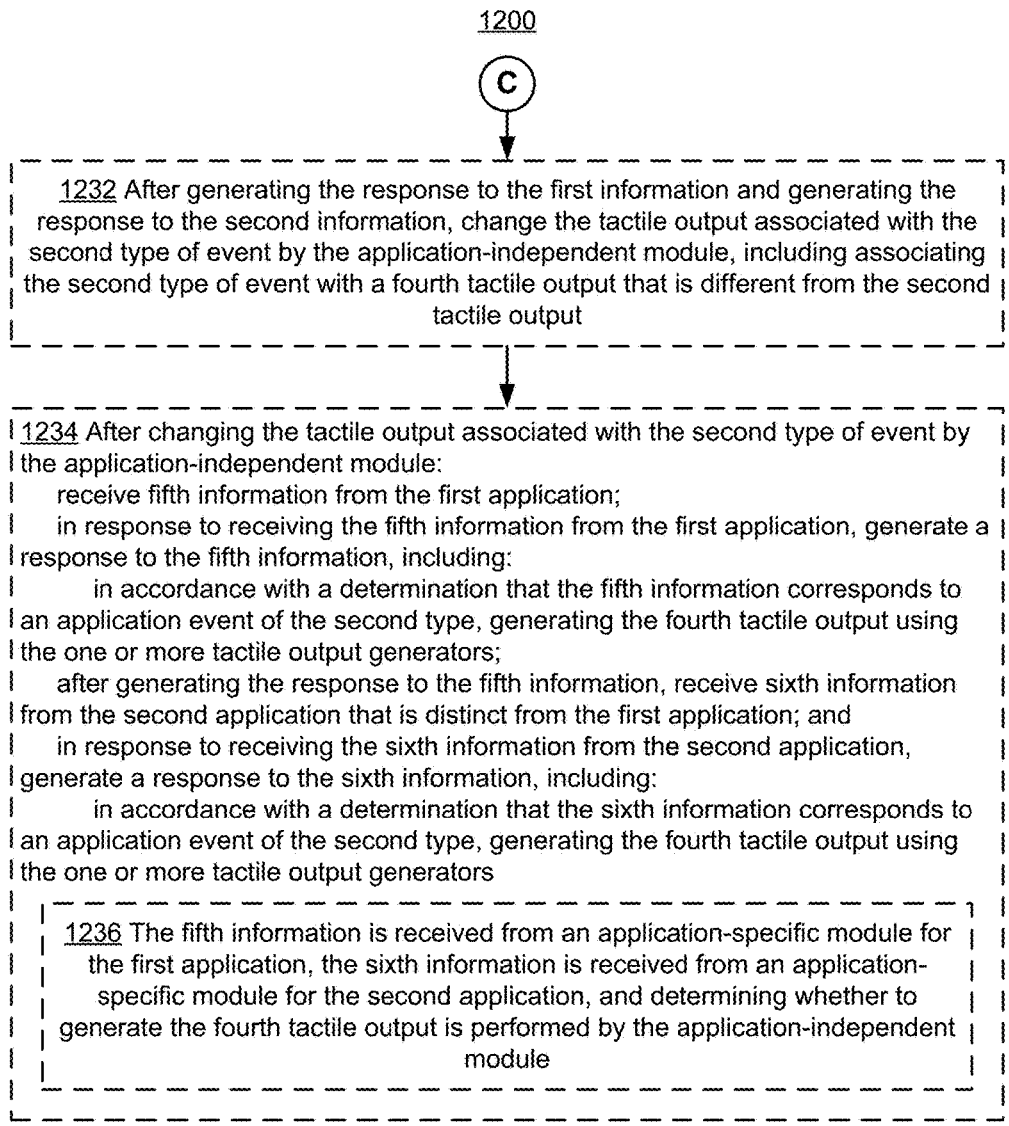

In accordance with some embodiments, FIG. 11 shows a functional block diagram of electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, electronic device 1100 includes display unit 1102 (e.g., including display 112) configured to display one or more user interfaces, touch-sensitive surface unit 1104 configured to receive touch inputs (e.g., on a display surface of display unit 1102), one or more tactile output generator unit(s) 1106 configured to generate one or more tactile outputs, and processing unit 1108 coupled with display unit 1102, touch-sensitive surface unit 1104, and one or more tactile output generator unit(s) 1106. In some embodiments, processing unit 1108 includes one or more of the following sub-units: receiving unit 1110, state setting unit 1112, determining unit 1114, tactile output enabling unit 1116, and issuing unit 1118.

In some embodiments, while one or more tactile output generator units 1106 are in a low-power state, processing unit 1108 is configured to receive (e.g., using receiving unit 1110) an indication that a user interaction has started, wherein a respective portion of the user interaction is associated with a tactile output, and the low-power state is a state in which tactile outputs are generated with a first amount of latency. In response to receiving the indication that the user interaction that is associated with the tactile output has started, in accordance with a determination (e.g., made using determining unit 1114) that the indication meets tactile output generator preparation criteria, processing unit 1108 sets (e.g., using state setting unit 1112) one or more tactile output generator units 1106 to a low-latency state at a first time, wherein the low-latency state is a state in which the tactile outputs are generated with a second amount of latency that is lower than the first amount of latency. After setting one or more tactile output generator units 1106 to the low-latency state, in accordance with a determination (e.g., made using determining unit 1114) that the user interaction has reached the respective portion of the user interaction that is associated with the tactile output before a predefined amount of time since the first time has elapsed and that one or more tactile output generator units 1106 are still in the low-latency state, processing unit 1108 enables generation of the tactile output using one or more tactile output generator units 1106 with the second amount of latency. In accordance with a determination that a tactile output has not been generated for at least the predefined amount of time since the first time, processing unit 1108 transitions one or more tactile output generator units 1106 from the low-latency state to the low-power state.

In some embodiments, processing unit 1108 is further configured to, after setting one or more tactile output generator units 1106 to the low-latency state, in accordance with a determination that the user interaction has reached the respective portion of the user interaction that is associated with the tactile output after the predefined amount of time since the first time has elapsed and that one or more tactile output generator units 1106 have returned to the low-power state, enable generation (e.g., using tactile output enabling unit 1116) of the tactile output using one or more tactile output generator units 1106 with the first amount of latency.

In some embodiments, the low-power state of one or more tactile output generator units 1106 has a lower power consumption than the low-latency state, and the low-latency state has a lower latency for generating tactile outputs than the low-power state.

In some embodiments, the low-power state is a predefined inactive state of one or more tactile output generator units 1106.

In some embodiments, the low-latency state is selected from a first low-latency state and a second low-latency state, wherein the first low-latency state consumes less power than the second low-latency state and has a higher latency than the second low-latency state.

In some embodiments, the low-latency state is selected from the first low-latency state and the second low-latency state by an operating system of device 1100 based on energy conservation protocols used by device 1100.

In some embodiments, processing unit 1108 is further configured to, in response to receiving the indication (e.g., using receiving unit 1110) that the user interaction that is associated with the tactile output has started, in accordance with a determination that the indication does not meet tactile output generator preparation criteria, maintain (e.g., using state setting unit 1112) one or more tactile output generator units 1106 in the low-power state and forgo setting one or more tactile output generator units 1106 to the low-latency state.

In some embodiments, the user interaction that is associated with the tactile output includes location information corresponding to a touch input having a location on touch-sensitive surface unit 1104 or a user interface object having a location on touch-sensitive surface unit 1104.

In some embodiments, processing unit 1108 is further configured to determine a location (e.g., using determining unit 1114) of the tactile output in accordance with the location information for the user interaction.

In some embodiments, one or more tactile output generator units 1106 include two or more tactile output generator units 1106, each having a corresponding location, or location and size, and determining the location of the tactile output includes determining (e.g., using determining unit 1114) the location of the tactile output in accordance with the location information for the user interaction and the locations, or locations and sizes, of two or more tactile output generator units 1106.

In some embodiments, processing unit 1108 is further configured to issue (e.g., using issuing unit 1118) from a first software application a command to set (e.g., using state setting unit 1112) one or more tactile output generator units 1106 to the low-latency state, wherein setting one or more tactile output generator units 1106 to the low-latency state is performed in response to the command issued by the first software application to set one or more tactile output generator units 1106 to the low-latency state.

In some embodiments, processing unit 1108 is further configured to issue (e.g., using issuing unit 1118) a command to set (e.g., using state setting unit 1112) one or more tactile output generator units 1106 to the low-latency state, and receive, at an operating system of electronic device 1100, the issued command and making a determination (e.g., using determining unit 1114) of whether to set one or more tactile output generator units 1106 to the low-latency state.

In some embodiments, processing unit 1108 is further configured to determine (e.g., using determining unit 1114), using an operating system of electronic device 1100, when to set (e.g., using state setting unit 1112) one or more tactile output generator units 1106 to the low-latency state. In some embodiments, processing unit 1108 is further configured to determine (e.g., using determining unit 1114), using the operating system of electronic device 1100, whether to set (e.g., using state setting unit 1112) one or more tactile output generator units 1106 to the low-latency state in accordance with a state of electronic device 1100.

In some embodiments, the operating system of electronic device 1100 determines (e.g., using determining unit 1114), in response to a first software application issuing a command to set one or more tactile output generator units 1106 to the low-latency state, whether to set one or more tactile output generator units 1106 to the low-latency state in accordance with historical information concerning prior commands by the first software application to set one or more tactile output generator units 1106 to the low-latency state.

The operations described above with reference to FIGS. 10A-10D are, optionally, implemented by components depicted in FIGS. 1A-1B or FIG. 11. For example, receiving operation 1002, setting operation 1016, and generating operation 1038 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12D are flow diagrams illustrating method 1200 of generating consistent tactile outputs for multiple applications in accordance with some embodiments. Method 1200 is performed (1202) at an electronic device (e.g., device 300, FIG. 3, or portable multifunction device 100, FIG. 1A) with a display, a touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

As described below, method 1200 provides an enhanced way to provide tactile outputs using an application-independent software module. Providing tactile outputs using application-independent software based on information from application software provides common user interface framework that provides consistent user experience when various software applications are used. Providing a common user interface frame work to the user enhances the usability of such software applications and the device executing such software applications. In turn, this enhances the operability of the device and makes the user-device interface more efficient (e.g., by helping the user to provide proper inputs and reducing user mistakes and/or unintended operations when operating/interacting with the device). In addition, the method reduces the size of software applications and makes execution of such software applications faster. For battery-operated electronic devices, enabling a user to use software applications faster and more efficiently conserves power and increases the time between battery charges.

While a first type of event is associated with a first tactile output and a second type of event that is distinct from the first type of event is associated with a second tactile output that is different from the first tactile output by an application-independent module (e.g., application-independent software module 260, FIG. 1D), the device receives (1204) first information (e.g., information 272 indicating whether a particular operation corresponds to a success event or a failure event, FIG. 1D) from a first application (e.g., application 136-1, FIG. 1D); and, in response to receiving the first information from the first application (1206), generates a response to the first information, including: in accordance with a determination that the first information corresponds to an application event of the first type (e.g., a success event), generating (1208) the first tactile output using the one or more tactile output generators (e.g., a series of tactile outputs for a success event illustrated in FIG. 5AAA); and, in accordance with a determination that the first information corresponds to an application event of the second type (e.g., a failure event) that is distinct from the first type, generating (1210), using the one or more tactile output generators, the second tactile output that is different from the first tactile output (e.g., a series of tactile outputs for a failure event illustrated in FIG. 5BBB).

After generating the response to the first information, the device receives (1212) second information from a second application (e.g., application 136-2, FIG. 1D) that is distinct from the first application; and, in response to receiving the second information from the second application, generates (1214) a response to the second information, including: in accordance with a determination that the second information corresponds to an application event of the first type, generating (1216) the first tactile output using the one or more tactile output generators (e.g., a series of tactile outputs for a success event for an authorization of an electronic payment transaction); and, in accordance with a determination that the second information corresponds to an application event of the second type, generating (1218) the second tactile output using the one or more tactile output generators (e.g., a series of tactile outputs for a failure event for a denial of an electronic payment transaction) (e.g., using a UINotificationFeedbackGenerator object (or class), including types UINotificationFeedbackTypeSuccess and UINotificationFeedbackTypeError, as described in Appendix A).

In some embodiments, the first type of event is (1220) a success event (e.g., an event with the UIEventFeedbackTypeSuccess type, as described in Appendix A) and the second type of event is a failure event (e.g., an event with the UIEventFeedbackTypeError type, as described in Appendix A).

In some embodiments, the first information is received (1222) from an application-specific module for the first application (e.g., application 136-1, or a component of application 136-1 such as application core 270-1, FIG. 1E), the second information is received from an application-specific module for the second application (e.g., application 136-2, or a component of application 136-2 such as application core 270-2, FIG. 1E), and determining whether to generate the first tactile output or the second tactile output is performed by the application-independent module (e.g., application-independent software module 260, FIG. 1D, or a respective instance of application-independent software module 260, FIG. 1E (e.g., in FIG. 1E, application core 1 (270-1) sends information indicating whether a corresponding event is a success event or a failure event, application core 2 (270-2) sends information indicating whether a corresponding event is a success event or a failure event, and application independent software module 260 (or its instances) determines whether to generate the first tactile output or the second tactile output based on association of a success event and a failure event with the first tactile output and the second tactile output).

In some embodiments, generating the response to the first information includes (1224), in accordance with a determination that the first information corresponds to an application event of a third type (e.g., a warning event, such as a notification corresponding to display of an undo operation affordance as illustrated in FIG. 5CCC) that is associated with a fifth tactile output that is different from the first tactile output and the second tactile output and that is distinct from the first type and second type, generating, using the one or more tactile output generators, the fifth tactile output that is different from the first tactile output and the second tactile output; and generating the response to the second information includes, in accordance with a determination that the second information corresponds to an application event of the third type, generating the fifth tactile output using the one or more tactile output generators (e.g., using a UIEventFeedbackGenerator object (or class), including type UIEventFeedbackTypeWarning, as described in Appendix A), as described for example with reference to FIG. 5CCC.

In some embodiments, after generating the response to the first information and generating the response to the second information, the device changes (1226) the first tactile output associated with the first type of event by the application-independent module, including associating the first type of event with a third tactile output that is different from the first tactile output. For example, because the application-independent module determines which tactile output to generate for a respective type of event, by changing the association of an event type with a particular tactile output in the application-independent module, tactile outputs for multiple applications can be updated consistently. In addition, this facilitates changing tactile outputs for a particular event type as the changes need to be made only with the application-independent module instead of changing all of the applications that are configured to generate tactile outputs for the particular event type.

In some embodiments, after changing the tactile output associated with the first type of event by the application-independent module, the device receives (1228) third information from the first application; and, in response to receiving the third information from the first application, generating a response to the third information, including: in accordance with a determination that the third information corresponds to an application event of the first type (e.g., a success event), generating the third tactile output using the one or more tactile output generators. After generating the response to the third information, the device receives fourth information from the second application that is distinct from the first application; and, in response to receiving the fourth information from the second application, generating a response to the fourth information, including, in accordance with a determination that the fourth information corresponds to an application event of the first type (e.g., a success event), generating the third tactile output using the one or more tactile output generators. For example, once the application event of the first type (e.g., a success event) is associated with a new tactile output, namely the third tactile output, tactile outputs for the application event of the first type in both the first application and the second application are changed to match the third tactile output.

In some embodiments, the third information is received (1230) from an application-specific module for the first application (e.g., application core 1 (270-1) in FIG. 1E), the fourth information is received from an application-specific module for the second application (e.g., application core 2 (270-2) in FIG. 1E), and determining whether to generate the third tactile output (e.g., determining whether the third information and/or the fourth information correspond to an application event of the first type) is performed by the application-independent module (e.g., application independent software module 260 or its instances in FIG. 1E).

In some embodiments, after generating the response to the first information and generating the response to the second information, the device changes (1232) the tactile output associated with the second type of event by the application-independent module, including associating the second type of event with a fourth tactile output that is different from the second tactile output.

In some embodiments, after changing the tactile output associated with the second type of event by the application-independent module, the device receives (1234) fifth information from the first application; and, in response to receiving the fifth information from the first application, generates a response to the fifth information, including, in accordance with a determination that the fifth information corresponds to an application event of the second type (e.g., a failure event), generating the fourth tactile output using the one or more tactile output generators. After generating the response to the fifth information, the device receives sixth information from the second application that is distinct from the first application; and, in response to receiving the sixth information from the second application, generates a response to the sixth information, including, in accordance with a determination that the sixth information corresponds to an application event of the second type, generating the fourth tactile output using the one or more tactile output generators. For example, once the application event of the second type (e.g., a failure event) is associated with a new tactile output, namely the fourth tactile output, tactile outputs for the application event of the second type in both the first application and the second application are changed to match the fourth tactile output.

In some embodiments, the fifth information is received (1236) from an application-specific module for the first application (e.g., application core 1 (270-1) in FIG. 1E), the sixth information is received from an application-specific module for the second application (e.g., application core 2 (270-2) in FIG. 1E), and determining whether to generate the fourth tactile output (e.g., determining whether the fifth information and/or the sixth information correspond to an application event of the second type) is performed by the application-independent module (e.g., application independent software module 260 or its instances in FIG. 1E).

It should be understood that the particular order in which the operations in FIGS. 12A-12D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1400, 1600, 1800, and 2000) are also applicable in an analogous manner to method 1200 described above with respect to FIGS. 12A-12D. For example, the tactile outputs, information, software applications, application-independent modules, and application-specific modules described above with reference to method 1200 optionally have one or more of the characteristics of the tactile outputs, information, software applications, application-independent modules, and application-specific modules described herein with reference to other methods described herein (e.g., methods 600, 800, 1000, 1400, 1600, 1800, and 2000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 13:
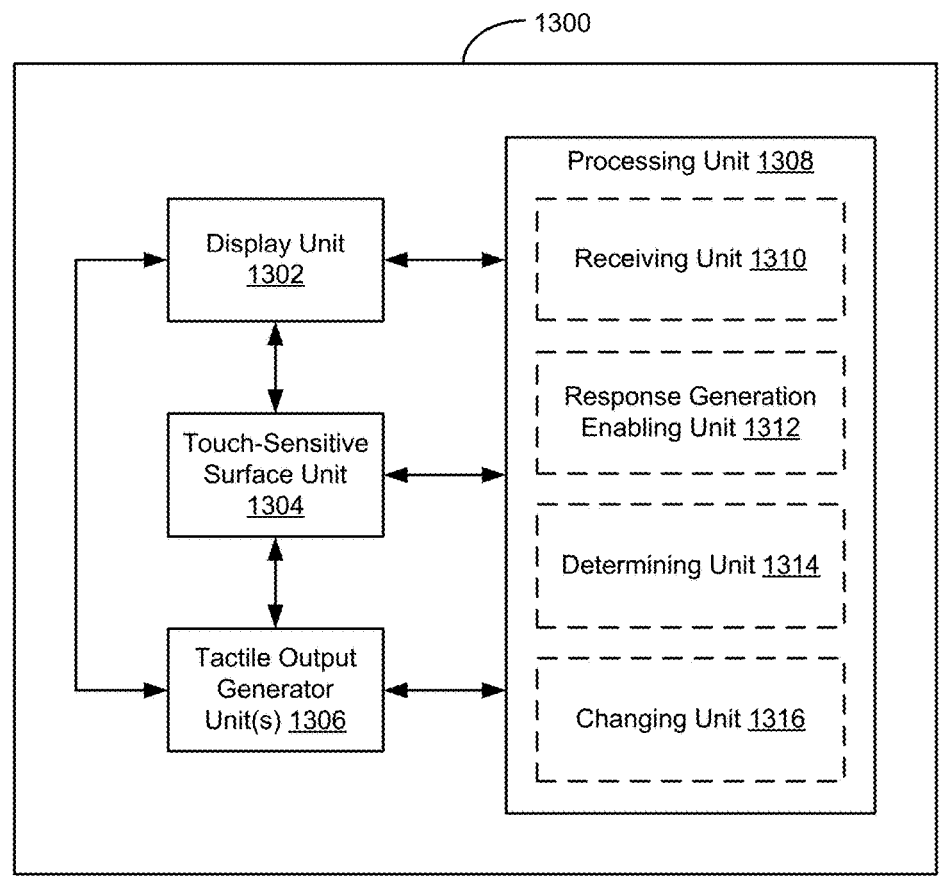
FIG. 13 is a functional block diagram of an electronic device in accordance with some embodiments.

The operations described above with reference to FIGS. 12A-12D are, optionally, implemented by components depicted in FIGS. 1A-1B or FIG. 13. For example, receiving operation 1204, generating operation 1208, receiving operation 1212, and generating operation 1214 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In accordance with some embodiments, FIG. 13 shows a functional block diagram of electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, electronic device 1300 includes display unit 1302 (e.g., including display 112) configured to display user interfaces, touch-sensitive surface unit 1304 configured to receive touch inputs (e.g., on a display surface of display unit 1302), one or more tactile output generator unit(s) 1306 configured to generate one or more tactile outputs, and processing unit 1308 coupled with display unit 1302, touch-sensitive surface unit 1304, and one or more tactile output generator unit(s) 1306. In some embodiments, processing unit 1308 includes one or more of the following sub-units: receiving unit 1310, response generation enabling unit 1312, determining unit 1314, and changing unit 1316.

In some embodiments, while a first type of event is associated with a first tactile output and a second type of event that is distinct from the first type is associated with a second tactile output that is different from the first tactile output by an application-independent module, processing unit 1308 is configured to receive (e.g., using receiving unit 1310) first information from a first application. Processing unit 1308 is configured to, in response to receiving the first information from the first application, enable generation of a response (e.g., using response generation enabling unit 1312) to the first information, including, in accordance with a determination (e.g., made using determining unit 1314) that the first information corresponds to an application event of the first type, enabling generation of the first tactile output (e.g., using response generation enabling unit 1312) using one or more tactile output generator units 1306, and in accordance with a determination (e.g., made using determining unit 1314) that the first information corresponds to an application event of the second type that is distinct from the first type, enabling generation (e.g., using response generation enabling unit 1312), using one or more tactile output generator units 1306, of the second tactile output that is different from the first tactile output. Processing unit 1308 is configured to, after enabling generation of the response to the first information, receive (e.g., using receiving unit 1310) second information from a second application that is distinct from the first application. Processing unit 1308 is configured to, in response to receiving the second information from the second application, enable generation of a response (e.g., using response generation enabling unit 1312) to the second information, including, in accordance with a determination (e.g., made using determining unit 1314) that the second information corresponds to an application event of the first type, enabling generation of the first tactile output using one or more tactile output generator units 1306, and in accordance with a determination (e.g., made using determining unit 1314) that the second information corresponds to an application event of the second type, enabling generation of the second tactile output using one or more tactile output generator units 1306.

In some embodiments, processing unit 1308 is further configured to, after enabling generation of the response to the first information and enabling generation of the response to the second information, change the tactile output (e.g., using changing unit 1316) associated with the first type of event by the application-independent module, including associating the first type of event with a third tactile output that is different from the first tactile output.

In some embodiments, after changing the tactile output associated with the first type of event by the application-independent module, processing unit 1308 receives third information (e.g., using receiving unit 1310) from the first application. Processing unit 1308 is configured to, in response to receiving the third information from the first application, enable generation of a response (e.g., using response generation enabling unit 1312) to the third information, including, in accordance with a determination (e.g., made using determining unit 1314) that the third information corresponds to an application event of the first type, enabling generation of the third tactile output (e.g., using response generation enabling unit 1312) using one or more tactile output generator units 1306. Processing unit 1308 is configured to, after enabling generation of the response to the third information, receive fourth information (e.g., using receiving unit 1310) from the second application that is distinct from the first application. Processing unit 1308 is configured to, in response to receiving the fourth information from the second application, enable generation of a response (e.g., using response generation enabling unit 1312) to the fourth information, including, in accordance with a determination (e.g., made using determining unit 1314) that the fourth information corresponds to an application event of the first type, enabling generation of the third tactile output (e.g., using response generation enabling unit 1312) using one or more tactile output generator units 1306.

In some embodiments, the third information is received from an application-specific module for the first application, the fourth information is received from an application-specific module for the second application, and determining whether to generate the third tactile output is performed by the application-independent module.

In some embodiments, processing unit 1308 is configured to, after enabling generation of the response to the first information and enabling generation of the response to the second information, change (e.g., using changing unit 1316) the tactile output associated with the second type of event by the application-independent module, including associating the second type of event with a fourth tactile output that is different from the second tactile output.

In some embodiments, processing unit 1308 is configured to, after changing (e.g., using changing unit 1316) the tactile output associated with the second type of event by the application-independent module, receive fifth information (e.g., using receiving unit 1310) from the first application. Processing unit 1308 is configured to, in response to receiving the fifth information from the first application, enable generation of a response (e.g., using response generation enabling unit 1312) to the fifth information, including, in accordance with a determination (e.g., made using determining unit 1314) that the fifth information corresponds to an application event of the second type, enabling generation of the fourth tactile output (e.g., using response generation enabling unit 1312) using one or more tactile output generator units 1306. Processing unit 1308 is configured to, after enabling generation of the response to the fifth information, receive sixth information (e.g., using receiving unit 1310) from the second application that is distinct from the first application. Processing unit 1308 is configured to, in response to receiving the sixth information from the second application, enable generation of a response (e.g., using response generation enabling unit 1312) to the sixth information, including, in accordance with a determination (e.g., made using determining unit 1314) that the sixth information corresponds to an application event of the second type, enabling generation of the fourth tactile output (e.g., using response generation enabling unit 1312) using one or more tactile output generator units 1306.

In some embodiments, the fifth information is received from an application-specific module for the first application, the sixth information is received from an application-specific module for the second application, and determining whether to generate the fourth tactile output is performed by the application-independent module.

In some embodiments, the first information is received from an application-specific module for the first application, the second information is received from an application-specific module for the second application, and determining whether to generate the first tactile output or the second tactile output is performed by the application-independent module.

In some embodiments, enabling generation of the response (e.g., using response generation enabling unit 1312) to the first information includes, in accordance with a determination (e.g., made using determining unit 1314) that the first information corresponds to an application event of a third type that is associated with a fifth tactile output that is different from the first tactile output and the second tactile output and that is distinct from the first type and second type, enabling generation (e.g., using response generation enabling unit 1312), using one or more tactile output generator units 1306, of the fifth tactile output that is different from the first tactile output and the second tactile output. In some embodiments, enabling generation of the response to the second information includes, in accordance with a determination (e.g., made using determining unit 1314) that the second information corresponds to an application event of the third type, enabling generation (e.g., using response generation enabling unit 1312) of the fifth tactile output using one or more tactile output generator units 1306.

In some embodiments, the first type of event is a success event and the second type of event is a failure event.

FIGS. 14A-14B are flow diagrams illustrating method 1400 of generating tactile outputs based on information from an application-specific module in accordance with some embodiments. Method 1400 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

As described below, method 1400 provides an enhanced way to provide tactile outputs using an application-independent software module. Providing tactile outputs using application-independent software based on information from application software provides common user interface framework that provides consistent user experience when various software applications are used. Providing a common user interface frame work to the user enhances the usability of such software applications and the device executing such software applications. In addition, the method provides an intuitive way to provide tactile outputs based on physics simulation of impact events. In turn, these features enhance the operability of the device and make the user-device interface more efficient (e.g., by helping the user to provide proper inputs and reducing user mistakes and/or unintended operations when operating/interacting with the device). Furthermore, the method reduces the size of software applications and makes execution of such software applications faster. For battery-operated electronic devices, enabling a user to use software applications faster and more efficiently conserves power and increases the time between battery charges.

The device receives (1402), at an application-independent module (e.g., application-independent software module 260, FIG. 1D), from an application-specific module that is associated with a first application (e.g., application 136-1, or a component of application 136-1 such as application core 270-1, FIGS. 1D-1E), information (e.g., information 272) about an input directed to a user interface of the first application.

An operation performed in the user interface of the first application in response to detecting the input is (1404) associated with a tactile output pattern specified by the application-specific module.

In addition, the information about the input includes (1406) information indicating a magnitude (e.g., speed or distance) of the operation performed in the user interface in response to detecting the input, as described in further detail herein with reference to FIGS. 5DDD-5GGG.

In some embodiments, the magnitude is (1408) provided by the first application.

In some embodiments, the magnitude is (1410) provided by an operating system of the electronic device (e.g., operating system 126, FIGS. 1A and 3). In some embodiments, the magnitude provided by the operating system takes into account other tactile outputs being generated during an overlapping time period.

In response to receiving the information about the input directed to the user interface of the first application, the device generates (1412), via the one or more tactile output generators, a tactile output that corresponds to the operation performed in the user interface of the first application.

The tactile output has (1414) the tactile output pattern specified by the application-specific module.

In addition, the tactile output has (1416) an amplitude determined (e.g., by the application-independent module) in accordance with the magnitude of the operation performed in the user interface of the first application in response to detecting the input (e.g., as provided by the application-specific module), as described in further detail herein with reference to FIGS. 5DDD-5GGG. For example, the tactile output is generated using UIImpactFeedbackGenerator.

In some embodiments, the amplitude of the tactile output is (1418) further determined in accordance with at least one of a velocity or mass of an object in a simulated collision or impact.

In some embodiments, the amplitude of the tactile output is (1420) further determined by applying a predefined physics model to one or more parameters of one or more displayed user interface elements or one or more parameters of a touch input.

In some embodiments, the tactile output is (1422) further characterized by a vibration frequency, wherein the vibration frequency is selected based on the tactile output pattern.

In some embodiments, the vibration frequency is (1424) less than 100 hertz.

It should be understood that the particular order in which the operations in FIGS. 14A-14B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1600, 1800, and 2000) are also applicable in an analogous manner to method 1400 described above with respect to FIGS. 14A-14B. For example, the tactile outputs, user interface operations, magnitudes, amplitudes, and frequencies described above with reference to method 1400 optionally have one or more of the characteristics of the tactile outputs, user interface operations, magnitudes, amplitudes, and frequencies described herein with reference to other methods described herein (e.g., methods 600, 800, 1000, 1200, 1600, 1800, and 2000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 15:
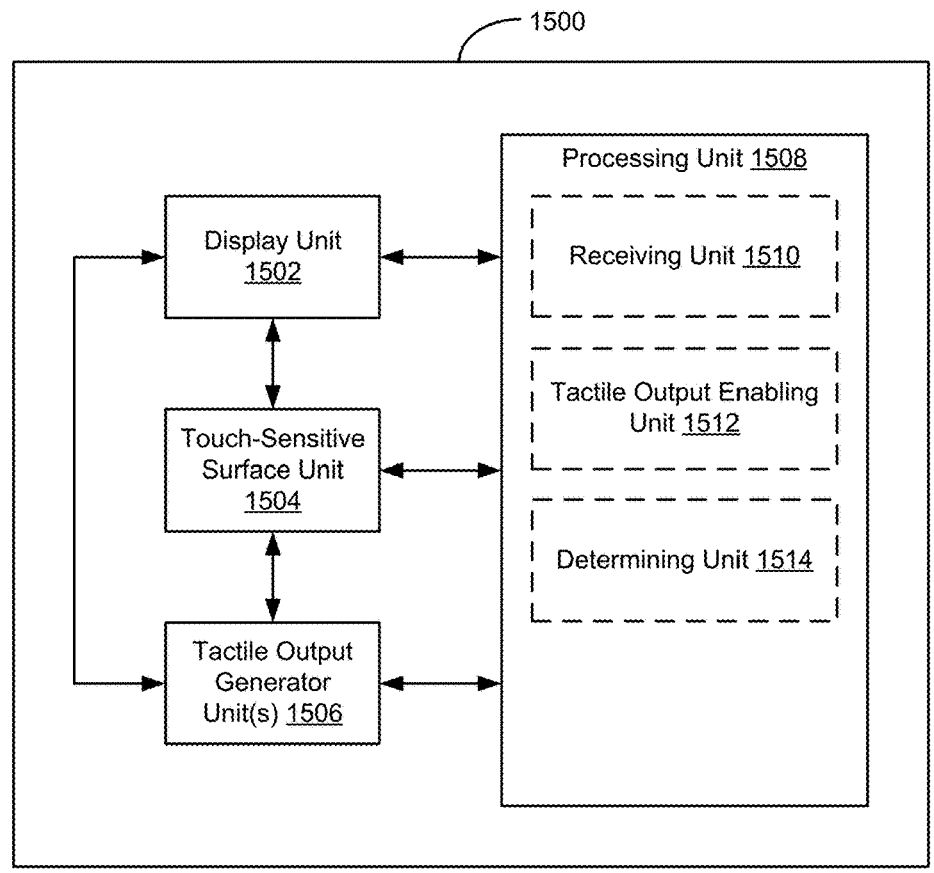
FIG. 15 is a functional block diagram of an electronic device in accordance with some embodiments.

In accordance with some embodiments, FIG. 15 shows a functional block diagram of electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, electronic device 1500 includes display unit 1502 (e.g., including display 112) configured to display user interfaces, touch-sensitive surface unit 1504 configured to receive touch inputs (e.g., on a surface, such as a display surface of display unit 1502), one or more tactile output generator unit(s) 1506 configured to generate one or more tactile outputs, and processing unit 1508 coupled with display unit 1502, touch-sensitive surface unit 1504, and one or more tactile output generator unit(s) 1506. In some embodiments, processing unit 1508 includes one or more of the following sub-units: receiving unit 1510, tactile output enabling unit 1512, and determining unit 1514.

In some embodiments, processing unit 1508 is configured to receive (e.g., using receiving unit 1510), at an application-independent module, from an application-specific module that is associated with a first application, information about an input directed to the user interface of the first application, wherein an operation performed in the user interface of the first application in response to detecting the input is associated with a tactile output pattern specified by the application-specific module, and the information about the input includes information indicating a magnitude of the operation performed in the user interface in response to detecting the input. Processing unit 1508 is configured to, in response to receiving the information about the input directed to the user interface of the first application, enable generation (e.g., using tactile output enabling unit 1512), via one or more tactile output generator units 1506, of a tactile output that corresponds to the operation performed in the user interface of the first application, wherein the tactile output has the tactile output pattern specified by the application-specific module, and the tactile output has an amplitude determined in accordance with the magnitude of the operation performed in the user interface of the first application in response to detecting the input.

In some embodiments, the tactile output is further characterized by a vibration frequency, wherein the vibration frequency is selected based on the tactile output pattern. In some embodiments, the vibration frequency is less than 100 hertz. In some embodiments, the amplitude of the tactile output is further determined (e.g., using determining unit 1514) in accordance with at least one of a velocity or mass of an object in a simulated collision or impact. In some embodiments, the amplitude of the tactile output is further determined (e.g., using determining unit 1514) by applying a predefined physics model to one or more parameters of one or more displayed user interface elements or one or more parameters of a touch input. In some embodiments, the magnitude is provided by the application. In some embodiments, the magnitude is provided by an operating system of electronic device 1500.

The operations described above with reference to FIGS. 14A-14B are, optionally, implemented by components depicted in FIGS. 1A-1B or FIG. 15. For example, receiving operation 1402 and generating operation 1412 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 16A-16D are flow diagrams illustrating method 1600 of setting power/latency states of tactile output generators based on user interaction events in accordance with some embodiments. Method 1600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1600 are, optionally, combined and/or the order of some operations is, optionally, changed.

As described below, method 1600 provides an enhanced way to provide tactile outputs based on states of tactile output generators. Predicting an upcoming tactile output generation event and transitioning tactile output generators into a low-latency mode reduces the latency in generating tactile outputs, which makes the device more responsive to user inputs, thereby creating a more efficient human-machine interface. For battery-operated electronic devices, placing the tactile output generators in the low-latency mode based on prediction of upcoming tactile output generation events conserves power over maintaining the tactile output generators in the low-latency mode all the time and increases the time between battery charges.

The device displays (1602) a user interface on the display.

While displaying the user interface on the display and while the one or more tactile output generators are in a low-power state (e.g., inactive, FIGS. 5ZZ and 5HHH), the device detects (1604) a first user interaction via the touch-sensitive surface.

In some embodiments, the first user interaction is (1606) touchdown of a contact on the touch-sensitive surface.

In some embodiments, the first user interaction is (1608) a change in a contact after detecting touchdown of the contact on the touch-sensitive surface.

In response to detecting the first user interaction, the device sets (1610) the one or more tactile output generators to a low-latency state (e.g., pre-warm or active, FIG. 5ZZ), as described in further detail herein with reference to FIG. 5III. In some embodiments, the tactile output generators are set to the low-latency state based on a determination that the first user interaction is one that potentially corresponds to a sequence of input events (e.g., a drag and drop input) that are associated with tactile outputs. For example, in some embodiments the tactile output generators are set to the low-latency state as described herein with reference to method 1000.

After setting the one or more tactile output generators to the low-latency state, the device detects (1612) a second user interaction that is part of a same sequence of user interactions as the first user interaction (e.g., the first user interaction and the second user interaction correspond to a same continuously detected contact or set of contacts on the touch-sensitive surface).

In response to detecting the second user interaction, the device generates (1614) a tactile output that corresponds to the second user interaction (e.g., using a UIFeedbackGenerator Prepare function or a UIFeedbackGeneratorUserinteractionDriven option as described in Appendix B).

Referring again to operation 1612, in some embodiments, the first user interaction and the second user interaction are (1616) detected as part of a continuous touch input on the touch-sensitive surface (e.g., during which the touch input remains in contact with the touch-sensitive surface) that traverses a sequence of components of the user interface displayed on the display.

In some embodiments, the device scrolls (1618) a set of menu items in response to user input on the touch-sensitive surface, wherein the sequence of user interactions comprises a sequence of respective menu items in the set of menu items scrolling to or through a selection position in the user interface (e.g., as described in further detail herein with reference to FIGS. 5I-5J).

In some embodiments, the device scrolls (1620) a set of date component or time component items in response to user input on the touch-sensitive surface, wherein the sequence of user interactions comprises a sequence of date component or time component items scrolling to or through a selection position in the user interface (e.g., as described in further detail herein with reference to FIGS. 5K-5O).

Referring again to operation 1614, in some embodiments, a monitoring function tracks (1622) a progress of the sequence of user interactions. The one or more tactile output generators are changed to the low-latency state based on a determination that the monitoring function has entered a start state in which the monitoring function has started monitoring the sequence of user interactions. In addition, the tactile output is generated based on a determination that the monitoring function has entered a changed state (e.g., a changed state for or with respect to the sequence of user interactions).

In some embodiments, a monitoring function tracks (1624) a progress of the sequence of user interactions. The one or more tactile output generators are changed to the low-latency state based on a determination that the monitoring function has entered a changed state that precedes a changed state that corresponds to a tactile output (e.g., a changed state indicating movement of the contact). In addition, the tactile output is generated based on a determination that the monitoring function has entered the changed state that corresponds to a tactile output (e.g., a changed state indicating movement of the contact over a boundary or to a new drop target).

In some embodiments, the sequence of user interactions corresponds (1626) to a continuous touch input on the touch-sensitive surface that traverses a sequence of components of a user interface displayed on the display, and the device generates a sequence of two or more tactile outputs using identical waveforms (e.g., using UIRetargetFeedbackGenerator).

In some embodiments, the sequence of user interactions corresponds (1628) to a touch input on the touch-sensitive surface that traverses a sequence of soft keys (e.g., keys for selecting different versions of a same letter or character, such as a letter (e.g., "e") with different diacritical marks) displayed on the display, and the device generates one or more tactile outputs that correspond to the touch input reaching predefined positions with respect to the sequence of soft keys (e.g., leading edges, or central positions, or both, of the keys).

In some embodiments, the sequence of user interactions includes (1630) a sequence of events corresponding to distinct phases of dragging an object, in the user interface displayed on the display, from an initial location to another location (e.g., using a UIDragFeedbackGenerator object), as described in further detail herein with reference to FIGS. 5LL-5QQ.

In some embodiments, the distinct phases of dragging the object include (1632) an object lifting phase and an object dropping phase. In some embodiments, in response to a first respective user interaction, in the sequence of user interactions, the first respective user interaction corresponding to the object lifting phase, the device sets one or more tactile output generators to the low-latency state, and in response to a second respective user interaction, in the sequence of user interactions, the second respective user interaction corresponding to the object dropping phase, the device sets one or more tactile output generators to the low-power state (e.g., as described herein with reference to method 1000).

In some embodiments, the distinct phases of dragging the object include (1634) an object snapping phase, corresponding to the object snapping into place with respect to a user interface feature (e.g., a grid or an array, as described in further detail herein with reference to FIGS. 5RR-5SS), and the tactile output corresponds to the object snapping into place with respect to the user interface feature. In some embodiments, a tactile output is generated in accordance with an object snapping into place with respect to a user interface feature without regard to whether the object snapping into place corresponds to an object snapping phase of a sequence of distinct phases of dragging the object.

In some embodiments, after generating the tactile output in response to detecting the second user interaction, the device forgoes (1636) generation of a subsequent tactile output in response to detecting a third user interaction that is part of the same sequence of user interactions as the first user interaction and the second user interaction, in accordance with a determination that the third user interaction occurred less than a predefined time duration from the second user interaction (e.g., as described in further detail herein with reference to FIGS. 5K-5O and 5JJJ, and method 1800).

In some embodiments, the device detects (1638) an end of the sequence of user interactions. In response to detecting the end of the sequence of user interactions, the device sets the one or more tactile output generators to the low-power state.

In some embodiments, a monitoring function tracks (1640) a progress of the sequence of user interactions, and the one or more tactile output generators are set to the low-power state based on a determination that the monitoring function has entered an end state (e.g., an end state for, or with respect to, the sequence of user interactions).

It should be understood that the particular order in which the operations in FIGS. 16A-16D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1800, and 2000) are also applicable in an analogous manner to method 1600 described above with respect to FIGS. 16A-16D. For example, the tactile outputs, tactile output generators, tactile output generator states, user interactions, user interface elements, and user interface manipulations described above with reference to method 1600 optionally have one or more of the characteristics of the tactile outputs, tactile output generators, tactile output generator states, user interactions, user interface elements, and user interface manipulations described herein with reference to other methods described herein (e.g., methods 600, 800, 1000, 1200, 1400, 1800, and 2000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 17:
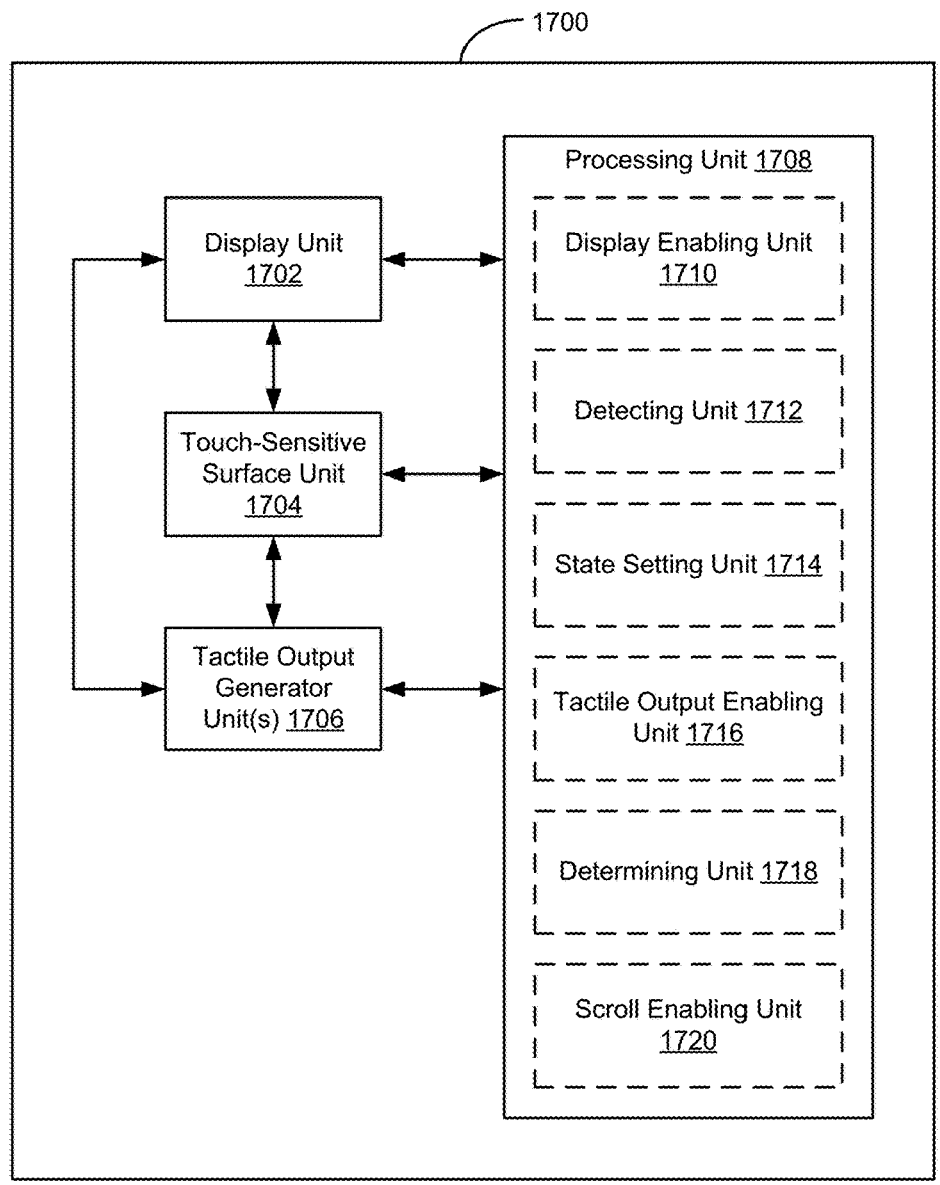
FIG. 17 is a functional block diagram of an electronic device in accordance with some embodiments.

In accordance with some embodiments, FIG. 17 shows a functional block diagram of electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, electronic device 1700 includes display unit 1702 (e.g., including display 112) configured to display user interfaces, touch-sensitive surface unit 1704 configured to receive touch inputs (e.g., on a surface, such as a display surface of display unit 1702), one or more tactile output generator unit(s) 1706 configured to generate one or more tactile outputs, and processing unit 1708 coupled with display unit 1702, touch-sensitive surface unit 1704, and one or more tactile output generator unit(s) 1706. In some embodiments, processing unit 1708 includes one or more of the following sub-units: display enabling unit 1710, detecting unit 1712, state setting unit 1714, tactile output enabling unit 1716, determining unit 1718, and scroll enabling unit 1720.

In some embodiments, processing unit 1708 is configured to enable display (e.g., using display enabling unit 1710) of a user interface on display unit 1702. While enabling display of the user interface on display unit 1702 and while one or more tactile output generator units 1706 are in a low-power state, processing unit 1708 detects (e.g., using detecting unit 1712) a first user interaction via touch-sensitive surface unit 1704. Processing unit 1708 is configured to, in response to detecting the first user interaction, set one or more tactile output generator units 1706 to a low-latency state (e.g., using state setting unit 1714). Processing unit 1708 is configured to, after setting one or more tactile output generator units 1706 to the low-latency state, detect (e.g., using detecting unit 1712) a second user interaction that is part of a same sequence of user interactions as the first user interaction. Processing unit 1708 is configured to, in response to detecting the second user interaction, enable generation of a tactile output (e.g., using tactile output enabling unit 1716) that corresponds to the second user interaction.

In some embodiments, the first user interaction and the second user interaction are detected as part of a continuous touch input on touch-sensitive surface unit 1704 that traverses a sequence of components of the user interface displayed on display unit 1702.

In some embodiments, the first user interaction is touchdown of a contact on touch-sensitive surface unit 1704. In some embodiments, the first user interaction is a change in a contact after detecting touchdown of the contact on touch-sensitive surface unit 1704.

In some embodiments, a monitoring function tracks a progress of the sequence of user interactions. One or more tactile output generator units 1706 are changed (e.g., using state setting unit 1714) to the low-latency state based on a determination (e.g., made using determining unit 1718) that the monitoring function has entered a start state in which the monitoring function has started monitoring the sequence of user interactions, and the tactile output is generated (e.g., using tactile output enabling unit 1716) based on a determination (e.g., made using determining unit 1718) that the monitoring function has entered a changed state.

In some embodiments, a monitoring function tracks a progress of the sequence of user interactions. One or more tactile output generator units 1706 are changed (e.g., using state setting unit 1714) to the low-latency state based on a determination (e.g., made using determining unit 1718) that the monitoring function has entered a changed state that precedes a changed state that corresponds to a tactile output, and the tactile output is generated (e.g., using tactile output enabling unit 1716) based on a determination (e.g., made using determining unit 1718) that the monitoring function has entered the changed state that corresponds to a tactile output.

In some embodiments, processing unit 1708 is further configured to detect (e.g., using detecting unit 1712) an end of the sequence of user interactions. Processing unit 1708 is configured to, in response to detecting the end of the sequence of user interactions, set one or more tactile output generator units 1706 to the low-power state (e.g., using state setting unit 1714).

In some embodiments, a monitoring function tracks a progress of the sequence of user interactions, and one or more tactile output generator units 1706 are set (e.g., using state setting unit 1714) to the low-power state based on a determination (e.g., made using determining unit 1718) that the monitoring function has entered an end state.

In some embodiments, the sequence of user interactions corresponds to a continuous touch input on touch-sensitive surface unit 1704 that traverses a sequence of components of a user interface displayed on display unit 1702, and processing unit 1708 is further configured to enable generation of a sequence of two or more tactile outputs (e.g., using tactile output enabling unit 1716) using identical waveforms.

In some embodiments, processing unit 1708 is configured to, after enabling generation of the tactile output in response to detecting the second user interaction, forgo generation of a subsequent tactile output (e.g., using tactile output enabling unit 1716) in response to detecting (e.g., using detecting unit 1712) a third user interaction that is part of the same sequence of user interactions as the first user interaction and the second user interaction, in accordance with a determination (e.g., made using determining unit 1718) that the third user interaction occurred less than a predefined time duration from the second user interaction.

In some embodiments, processing unit 1708 enables scrolling of a set of menu items (e.g., using scroll enabling unit 1720) in response to user input on touch-sensitive surface unit 1704, wherein the sequence of user interactions comprises a sequence of respective menu items in the set of menu items scrolling to or through a selection position in the user interface.

In some embodiments, processing unit 1708 enables scrolling a set of date component or time component items (e.g., using scroll enabling unit 1720) in response to user input on touch-sensitive surface unit 1704, wherein the sequence of user interactions comprises a sequence of date component or time component items scrolling to or through a selection position in the user interface.

In some embodiments, the sequence of user interactions corresponds to a touch input on touch-sensitive surface unit 1704 that traverses a sequence of soft keys displayed on display unit 1702, and processing unit 1708 enables generation of one or more tactile outputs (e.g., using tactile output enabling unit 1716) that correspond to the touch input reaching predefined positions with respect to the sequence of soft keys.

In some embodiments, the sequence of user interactions includes a sequence of events corresponding to distinct phases of dragging an object, in the user interface displayed on display unit 1702, from an initial location to another location. In some embodiments, the distinct phases of dragging the object include an object lifting phase and an object dropping phase. In some embodiments, the distinct phases of dragging the object include an object snapping phase, corresponding to the object snapping into place with respect to a user interface feature, and the tactile output corresponds to the object snapping into place with respect to the user interface feature.

The operations described above with reference to FIGS. 16A-16D are, optionally, implemented by components depicted in FIGS. 1A-1B or FIG. 17. For example, detecting operation 1604, setting operation 1610, and generating operation 1614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 18A-18C are flow diagrams illustrating method 1800 of conditionally generating tactile outputs based on a time interval from a previous tactile output generation in accordance with some embodiments. Method 1800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1800 are, optionally, combined and/or the order of some operations is, optionally, changed.

As described below, method 1800 provides an enhanced way to provide tactile outputs based on time intervals. Forgoing generation of tactile outputs based on time intervals from preceding tactile outputs reduces excessive generation of tactile outputs, thereby protecting tactile output generators. In addition, forgoing generation of tactile outputs based on time intervals from preceding tactile outputs reduces overloading the user with tactile outputs, thereby allowing the user to focus on more important tactile outputs. Thus, this protects the device and makes the user-device interface more efficient (e.g., by providing more important tactile outputs and reducing user mistakes and/or unintended operations when operating/interacting with the device).

The device receives (1802) a first request for a first user interface operation.

The first user interface operation is (1804) a first type of change in a respective user interface element that is associated with a first tactile output.

In response to receiving the first request (1806), the device performs (1808) the first user interface operation, and generates (1810) the first tactile output.

After performing the first user interface operation, the device receives (1812) a second request for a second user interface operation that is associated with a second tactile output.

In response to receiving the second request (1814), in accordance with a determination (1816) that the second request for the second user interface operation comprises a request for an instance of the first type of change in the user interface that is associated with the second tactile output, the operations described as followed are performed (e.g., as described in further detail herein with reference to FIG. 5JJJ).

The device determines (1818) a time interval from a point in time corresponding to a most recent prior instance of the first type of change in the respective user interface element for which a tactile output was generated to a point in time corresponding to the first type of change in the respective user interface element requested by the second request. In some embodiments, the time interval is measured from request times for the tactile outputs, times associated with user interface changes, or tactile output times (actual and projected).

In accordance with a determination (1820) that the time interval is less than a predefined time period, the device performs the second user interface operation without generating the second tactile output (e.g., as described in further detail herein with reference to the requests and tactile outputs in tactile output graph 5170a, FIG. 5JJJ).

In some embodiments, the time interval is (1822) determined from a beginning of the tactile output generated for the most recent prior instance of the first type of change in the respective user interface element to a beginning of the second tactile output. In some embodiments, the predefined time period is longer than a duration of the tactile output generated for the most recent prior instance of the first type of change in the respective user interface element.

In accordance with a determination (1824) that the time interval is greater than the predefined time period, the device performs the second user interface operation and generates the second tactile output (e.g., as described in further detail herein with reference to the requests and tactile outputs in tactile output graph 5170a, FIG. 5JJJ).

In some embodiments, in accordance (1826) a determination that the second request for the second user interface operation does not comprise a request for an instance of the first type of change in the respective user interface element, the device mixes the second tactile output with other tactile outputs generated by the one or more tactile output generators without regard to whether the time interval is less than the predefined time period (e.g., as described in further detail herein with reference to the requests and tactile outputs in tactile output graph 5170b, FIG. 5JJJ).

In some embodiments, after performing the second user interface operation, the device receives (1828) a third request for a third user interface operation that is associated with a third tactile output. In response to receiving the third request for the third user interface operation, in accordance with a determination that the third request for the third user interface operation comprises a request for an instance of the first type of change in the user interface that is associated with a third tactile output, the device determines a second time interval from a point in time corresponding to a most recent prior instance of the first type of change in the respective user interface element for which a tactile output was generated to a point in time corresponding to the first type of change in the respective user interface element requested by the third request. In accordance with a determination that the second time interval is less than the predefined time period, the device performs the third user interface operation without generating the third tactile output. In accordance with a determination that the second time interval is greater than the predefined time period, the device performs the third user interface operation and generates the third tactile output.

In some embodiments, the first and third tactile outputs are (1830) synchronized with first and third user interactions in a sequence of user interactions that correspond to a continuous touch input on the touch-sensitive surface (e.g., traversing a sequence of user interface elements, such as a sequence of menu items, date or time component items, or soft keys, in response to a continuous touch input). In some embodiments, the first, second, and third tactile outputs correspond to first, second, and third elements, respectively, in the sequence. In some embodiments, generation of a respective tactile output is synchronized with the continuous touch input traversing the corresponding respective user interface element. In some embodiments, however, if the input traverses the sequence too quickly, one or more of the tactile outputs are not generated. In some embodiments, even if, for example, the second tactile output is not generated, generation of the first and third tactile outputs is synchronized with the continuous touch input traversing the first and third element, respectively (e.g., without regard to whether the second tactile output is generated).

In some embodiments, in response to receiving the third request (1832), in accordance with a determination that the third request for the third user interface operation does not comprise an instance of the first type of change in the respective user interface element, the device mixes the third tactile output with other tactile outputs generated by the one or more tactile output generators without regard to whether the second time interval is less than the predefined time period (e.g., as described in further detail herein with reference to the requests and tactile outputs in tactile output graphs 5170a and 5170b, FIG. 5JJJ).

It should be understood that the particular order in which the operations in FIGS. 18A-18C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, and 2000) are also applicable in an analogous manner to method 1800 described above with respect to FIGS. 18A-18C. For example, the user interface elements, user interface operations, and tactile outputs, described above with reference to method 1800 optionally have one or more of the characteristics of the user interface elements, user interface operations, and tactile outputs described herein with reference to other methods described herein (e.g., methods 600, 800, 1000, 1200, 1400, 1600, and 2000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 19:
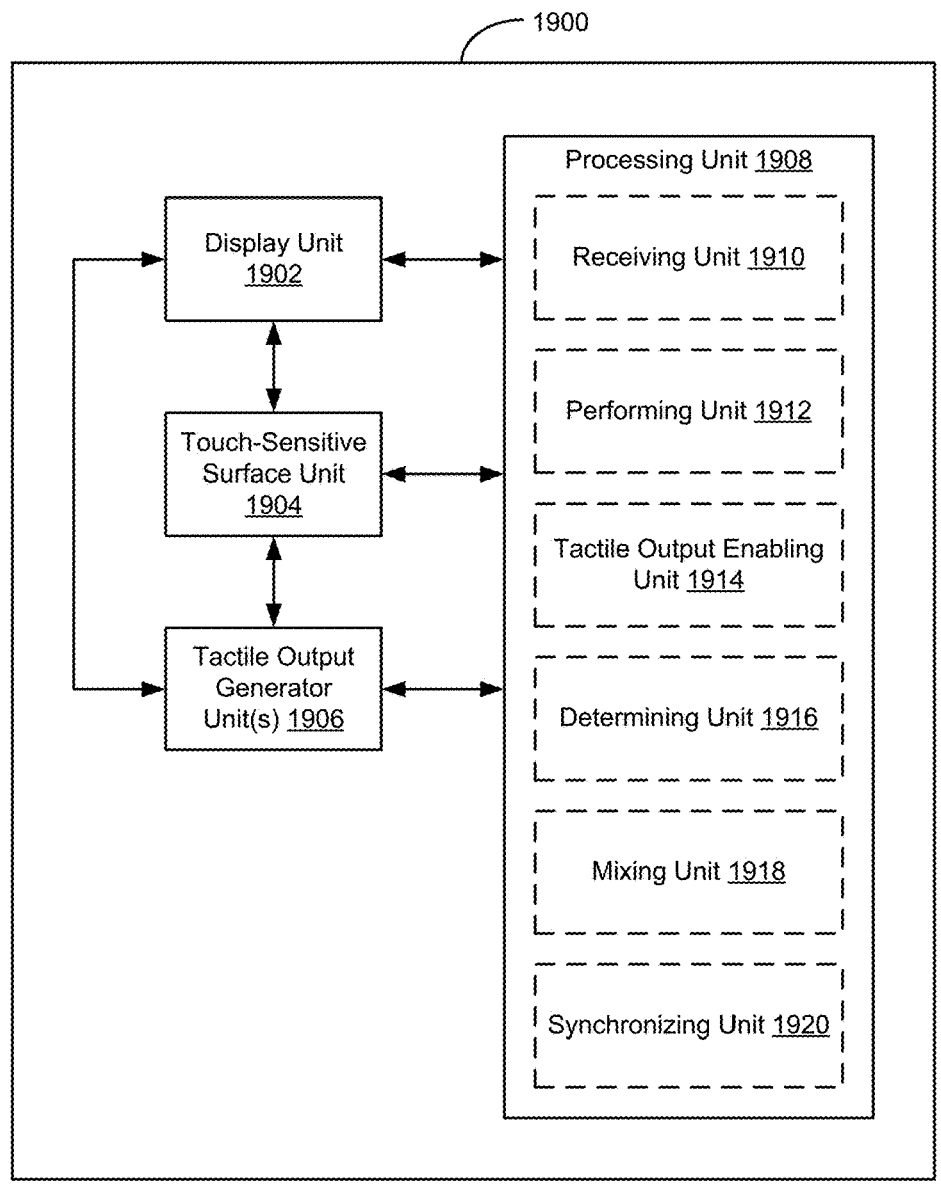
FIG. 19 is a functional block diagram of an electronic device in accordance with some embodiments.

In accordance with some embodiments, FIG. 19 shows a functional block diagram of electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, electronic device 1900 includes display unit 1902 (e.g., including display 112) configured to display user interfaces, touch-sensitive surface unit 1904 configured to receive touch inputs (e.g., on a surface, such as a display surface of display unit 1902), one or more tactile output generator unit(s) 1906 configured to generate one or more tactile outputs, and processing unit 1908 coupled with display unit 1902, touch-sensitive surface unit 1904, and one or more tactile output generator unit(s) 1906. In some embodiments, processing unit 1908 includes one or more of the following sub-units: receiving unit 1910, performing unit 1912, tactile output enabling unit 1914, determining unit 1916, mixing unit 1918, and synchronizing unit 1920.

In some embodiments, processing unit 1908 is configured to receive (e.g., using receiving unit 1910) a first request for a first user interface operation, wherein the first user interface operation is a first type of change in a respective user interface element that is associated with a first tactile output. Processing unit 1908 is configured to, in response to receiving the first request, perform (e.g., using performing unit 1912) the first user interface operation, and enable generation of the first tactile output (e.g., using tactile output enabling unit 1914). Processing unit 1908 is configured to, after performing the first user interface operation, receive (e.g., using receiving unit 1910) a second request for a second user interface operation that is associated with a second tactile output. Processing unit 1908 is configured to, in response to receiving the second request, in accordance with a determination (e.g., made using determining unit 1916) that the second request for the second user interface operation comprises a request for an instance of the first type of change in the user interface that is associated with a second tactile output, determine a time interval (e.g., using determining unit 1916) from a point in time corresponding to a most recent prior instance of the first type of change in the respective user interface element for which a tactile output was generated to a point in time corresponding to the first type of change in the respective user interface element requested by the second request. Processing unit 1908 is configured to, in accordance with a determination (e.g., made using determining unit 1916) that the time interval is less than a predefined time period, perform the second user interface operation (e.g., using performing unit 1912) without enabling generation of the second tactile output; and, in accordance with a determination that the time interval is greater than the predefined time period, perform the second user interface operation (e.g., using performing unit 1912) and enable generation of the second tactile output (e.g., using tactile output enabling unit 1914).

In some embodiments, the time interval is determined (e.g., using determining unit 1916) from a beginning of the tactile output generated for the most recent prior instance of the first type of change in the respective user interface element to a beginning of the second tactile output, and the predefined time period is longer than a duration of the tactile output generated for the most recent prior instance of the first type of change in the respective user interface element.

In some embodiments, processing unit 1908 is configured to, in response to receiving the second request, in accordance with a determination (e.g., made using determining unit 1916) that the second request for the second user interface operation does not comprise a request for an instance of the first type of change in the respective user interface element, mix (e.g., using mixing unit 1918 and/or tactile output enabling unit 1914) the second tactile output with other tactile outputs generated by one or more tactile output generator units 1906 without regard to whether the time interval is less than the predefined time period.

In some embodiments, processing unit 1908 is configured to, after performing the second user interface operation, receive (e.g., using receiving unit 1910) a third request for third user interface operation that is associated with a third tactile output. Processing unit 1908 is configured to, in response to receiving the third request for a third user interface operation, in accordance with a determination (e.g., made using determining unit 1916) that the third request for the third user interface operation comprises a request for an instance of the first type of change in the user interface that is associated with a third tactile output, determine (e.g., using determining unit 1916) a second time interval from a point in time corresponding to a most recent prior instance of the first type of change in the respective user interface element for which a tactile output was generated to a point in time corresponding to the first type of change in the respective user interface element requested by the third request. Processing unit 1908 is configured to, in accordance with a determination (e.g., made using determining unit 1916) that the second time interval is less than the predefined time period, perform the third user interface operation (e.g., using performing unit 1912) without enabling generation of the third tactile output. Processing unit 1908 is configured to, in accordance with a determination (e.g., made using determining unit 1916) that the second time interval is greater than the predefined time period, perform the third user interface operation (e.g., using performing unit 1912) and enable generation of the third tactile output (e.g., using tactile output enabling unit 1914).

In some embodiments, processing unit 1908 is configured to, in response to receiving the third request, in accordance with a determination that the third request for the third user interface operation does not comprise an instance of the first type of change in the respective user interface element, mix (e.g., using mixing unit 1918 and/or tactile output enabling unit 1914) the third tactile output with other tactile outputs generated by one or more tactile output generator units 1906 without regard to whether the second time interval is less than the predefined time period.

In some embodiments, the first and third tactile outputs are synchronized (e.g., using synchronizing unit 1920, mixing unit 1918, and/or tactile output enabling unit 1914) with first and third user interactions in a sequence of user interactions that correspond to a continuous touch input on touch-sensitive surface unit 1904.

The operations described above with reference to FIGS. 18A-18C are, optionally, implemented by components depicted in FIGS. 1A-1B or FIG. 19. For example, receiving operation 1802, performing operation 1808, and generating operation 1810 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 20A-20B are flow diagrams illustrating method 2000 of generating tactile outputs based on a magnitude of an input and dimensions of a user interface element in accordance with some embodiments. Method 2000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2000 are, optionally, combined and/or the order of some operations is, optionally, changed.

As described below, method 2000 provides an enhanced way to provide tactile outputs using an application-independent software module. Providing tactile outputs using application-independent software based on information from application software provides common user interface framework that provides consistent user experience when various software applications are used. Providing a common user interface frame work to the user enhances the usability of such software applications and the device executing such software applications. In addition, method 2000 provides an intuitive way to provide tactile outputs based on a magnitude of an input. Tactile outputs based on the magnitude of the input conform to user expectations for tactile outputs. In turn, these features enhance the operability of the device and make the user-device interface more efficient (e.g., by helping the user to provide proper inputs and reducing user mistakes and/or unintended operations when operating/interacting with the device). In addition, the method reduces the size of software applications and makes execution of such software applications faster. For battery-operated electronic devices, enabling a user to use software applications faster and more efficiently conserves power and increases the time between battery charges.

The device receives (2002), at an application-independent module (e.g., application-independent software module 260, FIG. 1D), user interface information (e.g., information 272, FIG. 1D) from an application.

In some embodiments, the application-independent module comprises (2004), or is included in, an operating system of the electronic device (e.g., operating system 126, FIGS. 1A and 3).

The user interface information corresponds (2006) to one or more displayed user interface elements with one or more dimensions defined by an application-specific module of the application.

In some embodiments, the one or more dimensions of the user interface elements include (2008) an extent of a user interface element and an extent that the user interface element can be temporarily scrolled beyond an edge of a display region (e.g., an edge of the display), as described in further detail herein with reference to FIGS. 5P-5Y. For example, the scrolling beyond the edge of the display region is maintained until the end of the input that caused the scrolling beyond the edge of the display region or is based on simulated momentum of the user interface element in response to an input with velocity in the direction of scrolling, at which point the user interface element scrolls back so that the user interface element is completely within the display region. In some embodiments, a tactile output is generated when the user interface element reaches the minimum zoom size. In some embodiments, a tactile output is generated when the user interface element reaches the amount by which the user interface element can be temporarily zoomed beyond the minimum zoom size. In some embodiments, a tactile output is generated when the user interface element snaps back to the minimum zoom size after being zoomed beyond the minimum zoom size.

In some embodiments, the one or more dimensions of the user interface elements include (2010) a maximum zoom size of a user interface element and an amount by which the user interface element can be temporarily zoomed beyond the maximum zoom size (e.g., the zooming beyond the maximum zoom size is maintained until the end of the input that caused the zooming beyond the maximum zoom size, at which point the user interface element returns to the maximum zoom size). In some embodiments, a tactile output is generated when the user interface element reaches the maximum zoom size, as described in further detail herein with reference to FIGS. 5Z-5EE. In some embodiments, a tactile output is generated when the user interface element reaches the amount by which the user interface element can be temporarily zoomed beyond the maximum zoom size. In some embodiments, a tactile output is generated when the user interface element snaps back to the maximum zoom size after being zoomed beyond the maximum zoom size.

In some embodiments, the one or more dimensions of the user interface elements include (2012) a minimum zoom size of a user interface element and an amount by which the user interface element can be temporarily zoomed beyond the minimum zoom size (e.g., the zooming beyond the minimum zoom size is maintained until the end of the input that caused the zooming beyond the minimum zoom size, at which point the user interface element returns to the minimum zoom size). In some embodiments, a tactile output is generated when the user interface element reaches the minimum zoom size, as described in further detail herein with reference to FIGS. 5F-5I. In some embodiments, a tactile output is generated when the user interface element reaches the amount by which the user interface element can be temporarily zoomed beyond the minimum zoom size. In some embodiments, a tactile output is generated when the user interface element snaps back to the minimum zoom size after being zoomed beyond the minimum zoom size.

Next, the device receives (2014) an input directed toward one or more of the displayed user interface elements (e.g., corresponding to changes in a position of a user input). In some embodiments, the device detects changes in the position of the input by receiving them from an application or from other channel(s) (e.g., a module that is updating the UI for the application).

Next, the device determines (2016), at the application-independent module, one or more tactile outputs to be generated based on a magnitude (e.g., distance, velocity, intensity, etc.) of the input and the one or more dimensions defined by the applications-specific module. In some embodiments, the device determines the one or more tactile outputs in accordance with changes to a position or scale of one or more of the displayed user interface elements, based on a magnitude (or more generally a parameter) of the input.

Next, the device generates (2018), using the one or more tactile output generators, the determined one or more tactile outputs (e.g., using a UIEdgeFeedbackGenerator class described in Appendix B or its instance).

In some embodiments, the application-independent module determines (2020) a magnitude of the one or more tactile outputs by applying a predefined physics model to one or more parameters of the received input (e.g., a magnitude of the velocity of the input).

In some embodiments, the application-independent module determines (2022) whether to generate a respective tactile output based on whether an edge of a respective element, of the displayed user interface elements, has passed a predefined boundary (e.g., as described in further detail herein with reference to FIGS. 5P-5II and 5NN-5PP).

In some embodiments, the application-independent module determines (2024) whether to generate a respective tactile output based on whether a parameter (e.g., size) of a respective element, of the displayed user interface elements, has passed a predefined limit.

In some embodiments, the application-independent module determines (2026) whether to generate a respective tactile output based on whether an edge of a respective element, of the displayed user interface elements, has passed a predefined boundary, and whether a respective user touch input is detected (e.g., scrolling with a rubber band effect while a contact is detected, or performing a zoom in or zoom out operation while a contact is detected).

It should be understood that the particular order in which the operations in FIGS. 20A-20B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 1000, 1200, 1400, 1600, and 1800) are also applicable in an analogous manner to method 2000 described above with respect to FIGS. 20A-20B. For example, the tactile outputs, user interface elements, user interface operations, user interface information, software applications, application-independent modules, magnitudes of tactile outputs described above with reference to method 2000 optionally have one or more of the characteristics of the tactile outputs, user interface elements, user interface operations, user interface information, software applications, application-independent modules, magnitudes of tactile outputs described herein with reference to other methods described herein (e.g., methods 600, 800, 1000, 1200, 1400, 1600, and 1800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

Figure 21:
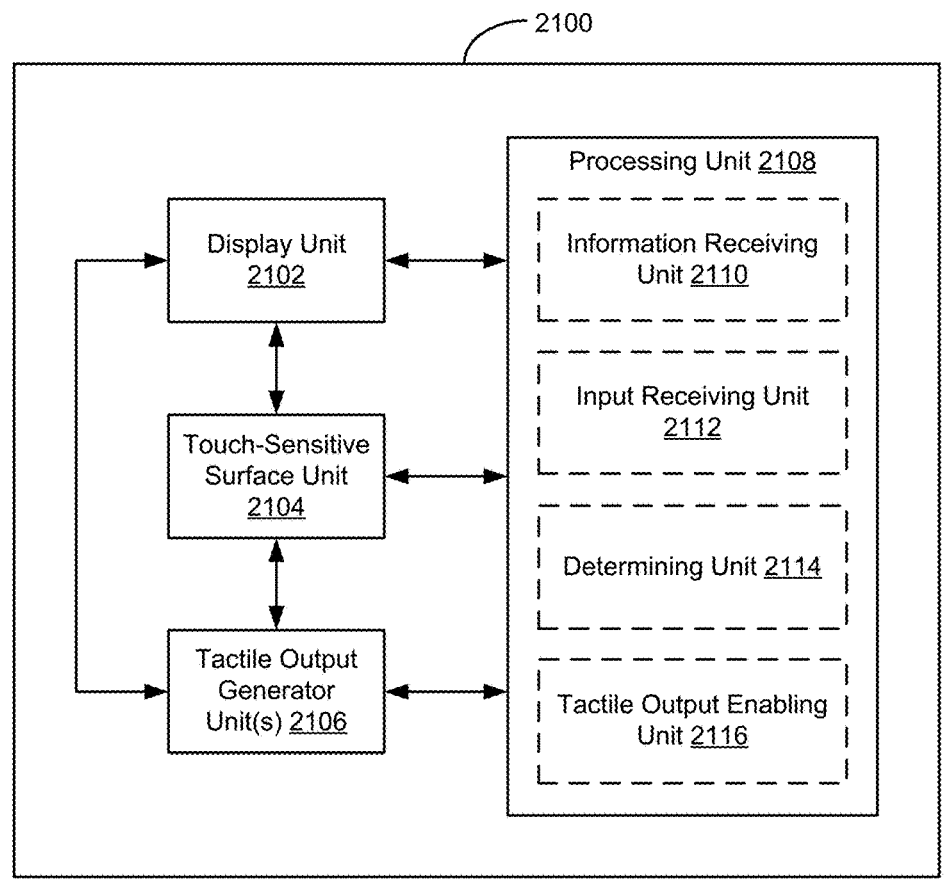
FIG. 21 is a functional block diagram of an electronic device in accordance with some embodiments.

In accordance with some embodiments, FIG. 21 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 includes display unit 2102 (e.g., corresponding to display 112) configured to display user interfaces, touch-sensitive surface unit 2104 configured to receive touch inputs (e.g., on a surface, such as a display surface of display unit 2102), one or more tactile output generator unit(s) 2106 configured to generate one or more tactile outputs, and processing unit 2108 coupled with display unit 2102, the touch-sensitive surface unit 2104, and the tactile output generator unit(s) 2106. In some embodiments, processing unit 2108 includes one or more of the following sub-units: information receiving unit 2110, input receiving unit 211, determining unit 2114, and tactile output enabling unit 2116.

In some embodiments, processing unit 2108 is configured to receive, at an application-independent module, user interface information from an application (e.g., using information receiving unit 2110), wherein the user interface information corresponds to one or more displayed user interface elements with one or more dimensions defined by an application-specific module of the application. Processing unit 2108 is configured to receive (e.g., using input receiving unit 2112) an input directed toward one or more of the displayed user interface elements. Processing unit 2108 is configured to determine, at the application-independent module, one or more tactile outputs to be generated based on a magnitude of the input and the one or more dimensions defined by the applications-specific module (e.g., using determining unit 2114), and enable generation (e.g., using tactile output enabling unit 2116) of the determined one or more tactile outputs using one or more tactile output generator units 2106.

In some embodiments, the application-independent module comprises, or is included in, an operating system of electronic device 2100. In some embodiments, the application-independent module determines a magnitude of the one or more tactile outputs by applying a predefined physics model to one or more parameters of the received input.

In some embodiments, the application-independent module determines (e.g., using determining unit 2114) whether to generate a respective tactile output based on whether an edge of a respective element, of the displayed user interface elements, has passed a predefined boundary. In some embodiments, the application-independent module determines (e.g., using determining unit 2114) whether to generate a respective tactile output based on whether a parameter of a respective element, of the displayed user interface elements, has passed a predefined limit. In some embodiments, the application-independent module determines (e.g., using determining unit 2114) whether to generate a respective tactile output based on whether an edge of a respective element, of the displayed user interface elements, has passed a predefined boundary, and whether a respective user touch input is detected.

In some embodiments, the dimensions of the user interface elements include an extent of a user interface element and an extent that the user interface element can be temporarily scrolled beyond an edge of a display region. In some embodiments, the dimensions of the user interface elements include a maximum zoom size of a user interface element and an amount by which the user interface element can be temporarily zoomed beyond the maximum zoom size. In some embodiments, the dimensions of the user interface elements include a minimum zoom size of a user interface element and an amount by which the user interface element can be temporarily zoomed beyond the minimum zoom size.

The operations described above with reference to FIGS. 20A-20B are, optionally, implemented by components depicted in FIGS. 1A-1B or FIG. 21. For example, receiving operation 2002, determining operation 2016, and generating operation 2018 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Appendix A

UIFeedbackGenerator (API)

Motivation

Architecture Overview

Figure 22A:
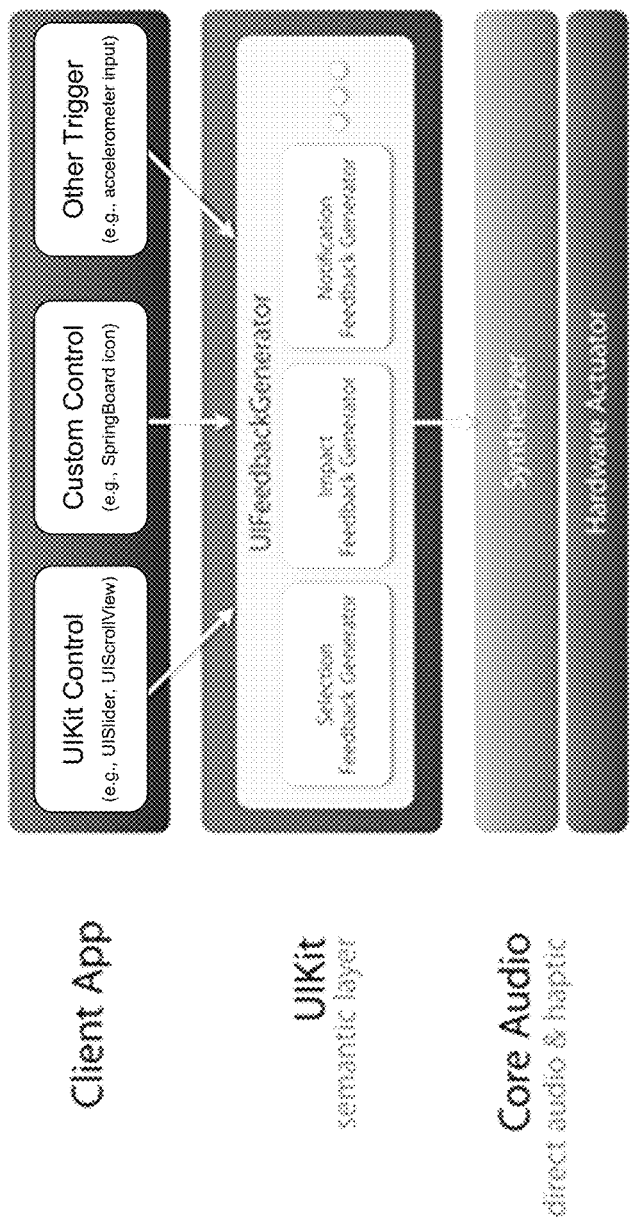
FIG. 22A is a diagram of an example feedback architecture.

Figure 22A is a diagram of an example feedback architecture.

UIKit sits on top of CoreAudio to play audio and haptic feedback, and provides a high level API called UIFeedbackGenerator. It is a semantic layer, a representation of a user interaction that would result in haptic and/or audio feedback. It takes input from the user interface and processes that input to generate and play feedback. For example, we want the same feedback when:

- spinning a wheel in a UIDatePicker to change the selected date
- highlighting different Home Screen Quick Actions when you 3D Touch on an app icon
- selecting different diacritics in the keyboard These three use cases are all represented by the same Selection feedback generator.

The list of feedback generators we plan to expose are:

- Selection (selection changes)
- Impact (collisions and detents)
- Notification (spontaneous notifications)

This architecture allows UIKit to change how feedback generators feel across the entire system without changing each of the use sites. This design lets us iterate quickly on haptics for system-wide interactions. Adopting feedback generators is easy for clients and minimally invasive to their existing code, even for feedback generators that perform complex processing of inputs to determine the appropriate feedback to play. Finally, by providing a limited set of well-defined feedback generators, we can ensure some degree of consistency in how feedback is used across the entire system.

Detailed Design

The only feedback APIs we plan to expose are a handful of feedback generator classes inheriting from UIFeedbackGenerator.

Base class — UIFeedbackGenerator

Objective-C

```
NS_CLASS_AVAILABLE_IOS(10_0)
@interface UIFeedbackGenerator : NSObject

- (void)prepare;

@end
```

Swift

```
@available(iOS 10.0, *)
class UIFeedbackGenerator { func prepare()

}
```

UIFeedbackGenerator is the base abstract class for all our feedback generators. It cannot be directly instantiated.

Feedback Generator Preparation

When directly calling feedback generating methods on feedback generator classes, UIKit first needs to bring up the underlying software and hardware stack, which incur a significant latency before the feedback is actually played (around 200ms). To alleviate this problem, the UIFeedbackGenerator base class contains the method prepare which is used to get everything ready for imminent feedback. This method can be called multiple times, and it's fine if no feedback is triggered after it. Once prepared, the latency is significantly lowered to around 60ms.

When prepared, a feedback generator is using expensive software and hardware resources so it should be kept in that state for a limited duration. It will go back to an idle state after a short time or until the object is deallocated.

Example

Objective-C

```
// prepare the feedback generator for imminent feedback
[feedbackGenerator prepare];

// do something on the feedback generator a little bit later
// with a minimal feedback latency
[feedbackGenerator something];
```

Swift

```
// prepare the feedback generator for imminent feedback
feedbackGenerator.prepare()

// do something on the feedback generator a little bit later
// with a minimal feedback latency
feedbackGenerator.something()
```

Built-in Feedback Generators

Selection Feedback Generator

The UISelectionFeedbackGenerator is used when changing a selection.

Objective-C

```
NS_CLASS_AVAILABLE_IOS(10_0)
@interface UISelectionFeedbackGenerator : UIFeedbackGenerator

- (void)selectionChanged;

@end
```

Swift

```
@available(iOS 10.0, *)
class UISelectionFeedbackGenerator : UIFeedbackGenerator {
```

```
    func selectionChanged()
```

}

The client just needs to call -selectionChanged whenever the selection changes, which will trigger feedback to play.

Example

Changing the selection in a menu.

Objective-C

```
UISelectionFeedbackGenerator *selectionFeedbackGenerator =
[[UISelectionFeedbackGenerator alloc] init];

// when the user starts interacting with the component,
// typically in the Began state of a gesture recognizer
[selectionFeedbackGenerator prepare];

// when the user selects something else as their finger moves
around,
// typically in the Changed state of a gesture recognizer,
// when the selected row changes
[selectionFeedbackGenerator selectionChanged];
```

Swift

```
let selectionFeedbackGenerator = UISelectionFeedbackGenerator()

// when the user starts interacting with the component,
// typically in the Began state of a gesture recognizer
selectionFeedbackGenerator.prepare();
```

```
// when the user selects something else as their finger moves around,
// typically in the Changed state of a gesture recognizer,
// when the selected row changes
selectionFeedbackGenerator.selectionChanged();
```

Impact Feedback Generator

The UIImpactFeedbackGenerator is used for collisions and detents.
Objective-C

```
typedef NS_ENUM(NSInteger, UIImpactFeedbackStyle) {
    UIImpactFeedbackStyleLight,
    UIImpactFeedbackStyleMedium,
    UIImpactFeedbackStyleHeavy
};

NS_CLASS_AVAILABLE_IOS(10_0)
@interface UIImpactFeedbackGenerator : UIFeedbackGenerator

- (instancetype)init NS_UNAVAILABLE;
- (instancetype)initWithStyle:(UIImpactFeedbackStyle)style NS_DESIGNATED_INITIALIZER;

/// when the object impacts something else
- (void)impactOccurred;

@end
```

Swift

```
enum UIImpactFeedbackStyle {
    case light, medium, heavy
```

}

```
@available(iOS 10.0, *)
class UIImpactFeedbackGenerator : UIFeedbackGenerator { init(style: UIImpactFeedbackStyle)

/// when the object impacts something else
    func impactOccurred()
}
```

UIImpactFeedbackGenerator generates feedback when items collide or cross a detent. The impact feedback generator is configured with a style representing the overall magnitude of the impact (roughly, the "mass" of the item).
The client calls -impactOccurred when an impact occurs.

Example

An object crossing a detent and colliding.
Objective-C

```
UIImpactFeedbackGenerator *impactFeedbackGenerator =
[[UIImpactFeedbackGenerator alloc] initWithStyle:
UIImpactFeedbackGeneratorStyleHeavy];

// when you're about to hit something
[impactFeedbackGenerator prepare];

// perform these a little bit later
{
    // when a collision occurs
    [impactFeedbackGenerator impactOccurred];
```

}
Swift

```
let impactFeedbackGenerator = UIImpactFeedbackGenerator(style: .heavy)

// when you're about to hit something
impactFeedbackGenerator.prepare()

// perform these a little bit later
{
    // when a collision occurs
    impactFeedbackGenerator.impactOccurred()
}
```

Notification Feedback Generator

The UINotificationFeedbackGenerator is used for spontaneous notifications.

Objective-C

```
typedef NS_ENUM(NSInteger, UINotificationFeedbackType) {
    UINotificationFeedbackTypeSuccess
    UINotificationFeedbackTypeWarning,
    UINotificationFeedbackTypeError
};

NS_CLASS_AVAILABLE_IOS(10_0)
@interface UINotificationFeedbackGenerator : UIFeedbackGenerator

- (void)notificationOccurred:(UINotificationFeedbackType)type;

@end
```

Swift
```
enum UINotificationFeedbackType {
    case success, warning, error
}

@available(iOS 10.0, *)
class UINotificationFeedbackGenerator : UIFeedbackGenerator { func notificationOccurred(type: UINotificationFeedbackType)

}
```
UINotificationFeedbackGenerator generates feedback for spontaneous notifications, generally triggered by some asynchronous event occurring as a result of previous user interaction (e.g. shake to undo alert presents, Apple Pay payment succeeds).

The client simply calls -notificationOccurred: passing the type of the notification, which will trigger the appropriate feedback.

Example

Displaying an alert controller with an error feedback.

Objective-C
```
UINotificationFeedbackGenerator *notificationFeedbackGenerator =
[[UINotificationFeedbackGenerator alloc] init];

[notificationFeedbackGenerator prepare];

// display an alert controller here

[notificationFeedbackGenerator
notificationOccurred:UINotificationFeedbackTypeError];
```

Swift

```
let notificationFeedbackGenerator =
UINotificationFeedbackGenerator();

notificationFeedbackGenerator.prepare()

// display an alert controller here notificationFeedbackGenerator.notificationOccurred(type: .error)
```

Impact on Existing Code

Existing first-party clients using _UITapticEngine will need to transition over to using the appropriate public or private UIFeedbackGenerator subclass, or the new UIPreviewInteraction API for Peek & Pop.

FAQ

What happens if I don't call prepare?
If you don't call prepare, you'll still get proper feedback playing but it may be delayed. Calling this method in advance is an optimization to ensure the best latency and feedback experience.
What happens if I call prepare constantly?
If you call prepare constantly, UIKit will try to honor it but might ignore your calls at some point to prevent an app from keeping the hardware warm if not actually triggering feedback.
What happens if I call a method generating feedback on a feedback generator and then immediately release/dealloc it? Will the feedback still be felt?
Yes, because the feedback generator schedules feedback events on a different object so it's not needed to actually play it. The hardware will go back to idle state as soon as the feedback is done playing - providing no other feedback generator is in play at the same time.

What if a third party client wants to have more complex haptics?

We currently don't support this but might in the future, either in UIKit or directly in CoreAudio.

Can a third party client disable or customize feedback on UIKit built-in controls?

No, we don't allow this to provide a unified experience across the system.

Date Picker

Figure 22B:
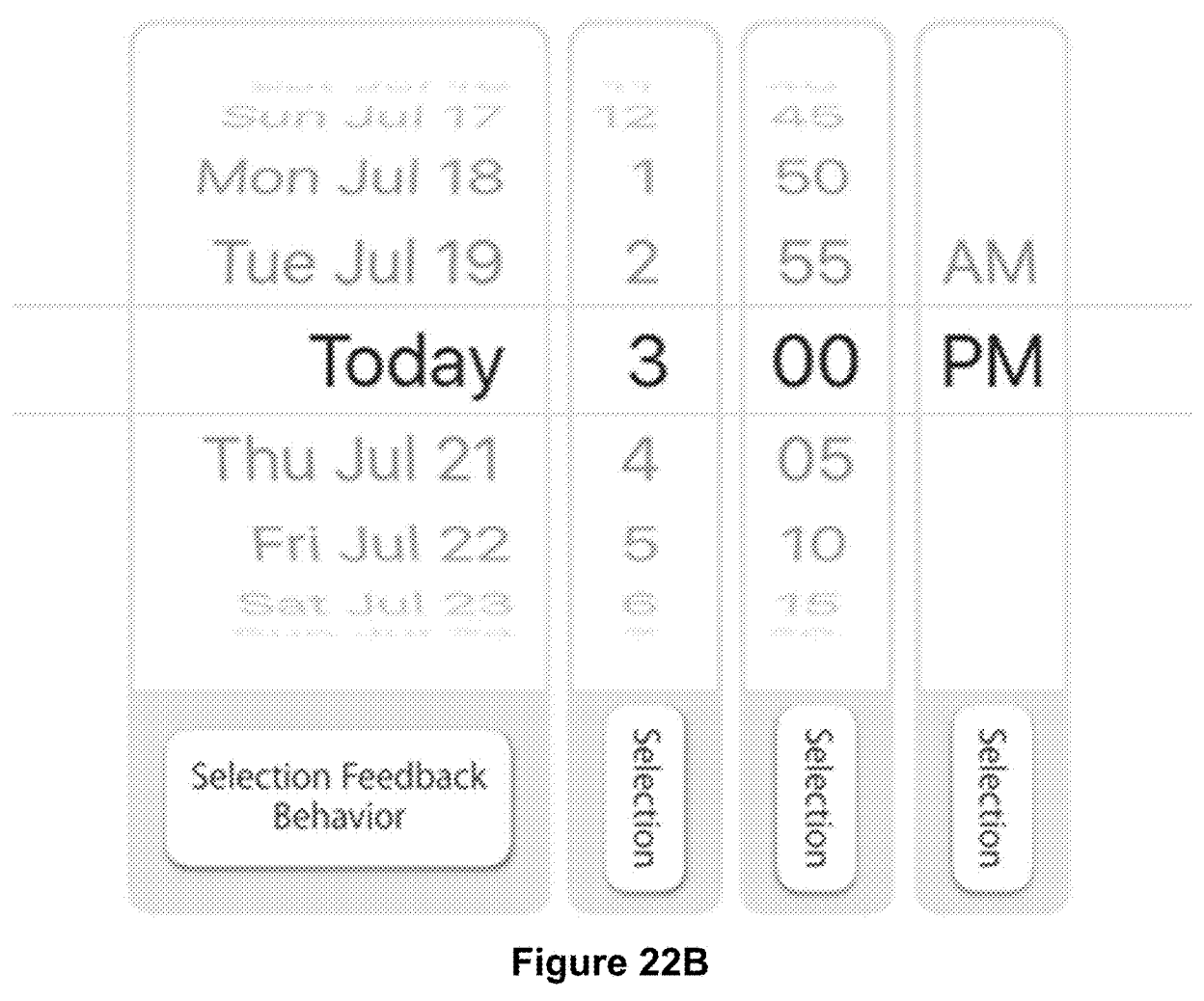

Let's look at the concrete example of a date picker (Figure 22B).

The date picker is made of 4 independently spinnable wheels which can be rotated simultaneously. As a consequence, we'll use 4 instances of UISelectionFeedbackGenerator to provide feedback when a new item is selected in each one of them.

A feature of the UISelectionFeedbackGenerator that is used by the date picker is that the pitch and volume of the audio and haptic are proportional to how fast the wheel is spinning. Each wheel will call selectionChanged on its own feedback generator, which will calculate the speed based on the frequency of the calls. Then the feedback generator will internally modulate the feedback to provide a great feeling for the end user.

Additionally, we want to limit the global frequency of played feedback across all selection feedback generators, to avoid overflowing the user with vibrations.

To achieve this rich experience, each wheel of the date picker (assuming they are subclasses of UIScrollView) would need this simple code:

Objective-C

```
- (instancetype)initWithFrame:(CGRect)frame
{
    self = [super initWithFrame:frame];

self.selectionFeedbackGenerator = [[UISelectionFeedbackGenerator alloc] init];

return self;
```

```
}

- (void)scrollViewWillBeginDragging:(UIScrollView *)scrollView
{
    // get the feedback generator ready for feedback as soon as we start scrolling
    [self.selectionFeedbackGenerator prepare];
}

- (void)scrollViewDidScroll:(UIScrollView *)scrollView
{
    // keep the feedback generator ready for feedback as long as we're scrolling
    [self.selectionFeedbackGenerator prepare];
}

- (void)_selectedRowDidChange
{
    [self.selectionFeedbackGenerator selectionChanged];
}
```

Appendix B

UIFeedbackGenerator additions

Architecture Overview

Figure 22C:
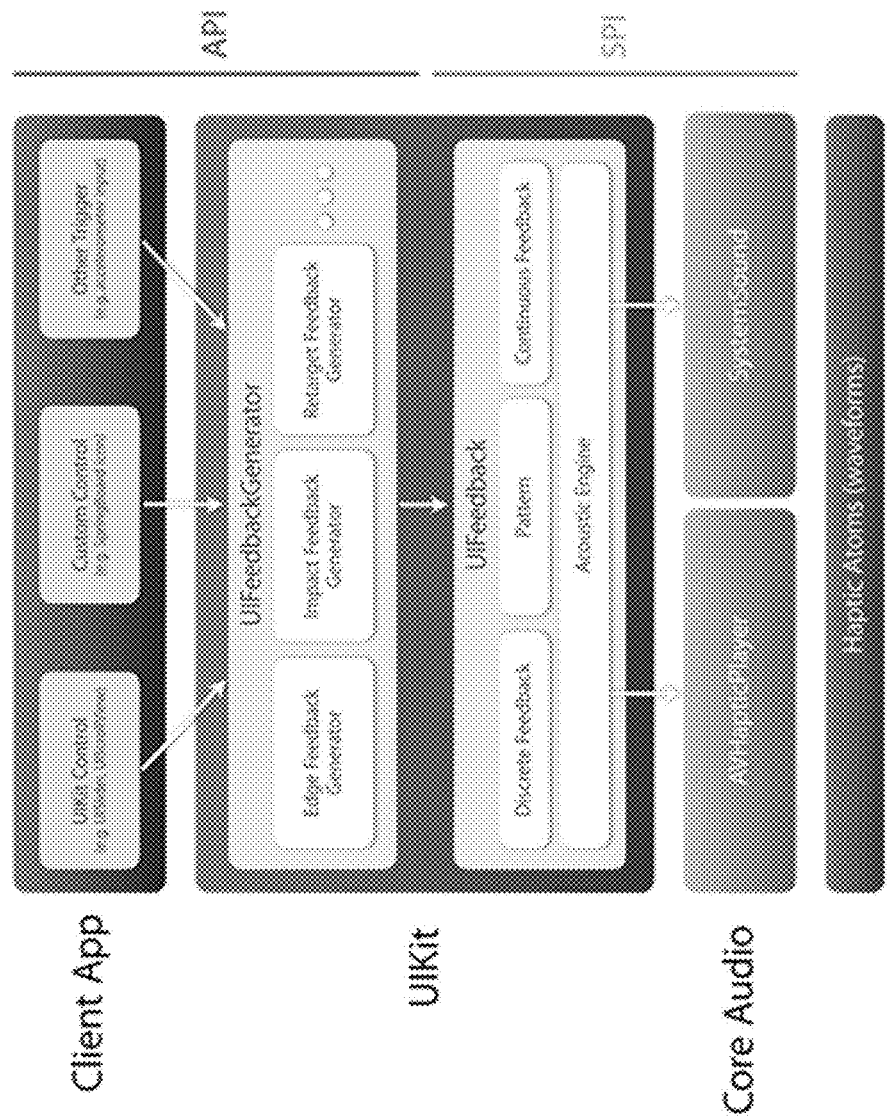
FIG. 22C is a diagram showing the overview of an example system.

Figure 22C is a diagram showing the overview of an example system.

Let's explore these layers one by one, starting from the bottom.

Low-level: Core Audio AVHapticPlayer and System Sound Services

AVHapticPlayer is the low-level entry point into the haptic system. This layer is vended by Core Audio. It allows UIKit to drive discrete haptics and modulate continuous ones. It also lets UIKit inform the system about how to prioritize haptic requests. The intent is for this layer to be consumed only by UIKit. This will keep UIKit as the only client of AVHapticPlayer, and allow us to iterate quickly on different haptic feelings.

The Core Audio System Sound Services APIs can play legacy haptics (e.g. peek & pop haptics) as well as sounds (e.g. keyboard clicks, device lock/unlock sounds). The new UIKit UIFeedback stack uses System Sound Services to play these sounds and legacy haptics, and as well as system sounds that we want to play alongside haptic feedback.

Mid-level: UIKit UIFeedback

The UIFeedback class represents playable feedback, which could be haptic and/or audio. There are subclasses for different use cases: UIDiscreteFeedback for discrete one-off haptics (e.g. "Peek" or "Pop"), UIContinuousFeedback for continuous haptics (e.g. a continuous vibration), and UIFeedbackPattern which can compose multiple discrete and continuous feedback into a more complex pattern. When a UIFeedback instance is told to play, it is handed over to a UIFeedbackEngine which is responsible for using the low-level Core Audio APIs to prepare the hardware and then schedule & play the feedback.

This UIFeedback layer is consumed primarily by UIKit to implement the high-level UIFeedbackGenerator API described below. Internal clients with exceptional needs can use UIFeedback directly, but such cases are extremely limited (currently there are none).

High-level: UIKit UIFeedbackGenerator (API)

UIFeedbackGenerator is a high-level representation of a user interaction that would result in haptic and/or audio feedback.

Synchronizing with the UI

To synchronize your UI with the feedback and make sure both happen at the same time, you can call prepareWithCompletionHandler: and execute your UI and feedback code in the handler, which will be called on the main thread. This will ensure that the feedback generated has a minimal latency and is experienced in sync with the UI.

The success parameter informs you about whether feedback will actually be played for actions called inside the handler or not.

Example

If you want to display some UI which would be synchronized with a feedback.
Objective-C

```
[generator prepareWithCompletionHandler:^(BOOL success) {

// display some UI here if (success) {

// do something on the generator

// the latency for the feedback here will be minimal

}

}];
```

Drag Feedback Generator

The UIDragFeedbackGenerator is used for interactive drag & drop and reordering.
Objective-C

```
NS_ASSUME_NONNULL_BEGIN

NS_CLASS_AVAILABLE_IOS(10_0) @interface UIDragFeedbackGenerator :

UIFeedbackGenerator <UIFeedbackGeneratorUserInteractionDriven>
```

```
/// call when the interaction has moved the object being dragged
- (void)positionUpdated;

/// call when the object updated its drop target
- (void)dropTargetUpdated;

@end

NS_CLASS_AVAILABLE_IOS(10_0) @interface
UIDragSnappingFeedbackGenerator : UIDragFeedbackGenerator /// call when the object being dragged lifts from its initial position
- (void)draggedObjectLifted;

/// call when the object being dragged lands into its final position
- (void)draggedObjectLanded;

/// call when the interaction made some object snaps into another position
- (void)objectSnapped;

@end

NS_ASSUME_NONNULL_END
```

UIDragFeedbackGenerator generates feedback when items are dragged and reordered. The drag generator has a sub-
class UIDragSnappingFeedbackGenerator to be used when the dragged item will snap into place.

The drag generator is user interaction driven, so the appropriate calls should be made when user interaction begins/ends/cancels. Then the client should call -positionUpdated whenever the dragged item moves, and (if using the snapping style) call -snappedToFinalPosition when the dragged item snaps into place.

Example

Dragging and dropping an object.

Objective-C

```
UIDragFeedbackGenerator *dragGenerator = [UIDragFeedbackGenerator generatorWithCoordinateSpace:self];

// when the user interaction starts,
// typically in the Began state of a gesture recognizer
[dragGenerator userInteractionStarted];

// when the user moved the dragged object on the screen
// expected to be called a lot of times
[dragGenerator positionUpdated];

// when the major drop target changes,
// for example moving from one area to another
[dragGenerator dropTargetUpdated];

// when the user interaction stops,
// typically in the Ended state of a gesture recognizer
[dragGenerator userInteractionEnded];
```

Edge Feedback Generator

The UIEdgeFeedbackGenerator is used when reaching an edge or limit.

Objective-C

```
NS_ASSUME_NONNULL_BEGIN

NS_CLASS_AVAILABLE_IOS(10_0) @interface UIEdgeFeedbackGenerator :
UIFeedbackGenerator <UIFeedbackGeneratorUserInteractionDriven>

// distance describes the area between edges
// By default, it is the axis size component of the generator's
// coordinate spaces' bounds
@property (nonatomic) CGFloat distance;

// extentBeyondDistance specifies how many points, in
// coordinateSpace, the interaction can move. 0 by default
@property (nonatomic) CGFloat extentBeyondDistance;

// position can range from (0 - extentBeyondDistance) to
// (distance + extentBeyondDistance)
// position should be within coordinateSpace
- (void)positionUpdated:(CGFloat)position;

@end

NS_CLASS_AVAILABLE_IOS(10_0) @interface UIZoomEdgeFeedbackGenerator
: UIEdgeFeedbackGenerator
```

```
@property (nonatomic) CGFloat minimumZoomScale;
@property (nonatomic) CGFloat maximumZoomScale;

// the minimum zoom scale which can be reached temporarily when zooming out past the minimumZoomScale
@property (nonatomic) CGFloat minimumTemporaryZoomScale;
// the maximum zoom scale which can be reached temporarily when zooming in past the maximumZoomScale
@property (nonatomic) CGFloat maximumTemporaryZoomScale;

- (void)zoomScaleUpdated:(CGFloat)zoomScale;

@end

NS_ASSUME_NONNULL_END
```

UIEdgeFeedbackGenerator generates feedback when an edge or limit is reached and/or exceeded. Each edge generator is created with a style for the particular use, which affects the feedback that is generated. The edge generator is one-dimensional, and is configured for a single axis. It is also configured with a distance (i.e. the size of the view in that axis) and an extentBeyondDistance (i.e. the maximum rubber band distance; how far beyond the distance can the position move).

UIZoomEdgeFeedbackGenerator is a subclass of edge generator that generates feedback when a zoom limit is reached and/or exceeded. It is configured with minimum and maximum zoom scales, as well as minimum/maximum temporary zoom scales (the equivalent rubber band effect for zooming).

Both the edge and zoom edge generators are user interaction driven, so the appropriate calls should be made when user interaction begins/ends/cancels. Then the client just needs to call -positionUpdated: or -zoomScaleUpdated: whenever the value changes. The generator processes these inputs to play feedback; for example, when an edge is reached the generator plays a haptic with an intensity proportional to the velocity at that time.

Example

Implementing a slider-like UIControl subclass.

Swift

```swift
class MyCustomSlider : UIControl {
    let edgeGenerator =
UIEdgeFeedbackGenerator(coordinateSpace:self)

// ...

override func touchesBegan(touches: Set<UITouch>, withEvent event: UIEvent?) {

// ...

self.edgeGenerator.userInteractionStarted()
    } override func touchesMoved(touches: Set<UITouch>, withEvent event: UIEvent?) {

// ...
        let position = /* get the new position, 0.0 to 1.0 */
        self.edgeGenerator.positionUpdated(position: position)
    } override func touchesEnded(touches: Set<UITouch>, withEvent event: UIEvent?) {

// ...
```

```
        self.edgeGenerator.userInteractionEnded()
    } override func touchesCancelled(touches: Set<UITouch>, withEvent event: UIEvent?) {
        // ...

self.edgeGenerator.userInteractionCancelled()
    }
}
```
Objective-C
```
@implementation MyCustomSlider

- (id)init {
    ...
    self.edgeGenerator = [UIEdgeFeedbackGenerator generatorWithCoordinateSpace:self];
    ...
}

- (void)touchesBegan:(NSSet *)touches withEvent:(UIEvent *)event {
    // ...
    [self.edgeGenerator userInteractionStarted];
}

- (void)touchesMoved:(NSSet *)touches withEvent:(UIEvent *)event {
```

```
    // ...
    CGFloat position = /* get the new position, 0.0 to 1.0 */;
    [self.edgeGenerator positionUpdated:position];
}

- (void)touchesEnded:(NSSet *)touches withEvent:(UIEvent *)event {
    // ...
    [self.edgeGenerator userInteractionEnded];
}

- (void)touchesCancelled:(NSSet *)touches withEvent:(UIEvent
*)event {
    // ...
    [self.edgeGenerator userInteractionCancelled];
}

@end
```

Additions to UIKit components

Several components of UIKit have adopted feedback and expose new APIs to control how the produce this feedback. They take the form of the generator property being exposed, which can either be set to nil to remove the feedback for this generator, or to a different object if the client wants a custom feedback experience (typically, the same object created with a different style).

Exposing the feedback generators instead of just boolean properties allows for future API extension without needing to change all the UIKit component APIs again and focus only on the feedback generator class and subclasses.

UISwitch API Additions

UISwitch uses the retarget generator to provide feedback when the switch flips value.

Objective-C

```
@interface UISwitch ()

@property (nonatomic, strong, nullable) UIImpactFeedbackGenerator *impactFeedbackGenerator;

@end
```

UIPickerView API Additions

UIPickerView uses the retarget generator to provide feedback when a component (wheel) of the picker view changes selection.

Objective-C

```
@interface UIPickerView ()

@property (nonatomic, strong, nullable) UIRetargetFeedbackGenerator *retargetFeedbackGenerator;

@end
```

UIDatePicker API Additions

UIDatePicker uses the retarget generator to provide feedback when a component (wheel) of the date picker changes selection.

Objective-C

```
@interface UIDatePicker ()

@property (nonatomic, strong, nullable) UIRetargetFeedbackGenerator *retargetFeedbackGenerator;

@end
```

UIRefreshControl API Additions

UIRefreshControl uses the impact generator to provide feedback when the control begins refreshing.

Objective-C

```objc
@interface UIRefreshControl ()

@property (nonatomic, strong, nullable) UIImpactFeedbackGenerator *refreshFeedbackGenerator;

@end
```

UIScrollView API Additions

UIScrollView uses the edge generator to provide feedback when the user reaches an edge of the scrollable content area (where the rubber band effect begins), as well as when the user reaches a zoom limit when pinching with two fingers. Because scroll view can scroll horizontally and vertically, it uses two separate edge generators, one per axis. It also uses one zoom edge generator.

Objective-C

```objc
@interface UIScrollView ()

@property (nonatomic, strong, nullable) UIEdgeFeedbackGenerator *horizontalFeedbackGenerator;
@property (nonatomic, strong, nullable) UIEdgeFeedbackGenerator *verticalFeedbackGenerator;
@property (nonatomic, strong, nullable) UIZoomEdgeFeedbackGenerator *zoomFeedbackGenerator;

@end
```

UISlider API Additions

UISlider uses the edge generator to provide feedback when the slider's thumb (indicator knob) reaches the left or right edge of the slider. Because slider is strictly horizontal, it exposes a single edge generator.

Objective-C

```objc
@interface UISlider ()

@property (nonatomic, strong, nullable) UIEdgeFeedbackGenerator *edgeFeedbackGenerator;

@end
```

UITableView API Additions

UITableView uses the drag generator to provide feedback when the user reorders rows in the table view, and a retarget generator when the user switched to another section using the index bar.

Objective-C

```objc
@interface UITableView ()

@property (nonatomic, strong, nullable) UIRetargetFeedbackGenerator *indexRetargetFeedbackGenerator;
@property (nonatomic, strong, nullable) UIDragSnappingFeedbackGenerator *reorderFeedbackGenerator;

@end
```

UICollectionView API Additions

UICollectionView uses the drag generator to provide feedback when the user reorders items in the collection view.

Objective-C

```objc
@interface UICollectionView ()

@property (nonatomic, strong, nullable) UIDragSnappingFeedbackGenerator *reorderFeedbackGenerator;
```

@end

What is claimed is:

1. A method, comprising:
at an electronic device with a display, a touch-sensitive surface, and one or more tactile output generators:
displaying, on the display, a user interface;
detecting an occurrence of a first condition that triggers a first user interface event that is associated with a tactile output, wherein:
generating the first user interface event includes displaying one or more changes to the user interface; and
the device will not be able to generate the tactile output associated with the first user interface event for a respective amount of time; and
in response to detecting the occurrence of the first condition, in accordance with a determination that the first user interface event corresponds to a first user interface event category:
delaying generating the first user interface event for at least the respective amount of time; and
after delaying generating the first user interface event for at least the respective amount of time, displaying the one or more changes to the user interface and generating the tactile output that is associated with the first user interface event, wherein the display of the one or more changes to the user interface is synchronized with the generation of the tactile output that is associated with the first user interface event.

2. The method of claim 1, including, when the respective amount of time is a first amount of time, delaying displaying the one or more changes to the user interface for the first amount of time, and when the respective amount of time is a second amount of time, delaying displaying the one or more changes to the user interface for the second amount of time.

3. The method of claim 1, including, in response to detecting the occurrence of the first condition, in accordance with a determination that the first user interface event corresponds to a second user interface event category, displaying the one or more changes to the user interface before the respective amount of time has elapsed and generating the tactile output that is associated with the one or more changes in the user interface after the respective amount of time has elapsed.

4. The method of claim 3, wherein:
the first user interface event category includes events where the respective amount of time for the one or more changes to the user interface is flexible; and
the second user interface event category includes events where the respective amount of time for the one or more changes to the user interface is inflexible.

5. The method of claim 3, wherein:
the first user interface event category includes events where the one or more changes to the user interface do not simulate direct manipulation of the user interface by user inputs; and
the second user interface event category includes events where the one or more changes to the user interface simulate direct manipulation of the user interface by user inputs.

6. The method of claim 1, including:
detecting a user input on the touch-sensitive surface that triggers a second user interface event that is associated with a tactile output, wherein generating the second user interface event includes displaying one or more changes to the user interface; and,
in response to detecting the user input on the touch-sensitive surface, displaying the one or more changes to the user interface for the second user interface event and generating the tactile output that is associated with the second user interface event, wherein a first time interval between the display of the one or more changes to the user interface for the first user interface event and the generation of the tactile output that is associated with the first user interface event is less than a second time interval between the display of the one or more changes to the user interface for the second user interface event and the generation of the tactile output that is associated with the second user interface event.

7. The method of claim 1, wherein the detected occurrence of the first condition includes detected movement of the electronic device that meets predefined input pattern criteria and the one or more changes to the user interface include undoing a previously performed operation.

8. The method of claim 1, wherein the determination that the first user interface event corresponds to the first user interface event category includes a determination that the first user interface event is a notification event that does not correspond to a user input currently detected on the touch-sensitive surface.

9. The method of claim 1, wherein the determination that the first user interface event corresponds to the first user interface event category includes a determination that the first user interface event is a notification event initiated in accordance with receiving electronically delivered information from an information source external to the electronic device.

10. The method of claim 1, wherein the determination that the first user interface event corresponds to the first user interface event category includes a determination that the first user interface event is a notification event initiated in accordance with receiving electronically delivered information from an application executed by the electronic device and independent of any user input on the touch-sensitive surface that is detected at the same time as, or immediately preceding, the notification event.

11. The method of claim 1, wherein the determination that the first user interface event corresponds to the first user interface event category includes a determination that the first user interface event is a notification event initiated in accordance with completion of a transaction initiated by a user of the electronic device.

12. The method of claim 1, wherein the determination that the first user interface event corresponds to the first user interface event category includes a determination that the first user interface event is provided to an application programming interface (API) with a value indicating that the one or more changes to the user interface can be delayed until the device is ready to generate the tactile output.

13. An electronic device, comprising:
a display;
a touch-sensitive surface;
one or more tactile output generators;
one or more processors; and
memory storing one or more programs for execution by the one or more processors, the one or more programs including instructions for:
displaying, on the display, a user interface;
detecting an occurrence of a first condition that triggers a first user interface event that is associated with a tactile output, wherein:

generating the first user interface event includes displaying one or more changes to the user interface; and the device will not be able to generate the tactile output associated with the first user interface event for a respective amount of time; and in response to detecting the occurrence of the first condition, in accordance with a determination that the first user interface event corresponds to a first user interface event category:

delaying generating the first user interface event for at least the respective amount of time; and after delaying generating the first user interface event for at least the respective amount of time, displaying the one or more changes to the user interface and generating the tactile output that is associated with the first user interface event, wherein the display of the one or more changes to the user interface is synchronized with the generation of the tactile output that is associated with the first user interface event.

14. The electronic device of claim 13, wherein the one or more programs include instructions for, when the respective amount of time is a first amount of time, delaying displaying the one or more changes to the user interface for the first amount of time, and when the respective amount of time is a second amount of time, delaying displaying the one or more changes to the user interface for the second amount of time.

15. The electronic device of claim 13, wherein the one or more programs include instructions for, in response to detecting the occurrence of the first condition, in accordance with a determination that the first user interface event corresponds to a second user interface event category, displaying the one or more changes to the user interface before the respective amount of time has elapsed and generating the tactile output that is associated with the one or more changes in the user interface after the respective amount of time has elapsed.

16. The electronic device of claim 13, wherein:
the first user interface event category includes events where the respective amount of time for the one or more changes to the user interface is flexible; and
the second user interface event category includes events where the respective amount of time for the one or more changes to the user interface is inflexible.

17. The electronic device of claim 13, wherein:
the first user interface event category includes events where the one or more changes to the user interface do not simulate direct manipulation of the user interface by user inputs;
and the second user interface event category includes events where the one or more changes to the user interface simulate direct manipulation of the user interface by user inputs.

18. The electronic device of claim 13, wherein the one or more programs include instructions for:
detecting a user input on the touch-sensitive surface that triggers a second user interface event that is associated with a tactile output, wherein generating the second user interface event includes displaying one or more changes to the user interface; and,
in response to detecting the user input on the touch-sensitive surface, displaying the one or more changes to the user interface for the second user interface event and generating the tactile output that is associated with the second user interface event, wherein a first time interval between the display of the one or more changes to the user interface for the first user interface event and the generation of the tactile output that is associated with the first user interface event is less than a second time interval between the display of the one or more changes to the user interface for the second user interface event and the generation of the tactile output that is associated with the second user interface event.

19. The electronic device of claim 13, wherein the detected occurrence of the first condition includes detected movement of the electronic device that meets predefined input pattern criteria and the one or more changes to the user interface include undoing a previously performed operation.

20. The electronic device of claim 13, wherein the determination that the first user interface event corresponds to the first user interface event category includes a determination that the first user interface event is a notification event that does not correspond to a user input currently detected on the touch-sensitive surface.

21. The electronic device of claim 13, wherein the determination that the first user interface event corresponds to the first user interface event category includes a determination that the first user interface event is a notification event initiated in accordance with receiving electronically delivered information from an information source external to the electronic device.

22. The electronic device of claim 13, wherein the determination that the first user interface event corresponds to the first user interface event category includes a determination that the first user interface event is a notification event initiated in accordance with receiving electronically delivered information from an application executed by the electronic device and independent of any user input on the touch-sensitive surface that is detected at the same time as, or immediately preceding, the notification event.

23. The electronic device of claim 13, wherein the determination that the first user interface event corresponds to the first user interface event category includes a determination that the first user interface event is a notification event initiated in accordance with completion of a transaction initiated by a user of the electronic device.

24. The electronic device of claim 13, wherein the determination that the first user interface event corresponds to the first user interface event category includes a determination that the first user interface event is provided to an application programming interface (API) with a value indicating that the one or more changes to the user interface can be delayed until the device is ready to generate the tactile output.

25. A non-transitory computer readable storage medium storing one or more programs, the one or more programs comprising instructions, which, when executed by an electronic device with a display, a touch-sensitive surface, and one or more tactile output generators, cause the device to:
display, on the display, a user interface;
detect an occurrence of a first condition that triggers a first user interface event that is associated with a tactile output, wherein:
generating the first user interface event includes displaying one or more changes to the user interface; and
the device will not be able to generate the tactile output associated with the first user interface event for a respective amount of time; and
in response to detecting the occurrence of the first condition, in accordance with a determination that the first user interface event corresponds to a first user interface event category:

delay generating the first user interface event for at least the respective amount of time; and after delaying generating the first user interface event for at least the respective amount of time, display the one or more changes to the user interface and generate the tactile output that is associated with the first user interface event, wherein the display of the one or more changes to the user interface is synchronized with the generation of the tactile output that is associated with the first user interface event.

26. The non-transitory computer readable storage medium of claim 25, wherein the one or more programs include instructions, which, when executed by the electronic device, cause the device, when the respective amount of time is a first amount of time, to delay displaying the one or more changes to the user interface for the first amount of time, and when the respective amount of time is a second amount of time, to delay displaying the one or more changes to the user interface for the second amount of time.

27. The non-transitory computer readable storage medium of claim 25, wherein the one or more programs include instructions, which, when executed by the electronic device, cause the device, in response to detecting the occurrence of the first condition, in accordance with a determination that the first user interface event corresponds to a second user interface event category, to display the one or more changes to the user interface before the respective amount of time has elapsed and to generate the tactile output that is associated with the one or more changes in the user interface after the respective amount of time has elapsed.

28. The non-transitory computer readable storage medium of claim 25, wherein
the first user interface event category includes events where the respective amount of time for the one or more changes to the user interface is flexible; and
the second user interface event category includes events where the respective amount of time for the one or more changes to the user interface is inflexible.

29. The non-transitory computer readable storage medium of claim 25, wherein
the first user interface event category includes events where the one or more changes to the user interface do not simulate direct manipulation of the user interface by user inputs; and
the second user interface event category includes events where the one or more changes to the user interface simulate direct manipulation of the user interface by user inputs.

30. The non-transitory computer readable storage medium of claim 25, wherein the one or more programs include instructions, which, when executed by the electronic device, cause the device to:
detect a user input on the touch-sensitive surface that triggers a second user interface event that is associated with a tactile output, wherein generating the second user interface event includes displaying one or more changes to the user interface; and,
in response to detecting the user input on the touch-sensitive surface, display the one or more changes to the user interface for the second user interface event and generate the tactile output that is associated with the second user interface event, wherein a first time interval between the display of the one or more changes to the user interface for the first user interface event and the generation of the tactile output that is associated with the first user interface event is less than a second time interval between the display of the one or more changes to the user interface for the second user interface event and the generation of the tactile output that is associated with the second user interface event.

31. The non-transitory computer readable storage medium of claim 25, wherein the detected occurrence of the first condition includes detected movement of the electronic device that meets predefined input pattern criteria and the one or more changes to the user interface include undoing a previously performed operation.

32. The non-transitory computer readable storage medium of claim 25, wherein the determination that the first user interface event corresponds to the first user interface event category includes a determination that the first user interface event is a notification event that does not correspond to a user input currently detected on the touch-sensitive surface.

33. The non-transitory computer readable storage medium of claim 25, wherein the determination that the first user interface event corresponds to the first user interface event category includes a determination that the first user interface event is a notification event initiated in accordance with receiving electronically delivered information from an information source external to the electronic device.

34. The non-transitory computer readable storage medium of claim 25, wherein the determination that the first user interface event corresponds to the first user interface event category includes a determination that the first user interface event is a notification event initiated in accordance with receiving electronically delivered information from an application executed by the electronic device and independent of any user input on the touch-sensitive surface that is detected at the same time as, or immediately preceding, the notification event.

35. The non-transitory computer readable storage medium of claim 25, wherein the determination that the first user interface event corresponds to the first user interface event category includes a determination that the first user interface event is a notification event initiated in accordance with completion of a transaction initiated by a user of the electronic device.

36. The non-transitory computer readable storage medium of claim 25, wherein the determination that the first user interface event corresponds to the first user interface event category includes a determination that the first user interface event is provided to an application programming interface (API) with a value indicating that the one or more changes to the user interface can be delayed until the device is ready to generate the tactile output.

\* \* \* \* \*